United States Patent
Ren et al.

(10) Patent No.: US 12,435,108 B2
(45) Date of Patent: Oct. 7, 2025

(54) TEIXOBACTIN ANALOGUE AND USE THEREOF

(71) Applicant: SUNSHINE LAKE PHARMA CO., LTD., Guangdong (CN)

(72) Inventors: Qingyun Ren, Dongguan (CN); Zhimin Xiong, Dongguan (CN); Yingjun Zhang, Dongguan (CN); Xuechen Li, Hong Kong (CN); Xianwu Fu, Dongguan (CN); Ali Huang, Dongguan (CN); Huichao Luo, Dongguan (CN)

(73) Assignee: SUNSHINE LAKE PHARMA CO., LTD., Guangdong (CN)

( * ) Notice: Subject to any disclaimer, the term of this patent is extended or adjusted under 35 U.S.C. 154(b) by 828 days.

(21) Appl. No.: 17/624,830

(22) PCT Filed: Jul. 23, 2020

(86) PCT No.: PCT/CN2020/103757
§ 371 (c)(1),
(2) Date: Jan. 4, 2022

(87) PCT Pub. No.: WO2021/013217
PCT Pub. Date: Jan. 28, 2021

(65) Prior Publication Data
US 2022/0273760 A1 Sep. 1, 2022

(30) Foreign Application Priority Data

Jul. 24, 2019 (CN) .......................... 201910671351.8

(51) Int. Cl.
*C07K 11/02* (2006.01)
*A61P 31/04* (2006.01)
*A61P 31/06* (2006.01)
*C07K 7/06* (2006.01)

(52) U.S. Cl.
CPC .............. *C07K 11/02* (2013.01); *A61P 31/04* (2018.01); *A61P 31/06* (2018.01); *C07K 7/06* (2013.01)

(58) Field of Classification Search
None
See application file for complete search history.

(56) References Cited

U.S. PATENT DOCUMENTS

| 9,771,394 B2 | 9/2017 | Gordeev et al. |
| 11,046,730 B2 | 6/2021 | Nowick et al. |
| 11,174,290 B2 | 11/2021 | Peoples et al. |
| 2020/0216493 A1 | 7/2020 | Henninot et al. |
| 2021/0060121 A1* | 3/2021 | Li ........................... A61P 31/10 |
| 2021/0139539 A1 | 5/2021 | Singh et al. |

FOREIGN PATENT DOCUMENTS

| CN | 107778352 B | 10/2020 |
| CN | 106632604 B | 3/2021 |
| WO | 2018/214463 A1 | 11/2018 |
| WO | 2020/088053 A1 | 5/2020 |

OTHER PUBLICATIONS

Ling, L., Schneider, T., Peoples, A. et al. A new antibiotic kills pathogens without detectable resistance. Nature 517, 455-459 (2015). https://doi.org/10.1038/nature 14098 (Year: 2015).*

Kirchmair, J., Galler, A., Lang, D. et al. Predicting drug metabolism: experiment and/or computation ?. Nat Rev Drug Discov 14, 387-404 (2015). https://doi.org/10.1038/nrd4581 (Year: 2015).*

Parmar, A. et al. Syntheses of potent teixobactin analogues against methicillin-resistant *Staphylococcus aureus* (MRSA) through the replacement of I-allo-enduracididine with its isosteres. Chem. Commun., 2017, vol. 53, pp. 7788-7791.

Jin, K. et al. Synthesis and antibacterial studies of teixobactin analogues with non-isostere substitution of enduracididine. Bioorganic & Medicinal Chemistry 26, (2018), pp. 1062-1068.

Zong, Y. et al. Developing Equipotent Teixobactin Analogues against Drug-Resistant Bacteria and Discovering a Hydrophobic Interaction between Lipid II and Teixobactin. J. Med. Chem. 2018, vol. 61, pp. 3409-3421.

Parmar Anish et al. Efficient total syntheses and biological activities of two teixobactin analogues. Chemical Communications (Cambridge, United Kingdom), (2016), vol. 52, No. 36, pp. 6060-6063.

A. H. Abdel Monaim Shimaa et al. Re-evaluation of the N-terminal substitution and the D-residues of teixobactin. RSC Advances (2016), vol. 6, No. 77, pp. 73827-73829.

Parmar Anish et al. Design and syntheses of highly potent teixobactin analogues against *Staphylococcus aureus*, Methicillin-resistant *Staphylococcus aureus* (MRSA), vancomycin-resistant Enterococci (VRE) in vitro and in vivo. Journal of Medicinal Chemistry (2018), vol. 61 No. 5, pp. 2009-2017.

(Continued)

*Primary Examiner* — Christina Bradley
(74) *Attorney, Agent, or Firm* — Oliff PLC

(57) ABSTRACT

Pharmaceuticals, and specifically a Teixobactin analogue and use thereof. A pharmaceutical composition having the compound and use of the compound and the pharmaceutical composition thereof inhibits the growth and/or reproduction of Gram-positive bacteria or *Mycobacterium tuberculosis*. A compound has Formula (Ia) or a stereoisomer, a tautomer, an N-oxide, a solvate, a metabolite, a pharmaceutically acceptable salt or a prodrug thereof, (Ia)

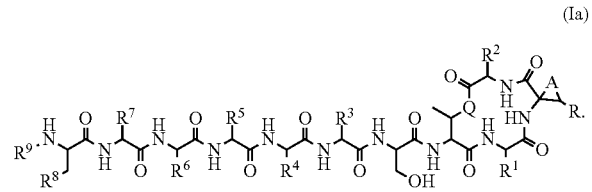

16 Claims, No Drawings

(56) References Cited

OTHER PUBLICATIONS

Parmar Anish et al. Teixobactin analogues reveal enduracididine to be non-essential for highly potent antibacterial activity and lipid II binding. Chemical Science, (2017), vol. 8, No. 12, pp. 8183-8192.
Fiers, William D. et al. Teixobactin and Its Analogues a New Hope in Antibiotic Discovery. ACS Infectious Diseases, (2017), vol. 3, No. 10, pp. 688-690.
Nov. 3, 2020 Search Report issued in International Patent Application No. PCT/CN2020/103757.
Nov. 3, 2020 Written Opinion issued in International Patent Application No. PCT/CN2020/103757.

* cited by examiner

TEIXOBACTIN ANALOGUE AND USE THEREOF

CROSS-REFERENCE TO RELATED APPLICATION

This application claims the priority and benefits of Chinese Patent Application No. 201910671351.8, filed with the State Intellectual Property Office of China on Jul. 24, 2019, which is incorporated herein by reference in its entirety.

FIELD OF THE INVENTION

The present invention belongs to the field of pharmaceuticals, and specifically relates to a Teixobactin analogue and use thereof. It further relates to a pharmaceutical composition comprising the compound. The compound and its pharmaceutical composition can be used to inhibit the growth and/or reproduction of Gram-positive bacteria or *Mycobacterium tuberculosis*.

BACKGROUND OF THE INVENTION

Gram-positive bacterial infections are common and frequently-occurring diseases that seriously endanger human health. Gram-positive cocci infections are increasing, and the detection rate of methicillin-resistant *Staphylococcus aureus* (MRSA) is increasing. Penicillin-resistant *Streptococcus pneumoniae* (PRSP) is spread in many countries and regions, and many other antibiotics that resist to glycopeptides and vancomycin-resistant cocci (VRE) emerge. Multidrug resistant *Mycobacterium tuberculosis* has increased. In order to effectively control these existing antibiotic and antimicrobial drug-resistant bacterial infections, it has become a hot spot of worldwide attention in the research and development of drugs to treat Gram-positive drug-resistant bacterial infections.

At present, bacteria can be mutated by contacting with antibacterial drugs to obtain drug resistance. There are four main mechanisms: ① production of antibiotic enzymes to inactivate antibiotics; ② variation of target resulting in having no response to drugs; ③ change of outer membrane permeability to block the entry of drugs; ④ enhancement of efflux to enhance the pump out of the drug into the bacteria. In the "encounter battles" with antibacterial drugs, the surviving bacteria have accumulated a wealth of "fighting experience" and become resistant varieties, which have evolved into "super bacteria" with cross-resistance, multi-resistance, pan-resistance, and total resistance.

In 2015, the detection rate of *Escherichia coli* in China for the third-generation cephalosporin-resistant bacteria was 59%, and the detection rate for quinolones-resistant bacteria was 53.5%. The detection rate of *Klebsiella pneumoniae* for the third-generation cephalosporin-resistant bacteria was 36.5%, and the detection rate for methicillin-resistant *aureus* was 35.8%. The detection rate of these representative drug-resistant bacteria was at a relatively high level. Globally, the average detection rate of vancomycin resistance of *Enterococcus faecium* in North America and Europe is as high as 66.8%, and is 39.4% in Latin America. Some multi-resistant and pan-resistant bacteria have pushed the clinic to a desperate situation, and it is urgent to accelerate the development of new antibacterial drugs.

Teixobactin is a new type of antibacterial drug discovered by American scientists through iChip technology in 2015. The compound kills certain bacterias in the mouse body at a rate comparable to existing antibiotics, and has no toxic and side effects, which is safe and effective. Teixobactin has good activity against most of the pathogenic bacteria tested, including enterococci, *Mycobacterium tuberculosis*, *Clostridium difficile*, and *Bacillus anthracis* which are hard to cure; it has good activity against *Staphylococcus aureus*, and it has better bactericidal effect than vancomycin against bacteria at the end of exponential growth. It can effectively inhibit drug-resistant *Mycobacterium tuberculosis*. The most important thing is that Teixobactin has a novel mechanism of action, mainly by destroying the cell wall to eliminate bacteria without inducing drug resistance. Teixobactin's in vitro research not only presents a novel antibiotic structure, but also brings hope for the emergence of new non-resistant antibiotics in the future. Therefore, Teixobactin is also called "super antibiotic". The initial in vitro pharmacokinetics shows that the half-life is more appropriate, and Teixobactin will not cause cytotoxicity, hemolysis, hERG inhibition, genotoxicity, etc. Therefore, it will have great development prospects in the research and development of Teixobactin analogues.

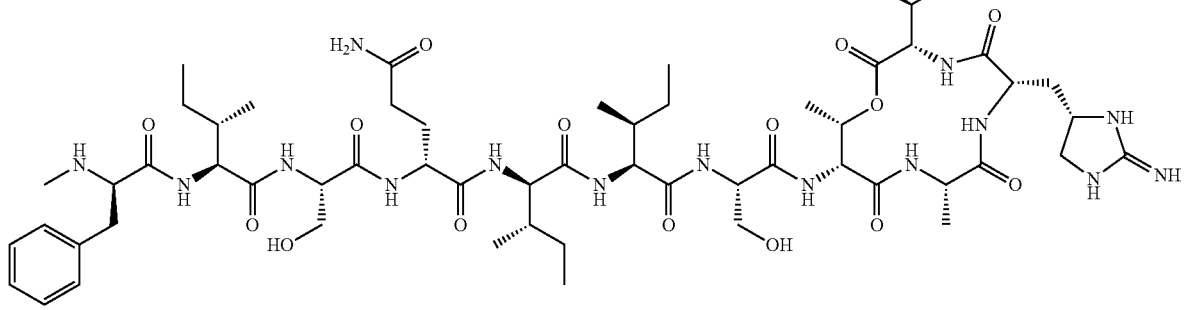

Teixobactin

SUMMARY OF THE INVENTION

The present invention provides a novel antibiotic containing spiro structure—Teixobactin analogue and its pharmaceutical composition, and the use of the compound or the pharmaceutical composition in the preparation of a medicament for inhibiting the growth and/or reproduction of Gram-positive bacteria or *Mycobacterium tuberculosis*. Compared with the existing similar compounds, the novel antibiotic compounds containing spiro structure of the present invention not only have better pharmacological activity, such as having very good antibacterial activity, but also have better in vivo metabolic kinetic properties and in vivo pharmacodynamic properties.

In one aspect, the present invention provides a compound having Formula (Ia) or a stereoisomer, a tautomer, an N-oxide, a solvate, a metabolite, a pharmaceutically acceptable salt or a prodrug thereof, 5-10 membered heterocyclyl, $C_{6-10}$ aryl or 5-10 membered heteroaryl, wherein each $C_{1-6}$ alkyl, $C_{2-6}$ alkenyl, $C_{2-6}$ alkynyl, $C_{3-6}$ cycloalkyl, 5-10 membered heterocyclyl, $C_{6-10}$ aryl and 5-10 membered heteroaryl is independently unsubstituted or substituted with 1, 2, 3, 4 or 5 substituents independently selected from deuterium, F, Cl, Br, I, CN, $NO_2$, OH, $NH_2$, —C(=O)OH, $C_{1-6}$ alkyl, $C_{2-6}$ alkenyl, $C_{2-6}$ alkynyl, $C_{1-6}$ haloalkyl, $C_{1-6}$ haloalkoxy, $C_{1-6}$ alkoxy, hydroxy $C_{1-6}$ alkyl, amino

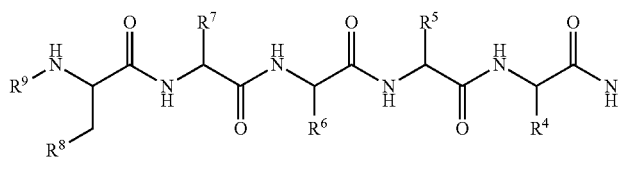 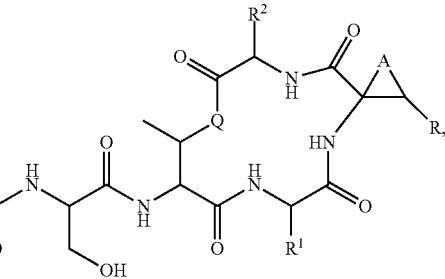

(Ia)

wherein, Q is —NH— or —O—;

$R^9$ is H, deuterium, $C_{1-6}$ alkyl, $C_{2-6}$ alkenyl, $C_{2-6}$ alkynyl, $C_{1-6}$ haloalkyl, $C_{3-6}$ cycloalkyl, 5-6 membered heterocyclyl, $C_{6-10}$ aryl or 5-6 membered heteroaryl;

each of $R^1$, $R^2$, $R^3$, $R^4$, $R^5$, $R^6$ and $R^7$ is independently H, deuterium, $C_{1-10}$ alkyl, $C_{2-10}$ alkenyl, $C_{2-8}$ alkynyl, $C_{1-6}$ alkoxy, $C_{1-10}$ haloalkyl, hydroxy $C_{1-6}$ alkyl, amino $C_{1-6}$ alkyl, carboxy $C_{1-6}$ alkyl, $H_2NC(=O)$—$C_{1-6}$ alkyl, $H_2NS(=O)_2$—$C_{1-6}$ alkyl, $NH_2C(=NH)NH$—$C_{1-6}$ alkyl, $C_{3-6}$ cycloalkyl, 5-6 membered heterocyclyl, $C_{6-10}$ aryl, 5-10 membered heteroaryl or —$P_1$—(NHC(=O)—$P_2$)$_t$—NHC(=O)—$P_3$—NHC(=NH)$NH_2$, wherein each of $C_{1-10}$ alkyl, $C_{2-10}$ alkenyl, $C_{2-8}$ alkynyl, $C_{1-6}$ alkoxy, $C_{1-10}$ haloalkyl, hydroxy $C_{1-6}$ alkyl, amino $C_{1-6}$ alkyl, carboxy $C_{1-6}$ alkyl, $H_2NC(=O)$—$C_{1-6}$ alkyl, $H_2NS(=O)_2$—$C_{1-6}$ alkyl, $NH_2C(=NH)NH$—$C_{1-6}$ alkyl, $C_{3-6}$ cycloalkyl, 5-6 membered heterocyclyl, $C_{6-10}$ aryl and 5-10 membered heteroaryl is independently unsubstituted or substituted with 1, 2 or 3 substituents, and the substituent is independently selected from deuterium, F, Cl, Br, I, CN, OH, $NH_2$, $NO_2$, —C(=O)OH, —SH, $C_{1-6}$ alkyl, $C_{2-6}$ alkenyl, $C_{2-6}$ alkynyl, $C_{1-6}$ haloalkyl, amino $C_{1-6}$ alkyl, hydroxy $C_{1-6}$ alkyl, carboxy $C_{1-6}$ alkyl, cyano $C_{1-6}$ alkyl, $C_{3-6}$ cycloalkyl, 5-6 membered heterocyclyl, $C_{6-10}$ aryl or 5-10 membered heteroaryl;

t is 0, 1, 2, 3, 4, 5, 6, 7 or 8;

each $P_1$, $P_2$ and $P_3$ is independently $C_{1-6}$ alkylene or $C_{2-6}$ alkenylene, wherein each $C_{1-6}$ alkylene and $C_{2-6}$ alkenylene is independently unsubstituted or substituted with 1, 2 or 3 substituents independently selected from deuterium, F, Cl, Br, I, CN, OH, $NH_2$, $NO_2$, —C(=O)OH, —SH, $C_{1-6}$ alkyl, $C_{2-6}$ alkenyl, $C_{2-6}$ alkynyl, $C_{1-6}$ haloalkyl, amino $C_{1-6}$ alkyl, hydroxy $C_{1-6}$ alkyl, carboxy $C_{1-6}$ alkyl or cyano $C_{1-6}$ alkyl;

$R^8$ is —$R^{10}$, —$R^{11}$-$L_1$-$R^{12}$ or —$R^{13}$-$L_2$-$R^{14}$-$L_3$-$R^{15}$;

each of $L_1$, $L_2$ and $L_3$ is independently —$(CH_2)_q$—, —O—, —S—, —NH—, —C(=O)—, —S(=O)$_2$— or —S(=O)—; q is 0, 1, 2, 3 or 4;

each of $R^{10}$, $R^{11}$, $R^{12}$, $R^{13}$, $R^{14}$ and $R^{15}$ is independently $C_{1-6}$ alkyl, $C_{2-6}$ alkenyl, $C_{2-6}$ alkynyl, $C_{3-6}$ cycloalkyl, $C_{1-6}$ alkyl, cyano $C_{1-6}$ alkyl, carboxy $C_{1-6}$ alkyl, $C_{3-6}$ cycloalkyl, 5-6 membered heterocyclyl, $C_{6-10}$ aryl or 5-6 membered heteroaryl;

A is —$(CR^aR^b)_p$—, —$(CR^aR^b)_s$—O—, —$(CR^aR^b)_s$—S—, —$(CR^aR^b)_s$—S(=O)—, —$(CR^aR^b)_s$—S(=O)$_2$—, —$(CR^aR^b)_s$—$NR^c$— or —$(CR^aR^b)_s$—C(=O)—; p is 1, 2, 3, 4, 5 or 6; each s is independently 0, 1, 2, 3, 4, 5 or 6;

each $R^a$, $R^b$ and $R^c$ is independently H, deuterium, F, Cl, Br, I, CN, $NO_2$, —C(=O)OH, OH, $NH_2$, —SH, $C_{1-6}$ alkyl, $C_{2-6}$ alkenyl, $C_{2-6}$ alkynyl, $C_{1-6}$ alkoxy, $C_{1-6}$ haloalkyl, $C_{1-6}$ haloalkoxy, hydroxy $C_{1-6}$ alkyl, amino $C_{1-6}$ alkyl, cyano $C_{1-6}$ alkyl, carboxy $C_{1-6}$ alkyl, $C_{3-6}$ cycloalkyl, 3-6 membered heterocyclyl-$C_{1-6}$ alkylene, 3-6 membered heterocyclyl, $C_{6-10}$ aryl or 5-6 membered heteroaryl;

R is $R^{16}$ or —$P_4$-$L_4$-$R^{17}$;

$P_4$ is $C_{1-6}$ alkylene or $C_{2-6}$ alkenylene, wherein each $C_{1-6}$ alkylene and $C_{2-6}$ alkenylene is independently unsubstituted or substituted with 1, 2 or 3 substituents independently selected from deuterium, F, Cl, Br, I, CN, OH, $NH_2$, $NO_2$, —C(=O)OH, —SH, $C_{1-6}$ alkyl, $C_{2-6}$ alkenyl, $C_{2-6}$ alkynyl, $C_{1-6}$ haloalkyl, amino $C_{1-6}$ alkyl, hydroxy $C_{1-6}$ alkyl, carboxy $C_{1-6}$ alkyl or cyano $C_{1-6}$ alkyl;

$L_4$ is —O—, —S—, —$NR^d$—, —S(=O)—, —S(=O)$_2$—, —$NR^eC(=O)$—, —$NR^eC(=O)O$—, —C(=O)—, —OC(=O)—, —C(=O)O—, —OC(=O)O— or —$NR^fS(=O)_2$—;

each of $R^{16}$ and $R^{17}$ is independently H, deuterium, F, Cl, Br, I, CN, $NO_2$, —C(=O)OH, OH, $NH_2$, —SH, $C_{1-8}$ alkyl, $C_{2-6}$ alkenyl, $C_{2-6}$ alkynyl, $NH_2C(=NR^g)NH$—$C_{1-6}$ alkyl, $C_{1-6}$ haloalkyl, $C_{1-6}$ haloalkoxy, $C_{3-6}$ cycloalkyl, 3-6 membered heterocyclyl, $C_{6-10}$ aryl or 5-6 membered heteroaryl, wherein each of $C_{1-8}$ alkyl, $C_{2-6}$ alkenyl, $C_{2-6}$ alkynyl, $NH_2C(=NR^g)NH$—$C_{1-6}$ alkyl, $C_{1-6}$ haloalkyl, $C_{1-6}$ haloalkoxy, $C_{3-6}$ cycloalkyl, 3-6 membered heterocyclyl, $C_{6-10}$ aryl and 5-6 membered heteroaryl is independent unsubstituted or substituted with 1, 2, 3 or 4 $R^x$;

each $R^d$, $R^e$, $R^f$ and $R^g$ is independently H, deuterium, $C_{1-6}$ alkyl, $C_{2-6}$ alkenyl, $C_{2-6}$ alkynyl, $C_{1-6}$ alkoxy, $C_{1-6}$ haloalkyl, $C_{1-6}$ haloalkoxy, hydroxy $C_{1-6}$ alkyl, amino $C_{1-6}$ alkyl, cyano $C_{1-6}$ alkyl, carboxy $C_{1-6}$ alkyl, $C_{3-6}$ cycloalkyl, 3-6 membered heterocyclyl, $C_{6-10}$ aryl or 5-6 membered heteroaryl;

or, $R^d$ and $R^{17}$, together with the nitrogen atom to which they are attached, form 5-6 membered heterocyclyl or 5-6 membered heteroaryl, wherein each of 5-6 membered heterocyclyl and 5-6 membered heteroaryl is independently unsubstituted or substituted with 1, 2, 3 or 4 $R^x$;

each $R^x$ is independently deuterium, F, Cl, Br, I, CN, $NO_2$, OH, $NH_2$, —C(=O)OH, —SH, —NHC(=NH)$NH_2$, $C_{1-6}$ alkyl, $C_{2-6}$ alkenyl, $C_{2-6}$ alkynyl, $C_{1-6}$ haloalkyl, $C_{1-6}$ haloalkoxy, $C_{1-6}$ alkoxy, 3-6 membered heterocyclyl or $C_{1-6}$ alkylamino.

In some embodiments, the invention provides a compound having Formula (I) or a stereoisomer, a tautomer, an N-oxide, a solvate, a metabolite, a pharmaceutically acceptable salt or a prodrug thereof, deuterium, F, Cl, Br, I, CN, OH, $NH_2$, $NO_2$, —C(=O) OH, —SH, $C_{1-6}$ alkyl, $C_{2-6}$ alkenyl, $C_{2-6}$ alkynyl, $C_{1-6}$ haloalkyl, amino $C_{1-6}$ alkyl, hydroxy $C_{1-6}$ alkyl, carboxy $C_{1-6}$ alkyl or cyano $C_{1-6}$ alkyl;

$R^8$ is —$R^{10}$, —$R^{11}$-$L_1$-$R^{12}$ or —$R^{13}$-$L_2$-$R^{14}$-$L_3$-$R^{15}$;

each of $L_1$, $L_2$ and $L_3$ is independently —$(CH_2)_q$—, —O—, —S—, —NH—, —C(=O)—, —S(=O)$_2$— or —S(=O)—; q is 0, 1, 2, 3 or 4;

each of $R^{10}$, $R^{11}$, $R^{12}$, $R^{13}$, $R^{14}$ and $R^{15}$ is independently $C_{1-6}$ alkyl, $C_{2-6}$ alkenyl, $C_{2-6}$ alkynyl, $C_{3-6}$ cycloalkyl, 5-10 membered heterocyclyl, $C_{6-10}$ aryl or 5-10 membered heteroaryl, wherein each $C_{1-6}$ alkyl, $C_{2-6}$ alkenyl, $C_{2-6}$ alkynyl, $C_{3-6}$ cycloalkyl, 5-10 membered heterocyclyl, $C_{6-10}$ aryl and 5-10 membered heteroaryl is independently unsubstituted or substituted with 1, 2, 3, 4 or 5 substituents independently selected from deuterium, F, Cl, Br, I, CN, $NO_2$, OH, $NH_2$, —C(=O)OH, $C_{1-6}$ alkyl, $C_{2-6}$ alkenyl, $C_{2-6}$ alkynyl, $C_{1-6}$ haloalkyl, $C_{1-6}$ haloalkoxy, $C_{1-6}$ alkoxy, hydroxy $C_{1-6}$ alkyl, amino $C_{1-6}$ alkyl, cyano $C_{1-6}$ alkyl, carboxy $C_{1-6}$ alkyl, $C_{3-6}$ cycloalkyl, 5-6 membered heterocyclyl, $C_{6-10}$ aryl or 5-6 membered heteroaryl;

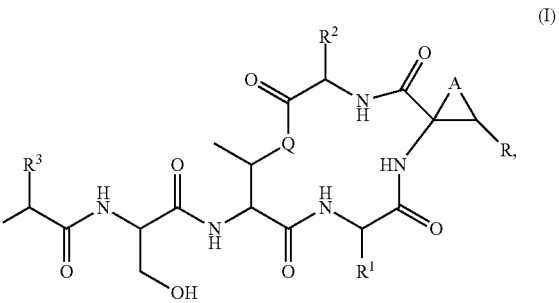

(I)

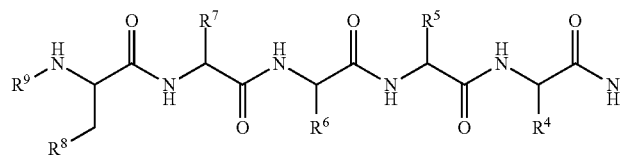

wherein, $R^9$ is H, deuterium, $C_{1-6}$ alkyl, $C_{2-6}$ alkenyl, $C_{2-6}$ alkynyl, $C_{1-6}$ haloalkyl, $C_{3-6}$ cycloalkyl, 5-6 membered heterocyclyl, $C_{6-10}$ aryl or 5-6 membered heteroaryl;

each of $R^1$, $R^2$, $R^3$, $R^4$, $R^5$, $R^6$ and $R^7$ is independently H, deuterium, $C_{1-10}$ alkyl, $C_{2-10}$ alkenyl, $C_{2-8}$ alkynyl, $C_{1-6}$ alkoxy, $C_{1-10}$ haloalkyl, hydroxy $C_{1-6}$ alkyl, amino $C_{1-6}$ alkyl, carboxy $C_{1-6}$ alkyl, $H_2NC(=O)$—$C_{1-6}$ alkyl, $H_2NS(=O)_2$—$C_{1-6}$ alkyl, $NH_2C(=NH)NH$—$C_{1-6}$ alkyl, $C_{3-6}$ cycloalkyl, 5-6 membered heterocyclyl, $C_{6-10}$ aryl, 5-10 membered heteroaryl or —$P_1$—(NHC (=O)—$P_2$)$_t$—NHC(=O)—$P_3$—NHC(=NH)$NH_2$, wherein each of $C_{1-10}$ alkyl, $C_{2-10}$ alkenyl, $C_{2-8}$ alkynyl, $C_{1-6}$ alkoxy, $C_{1-10}$ haloalkyl, hydroxy $C_{1-6}$ alkyl, amino $C_{1-6}$ alkyl, carboxy $C_{1-6}$ alkyl, $H_2NC(=O)$—$C_{1-6}$ alkyl, $H_2NS(=O)_2$—$C_{1-6}$ alkyl, $NH_2C(=NH)NH$— $C_{1-6}$ alkyl, $C_{3-6}$ cycloalkyl, 5-6 membered heterocyclyl, $C_{6-10}$ aryl and 5-10 membered heteroaryl is independently unsubstituted or substituted with 1, 2 or 3 substituents, and the substituent is independently selected from deuterium, F, Cl, Br, I, CN, OH, $NH_2$, $NO_2$, —C(=O)OH, —SH, $C_{1-6}$ alkyl, $C_{2-6}$ alkenyl, $C_{2-6}$ alkynyl, $C_{1-6}$ haloalkyl, amino $C_{1-6}$ alkyl, hydroxy $C_{1-6}$ alkyl, carboxy $C_{1-6}$ alkyl, cyano $C_{1-6}$ alkyl, $C_{3-6}$ cycloalkyl, 5-6 membered heterocyclyl, $C_{6-10}$ aryl or 5-10 membered heteroaryl;

t is 0, 1, 2, 3, 4, 5, 6, 7 or 8;

each $P_1$, $P_2$ and $P_3$ is independently $C_{1-6}$ alkylene or $C_{2-6}$ alkenylene, wherein each $C_{1-6}$ alkylene and $C_{2-6}$ alkenylene is independently unsubstituted or substituted with 1, 2 or 3 substituents independently selected from A is —$(CR^aR^b)_p$—, —$(CR^aR^b)_s$—O—, —$(CR^aR^b)_s$— S—, —$(CR^aR^b)_s$—S(=O)—, —$(CR^aR^b)_s$— S(=O)$_2$—$(CR^aR^b)_s$—$NR^c$— or —$(CR^aR^b)_s$—C (=O)—; p is 1, 2, 3, 4, 5 or 6; each s is independently 0, 1, 2, 3, 4, 5 or 6;

each $R^a$, $R^b$ and $R^c$ is independently H, deuterium, F, Cl, Br, I, CN, $NO_2$, —C(=O)OH, OH, $NH_2$, —SH, $C_{1-6}$ alkyl, $C_{2-6}$ alkenyl, $C_{2-6}$ alkynyl, $C_{1-6}$ alkoxy, $C_{1-6}$ haloalkyl, $C_{1-6}$ haloalkoxy, hydroxy $C_{1-6}$ alkyl, amino $C_{1-6}$ alkyl, cyano $C_{1-6}$ alkyl, carboxy $C_{1-6}$ alkyl, $C_{3-6}$ cycloalkyl, 3-6 membered heterocyclyl-$C_{1-6}$ alkylene, 3-6 membered heterocyclyl, $C_{6-10}$ aryl or 5-6 membered heteroaryl;

R is $R^{16}$ or —$P_4$-$L_4$-$R^{17}$;

$P_4$ is $C_{1-6}$ alkylene or $C_{2-6}$ alkenylene, wherein each $C_{1-6}$ alkylene and $C_{2-6}$ alkenylene is independently unsubstituted or substituted with 1, 2 or 3 substituents independently selected from deuterium, F, Cl, Br, I, CN, OH, $NH_2$, $NO_2$, —C(=O)OH, —SH, $C_{1-6}$ alkyl, $C_{2-6}$ alkenyl, $C_{2-6}$ alkynyl, $C_{1-6}$ haloalkyl, amino $C_{1-6}$ alkyl, hydroxy $C_{1-6}$ alkyl, carboxy $C_{1-6}$ alkyl or cyano $C_{1-6}$ alkyl;

$L_4$ is —O—, —S—, —$NR^d$—, —S(=O)—, —S(=O)$_2$—, —$NR^eC(=O)$—, —$NR^eC(=O)O$—, —C(=O)—, —OC(=O)—, —C(=O)O—, —OC (=O)O— or —$NR^fS(=O)_2$—;

each of $R^{16}$ and $R^{17}$ is independently H, deuterium, F, Cl, Br, I, CN, $NO_2$, —C(=O)OH, OH, $NH_2$, —SH, $C_{1-8}$ alkyl, $C_{2-6}$ alkenyl, $C_{2-6}$ alkynyl, $NH_2C(=NR^g)NH$— $C_{1-6}$ alkyl, $C_{1-6}$ haloalkyl, $C_{1-6}$ haloalkoxy, $C_{3-6}$ cycloalkyl, 3-6 membered heterocyclyl, $C_{6-10}$ aryl or 5-6 membered heteroaryl, wherein each of $C_{1-8}$ alkyl, $C_{2-6}$ alkenyl, $C_{2-6}$ alkynyl, $NH_2C(=NR^g)NH-C_{1-6}$ alkyl, $C_{1-6}$ haloalkyl, $C_{1-6}$ haloalkoxy, $C_{3-6}$ cycloalkyl, 3-6 membered heterocyclyl, $C_{6-10}$ aryl and 5-6 membered heteroaryl is independent unsubstituted or substituted with 1, 2, 3 or 4 $R^x$;

each $R^d$, $R^e$, $R^f$ and $R^g$ is independently H, deuterium, $C_{1-6}$ alkyl, $C_{2-6}$ alkenyl, $C_{2-6}$ alkynyl, $C_{1-6}$ alkoxy, $C_{1-6}$ haloalkyl, $C_{1-6}$ haloalkoxy, hydroxy $C_{1-6}$ alkyl, amino $C_{1-6}$ alkyl, cyano $C_{1-6}$ alkyl, carboxy $C_{1-6}$ alkyl, $C_{3-6}$ cycloalkyl, 3-6 membered heterocyclyl, $C_{6-10}$ aryl or 5-6 membered heteroaryl;

or, $R^d$ and $R^{17}$, together with the nitrogen atom to which they are attached, form 5-6 membered heterocyclyl or 5-6 membered heteroaryl, wherein each of 5-6 membered heterocyclyl and 5-6 membered heteroaryl is independently unsubstituted or substituted with 1, 2, 3 or 4 $R^x$;

each $R^x$ is independently deuterium, F, Cl, Br, I, CN, $NO_2$, OH, $NH_2$, $-C(=O)OH$, $-SH$, $-NHC(=NH)NH_2$, $C_{1-6}$ alkyl, $C_{2-6}$ alkenyl, $C_{2-6}$ alkynyl, $C_{1-6}$ haloalkyl, $C_{1-6}$ haloalkoxy, $C_{1-6}$ alkoxy, 3-6 membered heterocyclyl or $C_{1-6}$ alkylamino.

In some embodiments, the present invention provides a compound having Formula (II) or a stereoisomer, a tautomer, an N-oxide, a solvate, a metabolite, a pharmaceutically acceptable salt or a prodrug thereof,

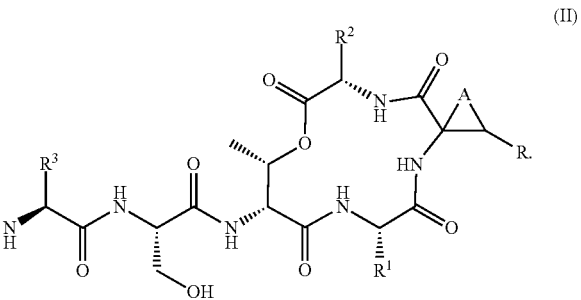

(II)

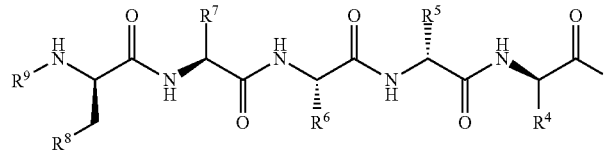

Wherein R, $R^1$, $R^2$, $R^3$, $R^4$, $R^5$, $R^6$, $R^7$, $R^8$, $R^9$ and A have the definitions described in the present invention.

In some embodiments, $R^9$ is H, deuterium, methyl, ethyl, n-propyl, isopropyl, n-butyl, tert-butyl, vinyl, ethynyl, trifluoromethyl, cyclopropyl, cyclobutyl, cyclopentyl, cyclohexyl, 5-6 membered heterocyclyl, phenyl or 5-6 membered heteroaryl.

In some embodiments, each of $R^1$, $R^2$, $R^3$, $R^4$, $R^5$, $R^6$ and $R^7$ is independently H, deuterium, $C_{1-8}$ alkyl, $C_{2-8}$ alkenyl, $C_{2-8}$ alkynyl, $C_{1-4}$ alkoxy, $C_{1-8}$ haloalkyl, hydroxy $C_{1-4}$ alkyl, amino $C_{1-4}$ alkyl, carboxy $C_{1-4}$ alkyl, $H_2NC(=O)-C_{1-4}$ alkyl, $H_2NS(=O)_2-C_{1-4}$ alkyl, $NH_2C(=NH)NH-C_{1-4}$ alkyl, $C_{3-6}$ cycloalkyl, 5-6 membered heterocyclyl, $C_{6-10}$ aryl, 5-6 membered heteroaryl or $-P_1-(NHC(=O)-P_2)_t-NHC(=O)-P_3-NHC(=NH)NH_2$, wherein each of $C_{1-8}$ alkyl, $C_{2-8}$ alkenyl, $C_{2-8}$ alkynyl, $C_{1-4}$ alkoxy, $C_{1-8}$ haloalkyl, hydroxy $C_{1-4}$ alkyl, amino $C_{1-4}$ alkyl, carboxy $C_{1-4}$ alkyl, $H_2NC(=O)-C_{1-4}$ alkyl, $H_2NS(=O)_2-C_{1-4}$ alkyl, $NH_2C(=NH)NH-C_{1-4}$ alkyl, $C_{3-6}$ cycloalkyl, 5-6 membered heterocyclyl, $C_{6-10}$ aryl and 5-6 membered heteroaryl is independently unsubstituted or substituted with 1, 2 or 3 substituents, and the substituent is independently selected from deuterium, F, Cl, Br, I, CN, OH, $NH_2$, $NO_2$, $-C(=O)OH$, $-SH$, $C_{1-4}$ alkyl, $C_{2-4}$ alkenyl, $C_{2-4}$ alkynyl, $C_{1-4}$ haloalkyl, amino $C_{1-4}$ alkyl, hydroxy $C_{1-4}$ alkyl, carboxy $C_{1-4}$ alkyl, cyano $C_{1-4}$ alkyl, $C_{3-6}$ cycloalkyl, 5-6 membered heterocyclyl, $C_{6-10}$ aryl or 5-6 membered heteroaryl;

each $P_1$, $P_2$ and $P_3$ is independently $C_{1-4}$ alkylene or $C_{2-4}$ alkenylene, wherein each $C_{1-4}$ alkylene and $C_{2-4}$ alkenylene is independently unsubstituted or substituted with 1, 2 or 3 substituents independently selected from deuterium, F, Cl, Br, I, CN, OH, $NH_2$, $NO_2$, $-C(=O)OH$, $-SH$, $C_{1-4}$ alkyl, $C_{2-4}$ alkenyl, $C_{2-4}$ alkynyl, $C_{1-4}$ haloalkyl, amino $C_{1-4}$ alkyl, hydroxy $C_{1-4}$ alkyl, carboxy $C_{1-4}$ alkyl or cyano $C_{1-4}$ alkyl.

In other embodiments, each of $R^1$, $R^2$, $R^3$, $R^4$, $R^5$, $R^6$ and $R^7$ is independently H, deuterium, methyl, ethyl, n-propyl, isopropyl, n-butyl, isobutyl, sec-butyl, t-butyl, n-pentyl, n-hexyl, n-heptyl, n-octyl, $-CH=CH_2$, $-CH_2CH=CH_2$, $-(CH_2)_2CH=CH_2$, $-(CH_2)_3CH=CH_2$, $-(CH_2)_4CH=CH_2$, $-(CH_2)_5CH=CH_2$, $-(CH_2)_6CH=CH_2$, methoxy, ethoxy, $-CF_3$, $-CHF_2$, $-CH_2CHF_2$, $-(CH_2)_2CHF_2$, $-(CH_2)_3CHF_2$, $-(CH_2)_4CHF_2$, $-(CH_2)_5CHF_2$, $-(CH_2)_6CH_2F$, $-(CH_2)_6CHF_2$, hydroxymethyl, hydroxyethyl, aminomethyl, carboxymethyl, $H_2NC(=O)-CH_2-$, $H_2NC(=O)-CH_2CH_2-$, $H_2NC(=O)-(CH_2)_3-$, $H_2NS(=O)_2-CH_2-$, $H_2NS(=O)_2-CH_2CH_2-$, $NH_2C(=NH)NH-CH_2-$, $NH_2C(=NH)NH-(CH_2)_2-$, $NH_2C(=NH)NH-(CH_2)_3-$, $NH_2C(=NH)NH-(CH_2)_4-$, cyclopropyl, cyclobutyl, cyclopentyl, cyclohexyl, 5-6 membered heterocyclyl, phenyl, 5-6 membered heteroaryl or $-P_1-(NHC(=O)-P_2)_t-NHC(=O)-P_3-NHC(=NH)NH_2$, wherein each methyl, ethyl, n-propyl, isopropyl, n-butyl, isobutyl, sec-butyl, t-butyl, n-pentyl, n-hexyl, n-heptyl, n-octyl, $-CH=CH_2$, $-CH_2CH=CH_2$, $-(CH_2)_2CH=CH_2$, $-(CH_2)_3CH=CH_2$, $-(CH_2)_4CH=CH_2$, $-(CH_2)_5CH=CH_2$, $-(CH_2)_6CH=CH_2$, methoxy, ethoxy, $-CHF_2$, $-CH_2CHF_2$, $-(CH_2)_2CHF_2$, $-(CH_2)_3CHF_2$, $-(CH_2)_4CHF_2$, $-(CH_2)_5CHF_2$, $-(CH_2)_6CH_2F$, $-(CH_2)_6CHF_2$, hydroxymethyl, hydroxyethyl, aminomethyl, carboxymethyl, $H_2NC(=O)-CH_2-$, $H_2NC(=O)-CH_2CH_2-$, $H_2NC(=O)-(CH_2)_3-$, $H_2NS(=O)_2-CH_2-$, $H_2NS(=O)_2-CH_2CH_2-$, $NH_2C(=NH)NH-CH_2-$, $NH_2C(=NH)NH-(CH_2)_2-$, $NH_2C(=NH)NH-(CH_2)_3-$, $NH_2C(=NH)NH-(CH_2)_4-$, cyclopropyl, cyclobutyl, cyclopentyl, cyclohexyl, 5-6 membered heterocyclyl, phenyl, 5-6 membered heteroaryl is independently unsubstituted or substituted with 1, 2 or 3 substituents, and the substituent is independently selected from deuterium, F, Cl, Br, I, CN, OH, $NH_2$, $NO_2$, $-C(=O)OH$, $-SH$, methyl, ethyl, n-propyl, isopropyl, vinyl, allyl, ethynyl, trifluoromethyl, difluoromethyl, aminomethyl, aminoethyl, amino-n- propyl, aminoisopropyl, amino-n-butyl, amino-n-pentyl, hydroxymethyl, hydroxyethyl, carboxymethyl, cyanomethyl, cyclopropyl, cyclobutyl, cyclopentyl, cyclohexyl, 5-6 membered heterocyclyl, phenyl or 5-6 membered heteroaryl;

each $P_1$, $P_2$ and $P_3$ is independently —$CH_2$—, —$CH_2CH_2$—, —$CH_2CH_2CH_2$—, —$CH(CH_3)CH_2$—, —$CH_2CH_2CH_2CH_2$—, —$CH_2(CH_2)_3CH_2$—, —CH=CH— or —CH=CHCH$_2$—, wherein each —$CH_2$—, —$CH_2CH_2$—, —$CH_2CH_2CH_2$—, —CH(CH$_3$)CH$_2$—, —$CH_2CH_2CH_2CH_2$—, —$CH_2(CH_2)_3CH_2$—, —CH=CH— and —CH=CHCH$_2$— is independently unsubstituted or substituted with 1, 2 or 3 substituents independently selected from deuterium, F, Cl, Br, I, CN, OH, NH$_2$, NO$_2$, —C(=O)OH, —SH, methyl, ethyl, n-propyl, isopropyl, vinyl, allyl, ethynyl, trifluoromethyl, difluoromethyl, aminomethyl, aminoethyl, amino-n-propyl, aminoisopropyl, amino-n-butyl, amino-n-pentyl, hydroxymethyl, hydroxyethyl, carboxymethyl or cyanomethyl.

In some embodiments, each $R^{10}$, $R^{11}$, $R^{12}$, $R^{13}$, $R^{14}$ and $R^{15}$ is independently $C_{1-4}$ alkyl, $C_{2-4}$ alkenyl, $C_{2-4}$ alkynyl, $C_{3-6}$ cycloalkyl, 5-10 membered heterocyclyl, $C_{6-10}$ aryl or 5-10 membered heteroaryl, wherein each $C_{1-4}$ alkyl, $C_{2-4}$ alkenyl, $C_{2-4}$ alkynyl, $C_{3-6}$ cycloalkyl, 5-10 membered heterocyclyl, $C_{6-10}$ aryl and 5-10 membered heteroaryl is independently unsubstituted or substituted with 1, 2, 3, 4 or 5 substituents independently selected from deuterium, F, Cl, Br, I, CN, NO$_2$, OH, NH$_2$, —C(=O)OH, $C_{1-4}$ alkyl, $C_{2-4}$ alkenyl, $C_{2-4}$ alkynyl, $C_{1-4}$ haloalkyl, $C_{1-4}$ haloalkoxy, $C_{1-4}$ alkoxy, hydroxy $C_{1-4}$ alkyl, amino $C_{1-4}$ alkyl, cyano $C_{1-4}$ alkyl, carboxy $C_{1-4}$ alkyl, $C_{3-6}$ cycloalkyl, 5-6 membered heterocyclyl, $C_{6-10}$ aryl or 5-6 membered heteroaryl.

In other embodiments, each $R^{10}$, $R^{11}$, $R^{12}$, $R^{13}$, $R^{14}$ and $R^{15}$ is independently methyl, ethyl, vinyl, ethynyl, cyclopropyl, cyclobutyl, cyclopentyl, cyclohexyl, pyrazolidinyl, pyrrolidinyl, imidazolidinyl, tetrahydrofuranyl, tetrahydrothienyl, piperidinyl, morpholinyl, thiomorpholinyl, piperazinyl, phenyl, naphthyl, furyl, thienyl, imidazolyl, thiazolyl, pyrrolyl, pyrazolyl, pyrimidinyl, pyridyl, pyrazinyl, benzofuranyl, benzimidazolyl, benzothienyl, indolyl, purinyl, quinolinyl or isoquinolinyl, wherein each methyl, ethyl, vinyl, ethynyl, cyclopropyl, cyclobutyl, cyclopentyl, cyclohexyl, pyrazolidinyl, pyrrolidinyl, imidazolidinyl, tetrahydrofuranyl, tetrahydrothienyl, piperidinyl, morpholinyl, thiomorpholinyl, piperazinyl, phenyl, naphthyl, furyl, thienyl, imidazolyl, thiazolyl, pyrrolyl, pyrazolyl, pyrimidinyl, pyridyl, pyrazinyl, benzofuranyl, benzimidazolyl, benzothienyl, indolyl, purinyl, quinolinyl and isoquinolinyl is independently unsubstituted or substituted with 1, 2, 3, 4 or 5 substituents independently selected from deuterium, F, Cl, Br, I, CN, NO$_2$, OH, NH$_2$, —C(=O)OH, methyl, ethyl, n-propyl, isopropyl, vinyl, ethynyl, —CF$_3$, —CHF$_2$, —CH$_2$CF$_3$, trifluoromethoxy, methoxy, ethoxy, hydroxymethyl, aminomethyl, cyanomethyl, carboxymethyl, cyclopropyl, cyclobutyl, cyclopentyl, cyclohexyl, 5-6 membered heterocyclyl, phenyl or 5-6 membered heteroaryl.

In some embodiments, each of $R^{16}$ and $R^{17}$ is independently H, deuterium, F, Cl, Br, I, CN, NO$_2$, —C(=O)OH, OH, NH$_2$, —SH, $C_{1-6}$ alkyl, $C_{2-4}$ alkenyl, $C_{2-4}$ alkynyl, NH$_2$C(=NR$^g$)NH—$C_{1-4}$alkyl, $C_{1-4}$ haloalkyl, $C_{1-4}$ haloalkoxy, $C_{3-6}$ cycloalkyl, 5-6 membered heterocyclyl, $C_{6-10}$ aryl or 5-6 membered heteroaryl, wherein each $C_{1-6}$ alkyl, $C_{2-4}$ alkenyl, $C_{2-4}$ alkynyl, NH$_2$C(=NR$^g$)NH—$C_{1-4}$ alkyl, $C_{1-4}$ haloalkyl, $C_{1-4}$ haloalkoxy, $C_{3-6}$ cycloalkyl, 5-6 membered heterocyclyl, $C_{6-10}$ aryl and 5-6 membered heteroaryl is independently unsubstituted or substituted with 1, 2, 3 or 4 $R^x$.

In other embodiments, each of $R^{16}$ and $R^{17}$ is independently H, deuterium, F, Cl, Br, I, CN, NO$_2$, —C(=O)OH, OH, NH$_2$, —SH, methyl, ethyl, n-propyl, isopropyl, n-butyl, isobutyl, t-butyl, n-pentyl, n-hexyl, —CH=CH$_2$, —CH=CHCH$_3$, —CH$_2$CH=CH$_2$, ethynyl, NH$_2$C(=NR$^g$)NH—CH$_2$—, NH$_2$C(=NR$^g$)NH—CH$_2$CH$_2$—, NH$_2$C(=NR$^g$)NH—CH$_2$CH$_2$CH$_2$—, NH$_2$C(=NR$^g$)NH—CH(CH$_3$)CH$_2$—, —CH$_2$F, —CF$_3$, —CHF$_2$, —CH$_2$CF$_3$, —CH$_2$CHF$_2$, —CH$_2$CH$_2$F, —(CH$_2$)$_2$CF$_3$, —(CH$_2$)$_2$CHF$_2$, —(CH$_2$)$_2$CH$_2$F, trifluoromethoxy, cyclopropyl, cyclobutyl, cyclopentyl, cyclohexyl, pyrazolidinyl, pyrrolidinyl, imidazolidinyl, tetrahydrofuranyl, tetrahydrothienyl, piperidinyl, morpholinyl, thiomorpholinyl, piperazinyl, phenyl, furanyl, thienyl, imidazolyl, thiazolyl, pyrrolyl, pyrazolyl, pyrimidinyl, pyridyl or pyrazinyl; wherein each of methyl, ethyl, n-propyl, isopropyl, n-butyl, isobutyl, t-butyl, n-pentyl, n-hexyl, —CH=CH$_2$, —CH=CHCH$_3$, —CH$_2$CH=CH$_2$, ethynyl, NH$_2$C(=NR$^g$)NH—CH$_2$—, NH$_2$C(=NR$^g$)NH—CH$_2$CH$_2$—, NH$_2$C(=NR$^g$)NH—CH$_2$CH$_2$CH$_2$—, NH$_2$C(=NR$^g$)NH—CH(CH$_3$)CH$_2$—, —CH$_2$F, —CHF$_2$, —CH$_2$CF$_3$, —CH$_2$CHF$_2$, —CH$_2$CH$_2$F, —(CH$_2$)$_2$CF$_3$, —(CH$_2$)$_2$CHF$_2$, —(CH$_2$)$_2$CH$_2$F, cyclopropyl, cyclobutyl, cyclopentyl, cyclohexyl, pyrazolidinyl, pyrrolidinyl, imidazolidinyl, tetrahydrofuranyl, tetrahydrothienyl, piperidinyl, morpholinyl, thiomorpholinyl, piperazinyl, phenyl, furanyl, thienyl, imidazolyl, thiazolyl, pyrrolyl, pyrazolyl, pyrimidinyl, pyridyl and pyrazinyl is independently unsubstituted or substituted with 1, 2, 3 or 4 $R^x$.

In some embodiments, each $R^a$, $R^b$ and $R^c$ is independently H, deuterium, F, Cl, Br, I, CN, NO$_2$, —C(=O)OH, OH, NH$_2$, —SH, $C_{1-4}$ alkyl, $C_{2-4}$ alkenyl, $C_{2-4}$ alkynyl, $C_{1-4}$ alkoxy, $C_{1-4}$ haloalkyl, $C_{1-4}$ haloalkoxy, hydroxy $C_{1-4}$ alkyl, amino $C_{1-4}$ alkyl, cyano $C_{1-4}$ alkyl, carboxyl $C_{1-4}$ alkyl, $C_{3-6}$ cycloalkyl, 5-6 membered heterocyclyl-$C_{1-4}$ alkylene, 5-6 membered heterocyclyl, $C_{6-10}$ aryl or 5-6 membered heteroaryl.

In some embodiments, each $R^a$, $R^b$ and $R^c$ is independently H, deuterium, F, Cl, Br, I, CN, NO$_2$, —C(=O)OH, OH, NH$_2$, —SH, methyl, ethyl, n-propyl, isopropyl, vinyl, ethynyl, methoxy, ethoxy, trifluoromethyl, —CHF$_2$, —CH$_2$CHF$_2$, —CH$_2$CH$_2$F, —CH$_2$CF$_3$, —(CH$_2$)$_2$CHF$_2$, —(CH$_2$)$_3$CHF$_2$, trifluoromethoxy, hydroxymethyl, —CH$_2$CH$_2$OH, aminomethyl, —CH$_2$CH$_2$NH$_2$, cyanoethyl, carboxymethyl, cyclopropyl, cyclobutyl, cyclopentyl, cyclohexyl, —(CH$_2$)$_2$-morpholine, —(CH$_2$)$_2$-pyrrole, 5-6 membered heterocyclyl, phenyl or 5-6 membered heteroaryl;

each $R^d$, $R^e$, $R^f$ and $R^g$ is independently H, deuterium, methyl, ethyl, n-propyl, isopropyl, vinyl, ethynyl, methoxy, ethoxy, trifluoromethyl, trifluoromethoxy, hydroxymethyl, aminomethyl, cyanomethyl, carboxymethyl, cyclopropyl, cyclobutyl, cyclopentyl, cyclohexyl, 5-6 membered heterocyclyl, phenyl or 5-6 membered heteroaryl;

or, $R^d$ and $R^{17}$, together with the nitrogen atom to which they are attached, form 5-6 membered heterocyclyl or 5-6 membered heteroaryl, wherein each of 5-6 membered heterocyclyl and 5-6 membered heteroaryl is independently unsubstituted or substituted with 1, 2, 3 or 4 $R^x$;

$P_4$ is —CH$_2$—, —CH$_2$CH$_2$—, —CH$_2$CH$_2$CH$_2$—, —CH(CH$_3$)CH$_2$—, —CH$_2$CH$_2$CH$_2$CH$_2$—, —CH$_2$(CH$_2$)$_3$CH$_2$—, —CH=CH— or —CH=CHCH$_2$—, wherein each —CH$_2$—, —CH$_2$CH$_2$—, —CH$_2$CH$_2$CH$_2$—, —CH(CH$_3$)CH$_2$—, —CH$_2$CH$_2$CH$_2$CH$_2$—, —CH$_2$(CH$_2$)$_3$CH$_2$—, —CH=CH— and —CH=CHCH$_2$— is independently unsubstituted or substituted with 1, 2 or 3 substituents independently selected from deuterium, F, Cl, Br, I, CN, OH, NH$_2$, NO$_2$, —C(=O)OH, —SH, methyl, ethyl, n-propyl, isopropyl, vinyl, allyl, ethynyl, trifluoromethyl, difluoromethyl, aminomethyl, hydroxyethyl, carboxymethyl or cyanomethyl.

In some embodiments, each R$^x$ is independently deuterium, F, Cl, Br, I, CN, NO$_2$, OH, NH$_2$, —C(=O)OH, —SH, —NHC(=NH)NH$_2$, C$_{1-4}$ alkyl, C$_{2-4}$ alkenyl, C$_{2-4}$ alkynyl, C$_{1-4}$ haloalkyl, C$_{1-4}$ haloalkoxy, C$_{1-4}$ alkoxy, 5-6 membered heterocyclyl or C$_{1-4}$ alkylamino.

In other embodiments, each R$^x$ is independently deuterium, F, Cl, Br, I, CN, NO$_2$, OH, NH$_2$, —C(=O)OH, —SH, —NHC(=NH)NH$_2$, methyl, ethyl, n-propyl, isopropyl, vinyl, ethynyl, trifluoromethyl, trifluoromethoxy, methoxy, ethoxy, n-propyloxy, n-butyloxy, n-pentyloxy, n-hexyloxy, morpholinyl, pyrrolyl or methylamino.

In another aspect, the invention relates to a pharmaceutical composition comprising the compound of the invention, optionally further comprising a pharmaceutically acceptable carrier, adjuvant, vehicle or a combination thereof.

In some embodiments, the pharmaceutical composition of the present invention further comprises one or more other therapeutic agents, wherein the other therapeutic agents are selected from antibacterial agents, antifungal agents, antiviral agents, antiprotozoal agents, antihelminthic agents or a combination thereof.

In another aspect, provided herein is use of the compound or the pharmaceutical composition disclosed herein in the manufacture of a medicament for preventing, managing, treating or lessening a bacterial infectiou disease in a subject.

In some embodiments, the bacterial infection is a Gram-positive bacterial infection or a *Mycobacterium tuberculosis* infection.

In some embodiments, the bacteria is *Streptococcus, Staphylococcus, Enterococcus, Corynebacterium, Listeria, Bacillus, Erysipelothrix*, Actinomycetes, *Helicobacter pylori, Legionella pneumophila, Mycobacterium tuberculosis, Mycobacterium avium, Mycobacterium avium intracellulare, Staphylococcus aureus, Staphylococcus epidermidis, Neisseria gonorrhoeae, Neisseria meningitidis, Streptococcus pyogenes, Streptococcus faecalis, Streptococcus bovis, Streptococcus pneumoniae, Haemophilus, Pseudomonas aeruginosa, Bacillus anthracis* or *Bacillus subtilis*.

In another aspect, provided herein is a method of preventing, managing, treating or lessening a bacterial infectious disease in a subject comprising administering to the subject a therapeutically effective amount of the compound or the the pharmaceutical composition disclosed herein.

In some embodiments, the bacterial infection is a Gram-positive bacterial infection or a *Mycobacterium tuberculosis* infection.

In some embodiments, the bacterias are *Streptococcus, Staphylococcus, Enterococcus, Corynebacterium, Listeria, Bacillus, Erysipelothrix*, Actinomycetes, *Helicobacter pylori, Legionella pneumophila, Mycobacterium tuberculosis, Mycobacterium avium, Mycobacterium avium intracellulare, Staphylococcus aureus, Staphylococcus epidermidis, Neisseria gonorrhoeae, Neisseria meningitidis, Streptococcus pyogenes, Streptococcus faecalis, Streptococcus bovis, Streptococcus pneumoniae, Haemophilus, Pseudomonas aeruginosa, Bacillus anthracis* or *Bacillus subtilis*.

In another aspect, provided herein is the compound or the pharmaceutical composition disclosed herein for use in preventing, managing, treating or lessening a bacterial infectious disease in a subject.

In some embodiments, the bacterial infection is a Gram-positive bacterial infection or a *Mycobacterium tuberculosis* infection.

In some embodiments, the bacterias are *Streptococcus, Staphylococcus, Enterococcus, Corynebacterium, Listeria, Bacillus, Erysipelothrix*, Actinomycetes, *Helicobacter pylori, Legionella pneumophila, Mycobacterium tuberculosis, Mycobacterium avium, Mycobacterium avium intracellulare, Staphylococcus aureus, Staphylococcus epidermidis, Neisseria gonorrhoeae, Neisseria meningitidis, Streptococcus pyogenes, Streptococcus faecalis, Streptococcus bovis, Streptococcus pneumoniae, Haemophilus, Pseudomonas aeruginosa, Bacillus anthracis* or *Bacillus subtilis*.

The foregoing merely summarizes certain aspects disclosed herein and is not intended to be limiting in nature. These aspects and other aspects and embodiments are described more fully below.

DETAILED DESCRIPTION

Definitions and General Terminology

Reference will now be made in detail to certain embodiments of the invention, examples of which are illustrated in the accompanying structures and formulas. The invention is intended to cover all alternatives, modifications, and equivalents which may be included within the scope of the present invention. One skilled in the art will recognize many methods and materials similar or equivalent to those described herein, which could be used in the practice of the present invention. The present invention is in no way limited to the methods and materials described herein. In the event that one or more of the incorporated literature, patents, and similar materials differs from or contradicts this application, including but not limited to defined terms, term usage, described techniques, or the like, this application controls.

It is further appreciated that certain features of the invention, which are, for clarity, described in the context of separate embodiments, can also be provided in combination in a single embodiment. Conversely, various features of the invention which are, for brevity, described in the context of a single embodiment, can also be provided separately or in any suitable subcombination.

Unless defined otherwise, all technical and scientific terms used herein have the same meaning as is commonly understood by one skilled in the art to which this invention belongs. All patents and publications referred to herein are incorporated by reference in their entirety.

As used herein, the following definitions shall apply unless otherwise indicated. For purposes of this invention, the chemical elements are identified in accordance with the Periodic Table of the Elements, CAS version, and the Handbook of Chemistry and Physics, 75th Ed. 1994. Additionally, general principles of organic chemistry are described in "Organic Chemistry", Thomas Sorrell, University Science Books, Sausalito: 1999, and Smith et al., "March's Advanced Organic Chemistry", John Wiley & Sons, New York: 2007, the entire contents of which are hereby incorporated by reference.

The grammatical articles "a", "an" and "the", as used herein, are intended to include "at least one" or "one or more" unless otherwise indicated herein or clearly contradicted by the context. Thus, the articles used herein refer to one or more than one (i.e. at least one) articles of the grammatical objects. By way of example, "a component" means one or more components, and thus, possibly, more than one component is contemplated and may be employed or used in an implementation of the described embodiments.

As used herein, the term "subject" refers to an animal. Typically the animal is a mammal. A subject also refers to for example, primates (e.g., humans, male or female), cows, sheep, goats, horses, dogs, cats, rabbits, rats, mice, fish, birds and the like. In certain embodiments, the subject is a primate. In yet other embodiments, the subject is a human.

As used herein, "patient" refers to a human (including adults and children) or other animal. In some embodiments, "patient" refers to a human.

The term "comprise" is an open expression, it means comprising the contents disclosed herein, but don't exclude other contents.

"Stereoisomers" refers to compounds which have identical chemical constitution, but differ with regard to the arrangement of the atoms or groups in space. Stereoisomers include enantiomer, diastereomers, conformer (rotamer), geometric (cis/trans) isomer, atropisomer, etc.

"Chiral" refers to molecules which have the property of non-superimposability of the mirror image partner, while the term "achiral" refers to molecules which are superimposable on their mirror image partner.

"Enantiomers" refers to two stereoisomers of a compound which are non-superimposable mirror images of one another.

"Diastereomer" refers to a stereoisomer with two or more centers of chirality and whose molecules are not mirror images of one another. Diastereomers have different physical properties, e.g., melting points, boiling points, spectral properties or biological activities. Mixture of diastereomers may separate under high resolution analytical procedures such as electrophoresis and chromatography such as HPLC.

Stereochemical definitions and conventions used herein generally follow S. P. Parker, Ed., McGraw-Hill Dictionary of Chemical Terms (1984) McGraw-Hill Book Company, New York; and Eliel, E. and Wilen, S., "Stereochemistry of Organic Compounds", John Wiley & Sons, Inc., New York, 1994.

Many organic compounds exist in optically active forms, i.e., they have the ability to rotate the plane of plane-polarized light. In describing an optically active compound, the prefixes D and L, or R and S, are used to denote the absolute configuration of the molecule about its chiral center(s). The prefixes d and l or (+) and (−) are employed to designate the sign of rotation of plane-polarized light by the compound, with (−) or l meaning that the compound is levorotatory. A compound prefixed with (+) or d is dextrorotatory. A specific stereoisomer may be referred to as an enantiomer, and a mixture of such stereoisomers is called an enantiomeric mixture. A 50:50 mixture of enantiomers is referred to as a racemic mixture or a racemate, which may occur where there has been no stereoselection or stereospecificity in a chemical reaction or process.

Any asymmetric atom (e.g., carbon or the like) of the compound(s) disclosed herein can be present in racemic or enantiomerically enriched, for example the (R)-, (S)- or (R,S)-configuration. In certain embodiments, each asymmetric atom has at least 50% enantiomeric excess, at least 60% enantiomeric excess, at least 70% enantiomeric excess, at least 80% enantiomeric excess, at least 90% enantiomeric excess, at least 95% enantiomeric excess, or at least 99% enantiomeric excess in the (R)- or (S)-configuration.

Depending on the choice of the starting materials and procedures, the compounds can be present in the form of one of the possible stereoisomers or as mixtures thereof, such as racemates and diastereoisomer mixtures, depending on the number of asymmetric carbon atoms. Optically active (R)- and (S)-isomers may be prepared using chiral synthons or chiral reagents, or resolved using conventional techniques. If the compound contains a double bond, the substituent may be E or Z configuration. If the compound contains a disubstituted cycloalkyl, the cycloalkyl substituent may have a cis- or trans-configuration.

Any resulting mixtures of stereoisomers can be separated on the basis of the physicochemical differences of the constituents, into the pure or substantially pure geometric isomers, enantiomers, diastereomers, for example, by chromatography and/or fractional crystallization. Cis and trans isomers are diastereomer.

Any resulting racemates of final products or intermediates can be resolved into the optical antipodes by methods known to those skilled in the art, e.g., by separation of the diastereomeric salts thereof. Racemic products can also be resolved by chiral chromatography, e.g., high performance liquid chromatography (HPLC) using a chiral adsorbent. Preferred enantiomers can also be prepared by asymmetric syntheses. See, for example, Jacques, et al., Enantiomers, Racemates and Resolutions (Wiley Interscience, New York, 1981); Principles of Asymmetric Synthesis (2nd Ed. Robert E. Gawley, Jeffrey Aubé, Elsevier, Oxford, U K, 2012); Eliel, E. L. Stereochemistry of Carbon Compounds (McGraw-Hill, N Y, 1962); Wilen, S. H. Tables of Resolving Agents and Optical Resolutions p. 268 (E. L. Eliel, Ed., Univ. of Notre Dame Press, Notre Dame, IN 1972); Chiral Separation Techniques: A Practical Approach (Subramanian, G. Ed., Wiley-VCH Verlag GmbH & Co. KGaA, Weinheim, Germany, 2007).

The term "tautomer" or "tautomeric form" refers to structural isomers of different energies which are interconvertible via a low energy barrier. Where tautomerization is possible (e.g. in solution), a chemical equilibrium of tautomers can be reached. For example, protontautomers (also known as prototropic tautomers) include interconversions via migration of a proton, such as keto-enol and imine-enamine isomerizations. Valence tautomers include interconversions by reorganization of some of the bonding electrons. A specific example of keto-enol tautomerization is the interconversion of pentane-2,4-dione and 4-hydroxypent-3-en-2-one tautomers. Another example of tautomerization is phenol-keto tautomerization. The specific example of phenol-keto tautomerism is pyridin-4-ol and pyridin-4(1H)-one tautomerism. Unless otherwise stated, all tautomeric forms of the compounds disclosed herein are within the scope of the invention.

The term "optional" or "optionally" refers to that a subsequently described event or circumstance may but need not occur, and that the description includes instances where the event or circumstance occurs and instances in which it does not. For example, "optional bond" means that the bond may or may not be present, and that the description includes single, double or triple bonds.

In general, the term "substituted" refers to the replacement of one or more hydrogen radicals in a given structure with the radical of a specified substituent. As described herein, compounds disclosed herein may optionally be substituted with one or more substituents, such as are illustrated generally below, or as exemplified by particular classes, subclasses, and species of the invention. The term "optionally substituted" may be used interchangeably with the term "unsubstituted or substituted", i.e., the structure is unsubstituted or substituted with one or more substituents described in the present invention.

Unless otherwise indicated, an optionally substituted group may have a substituent at each substitutable position of the group. When more than one position in a given structure can be substituted with more than one substituent selected from a specified group, the substituent may be either the same or different at each position. The substituents described therein may be, but not limited to, hydrogen, deuterium, oxo (=O), F, Cl, Br, I, CN, $NO_2$, —COOH, OH, $NH_2$, —SH, —NHC(=NH)$NH_2$, alkylamino, alkylthio, alkoxy, haloalkoxy, haloalkyl, aminoalkyl, alkyl, alkenyl, alkynyl, hydroxyalkyl, carboxyalkyl, cyanoalkyl, cycloalkyl, heterocyclyl, aryl, heteroaryl, $H_2NC$(=O)—$C_{1-6}$ alkyl, $H_2NS$(=O)$_2$—$C_{1-6}$ alkyl, $NH_2C$(=NH)NH—$C_{1-6}$ alkyl, —$P_1$—((NHC(=O)—$P_2$)$_t$—NHC(=O)—$P_3$—NHC(=NH)$NH_2$, $NH_2C$(=$NR^g$)NH—$C_{1-6}$ alkyl, etc. The $P_1$, $P_2$, $P_3$, t and $R^g$ have the definitions described in the present invention.

The term "unsubstituted" means that the specified group has no substituents.

Furthermore, what need to be explained is that the phrases "each . . . is independently" and "each of . . . and . . . is independently", unless otherwise stated, should be broadly understood, which can mean that the specific options expressed by the same symbol are independent of each other in different groups; or the specific options expressed by the same symbol are independent of each other in same groups.

At each part of the present specification, substitutes of compounds disclosed herein are disclosed in groups or in ranges. It is specifically intended that the invention includes each and every individual subcombination of the members of such groups and ranges. For example, the term "$C_1$-$C_6$ alkyl" is specifically intended to individually disclose methyl, ethyl, $C_3$ alkyl, $C_4$ alkyl, $C_5$ alkyl, and $C_6$ alkyl.

At various places in the present specification, linking substituents are described. Where the structure clearly requires a linking group, the Markush variables listed for that group are understood to be linking groups. For example, if the structure requires a linking group and the Markush group definition for that variable lists "alkyl" or "aryl" then it is understood that the "alkyl" or "aryl" represents a linking alkylene group or arylene group, respectively.

The term "alkyl" or "alkyl group" refers to a saturated linear or branched-chain monovalent hydrocarbon group of 1-20 carbon atoms, wherein the alkyl group is optionally substituted with one or more substituents described herein. Unless otherwise stated, the alkyl group contains 1-20 carbon atoms. In some embodiments, the alkyl group contains 1-12 carbon atoms. In some embodiments, the alkyl group contains 1-10 carbon atoms, i.e., $C_{1-10}$ alkyl. In other embodiments, the alkyl group contains 1-8 carbon atoms, i.e., $C_{1-8}$ alkyl. In other embodiments, the alkyl group contains 1-6 carbon atoms, i.e., $C_{1-6}$ alkyl. In still other embodiment, the alkyl group contains 1-4 carbon atoms, i.e., $C_{1-4}$ alkyl. In yet other embodiment, the alkyl group contains 1-2 carbon atoms, i.e., $C_{1-2}$ alkyl.

Examples of alkyl group include, but are not limited to, methyl (Me, —$CH_3$), ethyl (Et, —$CH_2CH_3$), n-propyl (n-Pr, —$CH_2CH_2CH_3$), isopropyl (i-Pr, —CH($CH_3$)$_2$), n-butyl (n-Bu, —$CH_2CH_2CH_2CH_3$), isobutyl (i-Bu, —$CH_2$CH($CH_3$)$_2$), sec-butyl (s-Bu, —CH($CH_3$)$CH_2CH_3$), tert-butyl (t-Bu, —C($CH_3$)$_3$), n-pentyl (—$CH_2CH_2CH_2CH_2CH_3$), 2-pentyl (—CH($CH_3$)$CH_2CH_2CH_3$), 3-pentyl (—CH($CH_2CH_3$)$_2$), 2-methyl-2-butyl (—C($CH_3$)$_2CH_2CH_3$), 3-methyl-2-butyl (—CH($CH_3$)CH($CH_3$)$_2$), 3-methyl-1-butyl (—$CH_2CH_2$CH($CH_3$)$_2$), 2-methyl-1-butyl (—$CH_2$CH($CH_3$)$CH_2CH_3$), n-hexyl (—$CH_2CH_2CH_2CH_2CH_2CH_3$), 2-hexyl (—CH($CH_3$)$CH_2CH_2CH_2CH_3$), 3-hexyl (—CH($CH_2CH_3$)($CH_2CH_2CH_3$)), 2-methyl-2-pentyl (—C($CH_3$)$_2CH_2CH_2CH_3$), 3-methyl-2-pentyl (—CH($CH_3$)CH($CH_3$)$CH_2CH_3$), 4-methyl-2-pentyl (—CH($CH_3$)$CH_2$CH($CH_3$)$_2$), 3-methyl-3-pentyl (—C($CH_3$)($CH_2CH_3$)$_2$), 2-methyl-3-pentyl (—CH($CH_2CH_3$)CH($CH_3$)$_2$), 2,3-dimethyl-2-butyl (—C($CH_3$)$_2$CH($CH_3$)$_2$), 3,3-dimethyl-2-butyl (—CH($CH_3$)C($CH_3$)$_3$), n-heptyl, n-octyl, etc.

The term "alkylene" refers to a saturated divalent hydrocarbon group derived from a straight or branched chain saturated hydrocarbon by the removal of two hydrogen atoms. Unless otherwise specified, the alkylene group contains 1-12 carbon atoms. In some embodiments, the alkylene group contains 1-6 carbon atoms. In other embodiments, the alkylene group contains 1-4 carbon atoms. In still other embodiments, the alkylene group contains 1-3 carbon atoms. In yet other embodiments, the alkylene group contains 1-2 carbon atoms. Such examples include, but are not limited to, methylene (—$CH_2$—), ethylene (including —$CH_2CH_2$— or —CH($CH_3$)—), isopropylene (including —CH($CH_3$)$CH_2$— or —C($CH_3$)$_2$—), n-propylene (including —$CH_2CH_2CH_2$—, —CH($CH_2CH_3$)— or —$CH_2$CH($CH_3$)—), n-butylene (including —$CH_2$($CH_2$)$_2CH_2$—, —CH($CH_2CH_3$)—, —$CH_2$CH($CH_2CH_3$)—, —$CH_2CH_2$CH($CH_3$)— or —CH($CH_3$)CH($CH_3$)—), tert-butylene (including —CH(CH($CH_3$)$_2$)—, —$CH_2$CH($CH_3$)$CH_2$— or —$CH_2$C($CH_3$)$_2$—), pentylene (e.g., —$CH_2$($CH_2$)$_3CH_2$—), hexylene (e.g., —$CH_2$($CH_2$)$_4CH_2$—), etc. wherein, the alkylene group may be optionally substituted with one or more substituents disclosed herein.

The term "alkenyl" refers to linear or branched-chain monovalent hydrocarbon radical of 2 to 12 carbon atoms with at least one site of unsaturation, i.e., a carbon-carbon $sp^2$ double bond, wherein the alkenyl radical may be optionally substituted with one or more substituents described herein, and includes radicals having "cis" and "trans" orientations, or alternatively, "E" and "Z" orientations. In some embodiments, the alkenyl contains 2 to 8 carbon atoms, i.e., $C_{2-8}$ alkenyl. In other embodiments, the alkenyl contains 2 to 6 carbon atoms, i.e., $C_{2-6}$ alkenyl. In still other embodiments, the alkenyl contains 2 to 4 carbon atoms, i.e., $C_{2-4}$ alkenyl. Examples of alkenyl group include, but are not limited to, vinyl (—CH=$CH_2$), allyl (—$CH_2$CH=$CH_2$), propenyl (—CH=$CHCH_3$), —CH=$CHCH_2CH_3$, —$CH_2$CH=$CHCH_3$, —$CH_2CH_2$CH=$CH_2$, —CH=C($CH_3$)$_2$, —CH=C($CH_3$)$_2$, —$CH_2$C($CH_3$)=$CH_2$, —$CH_2CH_2CH_2$CH=$CH_2$, —($CH_2$)$_4$CH=$CH_2$, —($CH_2$)$_5$CH=$CH_2$, —($CH_2$)$_6$CH=$CH_2$, etc.

The term "alkenylene" refers to a divalent hydrocarbon group derived from a straight or branched chain olefin by the removal of two hydrogen atoms, wherein at least one site of unsaturation is a carbon-carbon $sp^2$ double bond. Unless otherwise specified, the alkenylene group contains 2-12 carbon atoms. In some embodiments, the alkenylene group contains 2-8 carbon atoms, i.e., $C_{2-8}$ alkenylene. In other embodiments, the alkenylene group contains 2-6 carbon atoms, i.e., $C_{2-6}$ alkenylene. In other embodiments, the alkenylene group contains 2-4 carbon atoms, i.e., $C_{2-4}$ alkenylene. In still other embodiments, the alkenylene group contains 2-3 carbon atoms. In yet other embodiments, the alkenylene group contains 2 carbon atoms. Such examples include, but are not limited to, —CH=CH—, —$CH_2$CH=CH—, —CH=$CHCH_2$—, —CH=$CHCH_2CH_2$—, —$CH_2$CH=$CHCH_2$—, —$CH_2CH_2$CH=CH—, —CH=$CHCH_2CH_2$—, —CH$_2$CH=CHCH$_2$—, —CH$_2$CH$_2$CH=CH—, —CH$_2$CH$_2$CH$_2$CH=CH— and so on. wherein, the alkenylene group may be optionally substituted with one or more substituents disclosed herein.

The term "alkynyl" refers to a linear or branched monovalent hydrocarbon radical of 2 to 12 carbon atoms with at least one site of unsaturation, i.e., a carbon-carbon, sp triple bond, wherein the alkynyl radical may be optionally substituted with one or more substituents described herein. In some embodiments, the alkynyl contains 2 to 8 carbon atoms, i.e., C$_{2-8}$ alkynyl. In other embodiments, the alkynyl contains 2 to 6 carbon atoms, i.e., C$_{2-6}$ alkynyl. In still other embodiments, the alkynyl contains 2 to 4 carbon atoms, i.e., C$_{2-4}$ alkynyl. Examples of such group include, but are not limited to, ethynyl (—C≡CH), propargyl (—CH$_2$C≡CH), 1-propynyl (—C≡C—CH$_3$), and the like.

The term "alkoxy" refers to an alkyl group, as previously defined, attached to parent molecular moiety via an oxygen atom. Unless otherwise specified, the alkoxy group contains 1-12 carbon atoms. In some embodiments, the alkoxy group contains 1-6 carbon atoms, i.e., C$_{1-6}$ alkoxy.

In other embodiments, the alkoxy group contains 1-4 carbon atoms, i.e., C$_{1-4}$ alkoxy. In other embodiments, the alkoxy group contains 1-3 carbon atoms, i.e., C$_{1-3}$ alkoxy. In still other embodiment, the alkoxy group contains 1-2 carbon atoms, i.e., C$_{1-2}$ alkoxy. The alkoxy group may be optionally substituted with one or more substituents disclosed herein.

Examples of alkoxy groups include, but are not limited to, methoxy (MeO, —OCH$_3$), ethoxy (EtO, —OCH$_2$CH$_3$), 1-propoxy (n-PrO, n-propoxy, —OCH$_2$CH$_2$CH$_3$), 2-propoxy (i-PrO, i-propoxy, —OCH(CH$_3$)$_2$), 1-butoxy (n-BuO, n-butoxy, —OCH$_2$CH$_2$CH$_2$CH$_3$), 2-methyl-1-propoxy (i-BuO, i-butoxy, —OCH$_2$CH(CH$_3$)$_2$), 2-butoxy (s-BuO, s-butoxy, —OCH(CH$_3$)CH$_2$CH$_3$), 2-methyl-2-propoxy (t-BuO, t-butoxy, —OC(CH$_3$)$_3$), 1-pentyloxy (n-pentyloxy, —OCH$_2$CH$_2$CH$_2$CH$_2$CH$_3$), 2-pentyloxy (—OCH(CH$_3$)CH$_2$CH$_2$CH$_3$), 3-pentyloxy (—OCH(CH$_2$CH$_3$)$_2$), 2-methyl-2-butoxy (—OC(CH$_3$)$_2$CH$_2$CH$_3$), 3-methyl-2-butoxy (—OCH(CH$_3$)CH(CH$_3$)$_2$), 3-methyl-1-butoxy (—OCH$_2$CH$_2$CH(CH$_3$)$_2$), 2-methyl-1-butoxy (—OCH$_2$CH(CH$_3$)CH$_2$CH$_3$), etc.

The term "alkylthio" refers to an alkyl group, as previously defined, attached to parent molecular moiety via a divalent sulfur atom, i.e., alkyl-S—. Unless otherwise specified, the alkylthio group contains 1-12 carbon atoms. In some embodiments, the alkylthio group contains 1-6 carbon atoms, i.e., C$_{1-6}$ alkylthio. In other embodiments, the alkylthio group contains 1-4 carbon atoms, i.e., C$_{1-4}$ alkylthio. In other embodiments, the alkylthio group contains 1-3 carbon atoms, i.e., C$_{1-3}$ alkylthio. In still other embodiment, the alkylthio group contains 1-2 carbon atoms, i.e., C$_{1-2}$ alkylthio. The alkylthio group may be optionally substituted with one or more substituents disclosed herein. Examples of alkylthio group include, but are not limited to, methylthio (—SCH$_3$) and ethylthio (—SCH$_2$CH$_3$). Wherein the alkylthio radical is optionally substituted with one or more substitutents described herein.

The term "alkylamino" refers to "N-alkylamino" and "N,N-dialkylamino" wherein amino groups are independently substituted with one alkyl radical or two alkyl radicals, respectively. In some embodiments, the alkylamino group is one or two C$_{1-6}$ alkyl groups attached to a nitrogen atom, i.e., C$_{1-6}$ alkylamino. In some embodiments, the alkylamino group is one or two C$_{1-4}$ alkyl groups attached to a nitrogen atom, i.e., C$_{1-4}$ alkylamino. In some embodiments, the alkylamino group is one or two C$_{1-2}$ alkyl groups attached to a nitrogen atom, i.e., C$_{1-2}$ alkylamino. Some non-limiting examples of suitable alkylamino radical include mono or dialkylamino. Such examples include, but are not limited to, methylamino (N-methylamino), ethylamino (N-ethylamino), N, N-dimethylamino, N, N-diethylamino, N, N-di-n-propylamino and the like. The alkylamino group may be optionally substituted with one or more substituents disclosed herein.

The term "haloalkyl" refers to an alkyl group substituted with one or more halogen atoms. In some embodiments, the haloalkyl group contains 1-10 carbon atoms, i.e., C$_{1-10}$ haloalkyl. In some embodiments, the haloalkyl group contains 1-8 carbon atoms, i.e., C$_{1-8}$ haloalkyl. In other embodiments, the haloalkyl group contains 1-6 carbon atoms, i.e., C$_{1-6}$ haloalkyl. In other embodiments, the haloalkyl group contains 1-4 carbon atoms, i.e., C$_{1-4}$ haloalkyl. In still other embodiment, the haloalkyl group contains 1-3 carbon atoms, i.e., C$_{1-3}$ haloalkyl. In yet other embodiment, the haloalkyl group contains 1-2 carbon atoms, i.e., C$_{1-2}$ haloalkyl. Examples of haloalkyl include, but are not limited to, monofluoromethyl (—CH$_2$F), difluoromethyl (—CHF$_2$), trifluoromethyl (—CF$_3$), fluoroethyl (—CHFCH$_3$, —CH$_2$CH$_2$F), difluoroethyl (—CF$_2$CH$_3$, —CFHCFH$_2$, —CH$_2$CHF$_2$), perfluoroethyl, fluoropropyl (—CHFCH$_2$CH$_3$, —CH$_2$CHFCH$_3$, —CH$_2$CH$_2$CH$_2$F), difluoropropyl (—CF$_2$CH$_2$CH$_3$, —CFHCFHCH$_3$, —CH$_2$CH$_2$CHF$_2$, —CH$_2$CF$_2$CH$_3$, —CH$_2$CHFCH$_2$F), trifluoropropyl, 1,1-dichloroethyl, 1,2-dichloropropyl, —(CH$_2$)$_3$CHF$_2$, —(CH$_2$)$_4$CHF$_2$, —(CH$_2$)$_5$CHF$_2$, —(CH$_2$)$_6$CH$_2$F, —(CH$_2$)$_6$CHF$_2$, etc. Wherein, the haloalkyl group may be optionally substituted with one or more substituents disclosed herein.

The term "haloalkoxy" refers to an alkoxy group substituted with one or more halogen atoms. In some embodiments, the haloalkoxy group contains 1-10 carbon atoms. In some embodiments, the haloalkoxy group contains 1-8 carbon atoms. In other embodiments, the haloalkoxy group contains 1-6 carbon atoms, i.e., C$_{1-6}$ haloalkoxy. In other embodiments, the haloalkoxy group contains 1-4 carbon atoms, i.e., C$_{1-4}$ haloalkoxy. In still other embodiment, the haloalkoxy group contains 1-3 carbon atoms, i.e., C$_{1-3}$ haloalkoxy. In yet other embodiment, the haloalkoxy group contains 1-2 carbon atoms, i.e., C$_{1-2}$ haloalkoxy. Some non-limiting examples of the haloalkoxy group include trifluoromethoxy, difluoromethoxy, etc. Wherein, the haloalkoxy group may be optionally substituted with one or more substituents disclosed herein.

The term "cycloalkyl" refers to a monovalent or multivalent non-aromatic saturated ring having 3 to 12 carbon atoms as a monocyclic, bicyclic, or tricyclic ring system. In some embodiments, the cycloalkyl contains 3 to 12 carbon atoms. In still other embodiments, the cycloalkyl contains 3 to 8 carbon atoms. In yet other embodiments, the cycloalkyl contains 3 to 6 carbon atoms. Examples of cycloalkyl groups include, but are not limited to, cyclopropyl, cyclobutyl, cyclopentyl, cyclohexyl and the like. The cycloalkyl group is optionally substituted with one or more substituents described herein.

The term "heterocyclyl" refers to a saturated or partially unsaturation, nonaromatic ring having 3 to 12 ring atoms as a monocyclic, bicyclic, or tricyclic ring system, in which at least one ring member is selected from nitrogen, sulfur and oxygen. Wherein, the heterocyclic group is non-aromatic and does not contain any aromatic ring, and the ring system has one or more connection points connected to the rest of the molecule. The term "heterocyclyl" includes monocyclic, bicyclic or polycyclic fused, spiro or bridged heterocyclic ring systems. Bicyclic heterocyclic groups include bridged bicyclic heterocyclyl, fused bicyclic heterocyclyl and spiro bicyclic heterocyclyl. The terms "heterocyclyl", "heterocyclic group" and "heterocycle" are used interchangeably herein. Unless otherwise specified, the heterocyclyl group may be carbon or nitrogen linked, and a —CH$_2$— group can be optionally replaced by a —C(=O)— group. In which, the sulfur can be optionally oxygenized to S-oxide and the nitrogen can be optionally oxygenized to N-oxide. In some embodiments, the heterocyclyl is a ring system composed of 3-8 ring atoms, i.e., 3-8 membered heterocyclyl; in some embodiments, the heterocyclyl is a ring system composed of 3-6 ring atoms, i.e., 3-6 membered heterocyclyl; in some embodiments, the heterocyclyl is a ring system composed of 5-7 ring atoms; in some embodiments, the heterocyclyl is a ring system composed of 5-10 ring atoms, i.e., 5-10 membered heterocyclyl; in some embodiments, the heterocyclyl is a ring system composed of 5-8 ring atoms, i.e., 5-8 membered heterocyclyl; in other embodiments, the heterocyclyl is a ring system composed of 6-8 ring atoms; in other embodiments, the heterocyclyl is a ring system composed of 5-6 ring atoms, i.e., 5-6 membered heterocyclyl; in other embodiments, the heterocyclyl is a ring system composed of 4 ring atoms; in other embodiments, the heterocyclyl is a ring system composed of 5 ring atoms; in other embodiments, the heterocyclyl is a ring system composed of 6 ring atoms; in other embodiments, the heterocyclyl is a ring system composed of 7 ring atoms; in other embodiments, the heterocyclyl is a ring system composed of 8 ring atoms.

The heterocyclyl may be carbon or heteroatom linked; wherein a —CH$_2$— group of the ring can be optionally replaced by a —C(=O)— group, ring sulfur atoms may be optionally oxidized to form S-oxides, ring nitrogen atoms maybe optionally oxidized to form N-oxides. Examples of the heterocyclyl group include, but are not limited to, oxiranyl, azetidinyl, oxetanyl, thietanyl, pyrrolidinyl, 2-pyrrolinyl, 3-pyrrolinyl, pyrazolinyl, pyrazolidinyl, imidazolinyl, imidazolidinyl, tetrahydrofuranyl, dihydrofuranyl, tetrahydrothienyl, dihydrothienyl, 1,3-dioxolanyl, dithiolanyl, tetrahydropyranyl, dihydropyranyl, 2H-pyranyl, 4H-pyranyl, tetrahydrothiopyranyl, piperidinyl, morpholinyl, thiomorpholinyl, piperazinyl, dioxanyl, dithianyl, thioxanyl, homopiperazinyl, homopiperidinyl, oxepanyl, thiepanyl, tetrahydropyrrolyl, dihydropyrrolyl, tetrahydropyridinyl, tetrahydropyrimidinyl, tetrahydropyrazinyl, tetrahydropyridazinyl. Some non-limiting examples of heterocyclyl wherein —CH$_2$— group is replaced by —C(=O)— moiety include 2-oxopyrrolidinyl, oxo-1,3-thiazolidinyl, 2-piperidinonyl, 3,5-dioxopiperidinyl, pyrimidinedione-yl, and the like. Some non-limited examples of heterocyclyl wherein the ring sulfur atom is oxidized is sulfolanyl and 1,1-dioxo-thiomorpholinyl. Bridged heterocyclyl groups include, but are not limited to, 2-oxabicyclo [2.2.2] octyl, 1-azabicyclo [2.2.2] octyl, 3-azabicyclo [3.2.1] octyl, etc. The heterocyclyl group may be optionally substituted with one or more substituents disclosed herein.

The term "aryl" refers to monocyclic, bicyclic and tricyclic carbocyclic ring systems having a total of six to fourteen ring members, or six to twelve ring members, or six to ten ring members, wherein at least one ring in the system is aromatic, wherein each ring in the system contains 3 to 7 ring members and that has a single point or multipoint of attachment to the rest of the molecule. The term "aryl" and "aromatic ring" can be used interchangeably herein. Examples of the aryl group may include phenyl, naphthyl and anthracenyl. The aryl radical is optionally substituted with one or more substituents described herein.

The term "hetreroaryl" or "heteroaromatic ring" refers to a monovalent or polyvalent monocyclic, bicyclic, or tricyclic carbocyclic ring system having a total of 5 to 14 ring members, preferably, 5 to 10 ring members, or 5 to 6 ring members, wherein at least one ring in the system is aromatic and at least one ring contains one or more heteroatoms. The heteroaryl group is generally, but not necessarily bonded to the parent molecule through an aromatic ring of the heteroaryl group. The term "heteroaryl" and "heteroaromatic ring" or "heteroaromatic compound" can be used interchangeably herein. The heteroaryl group is optionally substituted with one or more substituents disclosed herein. In some embodiments, heteroaryl is a heteroaryl group of 5-10 ring atoms comprising 1, 2, 3 or 4 heteroatoms independently selected from O, S and N, i.e., 5-10 membered heteroaryl; in other embodiments, heteroaryl is a heteroaryl group of 5-6 ring atoms which is a single ring system and comprises 1, 2, 3 or 4 heteroatoms independently selected from O, S and N, i.e., 5-6 membered heteroaryl.

Some non-limiting examples of heteroaryl include 2-furanyl, 3-furanyl, N-imidazolyl, 2-imidazolyl, 4-imidazolyl, 5-imidazolyl, 3-isoxazolyl, 4-isoxazolyl, 5-isoxazolyl, 2-oxazolyl, 4-oxazolyl, 5-oxazolyl, N-pyrrolyl, 2-pyrrolyl, 3-pyrrolyl, 2-pyridyl, 3-pyridyl, 4-pyridyl, 2-pyrimidinyl, 4-pyrimidinyl, 5-pyrimidinyl, pyridazinyl (e.g., 3-pyridazinyl), 2-thiazolyl, 4-thiazolyl, 5-thiazolyl, tetrazolyl (e.g., 5H-tetrazolyl, 2H-tetrazolyl), triazolyl (e.g., 2-triazolyl, 5-triazolyl, 4H-1,2,4-triazolyl, 1H-1,2,4-triazolyl, 1,2,3-triazolyl), 2-thienyl, 3-thienyl, pyrazolyl (e.g., 2-pyrazolyl and 3-pyrazolyl), isothiazolyl, 1,2,3-oxadiazolyl, 1,2,5-oxadiazolyl, 1,2,4-oxadiazolyl, 1,3,4-oxadiazolyl, 1,2,3-thiodiazolyl, 1,3,4-thiodiazolyl, 1,2,5-thiodiazolyl, pyrazinyl, 1,3,5-triazinyl, and the following bi- or tricyclic groups: indolinyl, 1,2,3,4-tetrahydroisoquinolinyl, benzimidazolyl, benzofuryl, benzothiophenyl, indolyl (e.g., 2-indolyl), purinyl, quinolinyl (e.g., 2-quinolinyl, 3-quinolinyl, 4-quinolinyl), isoquinolinyl (e.g., 1-isoquinolinyl, 3-isoquinolinyl or 4-isoquinolinyl), phenoxothiyl, dibenzimidazolyl, dibenzofuranyl, dibenzothienyl, etc. The heteroaryl group is optionally substituted with one or more substituents disclosed herein.

The term "heteroatom" refers to one or more of oxygen, sulfur, nitrogen, phosphorus and silicon, including any oxidized form of nitrogen, sulfur, or phosphorus; the quaternized form of any basic nitrogen; or a substitutable nitrogen of a heterocyclic ring, for example, N (as in 3,4-dihydro-2H-pyrrolyl), NH (as in pyrrolidinyl) or NR (as in N-substituted pyrrolidinyl, R is the substituent described in the present invention).

The term "m-membered", where m is an integer typically describes the number of ring-forming atoms in a moiety where the number of ring-forming atoms is m. For example, piperidinyl is an example of a 6 membered heterocyclyl and cyclohexyl is an example of a 6 membered cycloalkyl.

The term "unsaturated" refers to a moiety having one or more units of unsaturation.

The term "halogen" refers to fluoro (F), chloro (Cl), bromo (Br), or iodo (I).

The term "nitro" refers to —NO$_2$.

The term "hydroxy" refers to —OH.

The term "amino" refers to —NH$_2$.

The term "cyano" refers to —CN.

The term "carboxylic acid", "carboxyl" or "carboxy" refers to —C(=O)OH.

The term "carbonyl", whether used alone or in conjunction with other terms, means —(C=O)—.

The term "deuterium" refers to D, i.e., $^2$H.

The term "hydroxyalkyl" refers to an alkyl group substituted with one or more hydroxy, wherein the alkyl group are as defined herein. In some embodiments, the hydroxyalkyl contains 1-6 carbon atoms, i.e., hydroxy $C_{1-6}$ alkyl. In other embodiments, the hydroxyalkyl contains 1-4 carbon atoms, i.e., hydroxy $C_{1-4}$ alkyl. In other embodiments, the hydroxyalkyl contains 1-3 carbon atoms, i.e., hydroxy $C_{1-3}$ alkyl. In still other embodiment, the hydroxyalkyl contains 1-2 carbon atoms, i.e., hydroxy $C_{1-2}$ alkyl. Examples of hydroxyalkyl include, but are not limited to, hydroxymethyl, hydroxyethyl (e.g., 2-hydroxyethyl (—$CH_2CH_2OH$), 1-hydroxyethyl (—$CHOHCH_3$), 1,2-dihydroxyethyl (—$CHOHCH_2OH$)), 2,3-dihydroxypropyl (—$CH_2CHOHCH_2OH$), 1-hydroxypropyl (—$CH_2CH_2CH_2OH$), 2-hydroxypropyl, 3-hydroxypropyl, hydroxybutyl, etc. Wherein, the hydroxyalkyl group may be optionally substituted with one or more substituents disclosed herein.

The term "cyanoalkyl" refers to an alkyl group substituted with one or more cyano groups (—CN), wherein the alkyl group are as defined herein, wherein the cyanoalkyl group may be optionally substituted with one or more substituents disclosed herein. In some embodiments, the cyanoalkyl group in the present invention refers to $C_{1-6}$ alkyl substituted with one or more cyano groups (—CN), i.e., cyano $C_{1-6}$ alkyl; in some embodiments, the cyanoalkyl group refers to $C_{1-4}$ alkyl substituted with one or more cyano groups (—CN), i.e., cyano $C_{1-4}$ alkyl; in some embodiments, the cyanoalkyl group refers to $C_{1-2}$ alkyl substituted with one or more cyano groups (—CN), i.e., cyano $C_{1-2}$ alkyl. Examples of cyanoalkyl groups include, but are not limited to, cyanomethyl, cyanoethyl (e.g., 2-cyanoethyl), and the like.

The term "aminoalkyl" refers to an alkyl group substituted with one or more amino groups (—$NH_2$), wherein the alkyl group are as defined herein, wherein the aminoalkyl group may be optionally substituted with one or more substituents disclosed herein. In some embodiments, the aminoalkyl group in the present invention refers to $C_{1-6}$ alkyl substituted with one or more amino groups (—$NH_2$), i.e., amino $C_{1-6}$ alkyl; in some embodiments, the aminoalkyl group refers to $C_{1-4}$ alkyl substituted with one or more amino groups (—$NH_2$), i.e., amino $C_{1-4}$ alkyl; in some embodiments, the aminoalkyl group refers to $C_{1-2}$ alkyl substituted with one or more amino groups (—$NH_2$), i.e., amino $C_{1-2}$ alkyl. Examples of aminoalkyl groups include, but are not limited to, aminomethyl, aminoethyl (e.g., 2-aminoethyl), amino-n-propyl (e.g., —$CH_2CH_2CH_2NH_2$), aminoisopropyl (e.g., —$CH(CH_3)CH_2NH_2$), amino-n-butyl (e.g., —$CH_2CH_2CH_2CH_2NH_2$), amino-n-pentyl (e.g., —$CH_2CH_2CH_2CH_2CH_2NH_2$), etc.

The term "carboxyalkyl" refers to an alkyl group substituted with one or more carboxy groups (—COOH), wherein the alkyl group are as defined herein. In some embodiments, the "carboxyalkyl" in the present invention is a "carboxy $C_{1-6}$ alkyl", i.e., a $C_{1-6}$ alkyl group substituted with one or more carboxyl groups (—COOH). In other embodiments, "carboxyalkyl" is "carboxy $C_{1-4}$ alkyl"; in other embodiments, "carboxyalkyl" is "carboxy $C_{1-2}$ alkyl". Such examples include, but are not limited to, carboxymethyl, carboxyethyl (e.g., 2-carboxyethyl), and the like.

The term "protecting group" or "PG" refers to a substituent that is commonly employed to block or protect a particular functionality while reacting with other functional groups on the compound. For example, an "amino-protecting group" is a substituent attached to an amino group that blocks or protects the amino functionality in the compound. Suitable amino-protecting groups include acetyl, trifluoroacetyl, t-butoxy-carbonyl (BOC, Boc), benzyloxycarbonyl (CBZ, Cbz) and 9-fluorenylmethylenoxy-carbonyl (Fmoc). Similarly, a "hydroxy-protecting group" refers to a substituent of a hydroxy group that blocks or protects the hydroxy functionality.

Suitable protecting groups include acetyl and silyl. A "carboxy-protecting group" refers to a substituent of the carboxy group that blocks or protects the carboxy functionality. Common carboxy-protecting groups include —$CH_2CH_2SO_2Ph$, cyanoethyl, 2-(trimethylsilyl)ethyl, 2-(trimethylsilyl) ethoxy-methyl, 2-(p-toluenesulfonyl) ethyl, 2-(p-nitrophenylsulfonyl)-ethyl, 2-(diphenylphosphino)-ethyl, nitroethyl and the like. For a general description of protecting groups and their use, see T. W. Greene, Protective Groups in Organic Synthesis, John Wiley & Sons, New York, 1991; and P. J. Kocienski, Protecting Groups, Thieme, Stuttgart, 2005.

Peptide solid phase chemical synthesis is one of the most important research methods in the field of protein research, including Fmoc method and Boc method. The principle is as follows: First, the amino acids that make up the target peptide are transformed into amino acids with protective groups at the amino terminus (this amino acid can usually be purchased directly), and the carboxy group of the first amino acid of the target peptide is connected to the solid support (resin) in the form of covalent bond, and then the amino group of this amino acid is used as the starting point of synthesis to acylate with the connected carboxyl group to form a peptide bond. Then the amino group of the resin peptide containing these two amino acids reacts with the carboxy group of the next amino acid, and this process is repeated until the target peptide is formed. Next, the target peptide is cleaved from the resin and oxidized and folded to obtain the crude product of the artificial peptide.

The phrase "pharmaceutically acceptable" refers to molecular entities and compositions that are physiologically tolerable and do not typically produce an allergic or similar untoward reaction, such as gastric upset, dizziness and the like, when administered to a human. Preferably, as used herein, the term "pharmaceutically acceptable" means approved by a regulatory agency of the Federal or a state government or listed in the U.S. Pharmacopeia or other generally recognized pharmacopeia for use in animals, and more particularly in humans.

The term "carrier" refers to a diluent, adjuvant, excipient, or vehicle with which the compound is administered. Such pharmaceutical carriers can be sterile liquids, such as water and oils, including those of petroleum, animal, vegetable or synthetic origin, such as peanut oil, soybean oil, mineral oil, sesame oil and the like. Water or aqueous solution saline solutions and aqueous dextrose and glycerol solutions are preferably employed as carriers, particularly for injectable solutions. Suitable pharmaceutical carriers are described in "Remington's Pharmaceutical Sciences" by E. W. Martin.

The term "prodrug" refers to a compound that is transformed in vivo into a compound of Formula (I), Formula (Ia), Formula (II), Formula (IIa) or Formula (III). Such a transformation can be affected, for example, by hydrolysis of the prodrug form in blood or enzymatic transformation to the parent form in blood or tissue. Prodrugs of the compounds disclosed herein may be, for example, esters. Some common esters which have been utilized as prodrugs are phenyl esters, aliphatic ($C_{1-24}$) esters, acyloxymethyl esters, carbonates, carbamates and amino acid esters. For example, a compound disclosed herein that contains a hydroxy group may be acylated at this position in its prodrug form. Other prodrug forms include phosphates, such as, those phosphate compounds derived from the phosphonation of a hydroxy group on the parent compound. A thorough discussion of prodrugs is provided in T. Higuchi and V. Stella, Pro-drugs as Novel Delivery Systems, Vol. 14 of the A.C.S. Symposium Series, Edward B. Roche, ed., Bioreversible Carriers in Drug Design, American Pharmaceutical Association and Pergamon Press, 1987, J. Rautio et al., Prodrugs: Design and Clinical Applications, Nature Review Drug Discovery, 2008, 7, 255-270, and S. J. Hecker et al., Prodrugs of Phosphates and Phosphonates, Journal of Medicinal Chemistry, 2008, 51, 2328-2345, all of which are incorporated herein by reference in their entireties.

A "metabolite" is a product produced through metabolism in the body of a specified compound or salt thereof. The metabolites of a compound may be identified using routine techniques known in the art and their activities determined using tests such as those described herein. Such products may result for example from oxidation, reduction, hydrolysis, amidation, deamidation, esterification, deesterification, enzyme cleavage, and the like, of the administered compound. Accordingly, the invention includes metabolites of compounds disclosed herein, including metabolites produced by contacting a compound disclosed herein with a mammal for a sufficient time period.

A "pharmaceutically acceptable salts" refers to organic or inorganic salts of a compound disclosed herein. Pharmaceutically acceptable salts are well known in the art. For example, S. M. Berge et al., describe pharmaceutically acceptable salts in detail in J. Pharmaceutical Sciences, 1977, 66: 1-19, which is incorporated herein by reference. Some non-limiting examples of pharmaceutically acceptable and nontoxic salts include salts formed with inorganic acids such as hydrochloric acid, hydrobromic acid, phosphoric acid, sulfuric acid and perchloric acid or with organic acids such as acetic acid, oxalic acid, maleic acid, tartaric acid, citric acid, succinic acid, malonic acid, etc. or by using other methods used in the art such as ion exchange. Pharmaceutically acceptable base addition salts include, but are not limited to, inorganic base salts, such as ammonium salts and metal salts of Groups I to XII of the periodic table, and organic base salts, such as salts with primary, secondary, and tertiary amines.

The term "solvate" refers to an association or complex of one or more solvent molecules and a compound disclosed herein. Examples of solvents that form solvates include, but are not limited to, water, isopropanol, ethanol, methanol, DMSO, ethyl acetate, acetic acid and ethanolamine. The term "hydrate" refers to the complex where the solvent molecule is water.

As used herein, the term "treat", "treating" or "treatment" of any disease or disorder refers in one embodiment, to ameliorating the disease or disorder (i.e., slowing or arresting or reducing the development of the disease or at least one of the clinical symptoms thereof). In another embodiment "treat", "treating" or "treatment" refers to alleviating or ameliorating at least one physical parameter including those which may not be discernible by the patient. In yet another embodiment, "treat", "treating" or "treatment" refers to modulating the disease or disorder, either physically, (e.g., stabilization of a discernible symptom), physiologically, (e.g., stabilization of a physical parameter), or both. In yet another embodiment, "treat", "treating" or "treatment" refers to preventing or delaying the onset or development or progression of the disease or disorder.

The term "therapeutically effective amount" means that when administered to a subject to treat a disease, the amount of the compound is sufficient for the treatment of the disease. The "therapeutically effective amount" may vary with the compound, disease and severity, and the condition, age, weight, gender, etc. of the subject to be treated.

The pharmaceutically acceptable salts of the present invention can be synthesized from the parent compound, basic or acidic moiety by conventional chemical methods. Generally, such salts can be prepared by reacting free acid forms of these compounds with a stoichiometric amount of the appropriate base (such as Na, Ca, Mg, or K hydroxide, carbonate, bicarbonate or the like), or by reacting free base forms of these compounds with a stoichiometric amount of the appropriate acid. Such reactions are typically carried out in water or in an organic solvent, or in a mixture of the two. Generally, use of non-aqueous media like ether, ethyl acetate, ethanol, isopropanol, or acetonitrile is desirable, where practicable. Lists of additional suitable salts can be found, e.g., in "Remington's Pharmaceutical Sciences", 20th ed., Mack Publishing Company, Easton, Pa., (1985); and in "Handbook of Pharmaceutical Salts: Properties, Selection, and Use" by Stahl and Wermuth (Wiley-VCH, Weinheim, Germany, 2002).

Furthermore, the compounds disclosed herein, including their salts, can also be obtained in the form of their hydrates, or include other solvents such as ethanol, DMSO, and the like, used for their crystallization. The compounds of the present invention may inherently or by design form solvates with pharmaceutically acceptable solvents (including water); therefore, it is intended that the invention embrace both solvated and unsolvated forms.

Any formula given herein is also intended to represent isotopically unenriched forms as well as isotopically enriched forms of the compounds. Isotopically enriched compounds have the structure depicted by the general formula given herein, except that one or more atoms are replaced by the atom having a selected atomic mass or mass number. Examples of isotopes that can be incorporated into compounds of the invention include isotopes of hydrogen, carbon, nitrogen, oxygen, phosphorous, sulfur, fluorine, and chlorine, such as $^{2}$H, $^{3}$H, $^{11}$C, $^{13}$C, $^{14}$C, $^{15}$N, $^{17}$O, $^{18}$O, $^{18}$F, $^{31}$P, $^{32}$P, $^{35}$S, $^{36}$Cl and $^{125}$I, respectively. Isotopically-enriched compounds disclosed herein can generally be prepared by conventional techniques known to those skilled in the art or by processes analogous to those described in the accompanying Examples and Preparations using an appropriate isotopically-labeled reagent in place of the non-labeled reagent previously employed.

Further, substitution with heavier isotopes, particularly deuterium (i.e., 2H or D) may afford certain therapeutic advantages resulting from greater metabolic stability. For example, increased in vivo half-life or reduced dosage requirements or an improvement in therapeutic index. It is understood that deuterium in this context is regarded as a substituent of a compound of Formula (I). The concentration of such a heavier isotope, specifically deuterium, may be defined by the isotopic enrichment factor. The term "isotopic enrichment factor" as used herein means the ratio between the isotopic abundance and the natural abundance of a specified isotope. If a substituent in a compound of this invention is denoted deuterium, such compound has an isotopic enrichment factor for each designated deuterium atom of at least 3500 (52.5% deuterium incorporation at each designated deuterium atom), at least 4000 (60% deuterium incorporation), at least 4500 (67.5% deuterium incorporation), at least 5000 (75% deuterium incorporation), at least 5500 (82.5% deuterium incorporation), at least 6000 (90% deuterium incorporation), at least 6333.3 (95% deuterium incorporation), at least 6466.7 (97% deuterium incorporation), at least 6600 (99% deuterium incorporation), or at least 6633.3 (99.5% deuterium incorporation). Pharmaceutically acceptable solvates in accordance with the invention include those wherein the solvent of crystallization may be isotopically substituted, e.g., $D_2O$, $d_6$-acetone, DMSO-$d_6$.

Unless otherwise stated, all tautomeric forms of the compounds disclosed herein are within the scope of the invention. Additionally, unless otherwise stated, structures depicted herein are also meant to include compounds that differ only in the presence of one or more isotopically enriched atoms.

DESCRIPTION OF COMPOUNDS OF THE INVENTION

The present invention provides a novel antibiotic and its pharmaceutical composition, and use of the compound or the pharmaceutical composition in the preparation of a medicament for inhibiting the growth and/or reproduction of Gram-positive bacteria or *Mycobacterium tuberculosis*. The present invention also provides methods of preparing these compounds, pharmaceutical compositions comprising these compounds, and methods of using these compounds and compositions to prepare medicaments for the above-mentioned diseases in mammals, especially humans. Compared with the existing similar compounds, the compounds of the present invention not only have better pharmacological activity, but also have better in vivo metabolic kinetic properties and in vivo pharmacodynamic properties. At the same time, the preparation method is simple and easy, and the technological method is stable, which is suitable for industrial production. Therefore, the compound provided by the present invention has better druggability compared with the existing similar compounds.

Specifically, the present invention relates to a compound having Formula (Ia) or a stereoisomer, a tautomer, an N-oxide, a solvate, a metabolite, a pharmaceutically acceptable salt or a prodrug thereof, $C_{1-6}$ alkoxy, $C_{1-10}$ haloalkyl, hydroxy $C_{1-6}$ alkyl, amino $C_{1-6}$ alkyl, carboxy $C_{1-6}$ alkyl, $H_2NC(=O)$—$C_{1-6}$ alkyl, $H_2NS(=O)_2$—$C_{1-6}$ alkyl, $NH_2C(=NH)NH$—$C_{1-6}$ alkyl, $C_{3-6}$ cycloalkyl, 5-6 membered heterocyclyl, $C_{6-10}$ aryl and 5-10 membered heteroaryl is independently unsubstituted or substituted with 1, 2 or 3 substituents, and the substituent is independently selected from deuterium, F, Cl, Br, I, CN, OH, $NH_2$, $NO_2$, —C(=O)OH, —SH, $C_{1-6}$ alkyl, $C_{2-6}$ alkenyl, $C_{2-6}$ alkynyl, $C_{1-6}$ haloalkyl, amino $C_{1-6}$ alkyl, hydroxy $C_{1-6}$ alkyl, carboxy $C_{1-6}$ alkyl, cyano $C_{1-6}$ alkyl, $C_{3-6}$ cycloalkyl, 5-6 membered heterocyclyl, $C_{6-10}$ aryl or 5-10 membered heteroaryl;

t is 0, 1, 2, 3, 4, 5, 6, 7 or 8;

each $P_1$, $P_2$ and $P_3$ is independently $C_{1-6}$ alkylene or $C_{2-6}$ alkenylene, wherein each $C_{1-6}$ alkylene and $C_{2-6}$ alkenylene is independently unsubstituted or substituted with 1, 2 or 3 substituents independently selected from deuterium, F, Cl, Br, I, CN, OH, $NH_2$, $NO_2$, —C(=O)OH, —SH, $C_{1-6}$ alkyl, $C_{2-6}$ alkenyl, $C_{2-6}$ alkynyl, $C_{1-6}$ haloalkyl, amino $C_{1-6}$ alkyl, hydroxy $C_{1-6}$ alkyl, carboxy $C_{1-6}$ alkyl or cyano $C_{1-6}$ alkyl;

$R^8$ is —$R^{10}$, —$R^{11}$-$L_1$-$R^{12}$ or —$R^{13}$-$L_2$-$R^{14}$-$L_3$-$R^{15}$;

each of $L_1$, $L_2$ and $L_3$ is independently —$(CH_2)_q$—, —O—, —S—, —NH—, —C(=O)—, —S(=O)$_2$— or —S(=O)—; q is 0, 1, 2, 3 or 4;

each of $R^{10}$, $R^{11}$, $R^{12}$, $R^{13}$, $R^{14}$ and $R^{15}$ is independently $C_{1-6}$ alkyl, $C_{2-6}$ alkenyl, $C_{2-6}$ alkynyl, $C_{3-6}$ cycloalkyl, 5-10 membered heterocyclyl, $C_{6-10}$ aryl or 5-10 membered heteroaryl, wherein each $C_{1-6}$ alkyl, $C_{2-6}$ alkenyl, $C_{2-6}$ alkynyl, $C_{3-6}$ cycloalkyl, 5-10 membered heterocyclyl, $C_{6-10}$ aryl and 5-10 membered heteroaryl is independently unsubstituted or substituted with 1, 2, 3, 4 or 5 substituents independently selected from deuterium, F, Cl, Br, I, CN, $NO_2$, OH, $NH_2$, —C(=O)OH, $C_{1-6}$ alkyl, $C_{2-6}$ alkenyl, $C_{2-6}$ alkynyl, $C_{1-6}$ haloalkyl, $C_{1-6}$ haloalkoxy, $C_{1-6}$ alkoxy, hydroxy $C_{1-6}$ alkyl, amino $C_{1-6}$ alkyl, cyano $C_{1-6}$ alkyl, carboxy $C_{1-6}$ alkyl, $C_{3-6}$ cycloalkyl, 5-6 membered heterocyclyl, $C_{6-10}$ aryl or 5-6 membered heteroaryl;

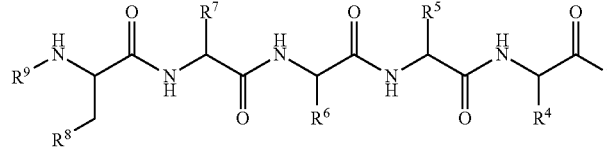
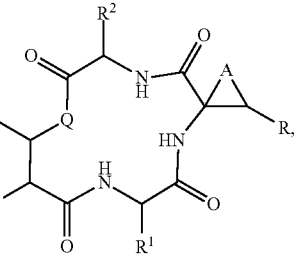

(Ia)

wherein, Q is —NH— or —O—;

$R^9$ is H, deuterium, $C_{1-6}$ alkyl, $C_{2-6}$ alkenyl, $C_{2-6}$ alkynyl, $C_{1-6}$ haloalkyl, $C_{3-6}$ cycloalkyl, 5-6 membered heterocyclyl, $C_{6-10}$ aryl or 5-6 membered heteroaryl;

each of $R^1$, $R^2$, $R^3$, $R^4$, $R^5$, $R^6$ and $R^7$ is independently H, deuterium, $C_{1-10}$ alkyl, $C_{2-10}$ alkenyl, $C_{2-8}$ alkynyl, $C_{1-6}$ alkoxy, $C_{1-10}$ haloalkyl, hydroxy $C_{1-6}$ alkyl, amino $C_{1-6}$ alkyl, carboxy $C_{1-6}$ alkyl, $H_2NC(=O)$—$C_{1-6}$ alkyl, $H_2NS(=O)_2$—$C_{1-6}$ alkyl, $NH_2C(=NH)NH$—$C_{1-6}$ alkyl, $C_{3-6}$ cycloalkyl, 5-6 membered heterocyclyl, $C_{6-10}$ aryl, 5-10 membered heteroaryl or —$P_1$—(NHC(=O)—$P_2$)$_t$—NHC(=O)—$P_3$—NHC(=NH)$NH_2$, wherein each of $C_{1-10}$ alkyl, $C_{2-10}$ alkenyl, $C_{2-8}$ alkynyl, A is —$(CR^aR^b)_p$—, —$(CR^aR^b)_s$—O—, —$(CR^aR^b)_s$—S—, —$(CR^aR^b)_s$—S(=O)—, —$(CR^aR^b)_s$—S(=O)$_2$—, —$(CR^aR^b)_s$—$NR^c$— or —$(CR^aR^b)_s$—C(=O)—; p is 1, 2, 3, 4, 5 or 6; each s is independently 0, 1, 2, 3, 4, 5 or 6;

each $R^a$, $R^b$ and $R^c$ is independently H, deuterium, F, Cl, Br, I, CN, $NO_2$, —C(=O)OH, OH, $NH_2$, —SH, $C_{1-6}$ alkyl, $C_{2-6}$ alkenyl, $C_{2-6}$ alkynyl, $C_{1-6}$ alkoxy, $C_{1-6}$ haloalkyl, $C_{1-6}$ haloalkoxy, hydroxy $C_{1-6}$ alkyl, amino $C_{1-6}$ alkyl, cyano $C_{1-6}$ alkyl, carboxy $C_{1-6}$ alkyl, $C_{3-6}$ cycloalkyl, 3-6 membered heterocyclyl-$C_{1-6}$ alkylene, 3-6 membered heterocyclyl, $C_{6-10}$ aryl or 5-6 membered heteroaryl;

R is $R^{16}$ or —$P_4$-$L_4$-$R^{17}$;

$P_4$ is $C_{1-6}$ alkylene or $C_{2-6}$ alkenylene, wherein each $C_{1-6}$ alkylene and $C_{2-6}$ alkenylene is independently unsubstituted or substituted with 1, 2 or 3 substituents independently selected from deuterium, F, Cl, Br, I, CN, OH, $NH_2$, $NO_2$, —C(=O)OH, —SH, $C_{1-6}$ alkyl, $C_{2-6}$ alkenyl, $C_{2-6}$ alkynyl, $C_{1-6}$ haloalkyl, amino $C_{1-6}$ alkyl, hydroxy $C_{1-6}$ alkyl, carboxy $C_{1-6}$ alkyl or cyano $C_{1-6}$ alkyl;

$L_4$ is —O—, —S—, —$NR^d$—, —S(=O)—, —S(=O)$_2$—, —$NR^eC$(=O)—, —$NR^eC$(=O)O—, —C(=O)—, —OC(=O)—, —C(=O)O—, —OC(=O)O— or —$NR^fS$(=O)$_2$—;

each of $R^{16}$ and $R^{17}$ is independently H, deuterium, F, Cl, Br, I, CN, $NO_2$, —C(=O)OH, OH, $NH_2$, —SH, $C_{1-8}$ alkyl, $C_{2-6}$ alkenyl, $C_{2-6}$ alkynyl, $NH_2C$(=$NR^g$)NH—$C_{1-6}$alkyl, $C_{1-6}$ haloalkyl, $C_{1-6}$ haloalkoxy, $C_{3-6}$ cycloalkyl, 3-6 membered heterocyclyl, $C_{6-10}$ aryl or 5-6 membered heteroaryl, wherein each of $C_{1-8}$ alkyl, $C_{2-6}$ alkenyl, $C_{2-6}$ alkynyl, $NH_2C$(=$NR^g$)NH—$C_{1-6}$ alkyl, $C_{1-6}$ haloalkyl, $C_{1-6}$ haloalkoxy, $C_{3-6}$ cycloalkyl, 3-6 membered heterocyclyl, $C_{6-10}$ aryl and 5-6 membered heteroaryl is independent unsubstituted or substituted with 1, 2, 3 or 4 $R^x$;

each $R^d$, $R^e$, $R^f$ and $R^g$ is independently H, deuterium, $C_{1-6}$ alkyl, $C_{2-6}$ alkenyl, $C_{2-6}$ alkynyl, $C_{1-6}$ alkoxy, $C_{1-6}$ haloalkyl, $C_{1-6}$ haloalkoxy, hydroxy $C_{1-6}$ alkyl, amino $C_{1-6}$ alkyl, cyano $C_{1-6}$ alkyl, carboxy $C_{1-6}$ alkyl, $C_{3-6}$ cycloalkyl, 3-6 membered heterocyclyl, $C_{6-10}$ aryl or 5-6 membered heteroaryl;

or, $R^d$ and $R^{17}$, together with the nitrogen atom to which they are attached, form 5-6 membered heterocyclyl or 5-6 membered heteroaryl, wherein each of 5-6 membered heterocyclyl and 5-6 membered heteroaryl is independently unsubstituted or substituted with 1, 2, 3 or 4 $R^x$;

each $R^x$ is independently deuterium, F, Cl, Br, I, CN, $NO_2$, OH, $NH_2$, —C(=O)OH, —SH, —NHC(=NH)$NH_2$, $C_{1-6}$ alkyl, $C_{2-6}$ alkenyl, $C_{2-6}$ alkynyl, $C_{1-6}$ haloalkyl, $C_{1-6}$ haloalkoxy, $C_{1-6}$ alkoxy, 3-6 membered heterocyclyl or $C_{1-6}$ alkylamino.

In some embodiments, the present invention relates to a compound having Formula (I) or a stereoisomer, a tautomer, an N-oxide, a solvate, a metabolite, a pharmaceutically acceptable salt or a prodrug thereof, In some embodiments, each of $R^1$, $R^2$, $R^3$, $R^4$, $R^5$, $R^6$ and $R^7$ is independently H, deuterium, $C_{1-10}$ alkyl, $C_{2-10}$ alkenyl, $C_{2-8}$ alkynyl, $C_{1-6}$ alkoxy, $C_{1-10}$ haloalkyl, hydroxy $C_{1-6}$ alkyl, amino $C_{1-6}$ alkyl, carboxy $C_{1-6}$ alkyl, $H_2NC$(=O)—$C_{1-6}$ alkyl, $H_2NS$(=O)$_2$—$C_{1-6}$ alkyl, $NH_2C$(=NH)NH—$C_{1-6}$ alkyl, $C_{3-6}$ cycloalkyl, 5-6 membered heterocyclyl, $C_{6-10}$ aryl, 5-10 membered heteroaryl or —$P_1$—(NHC(=O)—$P_2$)$_t$—NHC(=O)—$P_3$—NHC(=NH)$NH_2$, wherein each of $C_{1-10}$ alkyl, $C_{2-10}$ alkenyl, $C_{2-8}$ alkynyl, $C_{1-6}$ alkoxy, $C_{1-10}$ haloalkyl, hydroxy $C_{1-6}$ alkyl, amino $C_{1-6}$ alkyl, carboxy $C_{1-6}$ alkyl, $H_2NC$(=O)—$C_{1-6}$ alkyl, $H_2NS$(=O)$_2$—$C_{1-6}$ alkyl, $NH_2C$(=NH)$NH$—$C_{1-6}$ alkyl, $C_{3-6}$ cycloalkyl, 5-6 membered heterocyclyl, $C_{6-10}$ aryl and 5-10 membered heteroaryl is independently unsubstituted or substituted with 1, 2 or 3 substituents, and the substituent is independently selected from deuterium, F, Cl, Br, I, CN, OH, $NH_2$, $NO_2$, —C(=O)OH, —SH, $C_{1-6}$ alkyl, $C_{2-6}$ alkenyl, $C_{2-6}$ alkynyl, $C_{1-6}$ haloalkyl, amino $C_{1-6}$ alkyl, hydroxy $C_{1-6}$ alkyl, carboxy $C_{1-6}$ alkyl, cyano $C_{1-6}$ alkyl, $C_{3-6}$ cycloalkyl, 5-6 membered heterocyclyl, $C_{6-10}$ aryl or 5-10 membered heteroaryl;

t is 0, 1, 2, 3, 4, 5, 6, 7 or 8;

each $P_1$, $P_2$ and $P_3$ is independently $C_{1-6}$ alkylene or $C_{2-6}$ alkenylene, wherein each $C_{1-6}$ alkylene and $C_{2-6}$ alkenylene is independently unsubstituted or substituted with 1, 2 or 3 substituents independently selected from deuterium, F, Cl, Br, I, CN, OH, $NH_2$, $NO_2$, —C(=O)OH, —SH, $C_{1-6}$ alkyl, $C_{2-6}$ alkenyl, $C_{2-6}$ alkynyl, $C_{1-6}$ haloalkyl, amino $C_{1-6}$ alkyl, hydroxy $C_{1-6}$ alkyl, carboxy $C_{1-6}$ alkyl or cyano $C_{1-6}$ alkyl.

In some embodiments, $R^8$ is —$R^{10}$, —$R^{11}$-$L_1$-$R^{12}$ or —$R^{13}$-$L_2$-$R^{14}$-$L_3$-$R^{15}$;

each $L_1$, $L_2$ and $L_3$ is independently —(CH$_2$)$_q$—, —O—, —S—, —NH—, —C(=O)—, —S(=O)$_2$— or —S(=O)—; q is 0, 1, 2, 3 or 4;

each of $R^{10}$, $R^{11}$, $R^{12}$, $R^{13}$, $R^{14}$ and $R^{15}$ is independently $C_{1-6}$ alkyl, $C_{2-6}$ alkenyl, $C_{2-6}$ alkynyl, $C_{3-6}$ cycloalkyl, 5-10 membered heterocyclyl, $C_{6-10}$ aryl or 5-10 membered heteroaryl, wherein each of $C_{1-6}$ alkyl, $C_{2-6}$ alkenyl, $C_{2-6}$ alkynyl, $C_{3-6}$ cycloalkyl, 5-10 membered heterocyclyl, $C_{6-10}$ aryl and 5-10 membered heteroaryl is independently unsubstituted or substituted with 1, 2, 3, 4 or 5 substituents independently selected from deuterium, F, Cl, Br, I, CN, $NO_2$, OH, $NH_2$, —C(=O)OH, $C_{1-6}$ alkyl, $C_{2-6}$ alkenyl, $C_{2-6}$ alkynyl, $C_{1-6}$ haloal-

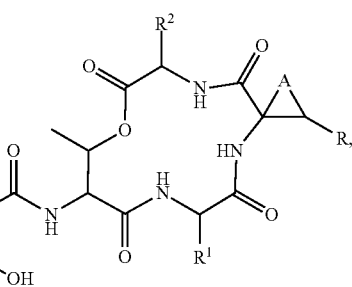

(I)

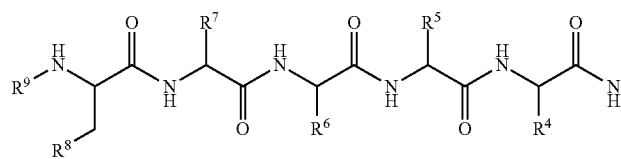

wherein R, $R^1$, $R^2$, $R^3$, $R^4$, $R^5$, $R^6$, $R^7$, $R^8$, $R^9$ and A have the definitions described in the present invention.

In some embodiments, $R^9$ is H, deuterium, $C_{1-6}$ alkyl, $C_{2-6}$ alkenyl, $C_{2-6}$ alkynyl, $C_{1-6}$ haloalkyl, $C_{3-6}$ cycloalkyl, 5-6 membered heterocyclyl, $C_{6-10}$ aryl or 5-6 membered heteroaryl.

kyl, $C_{1-6}$ haloalkoxy, $C_{1-6}$ alkoxy, hydroxy $C_{1-6}$ alkyl, amino $C_{1-6}$ alkyl, cyano $C_{1-6}$ alkyl, carboxy $C_{1-6}$ alkyl, $C_{3-6}$ cycloalkyl, 5-6 membered heterocyclyl, $C_{6-10}$ aryl or 5-6 membered heteroaryl.

In some embodiments, A is —(CR$^a$R$^b$)$_p$—, —(CR$^a$R$^b$)$_s$—O—, —(CR$^a$R$^b$)$_s$—S—, —(CR$^a$R$^b$)$_s$—S(=O)—, —(CR$^a$R$^b$)$_s$—S(=O)$_2$—, —(CR$^a$R$^b$)$_s$—NR$^c$— or —(CR$^a$R$^b$)$_s$—C(=O)—; p is 1, 2, 3, 4, 5 or 6; each s is independently 0, 1, 2, 3, 4, 5 or 6;

each R$^a$, R$^b$ and R$^c$ is independently H, deuterium, F, Cl, Br, I, CN, NO$_2$, —C(=O)OH, OH, NH$_2$, —SH, C$_{1-6}$ alkyl, C$_{2-6}$ alkenyl, C$_{2-6}$ alkynyl, C$_{1-6}$ alkoxy, C$_{1-6}$ haloalkyl, C$_{1-6}$ haloalkoxy, hydroxy C$_{1-6}$ alkyl, amino C$_{1-6}$ alkyl, cyano C$_{1-6}$ alkyl, carboxy C$_{1-6}$ alkyl, C$_{3-6}$ cycloalkyl, 3-6 membered heterocyclyl-C$_{1-6}$ alkylene, 3-6 membered heterocyclyl, C$_{6-10}$ aryl or 5-6 membered heteroaryl, wherein each C$_{1-6}$ alkyl, C$_{2-6}$ alkenyl, C$_{2-6}$ alkynyl, C$_{1-6}$ alkoxy, C$_{1-6}$ haloalkyl, C$_{1-6}$ haloalkoxy, hydroxy C$_{1-6}$ alkyl, amino C$_{1-6}$ alkyl, cyano C$_{1-6}$ alkyl, carboxy C$_{1-6}$ alkyl, C$_{3-6}$ cycloalkyl, 3-6 membered heterocyclyl-C$_{1-6}$ alkylene, 3-6 membered heterocyclyl, C$_{6-10}$ aryl and 5-6 membered heteroaryl is independently unsubstituted or substituted with 1, 2, 3, 4 or 5 substituents independently selected from F, Cl, Br, I, CN, NO$_2$, OH, NH$_2$, —C(=O)OH, —SH, —NHC(=NH)NH$_2$, —NHC(=NH)NHCH$_3$, —NHC(=O)OCH(CH$_2$CNH$_2$)$_2$, p-fluorophenoxy, —OC(=O)phenyl, —NHC(=O)C$_{1-6}$ alkyl, —NHC(=O)-halophenyl, C$_{1-6}$ alkyl, C$_{1-6}$ alkylthio, C$_{2-6}$ alkenyl, C$_{2-6}$ alkynyl, C$_{1-6}$ haloalkyl, C$_{1-6}$ haloalkoxy, C$_{1-6}$ alkoxy or C$_{1-6}$ alkylamino.

In some embodiments, R is R$^{16}$ or —P$_4$-L$_4$-R$^{17}$;

P$_4$ is C$_{1-6}$ alkylene or C$_{2-6}$ alkenylene, wherein each C$_{1-6}$ alkylene and C$_{2-6}$ alkenylene is independently unsubstituted or substituted with 1, 2 or 3 substituents independently selected from deuterium, F, Cl, Br, I, CN, OH, NH$_2$, NO$_2$, —C(=O)OH, —SH, C$_{1-6}$ alkyl, C$_{2-6}$ alkenyl, C$_{2-6}$ alkynyl, C$_{1-6}$ haloalkyl, amino C$_{1-6}$ alkyl, hydroxy C$_{1-6}$ alkyl, carboxy C$_{1-6}$ alkyl or cyano C$_{1-6}$ alkyl;

L$_4$ is —O—, —S—, —NR$^d$—, —S(=O)—, —S(=O)$_2$—, —NR$^e$C(=O)—, —NR$^e$C(=O)O—, —C(=O)—, —OC(=O)—, —C(=O)O—, —OC(=O)O— or —NR$^f$S(=O)$_2$—;

each of R$^{16}$ and R$^{17}$ is independently H, deuterium, F, Cl, Br, I, CN, NO$_2$, —C(=O)OH, OH, NH$_2$, —SH, C$_{1-8}$ alkyl, C$_{2-6}$ alkenyl, C$_{2-6}$ alkynyl, NH$_2$C(=NR$^g$)NH—C$_{1-6}$alkyl, C$_{1-6}$ haloalkyl, C$_{1-6}$ haloalkoxy, C$_{3-6}$ cycloalkyl, 3-6 membered heterocyclyl, C$_{6-10}$ aryl or 5-6 membered heteroaryl, wherein each of C$_{1-8}$ alkyl, C$_{2-6}$ alkenyl, C$_{2-6}$ alkynyl, NH$_2$C(=NR$^g$)NH—C$_{1-6}$ alkyl, C$_{1-6}$ haloalkyl, C$_{1-6}$ haloalkoxy, C$_{3-6}$ cycloalkyl, 3-6 membered heterocyclyl, C$_{6-10}$ aryl and 5-6 membered heteroaryl is independent unsubstituted or substituted with 1, 2, 3 or 4 R$^x$;

each R$^d$, R$^e$, R$^f$ and R$^g$ is independently H, deuterium, C$_{1-6}$ alkyl, C$_{2-6}$ alkenyl, C$_{2-6}$ alkynyl, C$_{1-6}$ alkoxy, C$_{1-6}$ haloalkyl, C$_{1-6}$ haloalkoxy, hydroxy C$_{1-6}$ alkyl, amino C$_{1-6}$ alkyl, cyano C$_{1-6}$ alkyl, carboxy C$_{1-6}$ alkyl, C$_{3-6}$ cycloalkyl, 3-6 membered heterocyclyl, C$_{6-10}$ aryl or 5-6 membered heteroaryl;

or, R$^d$ and R$^{17}$, together with the nitrogen atom to which they are attached, form 5-6 membered heterocyclyl or 5-6 membered heteroaryl, wherein each of 5-6 membered heterocyclyl and 5-6 membered heteroaryl is independently unsubstituted or substituted with 1, 2, 3 or 4 R$^x$;

each R$^x$ is independently deuterium, F, Cl, Br, I, CN, NO$_2$, OH, NH$_2$, —C(=O)OH, —SH, —NHC(=NH)NH$_2$, C$_{1-6}$ alkyl, C$_{2-6}$ alkenyl, C$_{2-6}$ alkynyl, C$_{1-6}$ haloalkyl, C$_{1-6}$ haloalkoxy, C$_{1-6}$ alkoxy, 3-6 membered heterocyclyl or C$_{1-6}$ alkylamino.

In some embodiments, the present invention relates to a compound having Formula (II) or a stereoisomer, a tautomer, an N-oxide, a solvate, a metabolite, a pharmaceutically acceptable salt or a prodrug thereof, (II)

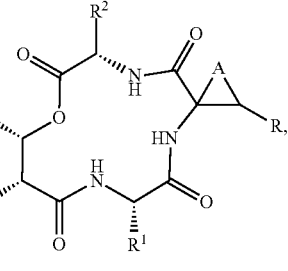
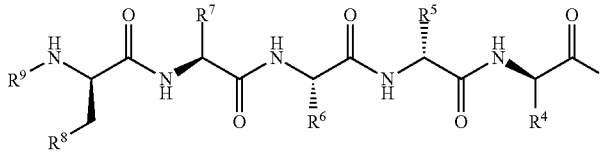

wherein R, R$^1$, R$^2$, R$^3$, R$^4$, R$^5$, R$^6$, R$^7$, R$^8$, R$^9$ and A have the definitions described in the present invention.

In some embodiments, the present invention relates to a compound having Formula (IIa) or a stereoisomer, a tautomer, an N-oxide, a solvate, a metabolite, a pharmaceutically acceptable salt or a prodrug thereof, (IIa)

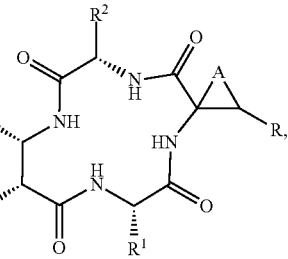
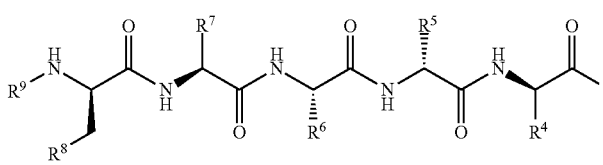

wherein R, R¹, R², R³, R⁴, R⁵, R⁶, R⁷, R⁸, R⁹ and A have the definitions described in the present invention.

In some embodiments, the invention relates to a compound having Formula (III) or a stereoisomer, a tautomer, an N-oxide, a solvate, a metabolite, a pharmaceutically acceptable salt or a prodrug thereof,

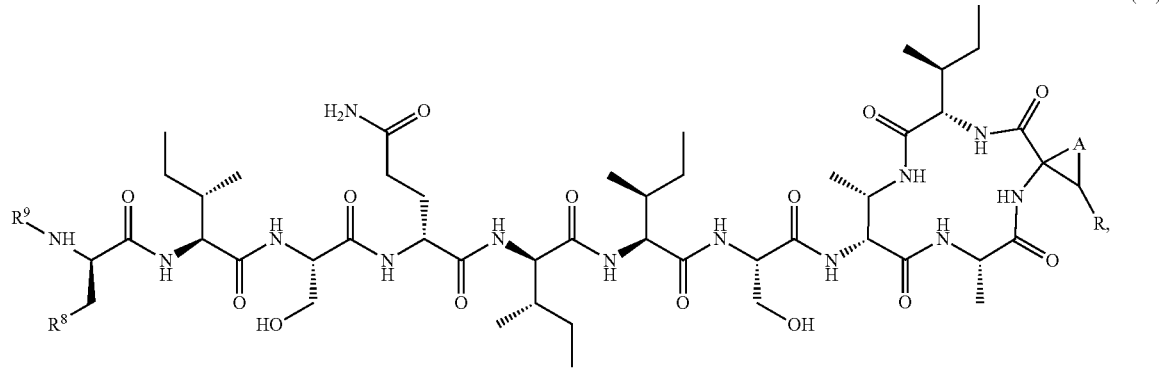

(III)

wherein, R, R⁸, R⁹ and A have the definitions described in the present invention.

In some embodiments, R⁹ is H, deuterium, $C_{1-4}$ alkyl, $C_{2-4}$ alkenyl, $C_{2-4}$ alkynyl, $C_{1-4}$ haloalkyl, $C_{3-6}$ cycloalkyl, 5-6 membered heterocyclyl, $C_{6-10}$ aryl or 5-6 membered heteroaryl.

In some embodiments, R⁹ is H, deuterium, methyl, ethyl, n-propyl, isopropyl, n-butyl, tert-butyl, vinyl, ethynyl, trifluoromethyl, cyclopropyl, cyclobutyl, cyclopentyl, cyclohexyl, 5-6 membered heterocyclyl, phenyl or 5-6 membered heteroaryl.

In other embodiments, each of R¹, R², R³, R⁴, R⁵, R⁶ and R⁷ is independently H, deuterium, $C_{1-8}$ alkyl, $C_{2-8}$ alkenyl, $C_{2-8}$ alkynyl, $C_{1-4}$ alkoxy, $C_{1-8}$ haloalkyl, hydroxy $C_{1-4}$ alkyl, amino $C_{1-4}$ alkyl, carboxy $C_{1-4}$ alkyl, $H_2NC(=O)-C_{1-4}$ alkyl, $H_2NS(=O)_2-C_{1-4}$ alkyl, $NH_2C(=NH)NH-C_{1-4}$ alkyl, $C_{3-6}$ cycloalkyl, 5-6 membered heterocyclyl, $C_{6-10}$ aryl, 5-6 membered heteroaryl or $-P_1-(NHC(=O)-P_2)_t-NHC(=O)-P_3-NHC(=NH)NH_2$, wherein each of $C_{1-8}$ alkyl, $C_{2-8}$ alkenyl, $C_{2-8}$ alkynyl, $C_{1-4}$ alkoxy, $C_{1-8}$ haloalkyl, hydroxy $C_{1-4}$ alkyl, amino $C_{1-4}$ alkyl, carboxy $C_{1-4}$ alkyl, $H_2NC(=O)-C_{1-4}$ alkyl, $H_2NS(=O)_2-C_{1-4}$ alkyl, $NH_2C(=NH)NH-C_{1-4}$ alkyl, $C_{3-6}$ cycloalkyl, 5-6 membered heterocyclyl, $C_{6-10}$ aryl and 5-6 membered heteroaryl is independently unsubstituted or substituted with 1, 2 or 3 substituents, the substituent is independently selected from deuterium, F, Cl, Br, I, CN, OH, $NH_2$, $NO_2$, $-C(=O)$ OH, $-SH$, $C_{1-4}$ alkyl, $C_{2-4}$ alkenyl, $C_{2-4}$ alkynyl, $C_{1-4}$ haloalkyl, amino $C_{1-4}$ alkyl, hydroxy $C_{1-4}$ alkyl, carboxy $C_{1-4}$ alkyl, cyano $C_{1-4}$ alkyl, $C_{3-6}$ cycloalkyl, 5-6 membered heterocyclyl, $C_{6-10}$ aryl or 5-6 membered heteroaryl; wherein the $P_1$, $P_2$, $P_3$, and t have the definitions described in the present invention.

In still other embodiments, each of R¹, R², R³, R⁴, R⁵, R⁶ and R⁷ is independently H, deuterium, methyl, ethyl, n-propyl, isopropyl, n-butyl, isobutyl, sec-butyl, t-butyl, n-pentyl, n-hexyl, n-heptyl, n-octyl, $-CH=CH_2$, $-CH_2CH=CH_2$, $-(CH_2)_2CH=CH_2$, $-(CH_2)_3CH=CH_2$, $-(CH_2)_4CH=CH_2$, $-(CH_2)_5CH=CH_2$, $-(CH_2)_6CH=CH_2$, methoxy, ethoxy, $-CF_3$, $-CHF_2$, $-CH_2CHF_2$, $-(CH_2)_2CHF_2$, $-(CH_2)_3CHF_2$, $-(CH_2)_4CHF_2$, $-(CH_2)_5CHF_2$, $-(CH_2)_6CH_2F$, $-(CH_2)_6CHF_2$, hydroxymethyl, hydroxyethyl, aminomethyl, carboxymethyl, $H_2NC(=O)-CH_2-$, $H_2NC(=O)-CH_2CH_2-$, $H_2NC(=O)-(CH_2)_3-$, $H_2NS(=O)_2-CH_2-$, $H_2NS(=O)_2-CH_2CH_2-$, $NH_2C(=NH)NH-CH_2-$, $NH_2C(=NH)NH-(CH_2)_2-$, $NH_2C(=NH)NH-(CH_2)_3-$, $NH_2C(=NH)NH-(CH_2)_4-$, cyclopropyl, cyclobutyl, cyclopentyl, cyclohexyl, 5-6 membered heterocyclyl, phenyl, 5-6 membered heteroaryl or $-P_1-(NHC(=O)-P_2)_t-NHC(=O)-P_3-NHC(=NH)NH_2$, wherein each methyl, ethyl, n-propyl, isopropyl, n-butyl, isobutyl, sec-butyl, t-butyl, n-pentyl, n-hexyl, n-heptyl, n-octyl, $-CH=CH_2$, $-CH_2CH=CH_2$, $-(CH_2)_2CH=CH_2$, $-(CH_2)_3CH=CH_2$, $-(CH_2)_4CH=CH_2$, $-(CH_2)_5CH=CH_2$, $-(CH_2)_6CH=CH_2$, methoxy, ethoxy, $-CHF_2$, $-CH_2CHF_2$, $-(CH_2)_2CHF_2$, $-(CH_2)_3CHF_2$, $-(CH_2)_4CHF_2$, $-(CH_2)_5CHF_2$, $-(CH_2)_6CH_2F$, $-(CH_2)_6CHF_2$, hydroxymethyl, hydroxyethyl, aminomethyl, carboxymethyl, $H_2NC(=O)-CH_2-$, $H_2NC(=O)-CH_2CH_2-$, $H_2NC(=O)-(CH_2)_3-$, $H_2NS(=O)_2-CH_2-$, $H_2NS(=O)_2-CH_2CH_2-$, $NH_2C(=NH)NH-CH_2-$, $NH_2C(=NH)NH-(CH_2)_2-$, $NH_2C(=NH)NH-(CH_2)_3-$, $NH_2C(=NH)NH-(CH_2)_4-$, cyclopropyl, cyclobutyl, cyclopentyl, cyclohexyl, 5-6 membered heterocyclyl, phenyl and 5-6 membered heteroaryl is independently unsubstituted or substituted with 1, 2 or 3 substituents, and the substituent is independently selected from deuterium, F, Cl, Br, I, CN, OH, $NH_2$, $NO_2$, $-C(=O)$ OH, $-SH$, methyl, ethyl, n-propyl, isopropyl, vinyl, allyl, ethynyl, trifluoromethyl, difluoromethyl, aminomethyl, aminoethyl, amino-n-propyl, amino-isopropyl, amino-n-butyl, amino-n-pentyl, hydroxymethyl, hydroxyethyl, carboxymethyl, cyanomethyl, cyclopropyl, cyclobutyl, cyclopentyl, cyclohexyl, 5-6 membered heterocyclyl, phenyl or 5-6 membered membered heteroaryl; wherein the $P_1$, $P_2$, $P_3$ and t have the definitions described in the present invention.

In other embodiments, each $P_1$, $P_2$ and $P_3$ is independently $C_{1-4}$ alkylene or $C_{2-4}$ alkenylene, wherein each $C_{1-4}$ alkylene and $C_{2-4}$ alkenylene is independently unsubstituted or substituted with 1, 2 or 3 substituents independently selected from deuterium, F, Cl, Br, I, CN, OH, $NH_2$, $NO_2$, $-C(=O)$ OH, $-SH$, $C_{1-4}$ alkyl, $C_{2-4}$ alkenyl, $C_{2-4}$ alkynyl, $C_{1-4}$ haloalkyl, amino $C_{1-4}$ alkyl, hydroxy $C_{1-4}$ alkyl, carboxy $C_{1-4}$ alkyl or cyano $C_{1-4}$ alkyl.

In still other embodiments, each $P_1$, $P_2$ and $P_3$ is independently $-CH_2-$, $-CH_2CH_2-$, $-CH_2CH_2CH_2-$, $-CH(CH_3)CH_2-$, $-CH_2CH_2CH_2CH_2-$, $-CH_2(CH_2)_3CH_2-$, $-CH=CH-$ or $-CH=CHCH_2-$, wherein each $-CH_2-$, $-CH_2CH_2-$, $-CH_2CH_2CH_2-$, $-CH(CH_3)CH_2-$, $-CH_2CH_2CH_2CH_2-$, $-CH_2(CH_2)_3CH_2-$, —CH═CH— and —CH═CHCH$_2$— is independently unsubstituted or substituted with 1, 2 or 3 substituents independently selected from deuterium, F, Cl, Br, I, CN, OH, NH$_2$, NO$_2$, —C(═O)OH, —SH, methyl, ethyl, n-propyl, isopropyl, vinyl, allyl, ethynyl, trifluoromethyl, difluoromethyl, aminomethyl, aminoethyl, amino-n-propyl, aminoisopropyl, amino-n-butyl, amino-n-pentyl, hydroxymethyl, hydroxyethyl, carboxymethyl or cyanomethyl.

In other embodiments, each of $R^{10}$, $R^{11}$, $R^{12}$, $R^{13}$, $R^{14}$ and $R^{15}$ is independently C$_{1-4}$ alkyl, C$_{2-4}$ alkenyl, C$_{2-4}$ alkynyl, C$_{3-6}$ cycloalkyl, 5-10 membered heterocyclyl, C$_{6-10}$ aryl or 5-10 membered heteroaryl, wherein each of C$_{1-4}$ alkyl, C$_{2-4}$ alkenyl, C$_{2-4}$ alkynyl, C$_{3-6}$ cycloalkyl, 5-10 membered heterocyclyl, C$_{6-10}$ aryl and 5-10 membered heteroaryl is independently unsubstituted or substituted with 1, 2, 3, 4 or 5 substituents independently selected from deuterium, F, Cl, Br, I, CN, NO$_2$, OH, NH$_2$, —C(═O)OH, C$_{1-4}$ alkyl, C$_{2-4}$ alkenyl, C$_{2-4}$ alkynyl, C$_{1-4}$ haloalkyl, C$_{1-4}$ haloalkoxy, C$_{1-4}$ alkoxy, hydroxy C$_{1-4}$ alkyl, amino C$_{1-4}$ alkyl, cyano C$_{1-4}$ alkyl, carboxy C$_{1-4}$ alkyl, C$_{3-6}$ cycloalkyl, 5-6 membered heterocyclyl, C$_{6-10}$ aryl or 5-6 membered heteroaryl.

In still other embodiments, each of $R^{10}$, $R^{11}$, $R^{12}$, $R^{13}$, $R^{14}$ and $R^{15}$ is independently methyl, ethyl, vinyl, ethynyl, cyclopropyl, cyclobutyl, cyclopentyl, cyclohexyl, pyrazolidinyl, pyrrolidinyl, imidazolidinyl, tetrahydrofuranyl, tetrahydrothienyl, piperidinyl, morpholinyl, thiomorpholinyl, piperazinyl, phenyl, naphthyl, furyl, thienyl, imidazolyl, thiazolyl, pyrrolyl, pyrazolyl, pyrimidinyl, pyridyl, pyrazinyl, benzofuranyl, benzimidazolyl, benzothienyl, indolyl, purinyl, quinolinyl or isoquinolinyl, wherein each methyl, ethyl, vinyl, ethynyl, cyclopropyl, cyclobutyl, cyclopentyl, cyclohexyl, pyrazolidinyl, pyrrolidinyl, imidazolidinyl, tetrahydrofuranyl, tetrahydrothienyl, piperidinyl, morpholinyl, thiomorpholinyl, piperazinyl, phenyl, naphthyl, furyl, thienyl, imidazolyl, thiazolyl, pyrrolyl, pyrazolyl, pyrimidinyl, pyridyl, pyrazinyl, benzofuranyl, benzimidazolyl, benzothienyl, indolyl, purinyl, quinolinyl and isoquinolinyl is independently unsubstituted or substituted with 1, 2, 3, 4 or 5 substituents independently selected from deuterium, F, Cl, Br, I, CN, NO$_2$, OH, NH$_2$, —C(═O)OH, methyl, ethyl, n-propyl, isopropyl, vinyl, ethynyl, —CF$_3$, —CHF$_2$, —CH$_2$CF$_3$, trifluoromethoxy, methoxy, ethoxy, hydroxymethyl, aminomethyl, cyanomethyl, carboxymethyl, cyclopropyl, cyclobutyl, cyclopentyl, cyclohexyl, 5-6 membered heterocyclyl, phenyl or 5-6 membered heteroaryl.

In other embodiments, each of $R^{16}$ and $R^{17}$ is H, deuterium, F, Cl, Br, I, CN, NO$_2$, —C(═O)OH, OH, NH$_2$, —SH, C$_{1-6}$ alkyl, C$_{2-4}$ alkenyl, C$_{2-4}$ alkynyl, NH$_2$C(═NR$^g$)NH—C$_{1-4}$alkyl, C$_{1-4}$ haloalkyl, C$_{1-4}$ haloalkoxy, C$_{3-6}$ cycloalkyl, 5-6 membered heterocyclyl, C$_{6-10}$ aryl or 5-6 membered heteroaryl, wherein each C$_{1-6}$ alkyl, C$_{2-4}$ alkenyl, C$_{2-4}$ alkynyl, NH$_2$C(═NR$^g$)NH—C$_{1-4}$ alkyl, C$_{1-4}$ haloalkyl, C$_{1-4}$ haloalkoxy, C$_{3-6}$ cycloalkyl, 5-6 membered heterocyclyl, C$_{6-10}$ aryl and 5-6 membered heteroaryl is independently unsubstituted or substituted with 1, 2, 3 or 4 R$^x$; wherein R$^g$ and R$^x$ are as defined herein.

In still other embodiments, each of $R^{16}$ and $R^{17}$ is independently H, deuterium, F, Cl, Br, I, CN, NO$_2$, —C(═O) OH, OH, NH$_2$, —SH, methyl, ethyl, n-propyl, isopropyl, n-butyl, isobutyl, t-butyl, n-pentyl, n-hexyl, —CH═CH$_2$, —CH═CHCH$_3$, —CH$_2$CH═CH$_2$, ethynyl, NH$_2$C(═NR$^g$) NH—CH$_2$—, NH$_2$C(═NR$^g$)NH—CH$_2$CH$_2$—, NH$_2$C (═NR$^g$)NH—CH$_2$CH$_2$CH$_2$—, NH$_2$C(═NR$^g$)NH—CH (CH$_3$)CH$_2$—, —CH$_2$F, —CF$_3$, —CHF$_2$, —CH$_2$CF$_3$, —CH$_2$CHF$_2$, —CH$_2$CH$_2$F, —(CH$_2$)$_2$CF$_3$, —(CH$_2$)$_2$CHF$_2$, —(CH$_2$)$_2$CH$_2$F, trifluoromethoxy, cyclopropyl, cyclobutyl, cyclopentyl, cyclohexyl, pyrazolidinyl, pyrrolidinyl, imidazolidinyl, tetrahydrofuranyl, tetrahydrothienyl, piperidinyl, morpholinyl, thiomorpholinyl, piperazinyl, phenyl, furanyl, thienyl, imidazolyl, thiazolyl, pyrrolyl, pyrazolyl, pyrimidinyl, pyridyl or pyrazinyl; wherein each of methyl, ethyl, n-propyl, isopropyl, n-butyl, isobutyl, t-butyl, n-pentyl, n-hexyl, —CH═CH$_2$, —CH═CHCH$_3$, —CH$_2$CH═CH$_2$, ethynyl, NH$_2$C(═NR$^g$)NH—CH$_2$—, NH$_2$C(═NR$^g$)NH—CH$_2$CH$_2$—, NH$_2$C(═NR$^g$)NH—CH$_2$CH</pt4176>$_2$CH$_2$—, NH$_2$C(═NR$^g$)NH—CH(CH$_3$)CH$_2$—, —CH$_2$F, —CHF$_2$, —CH$_2$CF$_3$, —CH$_2$CHF$_2$, —CH$_2$CH$_2$F, —(CH$_2$)$_2$CF$_3$, —(CH$_2$)$_2$CHF$_2$, —(CH$_2$)$_2$CH$_2$F, cyclopropyl, cyclobutyl, cyclopentyl, cyclohexyl, pyrazolidinyl, pyrrolidinyl, imidazolidinyl, tetrahydrofuranyl, tetrahydrothienyl, piperidinyl, morpholinyl, thiomorpholinyl, piperazinyl, phenyl, furanyl, thienyl, imidazolyl, thiazolyl, pyrrolyl, pyrazolyl, pyrimidinyl, pyridyl and pyrazinyl is independently unsubstituted or substituted with 1, 2, 3 or 4 R$^x$, wherein R$^g$ and R$^x$ are as defined herein.

In other embodiments, each R$^a$, R$^b$ and R$^c$ is independently H, deuterium, F, Cl, Br, I, CN, NO$_2$, —C(═O)OH, OH, NH$_2$, —SH, C$_{1-4}$ alkyl, C$_{2-4}$ alkenyl, C$_{2-4}$ alkynyl, C$_{1-4}$ alkoxy, C$_{1-4}$ haloalkyl, C$_{1-4}$ haloalkoxy, hydroxy C$_{1-4}$ alkyl, amino C$_{1-4}$ alkyl, cyano C$_{1-4}$ alkyl, carboxy C$_{1-4}$ alkyl, C$_{3-6}$ cycloalkyl, 5-6 membered heterocyclyl-C$_{1-4}$ alkylene, 5-6 membered heterocyclyl, C$_{6-10}$ aryl or 5-6 membered heteroaryl, wherein each C$_{1-4}$ alkyl, C$_{2-4}$ alkenyl, C$_{2-4}$ alkynyl, C$_{1-4}$ alkoxy, C$_{1-4}$ haloalkyl, C$_{1-4}$ haloalkoxy, hydroxy C$_{1-4}$ alkyl, amino C$_{1-4}$ alkyl, cyano C$_{1-4}$ alkyl, carboxy C$_{1-4}$ alkyl, C$_{3-6}$ cycloalkyl, 5-6 membered heterocyclyl-C$_{1-4}$ alkylene, 5-6 membered heterocyclyl, C$_{6-10}$ aryl and 5-6 membered heteroaryl is independently unsubstituted or substituted with 1, 2, 3, 4 or 5 substituents independently selected from F, Cl, Br, I, CN, NO$_2$, OH, NH$_2$, —C(═O)OH, —SH, —NHC (═NH)NH$_2$, —NHC(═NH)NHCH$_3$, —NHC(═O)OCH (CH$_2$CNH$_2$)$_2$, p-fluorophenoxy, —OC(═O)phenyl, —NHC (═O)C$_{1-6}$ alkyl, —NH C(═O)-halophenyl, C$_{1-4}$ alkyl, C$_{1-4}$ alkylthio, C$_{2-4}$ alkenyl, C$_{2-4}$ alkynyl, C$_{1-4}$ haloalkyl, C$_{1-4}$ haloalkoxy, C$_{1-6}$ alkoxy or C$_{1-4}$ alkylamino.

In still other embodiments, each R$^a$, R$^b$ and R$^c$ is independently H, deuterium, F, Cl, Br, I, CN, NO$_2$, —C(═O) OH, OH, NH$_2$, —SH, methyl, ethyl, n-propyl, isopropyl, vinyl, ethynyl, methoxy, ethoxy, trifluoromethyl, —CHF$_2$, —CH$_2$CHF$_2$, —CH$_2$CH$_2$F, —CH$_2$CF$_3$, —(CH$_2$)$_2$CHF$_2$, —(CH$_2$)$_3$CHF$_2$, trifluoromethoxy, hydroxymethyl, aminomethyl, cyanomethyl, carboxymethyl, cyclopropyl, cyclobutyl, cyclopentyl, cyclohexyl, —(CH$_2$)$_2$-morpholine, —(CH$_2$)$_2$-pyrrole, 5-6 membered heterocyclyl, phenyl or 5-6 membered heteroaryl, wherein each methyl, ethyl, n-propyl, isopropyl, vinyl, ethynyl, methoxy, ethoxy, trifluoromethyl, —CHF$_2$, —CH$_2$CHF$_2$, —CH$_2$CH$_2$F, —CH$_2$CF$_3$, —(CH$_2$)$_2$CHF$_2$, —(CH$_2$)$_3$CHF$_2$, trifluoromethoxy, hydroxymethyl, —CH$_2$CH$_2$OH, aminomethyl, —CH$_2$CH$_2$NH$_2$, cyanomethyl, carboxymethyl, cyclopropyl, cyclobutyl, cyclopentyl, cyclohexyl, —(CH$_2$)$_2$-morpholine, —(CH$_2$)$_2$-pyrrole, 5-6 membered heterocyclyl, phenyl and 5-6 membered heteroaryl is independently unsubstituted or substituted with 1, 2, 3, 4 or 5 substituents independently selected from F, Cl, Br, I, CN, NO$_2$, OH, NH$_2$, —C(═O) OH, —SH, —NHC(═NH)NH$_2$, —NHC(═NH)NHCH$_3$, —NHC(═O)OCH(CH$_2$CNH$_2$)$_2$, p-fluorophenoxy, —OC (═O)phenyl, —NHC(═O)CH$_3$, —NHC(═O)CH$_2$CH$_3$, —NHC(═O)(CH$_2$)$_2$CH$_3$, —NHC(═O)(CH$_2$)$_3$CH$_3$, —NHC(═O)(CH$_2$)$_4$CH$_3$, —NHC(═O)-p-fluorophenyl, methyl, ethyl, n-propyl, isopropyl, —S—CH$_3$, —S—CH$_2$CH$_3$, —S—CH$_2$CH$_2$CH$_3$, C$_{2-4}$ alkenyl, C$_{2-4}$ alkynyl, C$_{1-4}$ haloalkyl, C$_{1-4}$ haloalkoxy, methoxy, ethoxy, n-propoxy, n-butoxy, n-pentyloxy, n-hexyloxy, n-heptyloxy, methylamino, ethylamino, N,N-dimethylamino, N,N-diethylamino or N,N-di-n-propylamino.

In other embodiments, each $R^d$, $R^e$, $R^f$ and $R^g$ is independently H, deuterium, $C_{1-4}$ alkyl, $C_{2-4}$ alkenyl, $C_{2-4}$ alkynyl, $C_{1-4}$ alkoxy, $C_{1-4}$ haloalkyl, $C_{1-4}$ haloalkoxy, hydroxy $C_{1-4}$ alkyl, amino $C_{1-4}$ alkyl, cyano $C_{1-4}$ alkyl, carboxy $C_{1-4}$ alkyl, $C_{3-6}$ cycloalkyl, 5-6 membered heterocyclyl, $C_{6-10}$ aryl or 5-6 membered heteroaryl;

or, $R^d$ and $R^{17}$, together with the nitrogen atom to which they are attached, form 5-6 membered heterocyclyl or 5-6 membered heteroaryl, wherein each of 5-6 membered heterocyclyl and 5-6 membered heteroaryl is independently unsubstituted or substituted with 1, 2, 3 or 4 $R^x$, wherein $R^x$ is as defined herein.

In still other embodiments, each $R^d$, $R^e$, $R^f$ and $R^g$ is independently H, deuterium, methyl, ethyl, n-propyl, isopropyl, vinyl, ethynyl, methoxy, ethoxy, trifluoromethyl, trifluoromethoxy, hydroxymethyl, aminomethyl, cyanomethyl, carboxymethyl, cyclopropyl, cyclobutyl, cyclopentyl, cyclohexyl, 5-6 membered heterocyclyl, phenyl or 5-6 membered heteroaryl;

or, $R^d$ and $R^{17}$, together with the nitrogen atom to which they are attached, form 5-6 membered heterocyclyl or 5-6 membered heteroaryl, wherein each of 5-6 membered heterocyclyl and 5-6 membered heteroaryl is independently unsubstituted or substituted with 1, 2, 3 or 4 $R^x$, wherein $R^x$ is as defined herein.

In other embodiments, $P_4$ is $C_{1-4}$ alkylene or $C_{2-4}$ alkenylene, wherein each $C_{1-4}$ alkylene and $C_{2-4}$ alkenylene is independently unsubstituted or substituted with 1, 2 or 3 substituents independently selected from deuterium, F, Cl, Br, I, CN, OH, $NH_2$, $NO_2$, —C(=O)OH, —SH, $C_{1-6}$ alkyl, $C_{2-6}$ alkenyl, $C_{2-6}$ alkynyl, $C_{1-6}$ haloalkyl, amino $C_{1-6}$ alkyl, hydroxy $C_{1-6}$ alkyl, carboxy $C_{1-6}$ alkyl or cyano $C_{1-6}$ alkyl.

In still other embodiments, $P_4$ is —$CH_2$—, —$CH_2CH_2$—, —$CH_2CH_2CH_2$—, —$CH(CH_3)CH_2$—, —$CH_2CH_2CH_2CH_2$—, —$CH_2(CH_2)_3CH_2$—, —CH=CH— or —CH=CHCH$_2$—, wherein each —$CH_2$—, —$CH_2CH_2$—, —$CH_2CH_2CH_2$—, —$CH(CH_3)CH_2$—, —$CH_2CH_2CH_2CH_2$—, —$CH_2(CH_2)_3CH_2$—, —CH=CH— and —CH=CHCH$_2$— is independently unsubstituted or substituted with 1, 2 or 3 substituents independently selected from deuterium, F, Cl, Br, I, CN, OH, $NH_2$, $NO_2$, —C(=O)OH, —SH, methyl, ethyl, n-propyl, isopropyl, vinyl, allyl, ethynyl, trifluoromethyl, difluoromethyl, aminomethyl, hydroxyethyl, carboxymethyl or cyanomethyl.

In other embodiments, each $R^x$ is independently deuterium, F, Cl, Br, I, CN, $NO_2$, OH, $NH_2$, —C(=O)OH, —SH, —NHC(=NH)$NH_2$, $C_{1-4}$ alkyl, $C_{2-4}$ alkenyl, $C_{2-4}$ alkynyl, $C_{1-4}$ haloalkyl, $C_{1-4}$ haloalkoxy, $C_{1-4}$ alkoxy, 5-6 membered heterocyclyl or $C_{1-4}$ alkylamino.

In still other embodiments, each $R^x$ is independently deuterium, F, Cl, Br, I, CN, $NO_2$, OH, $NH_2$, —C(=O)OH, —SH, —NHC(=NH)$NH_2$, methyl, ethyl, n-propyl, isopropyl, vinyl, ethynyl, trifluoromethyl, trifluoromethoxy, methoxy, ethoxy, n-propyloxy, n-butyloxy, n-pentyloxy, n-hexyloxy, morpholinyl, pyrrolyl or methylamino.

In some embodiments, the present invention relates to one of the following structures, or a stereoisomer, a tautomer, an N-oxide, a solvate, a metabolite, a pharmaceutically acceptable salt or a prodrug thereof, (1)

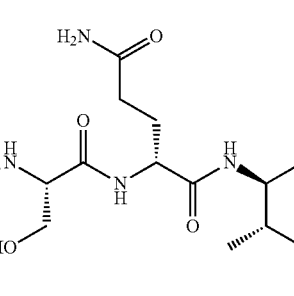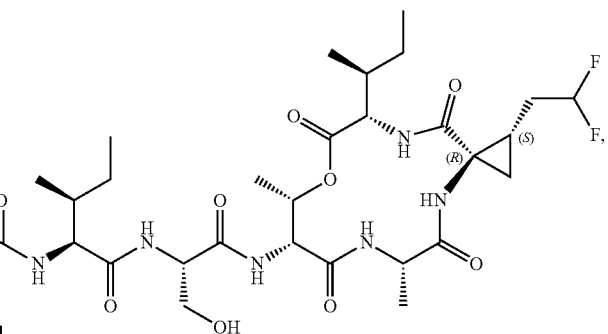

(2)

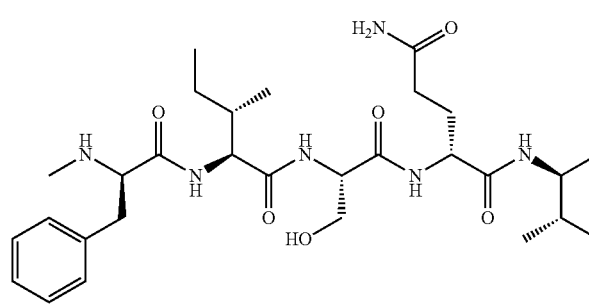

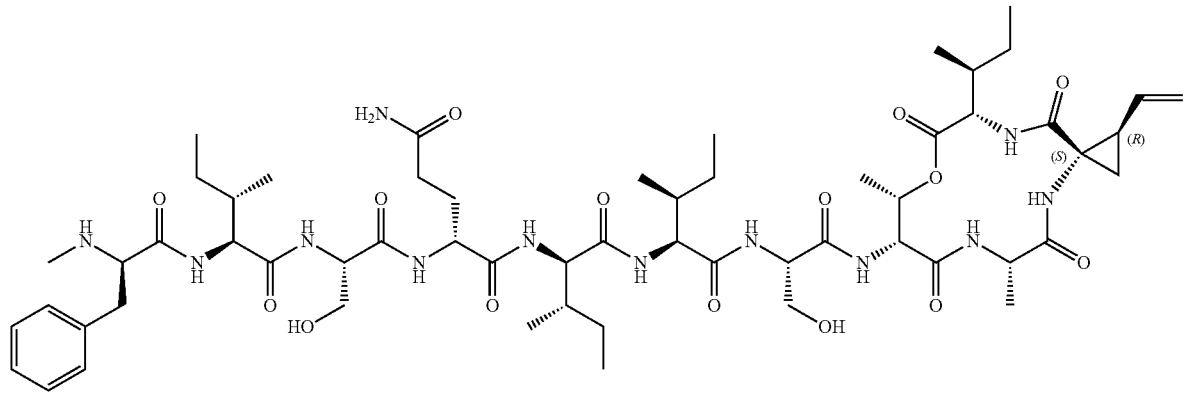
(3)
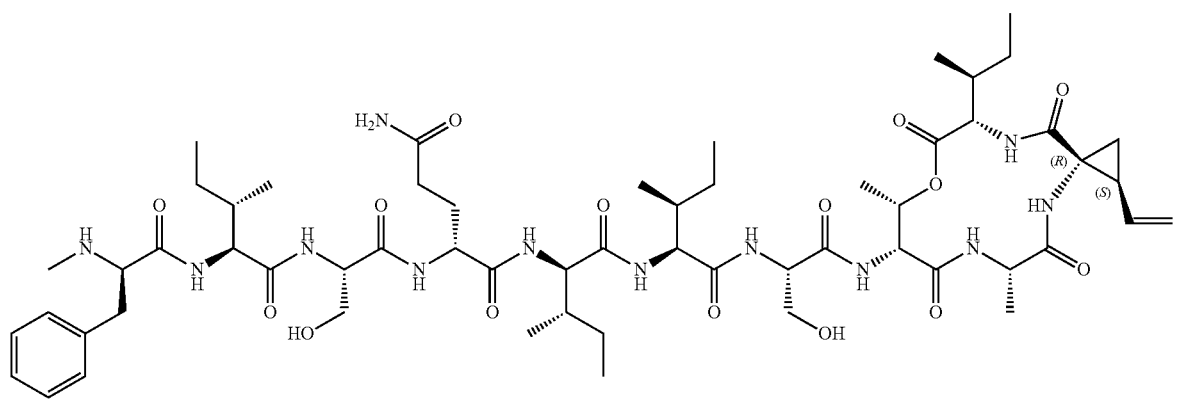
(4)
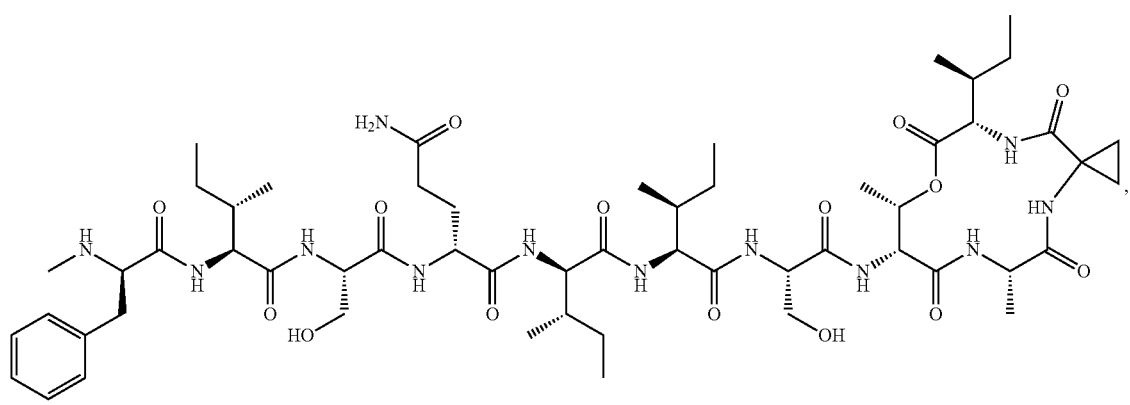
(5)
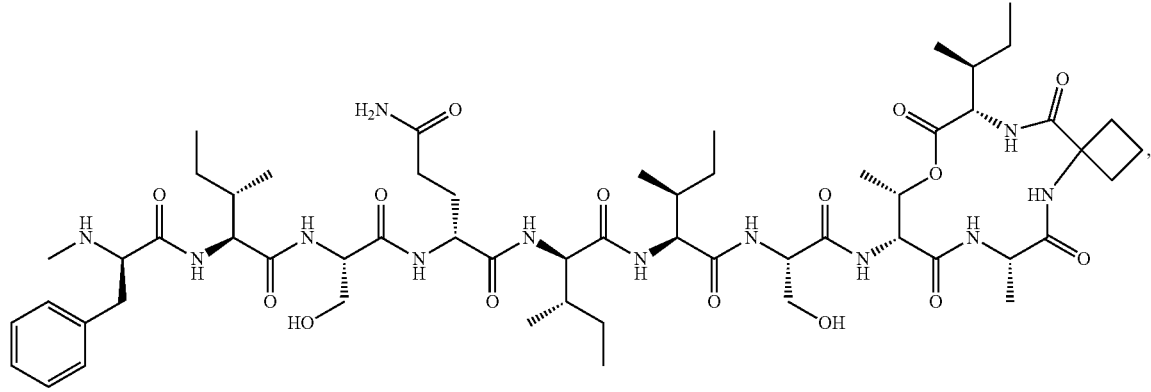
(6)

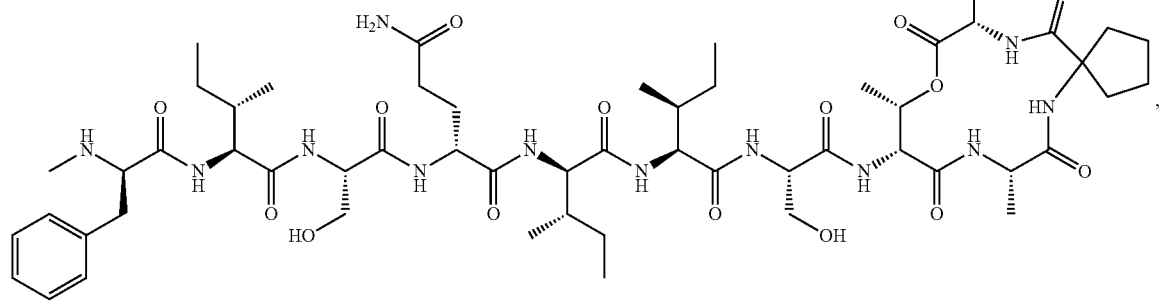
(7)
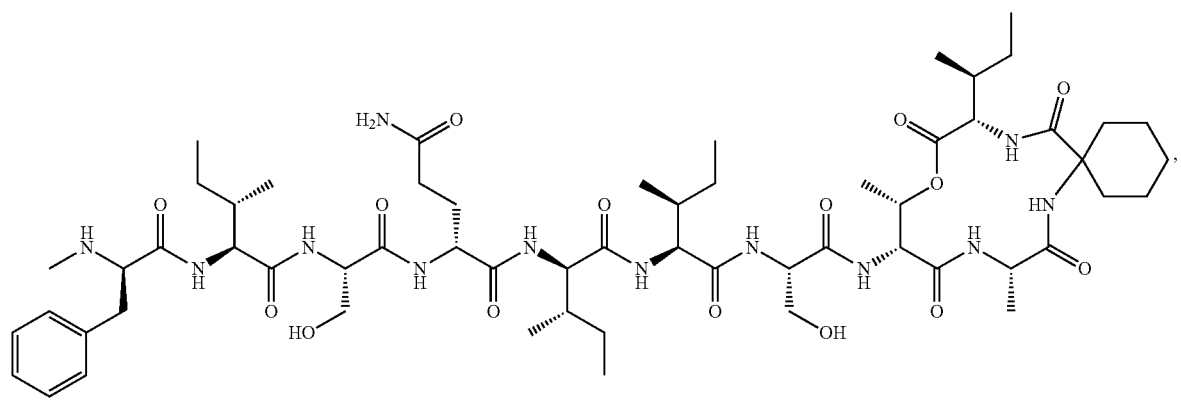
(8)
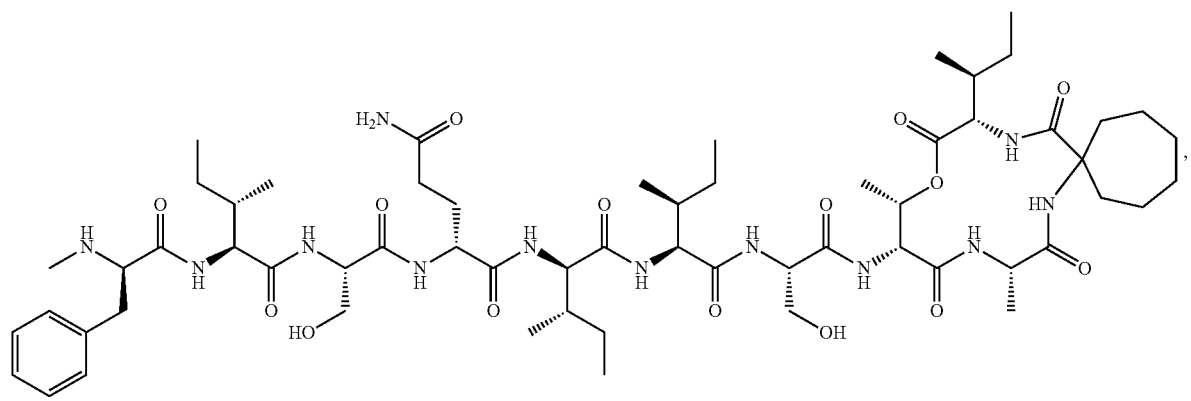
(9)
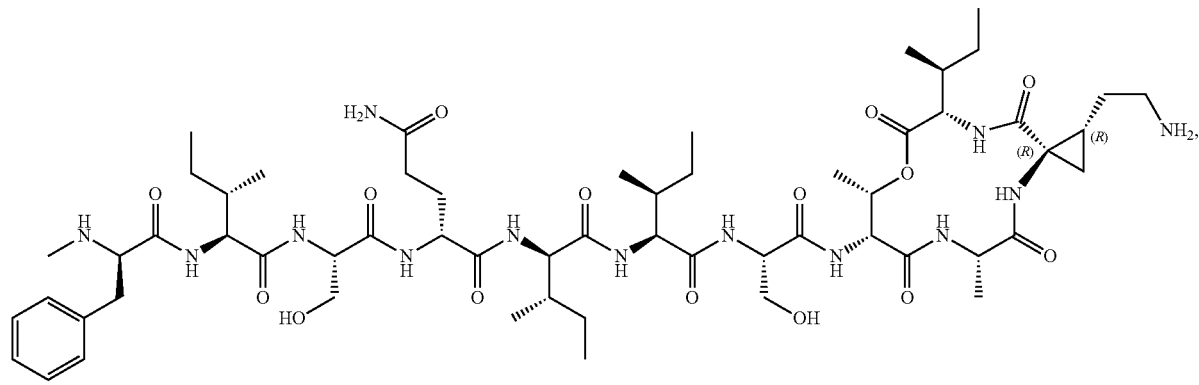
(10)

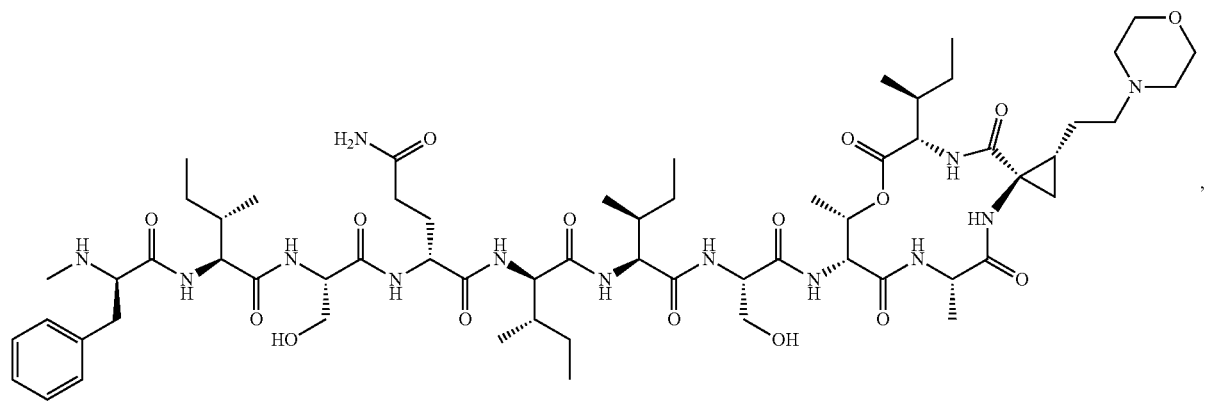
(11)
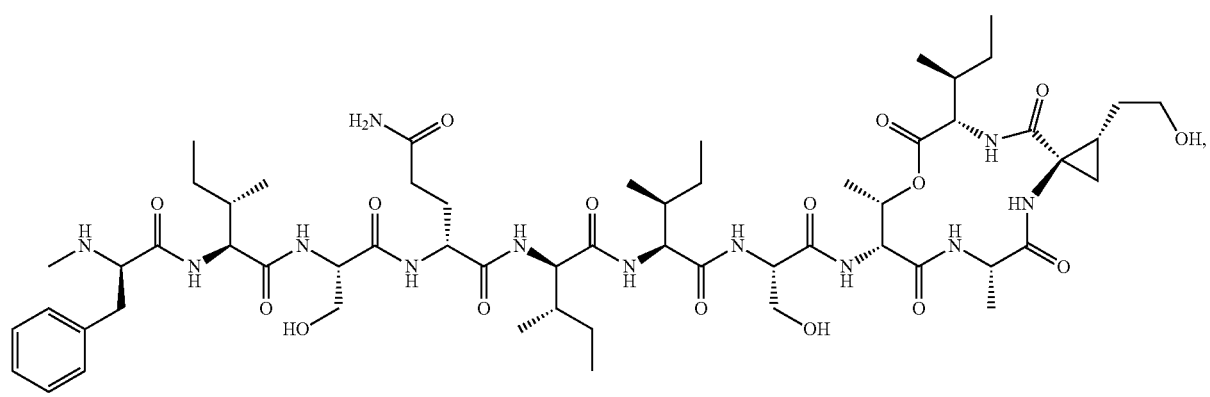
(12)
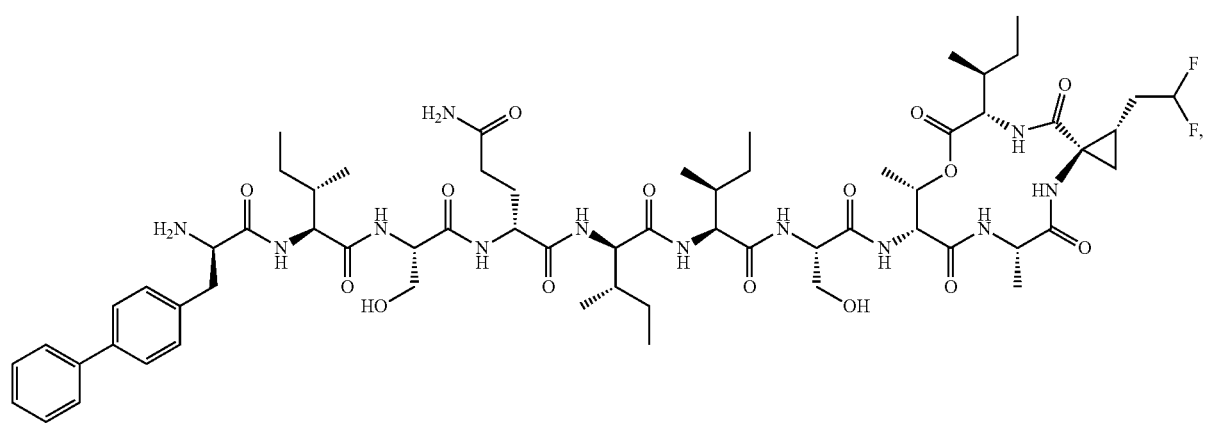
(13)

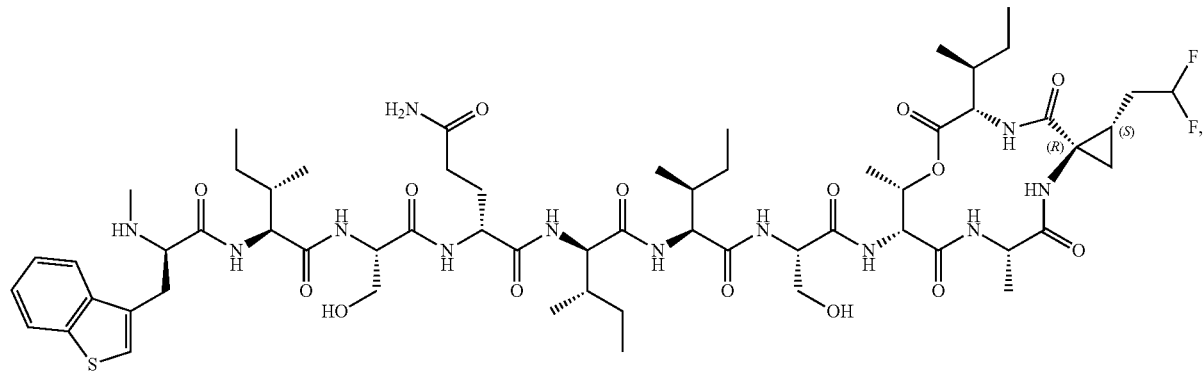
(14)
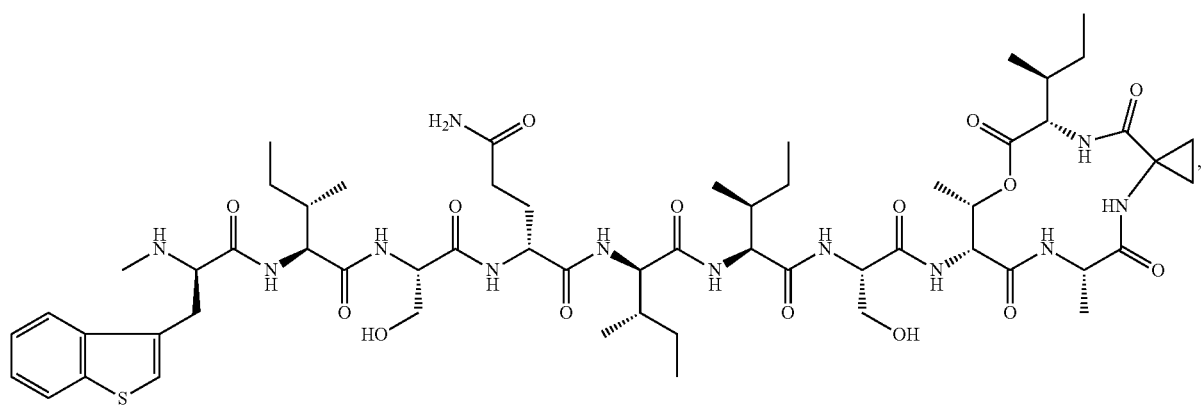
(15)
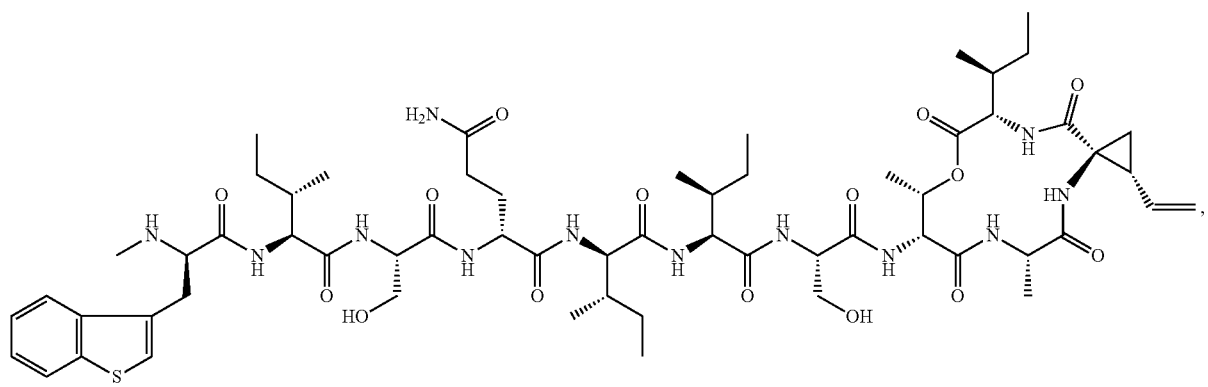
(16)
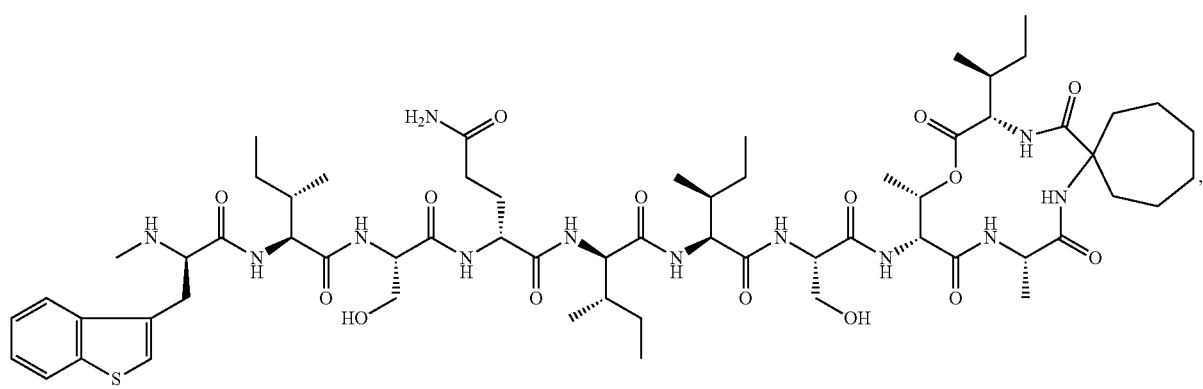
(17)

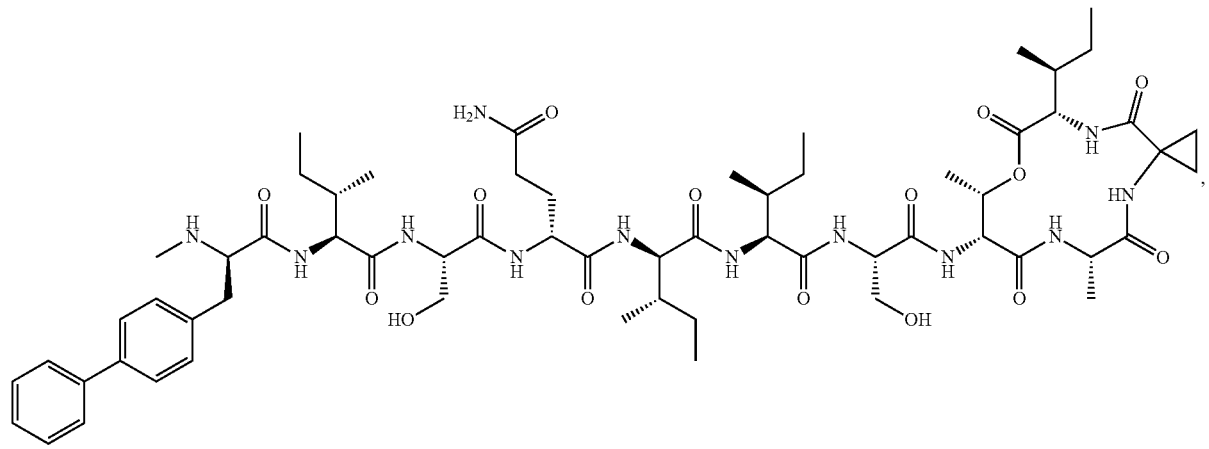
(18)
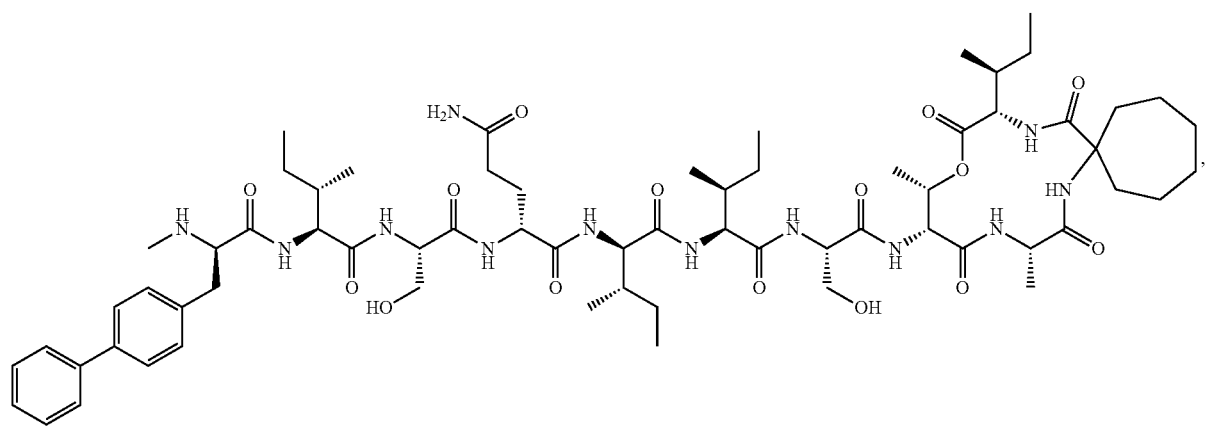
(19)
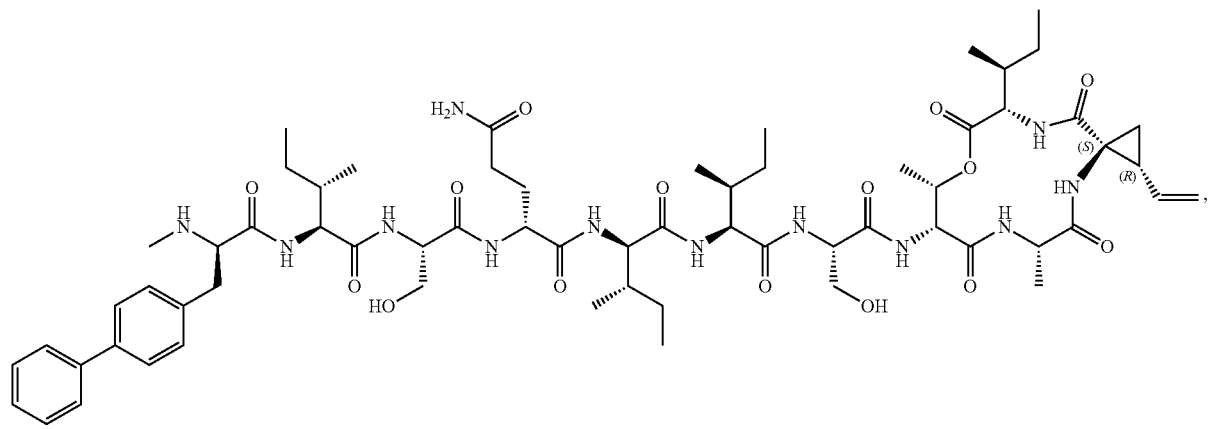
(20)

(21)
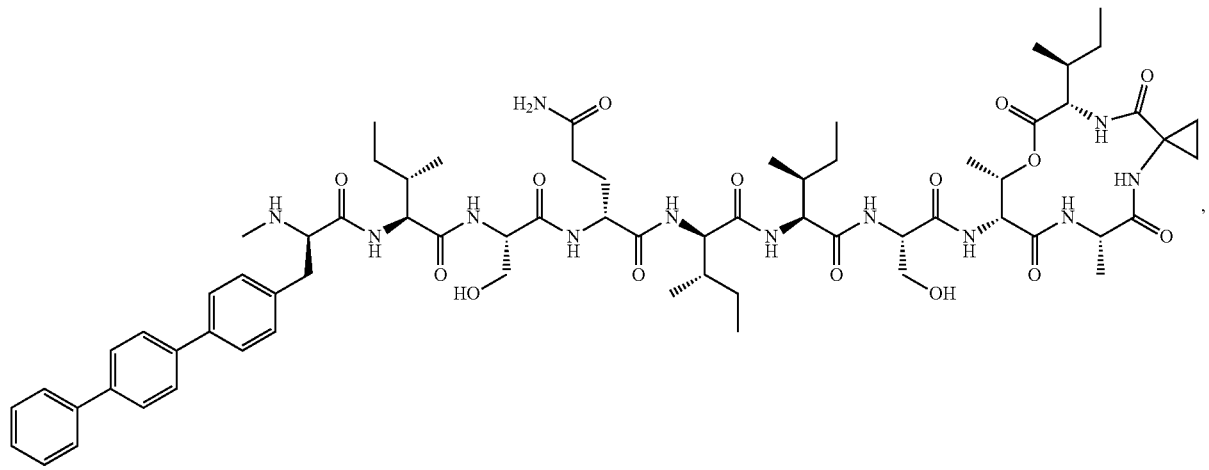
(22)
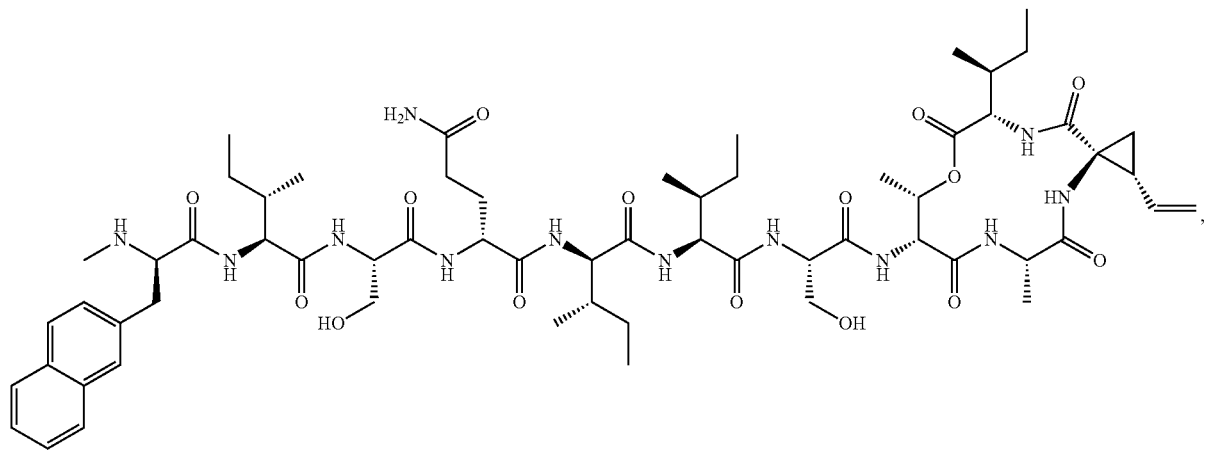
(23)
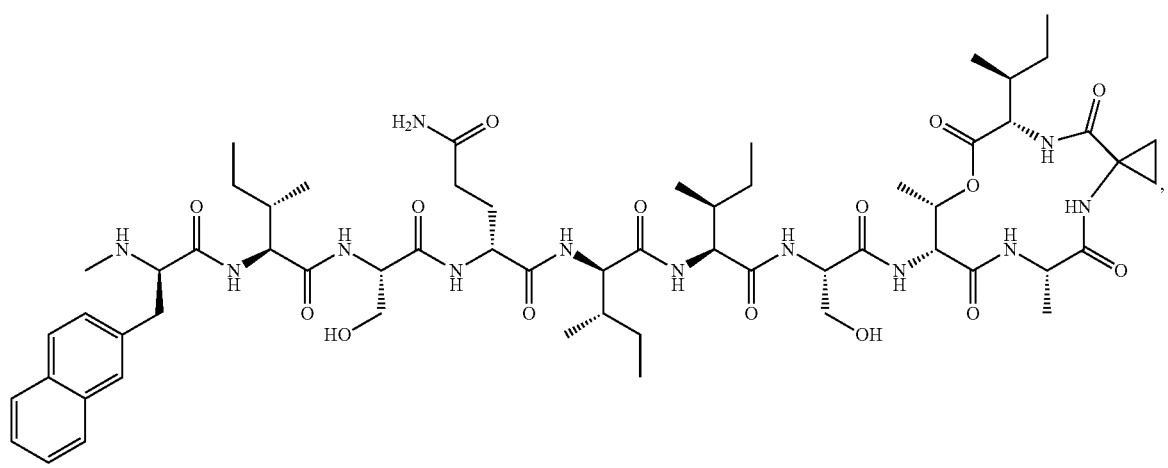

(24)
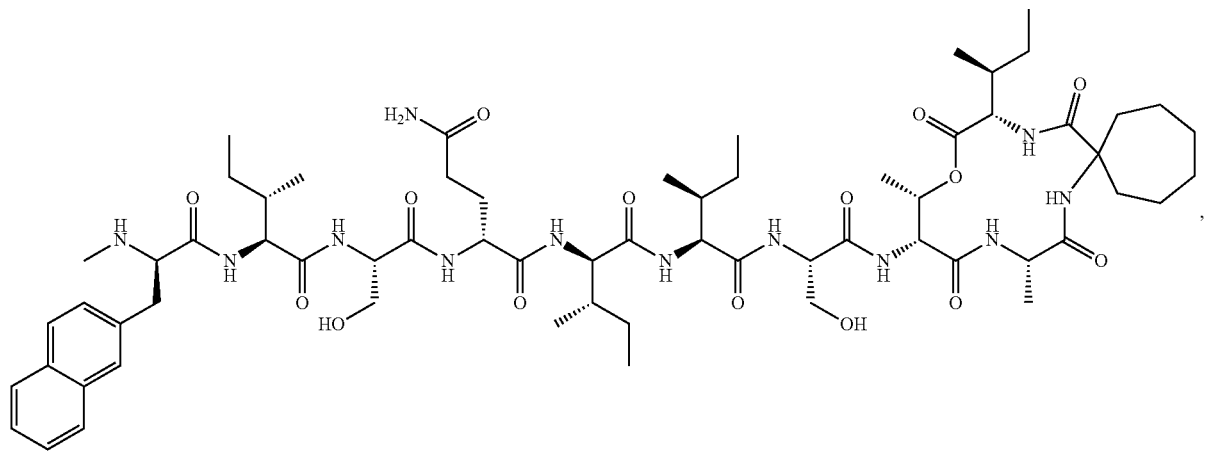
(25)
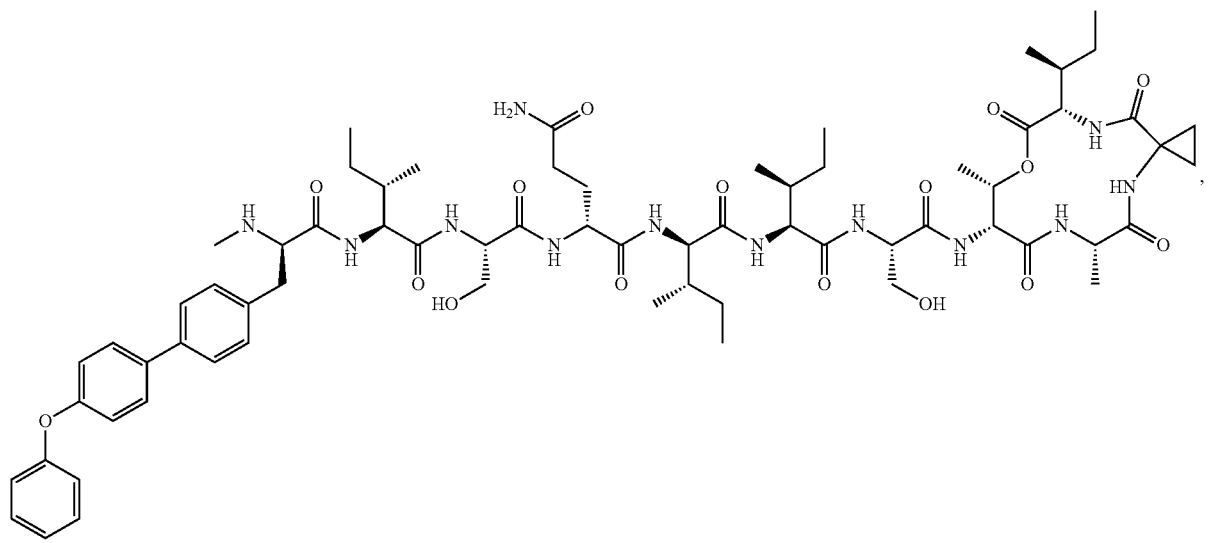
(26)
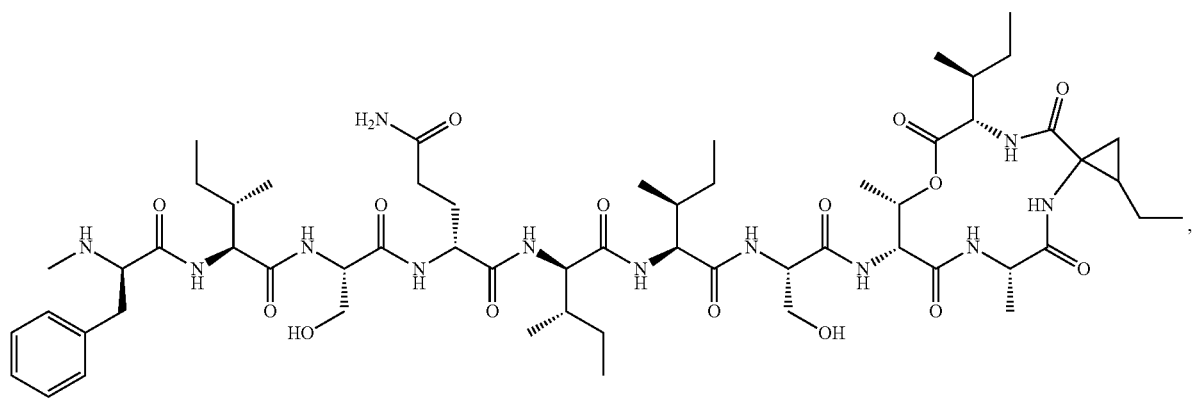

(27)
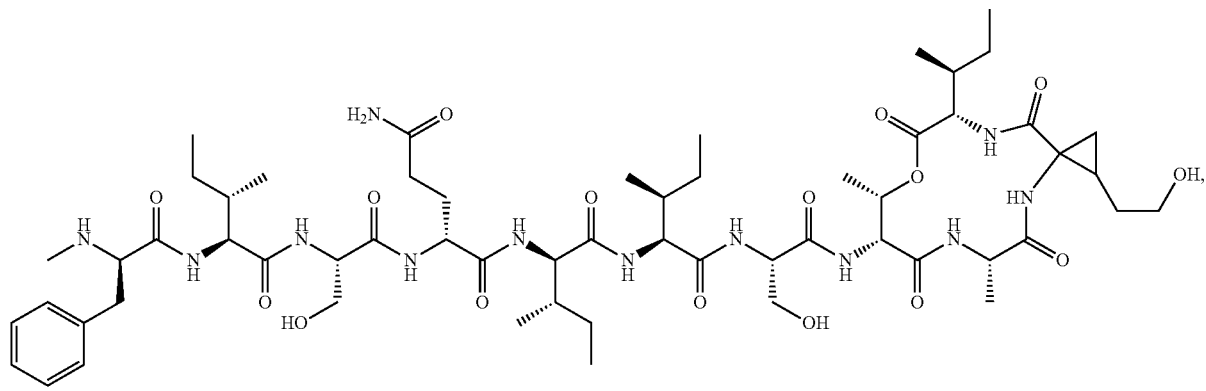
(28)
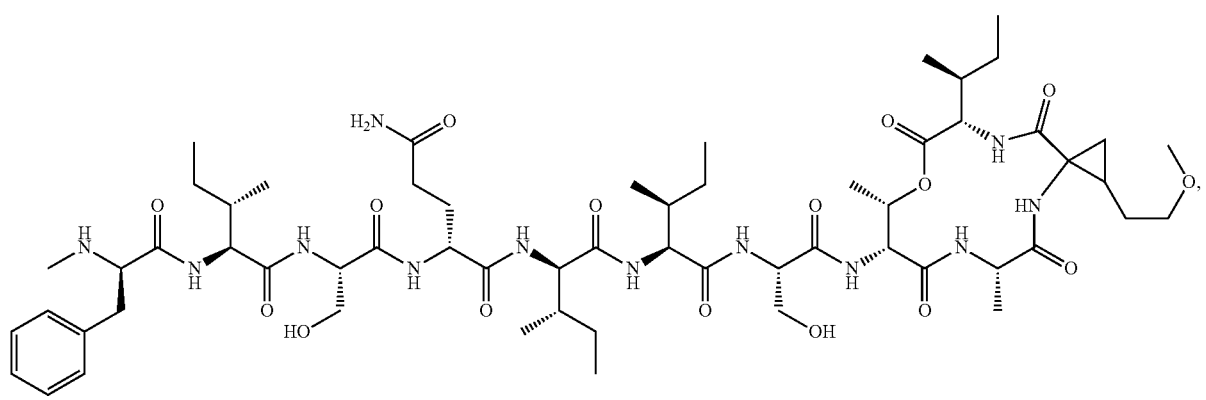
(29)
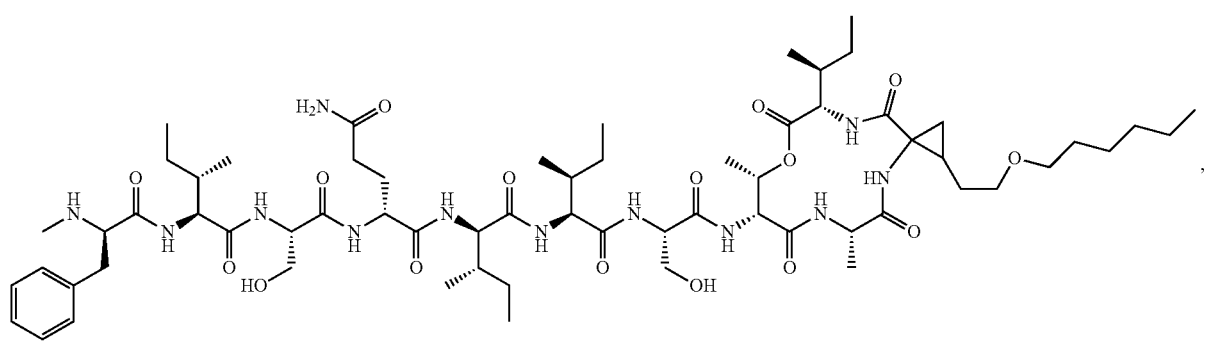
(30)
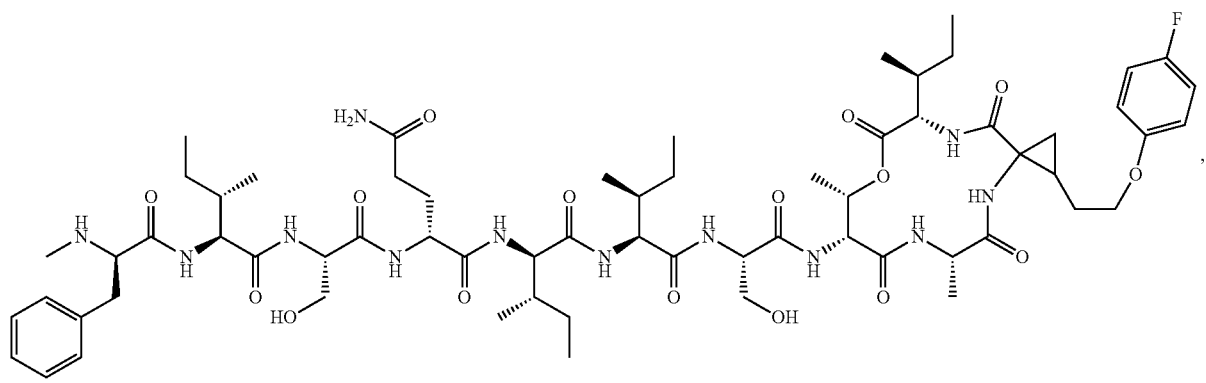

(31)
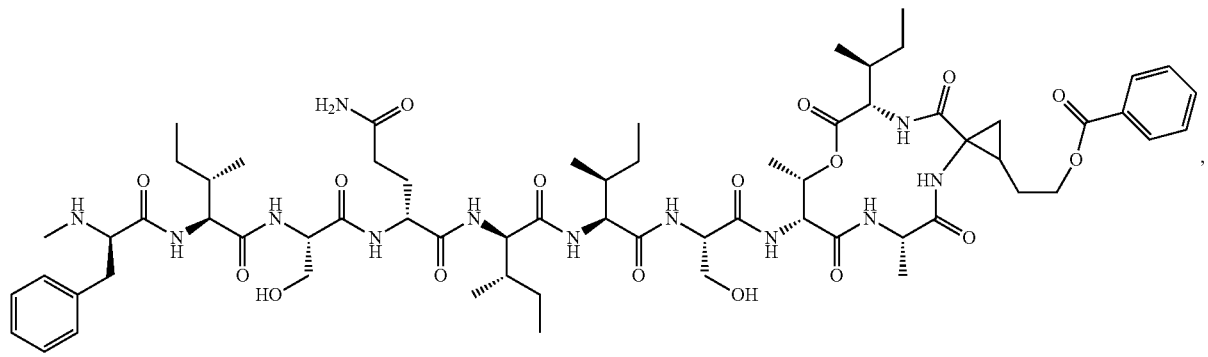
(32)
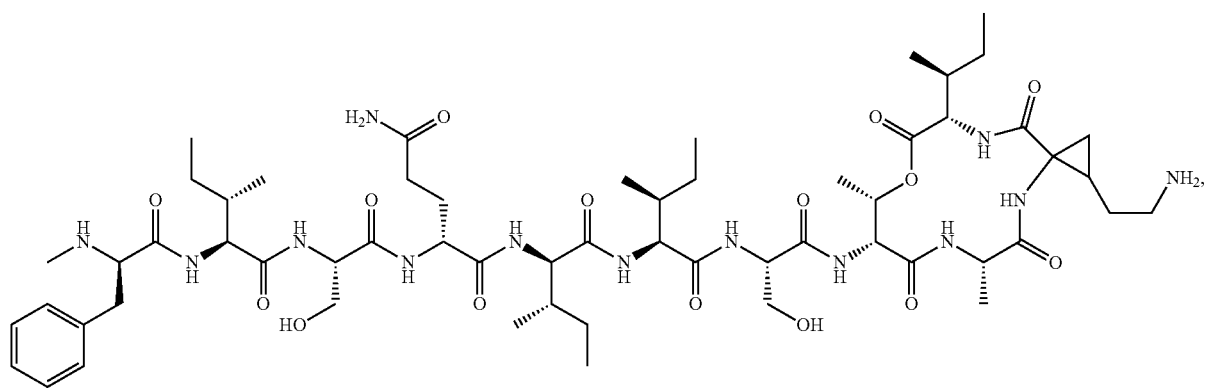
(33)
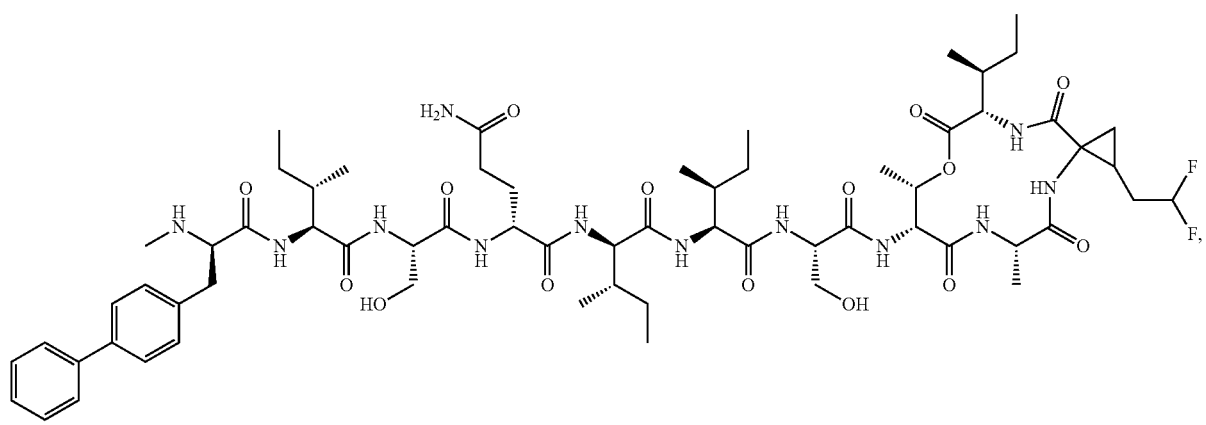

(34)
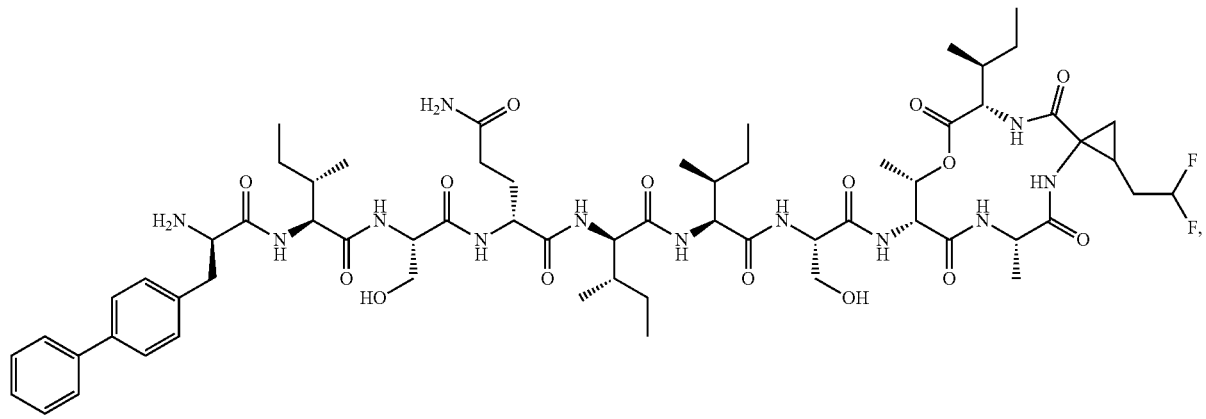
(35)
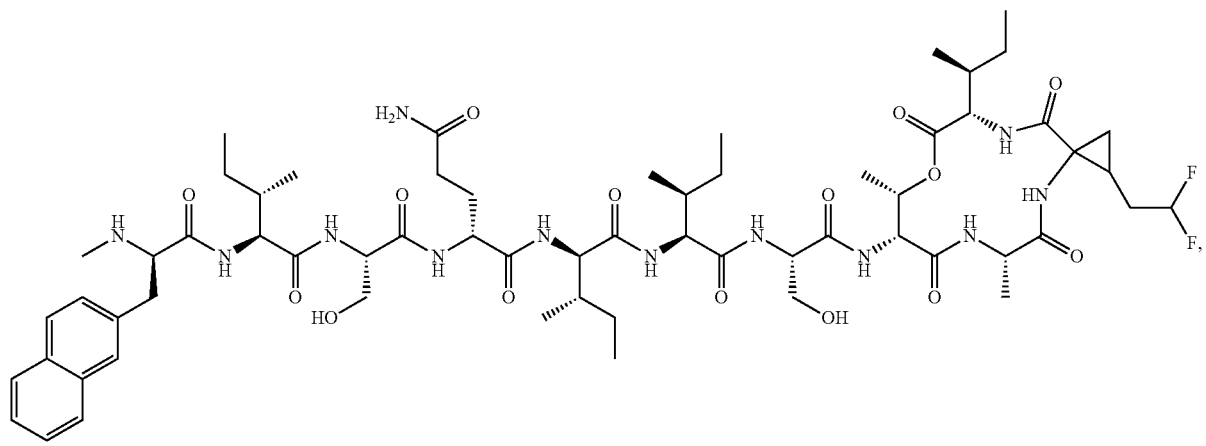
(36)
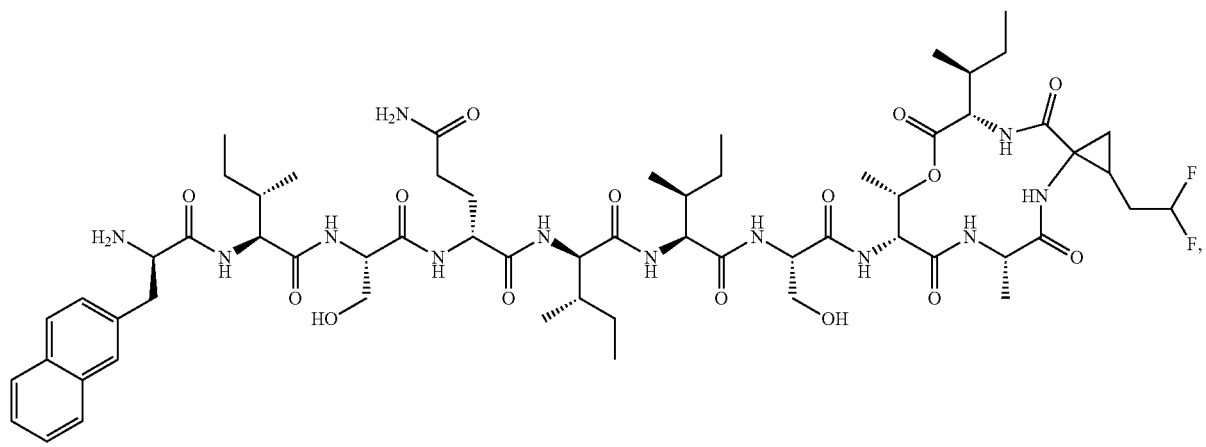

-continued
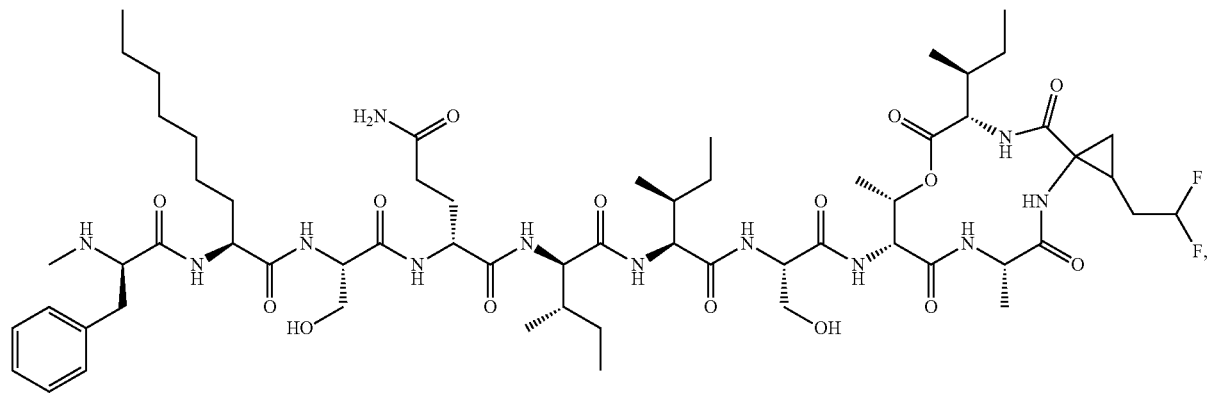
(37)
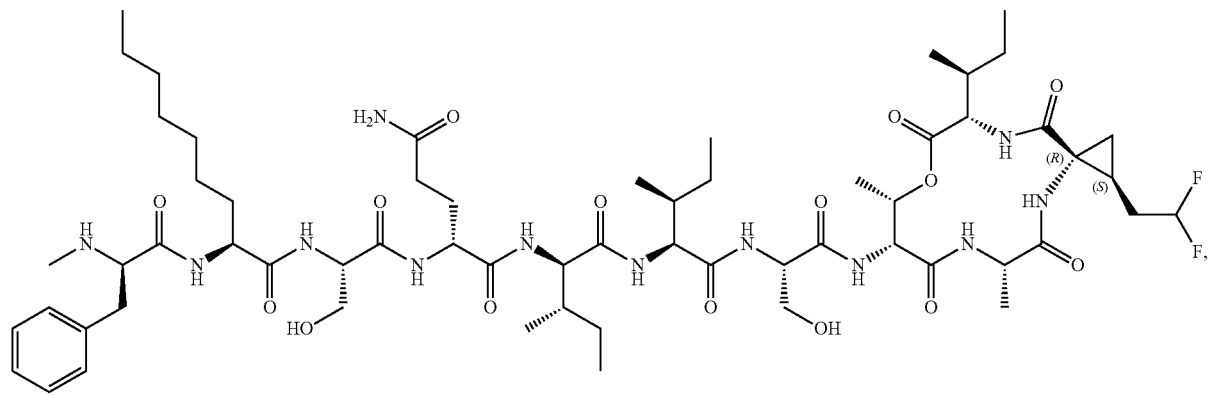
(38)
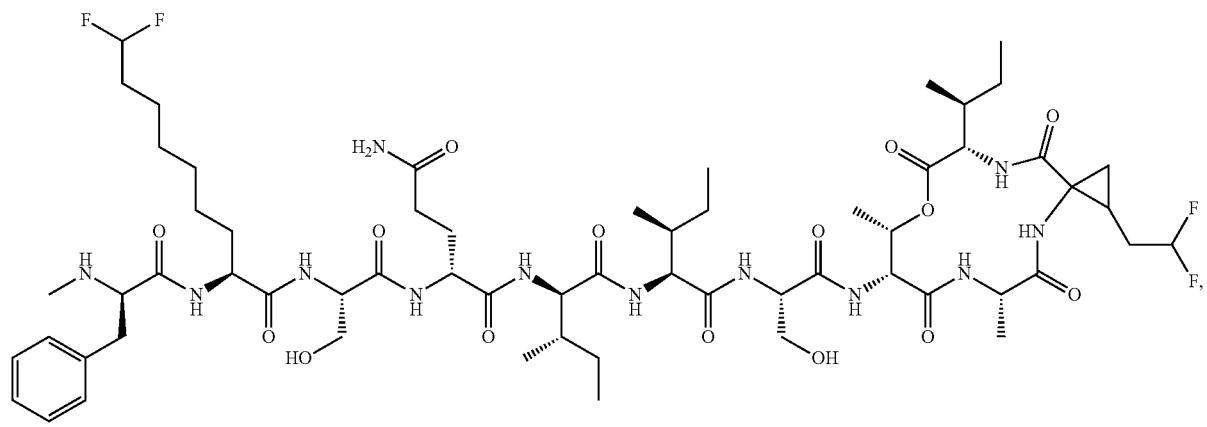
(39)

(40)
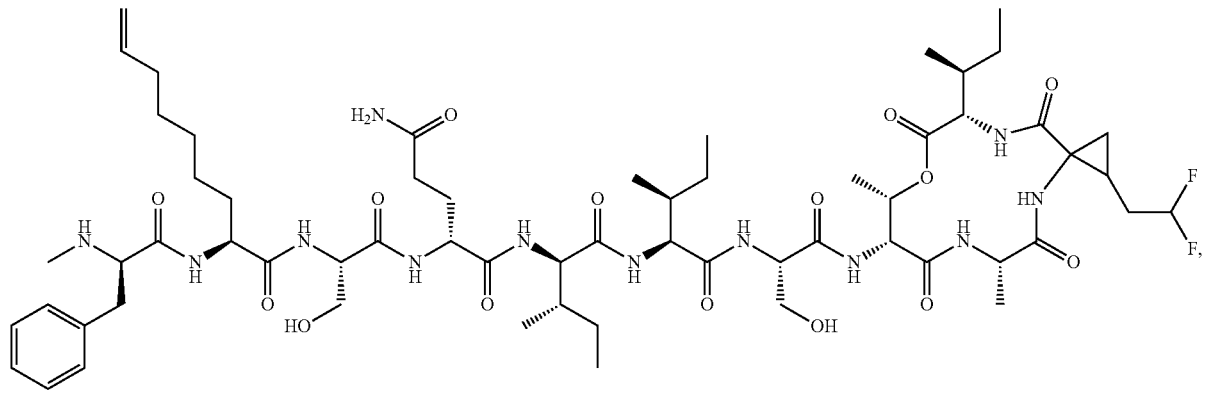
(41)
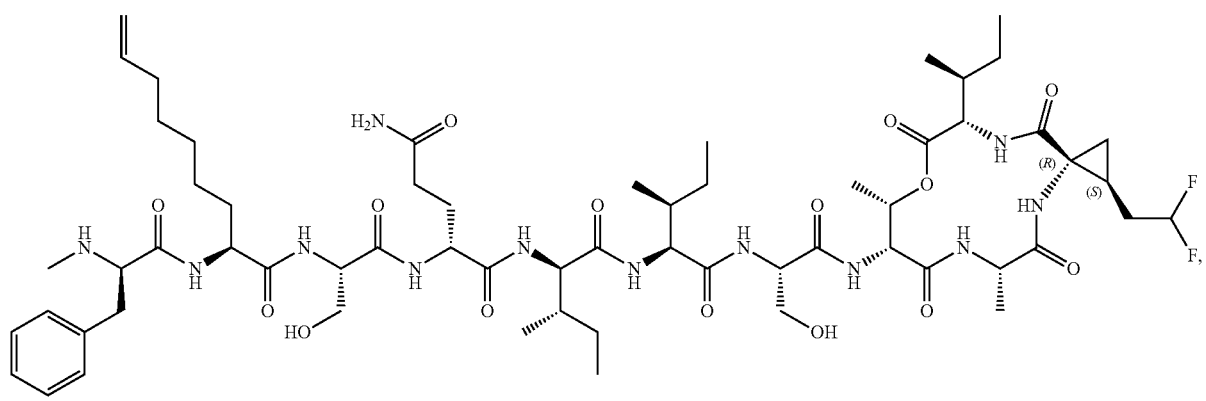
(42)
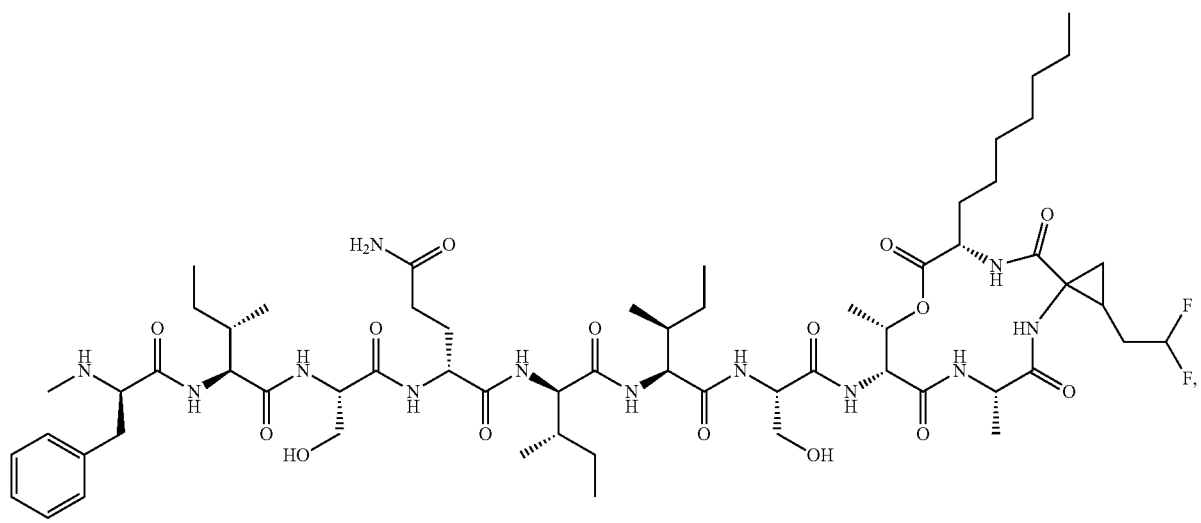

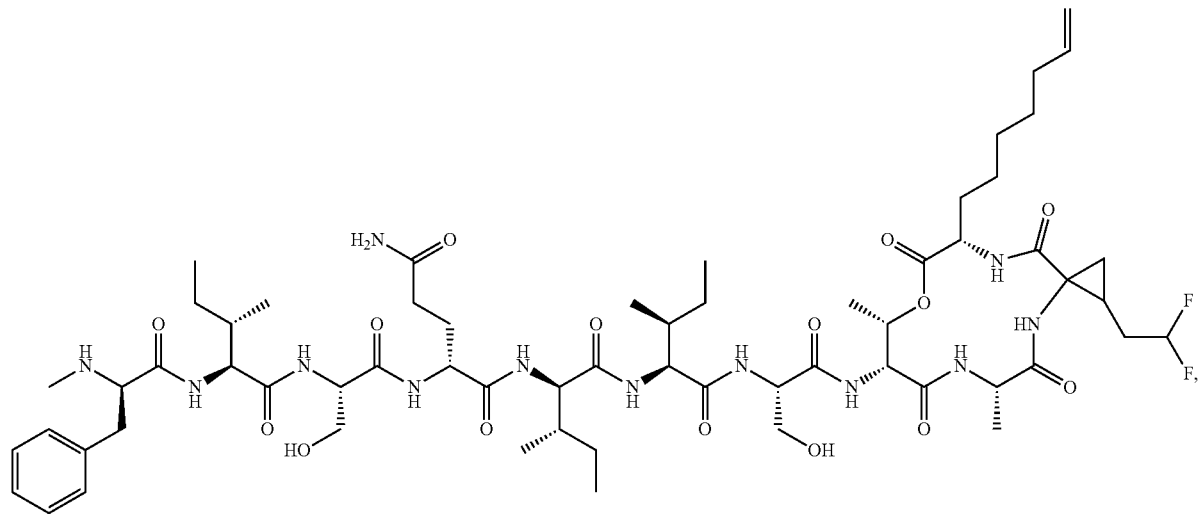
(43)
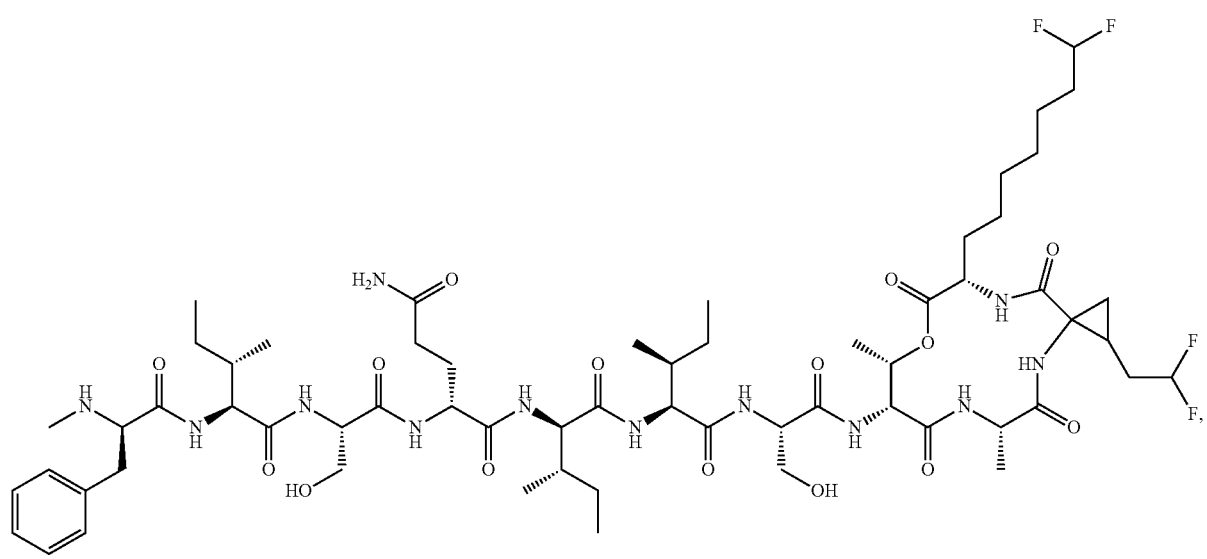
(44)
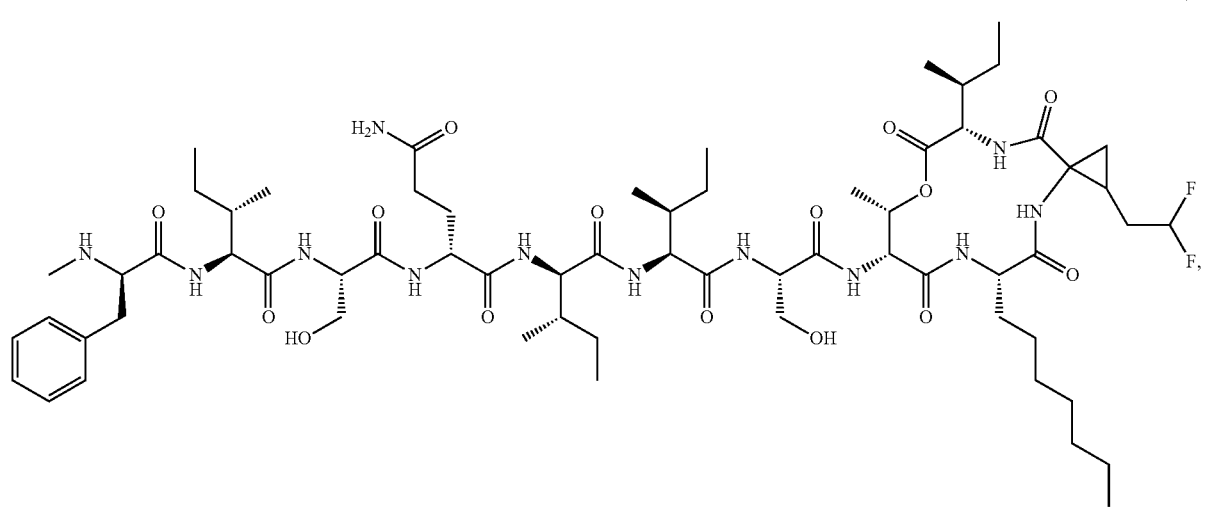
(45)

(46)
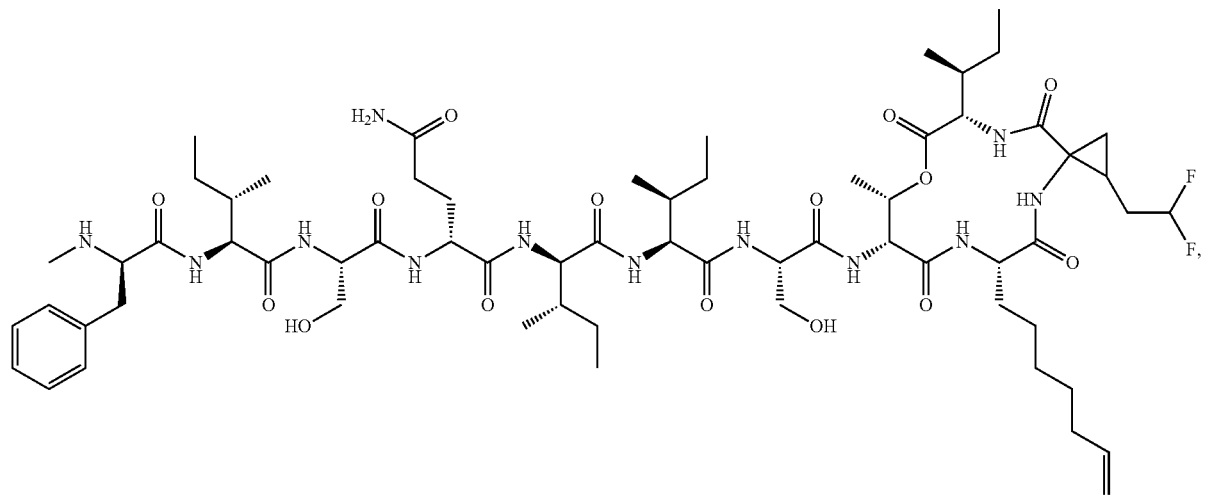
(47)
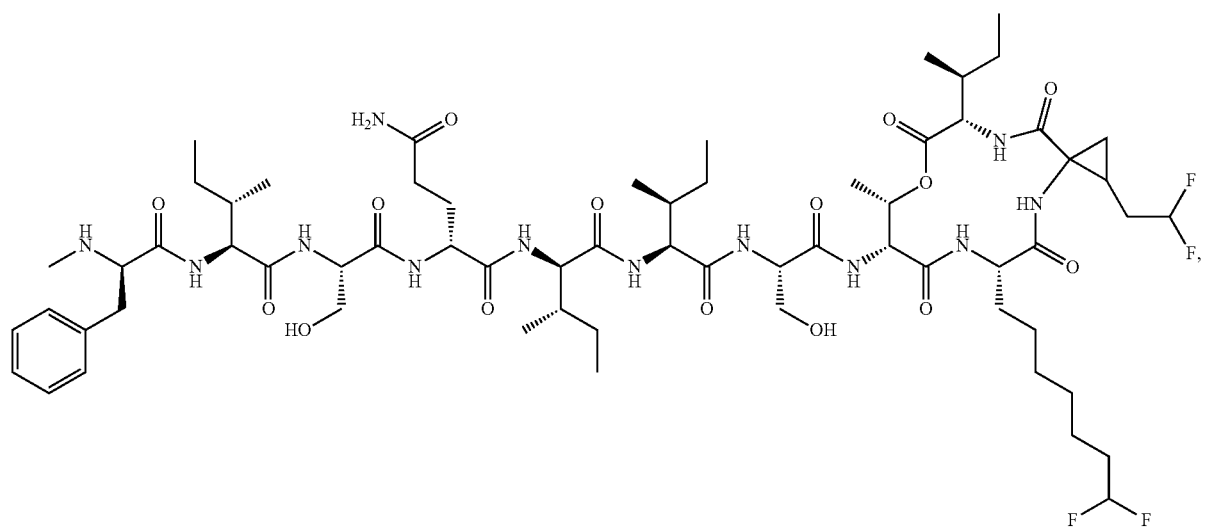
(48)
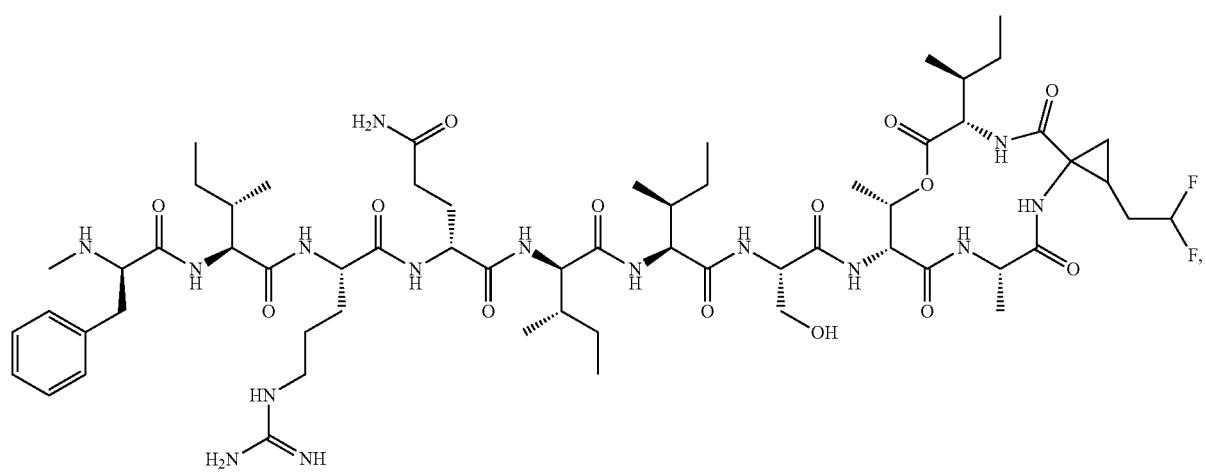

(49)
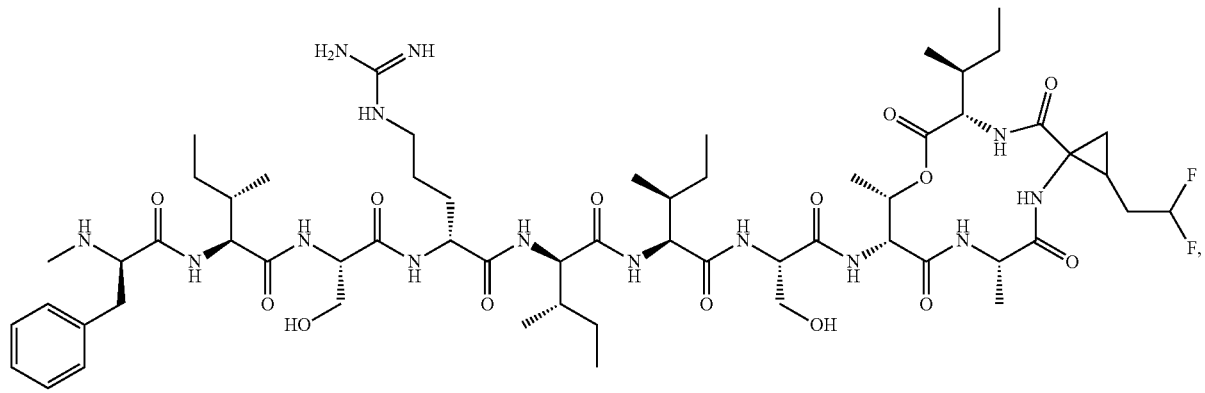
(50)
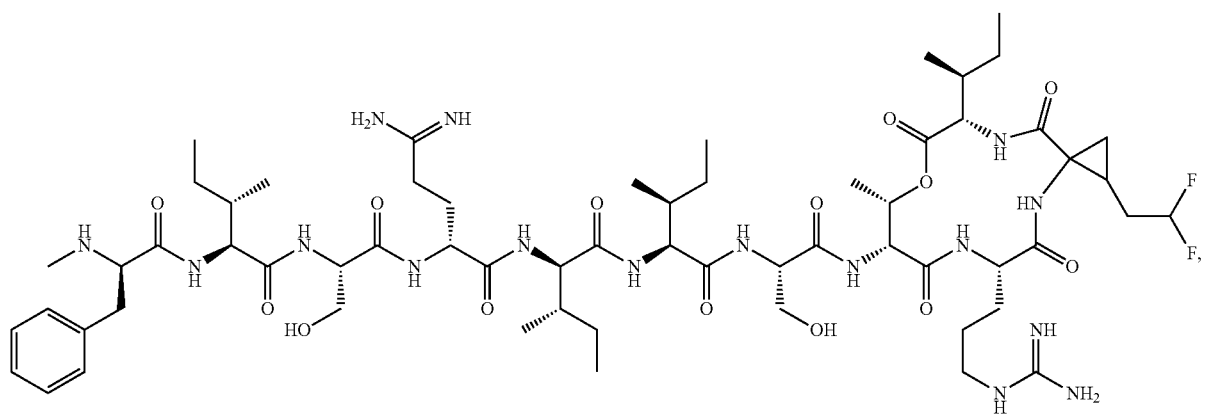
(51)
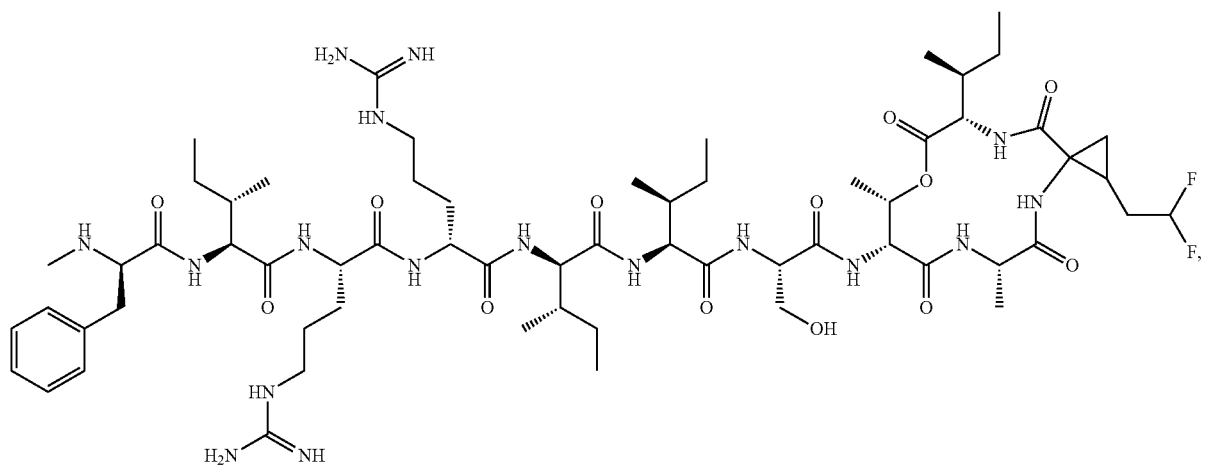

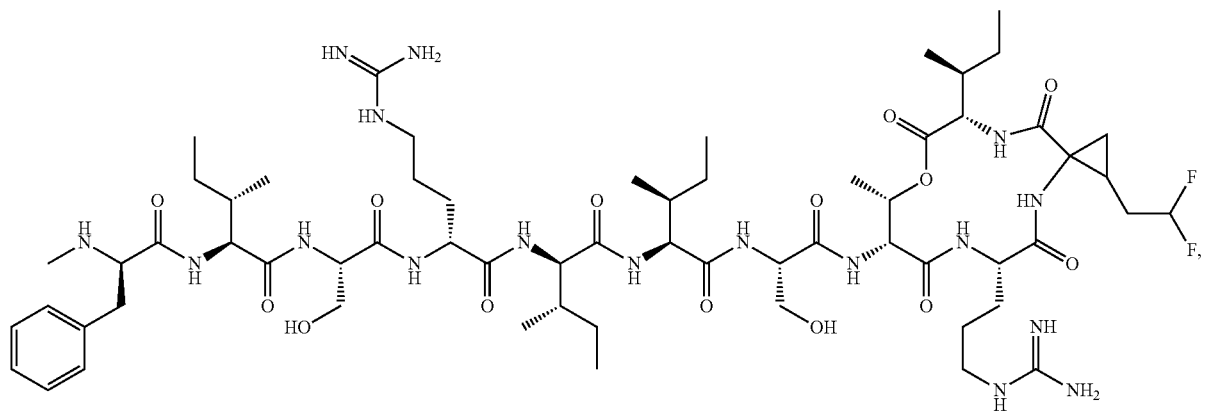
(52)
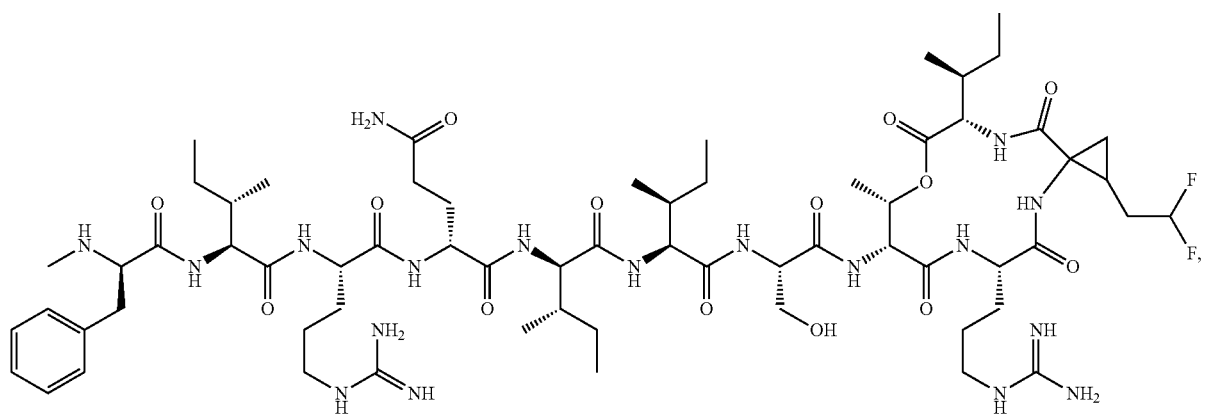
(53)
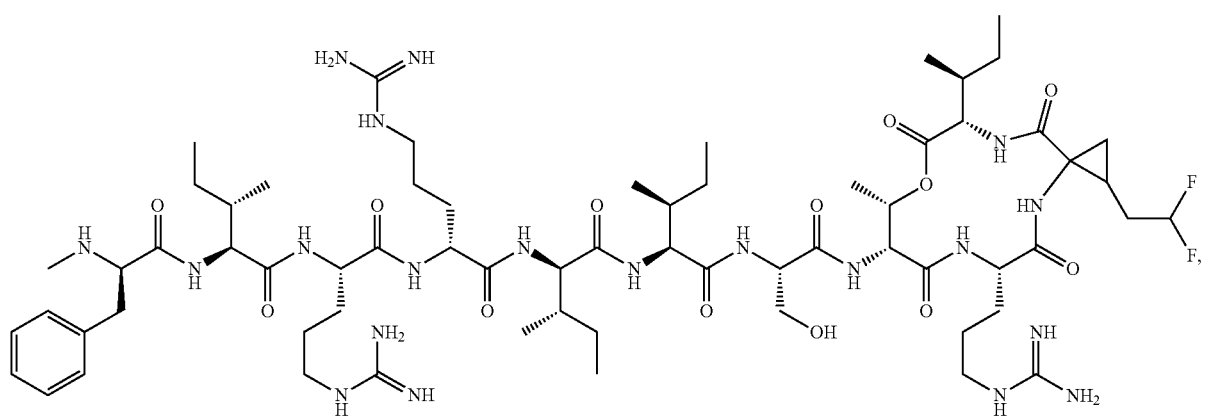
(54)

(55)
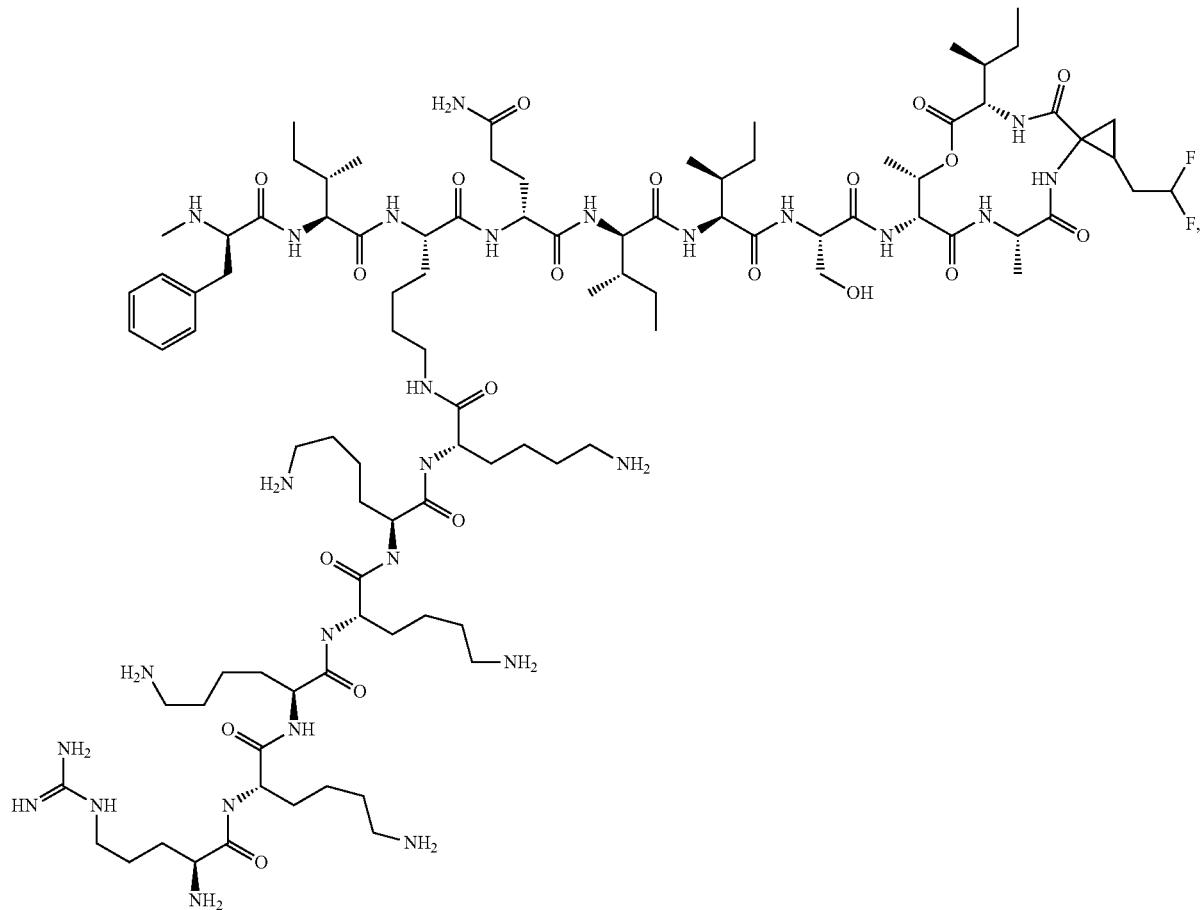
(56)
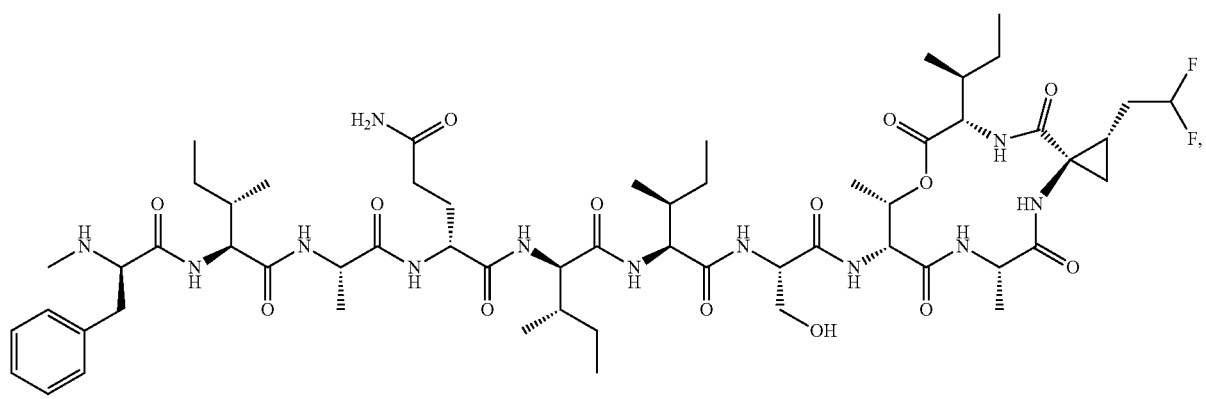

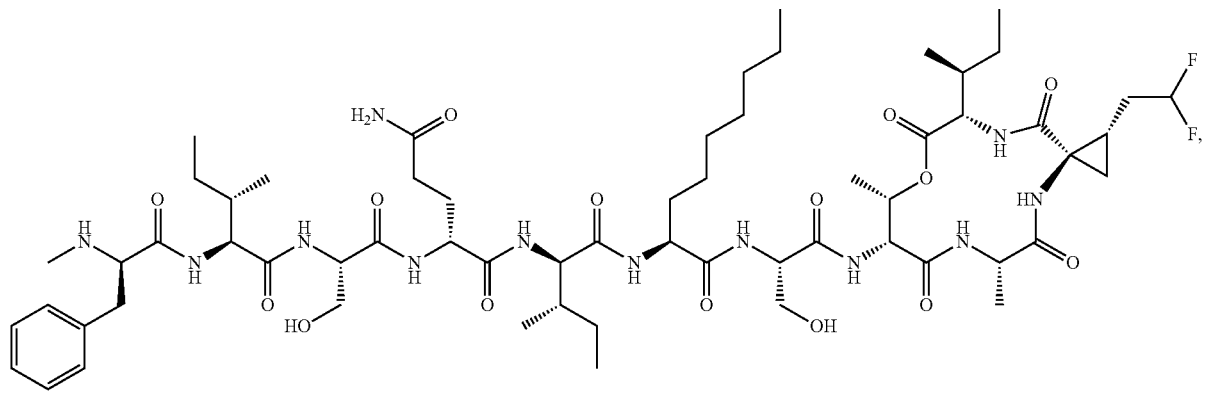
(57)
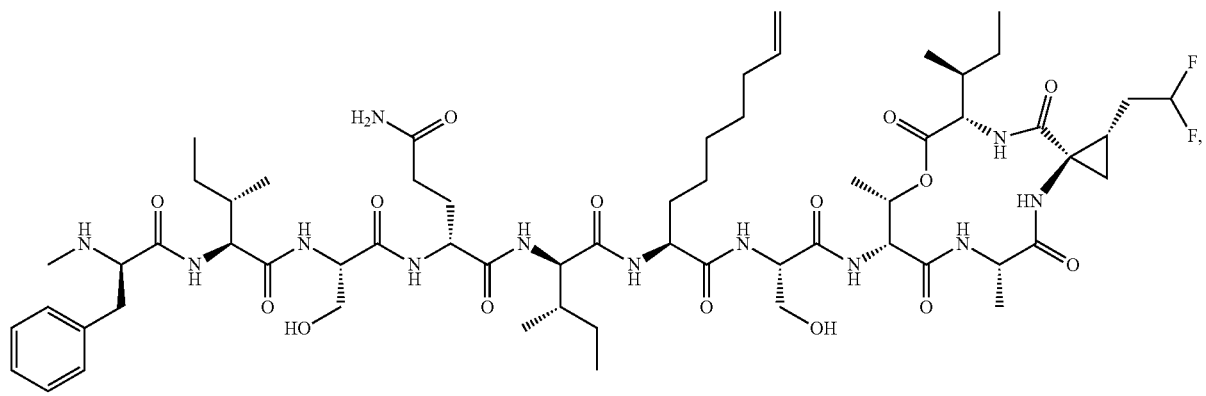
(58)
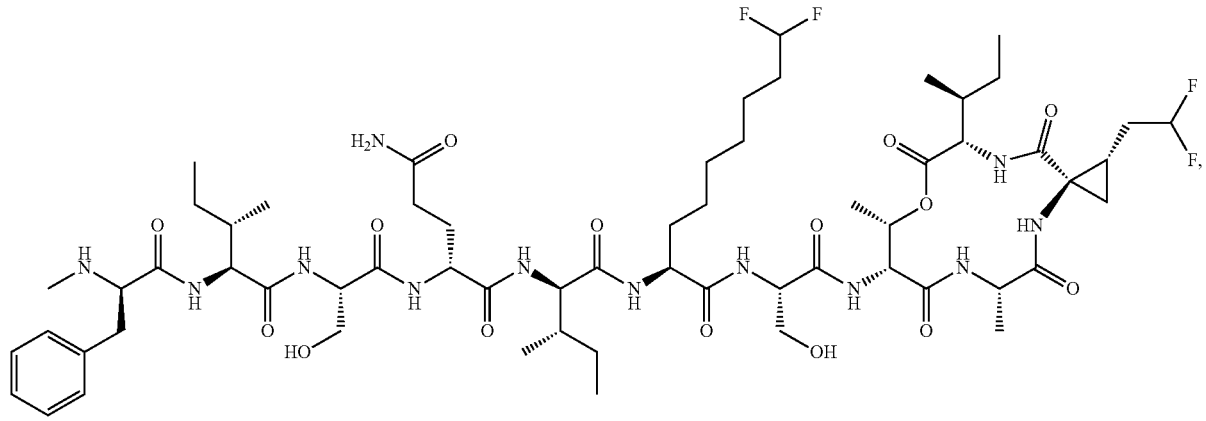
(59)

(60)
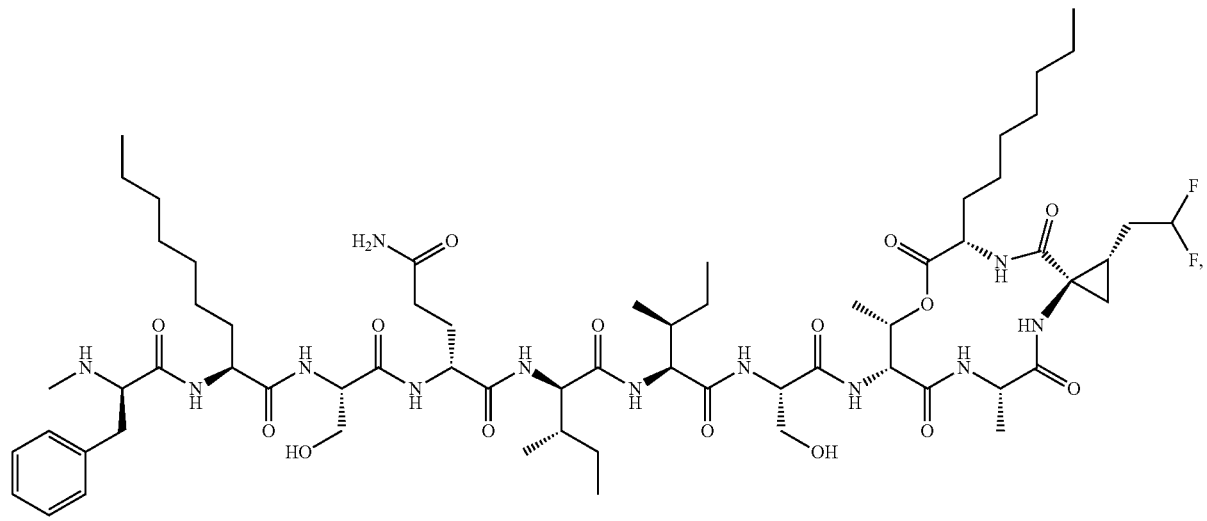
(61)
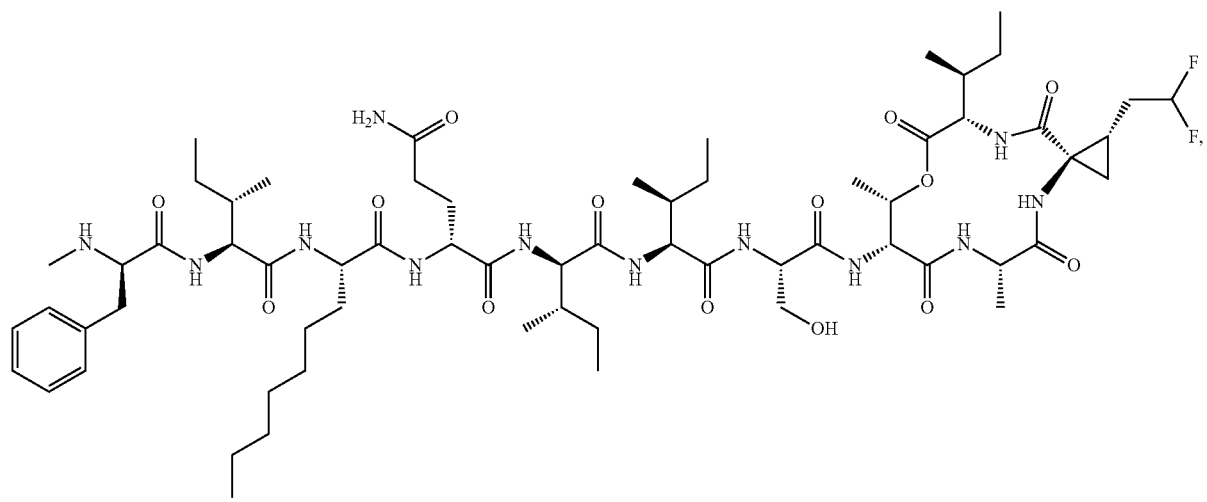
(62)
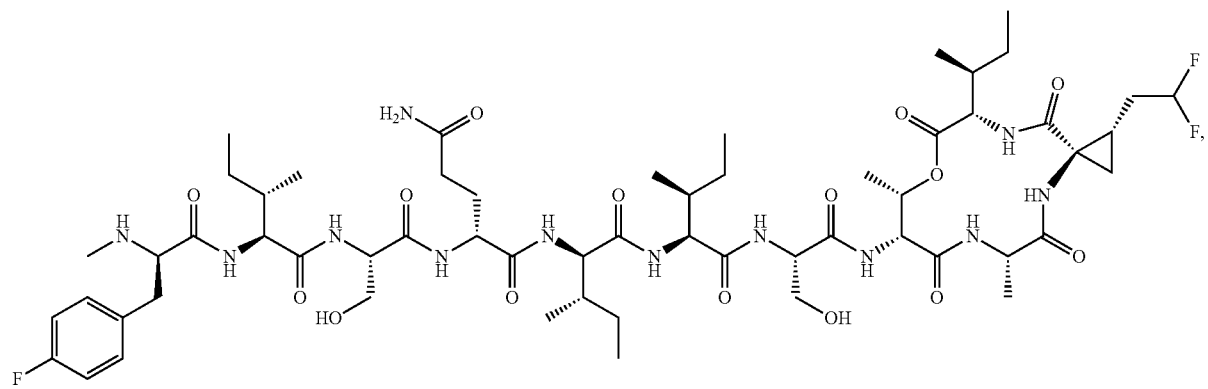

(63)
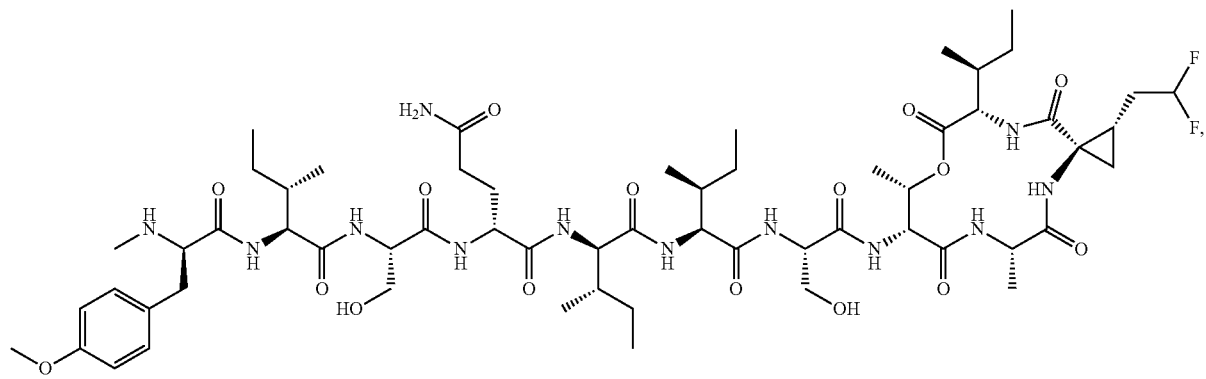
(64)
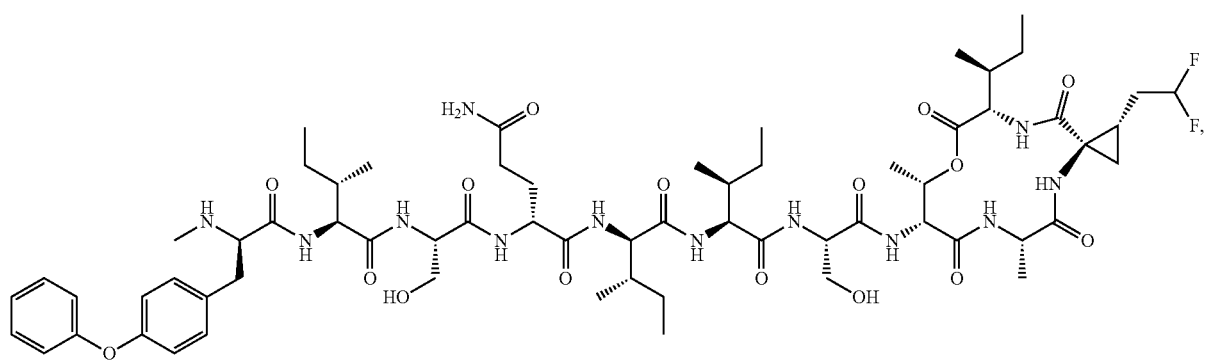
(65)
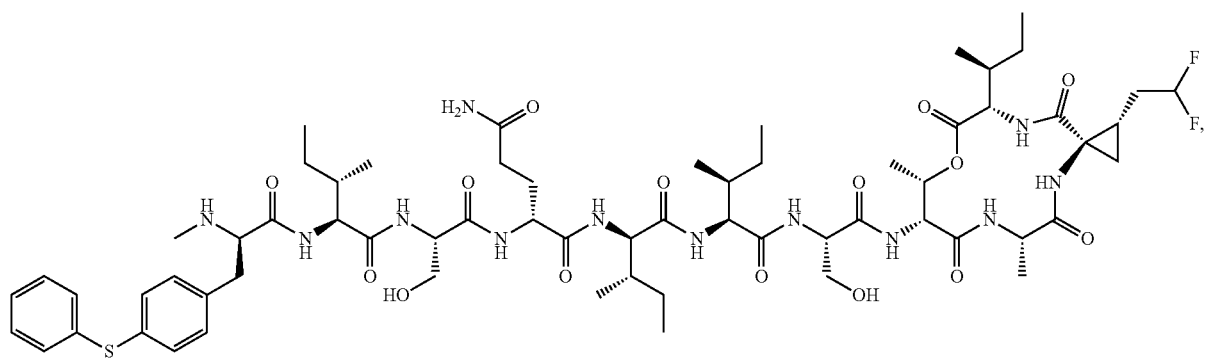
(66)
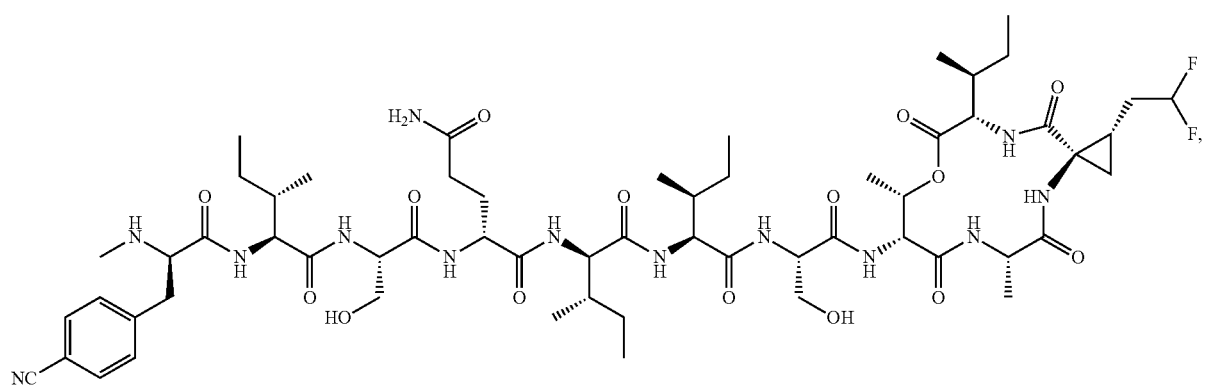

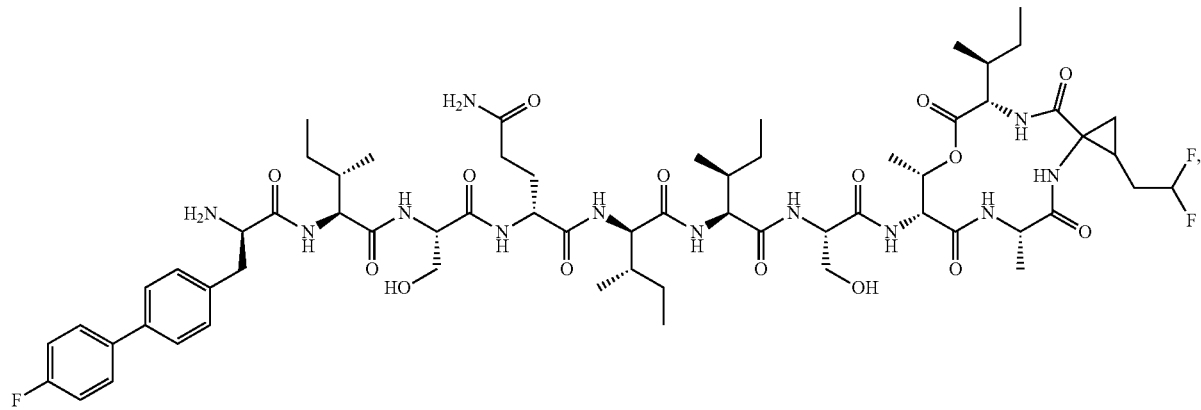
(67)
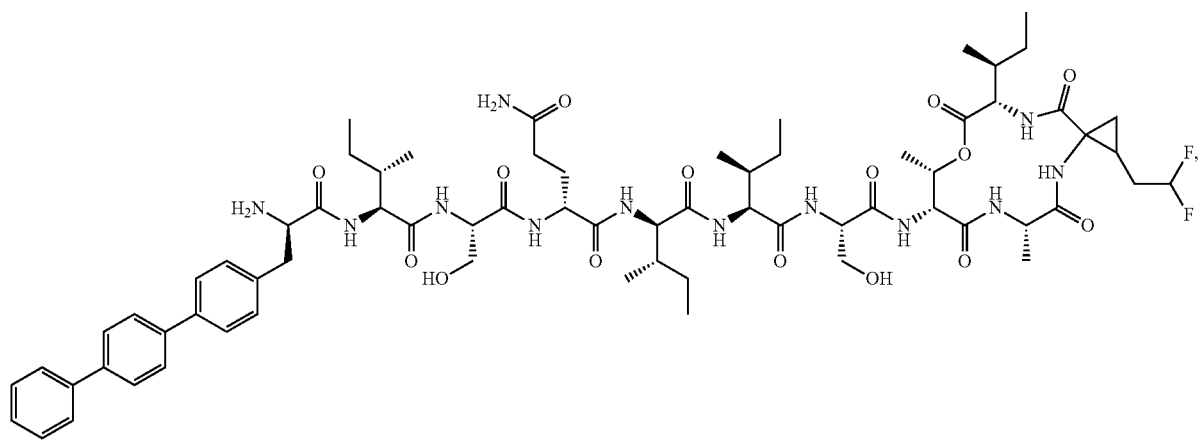
(68)
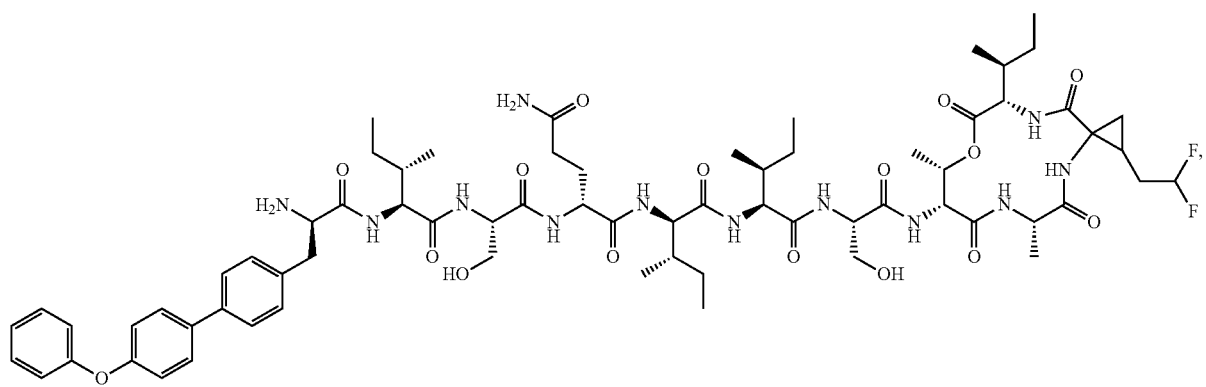
(69)

(70)
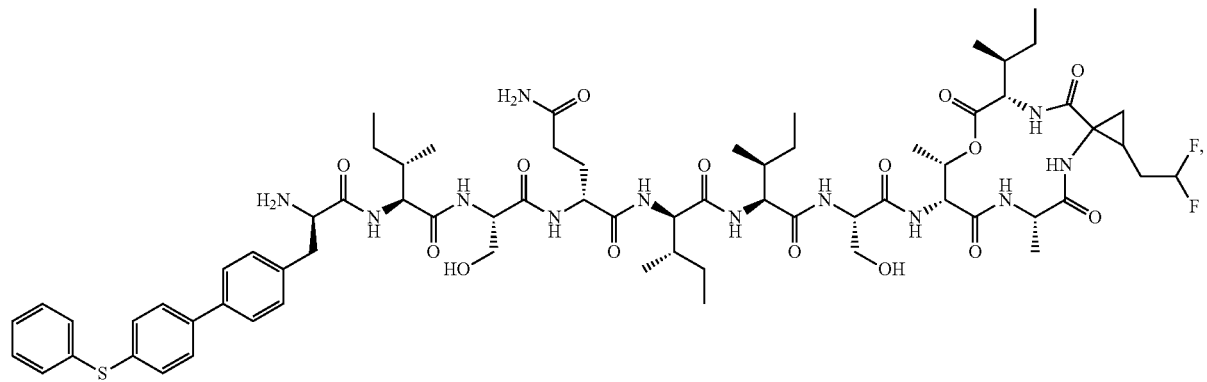
(71)
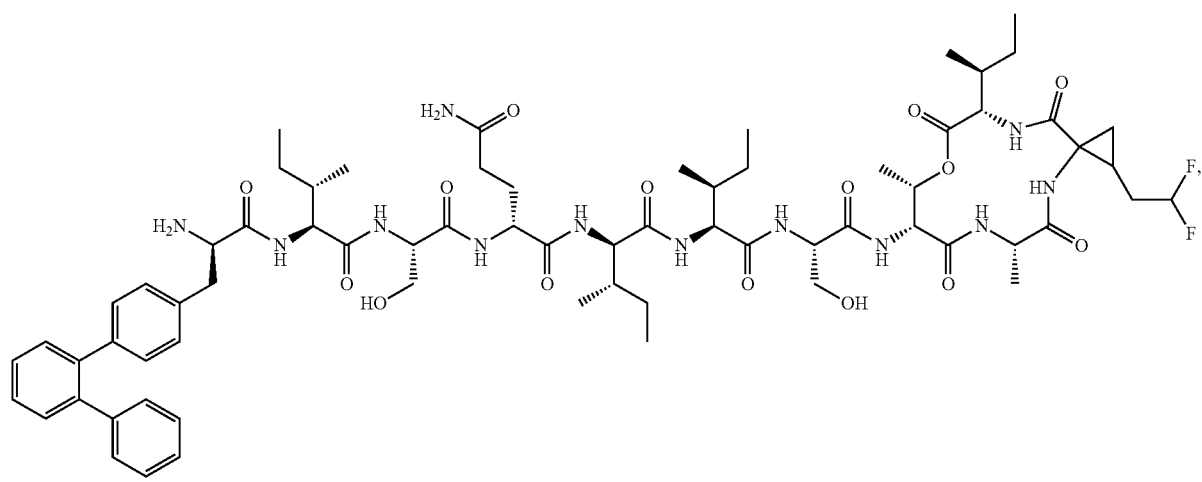
(72)
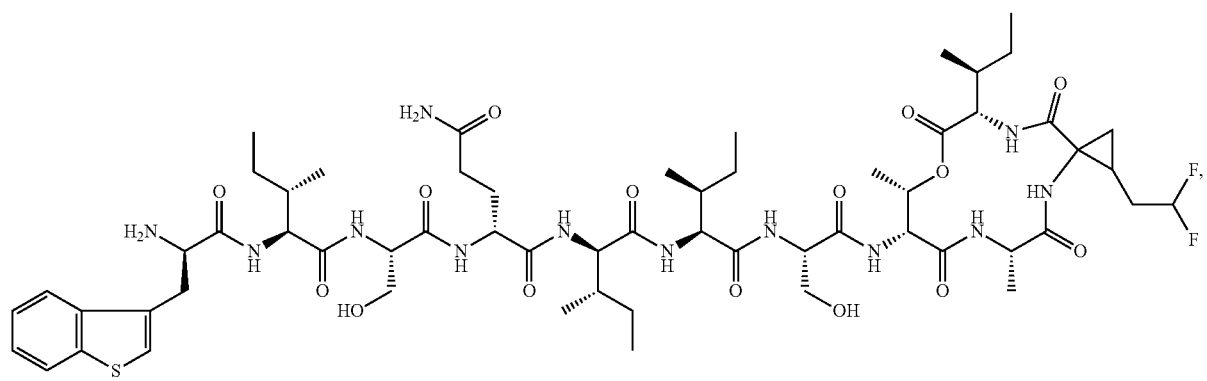

(73)
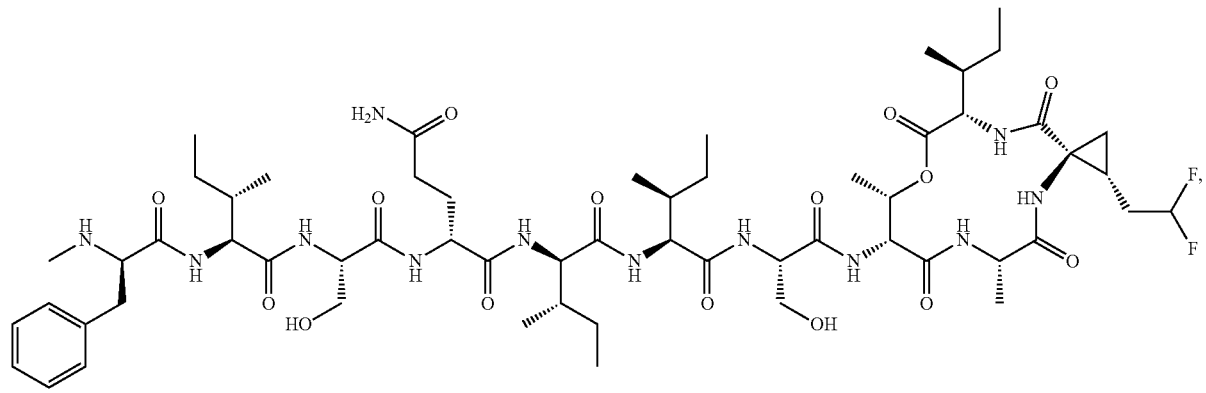
(74)
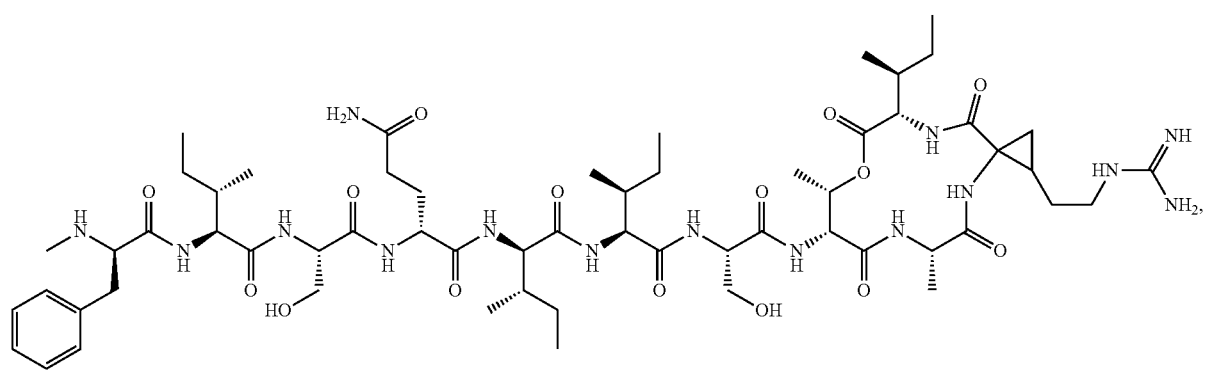
(75)
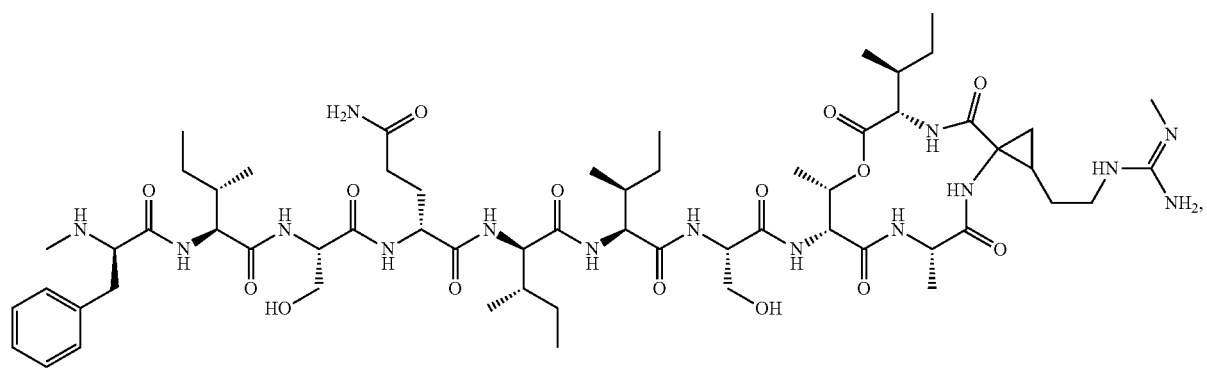
(76)
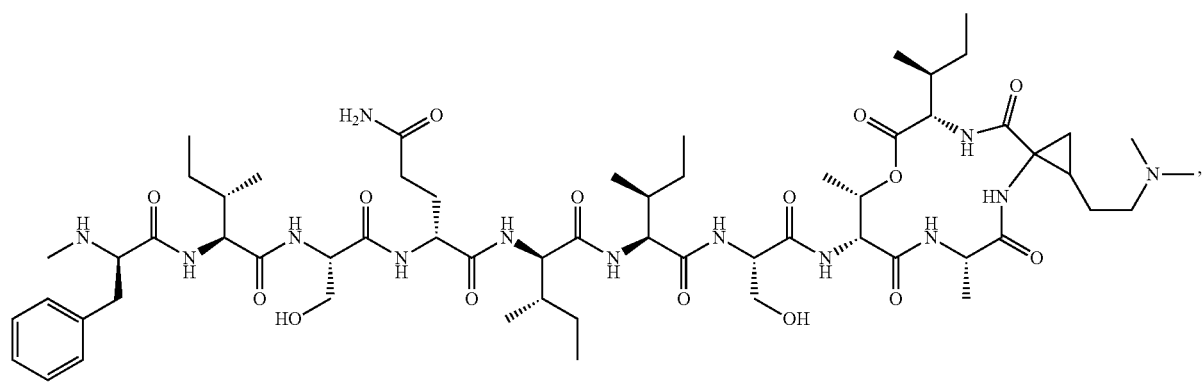

(77)
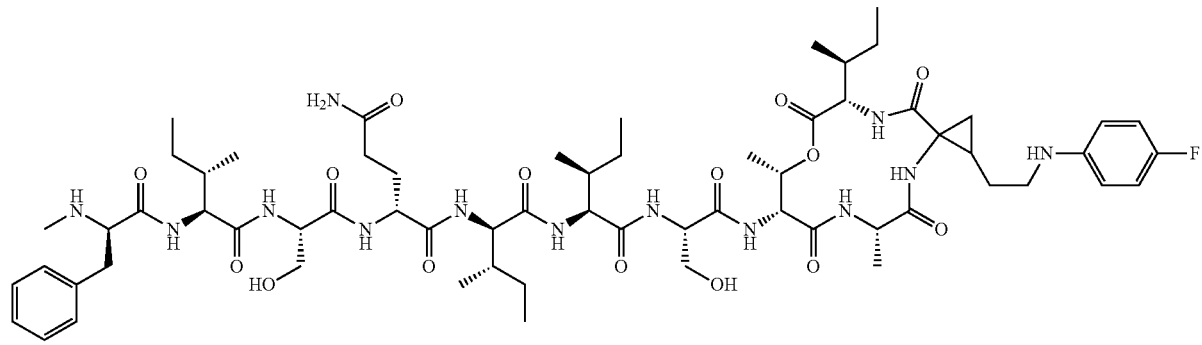
(78)
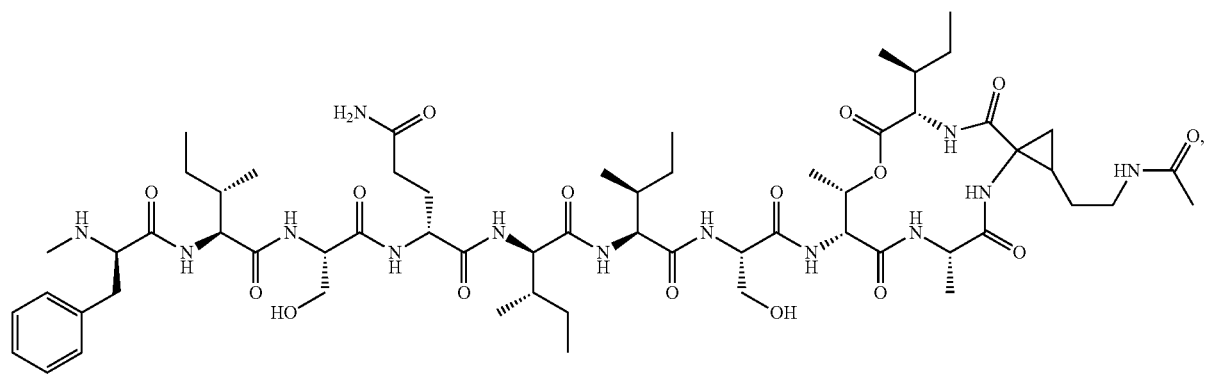
(79)
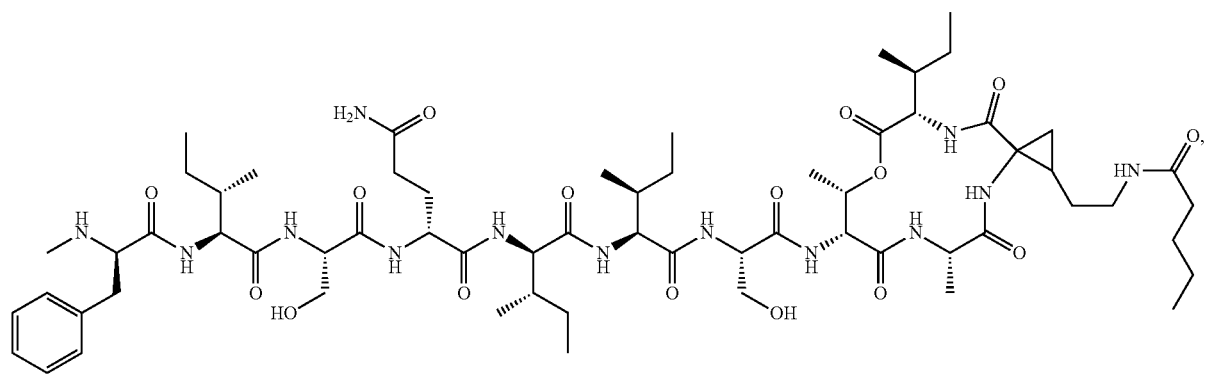
(80)
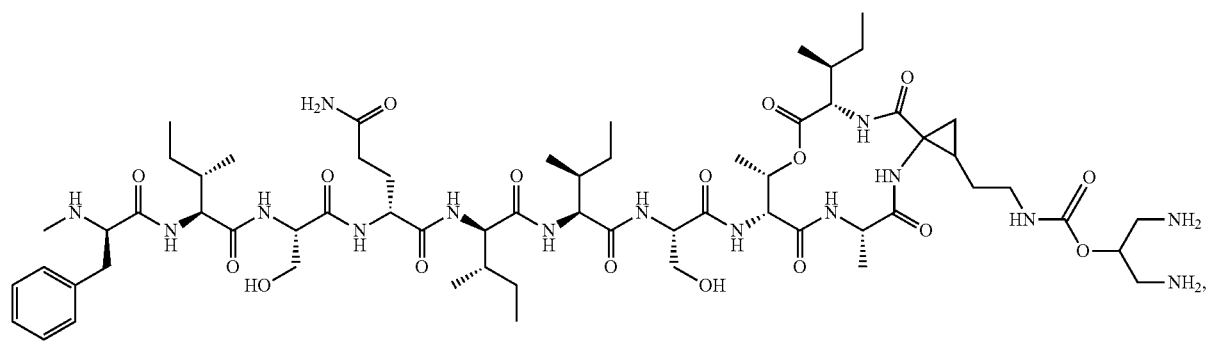

(81)
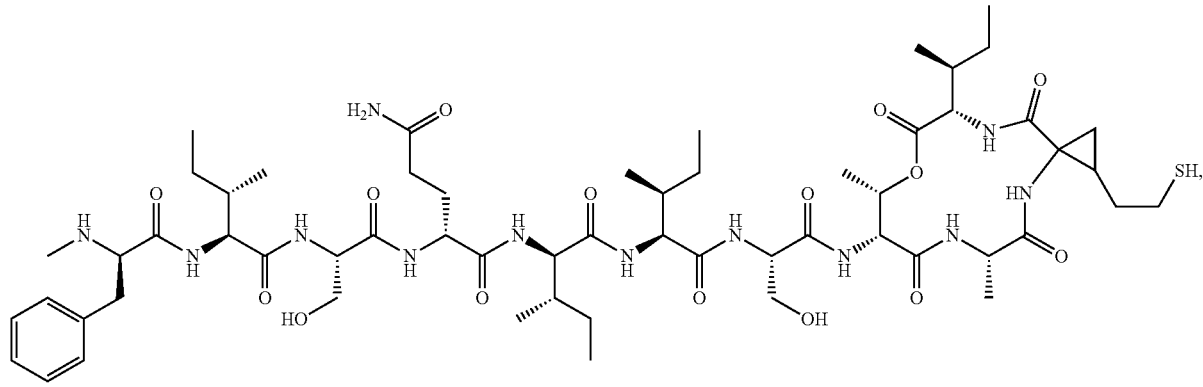
(82)
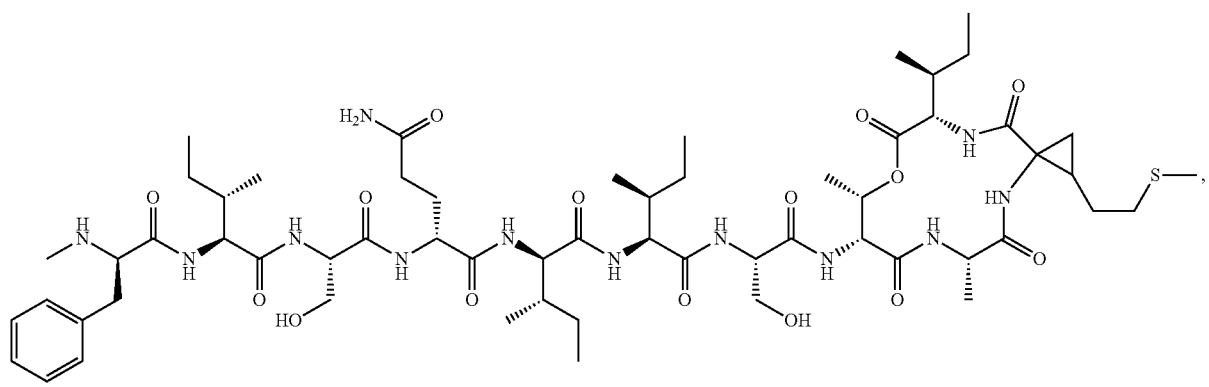
(83)
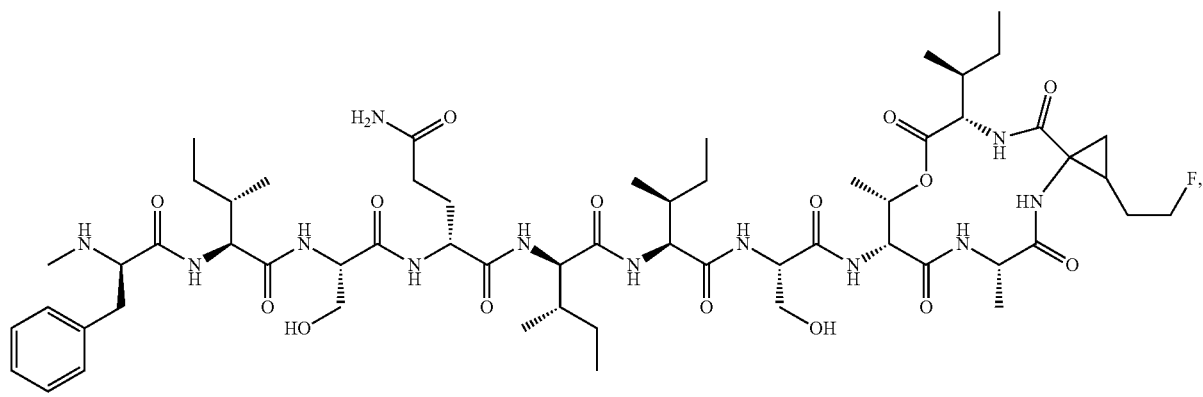
(84)
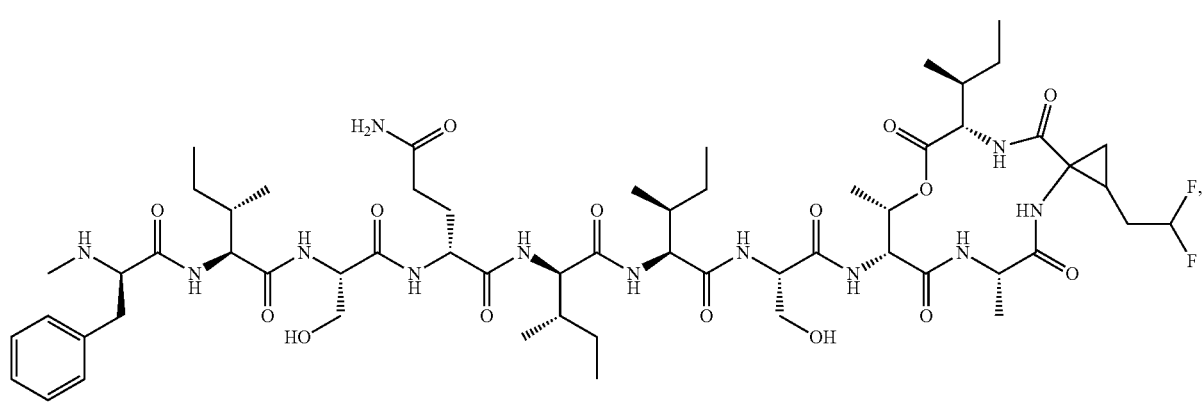

(85)
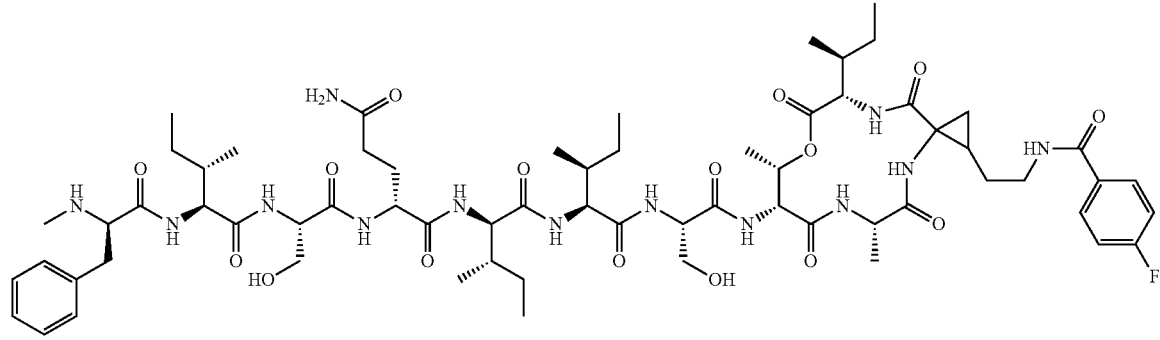
(86)
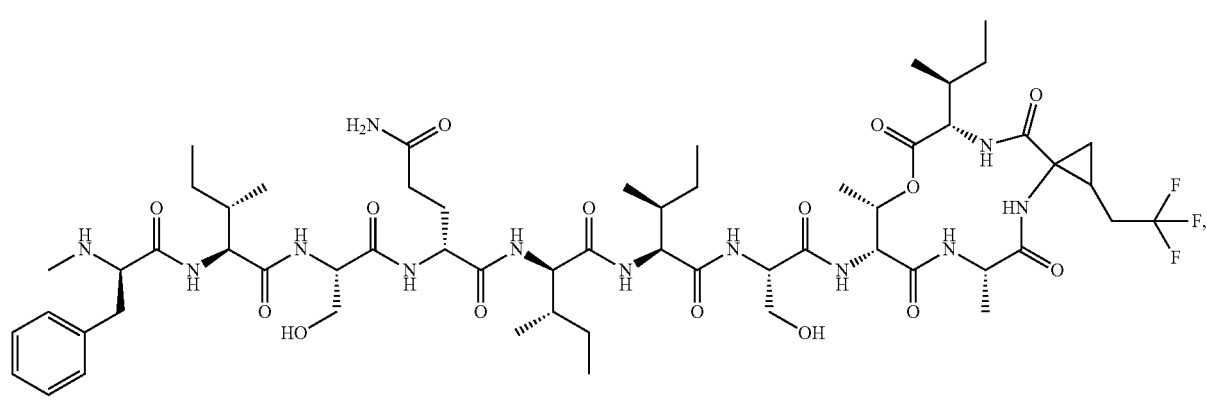
(87)
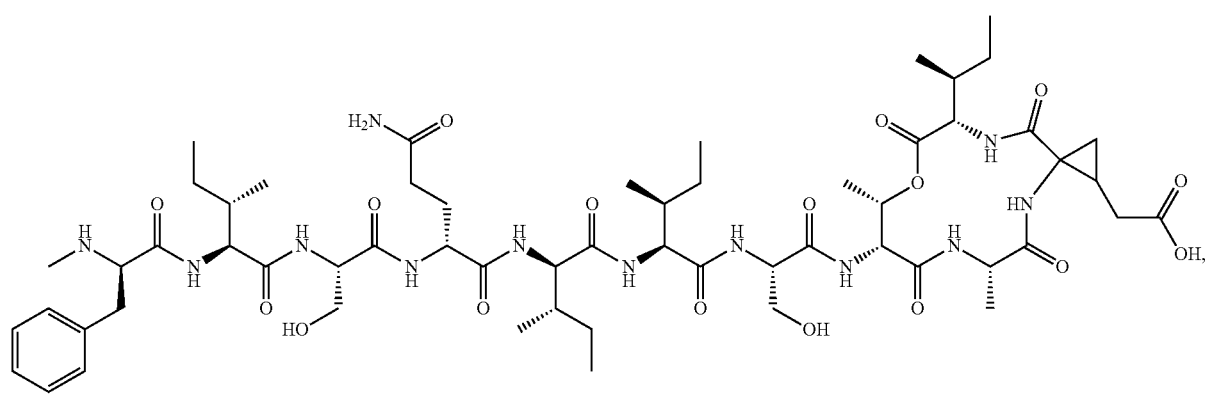
(88)
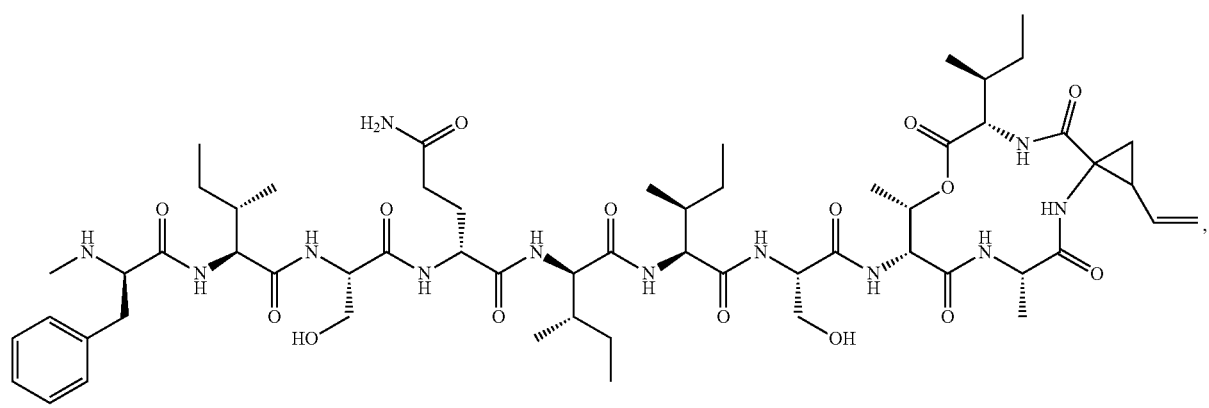

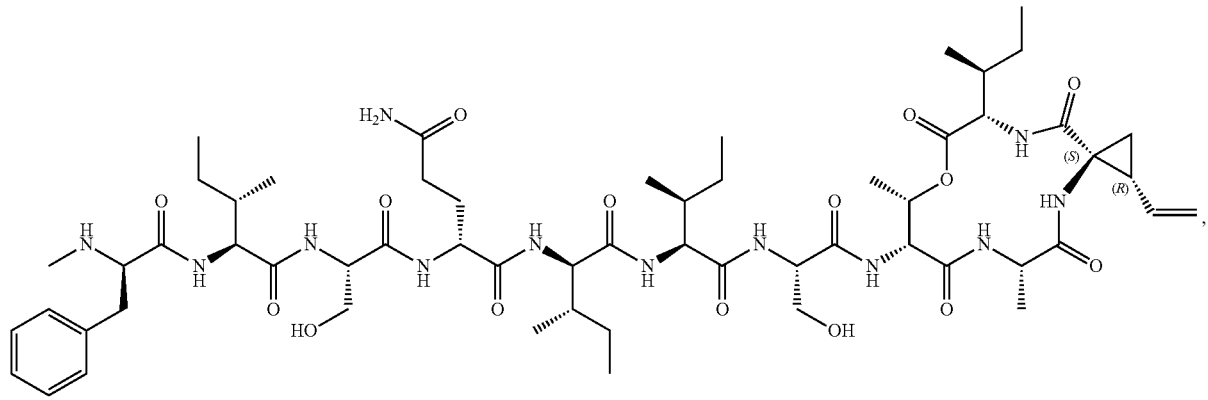
(89)
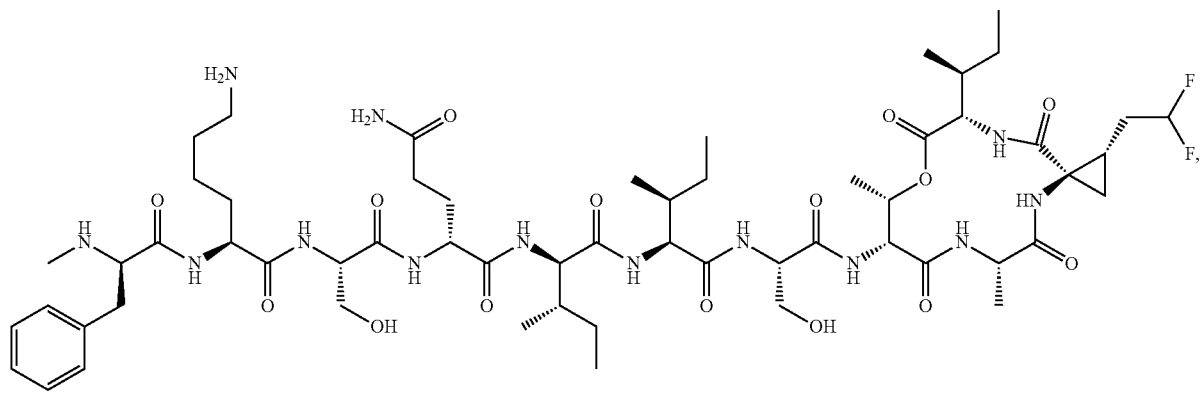
(90)
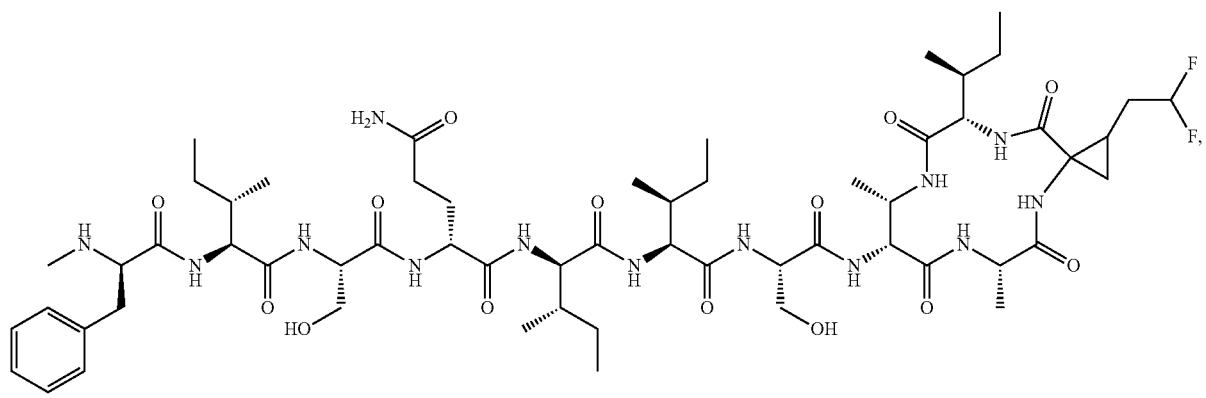
(91)

(92)
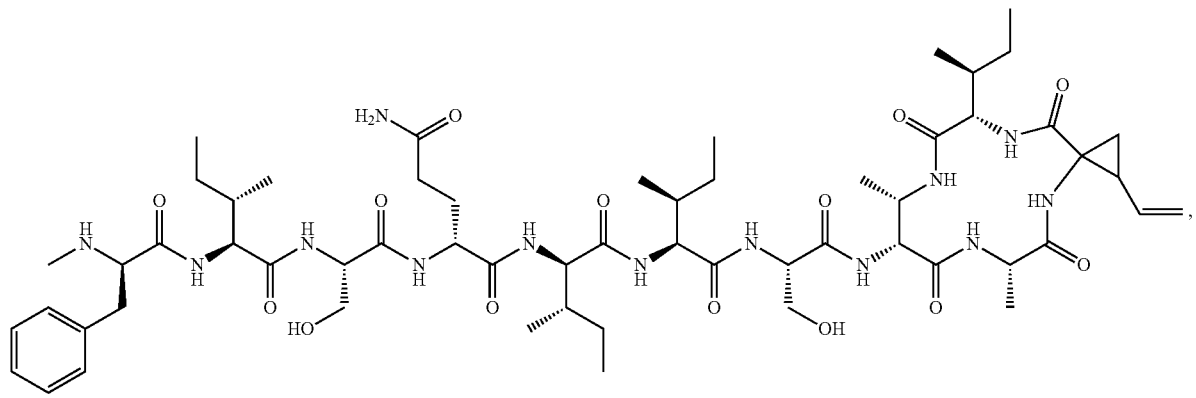
(93)
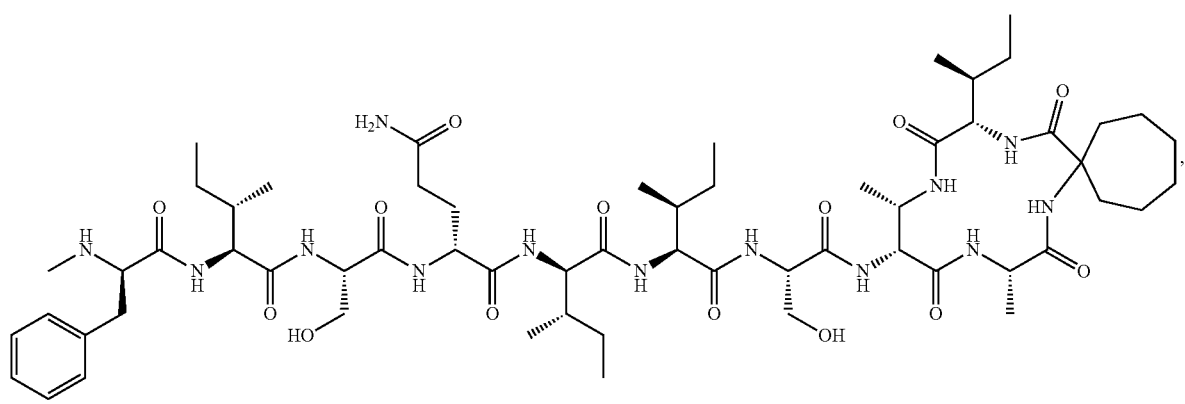
(94)
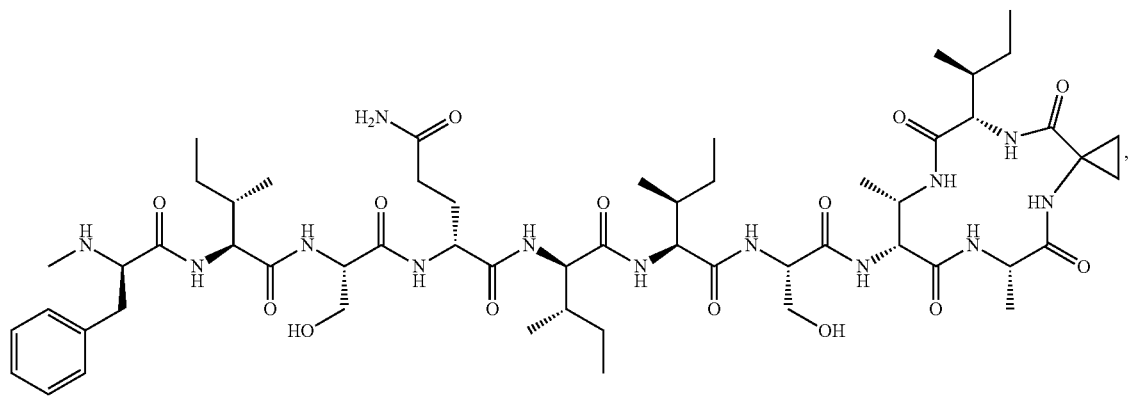
(95)
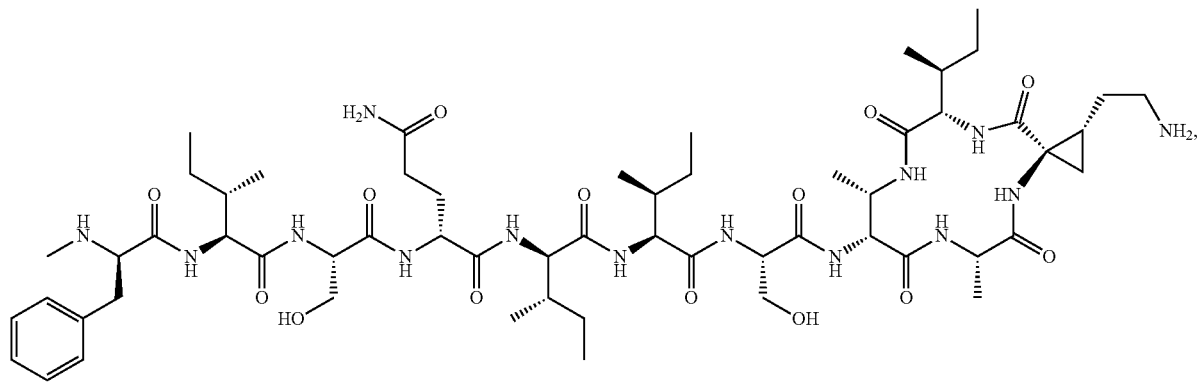

(96)
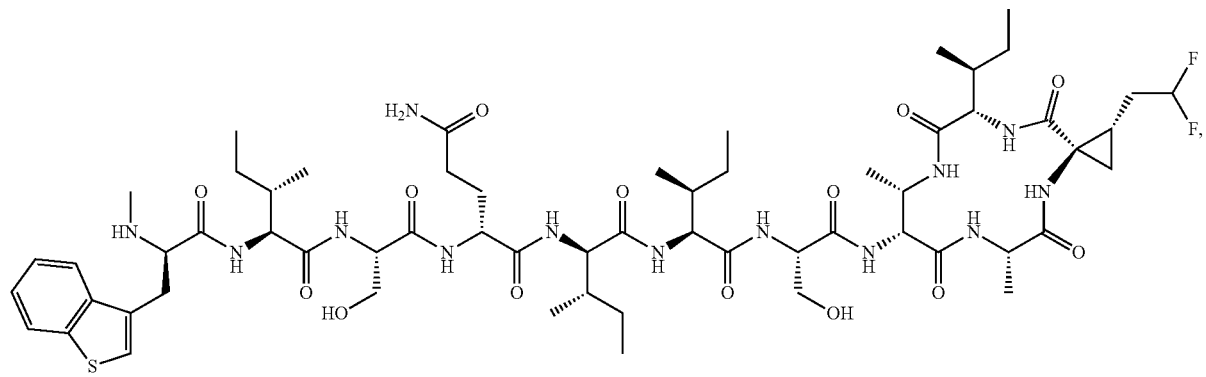
(97)
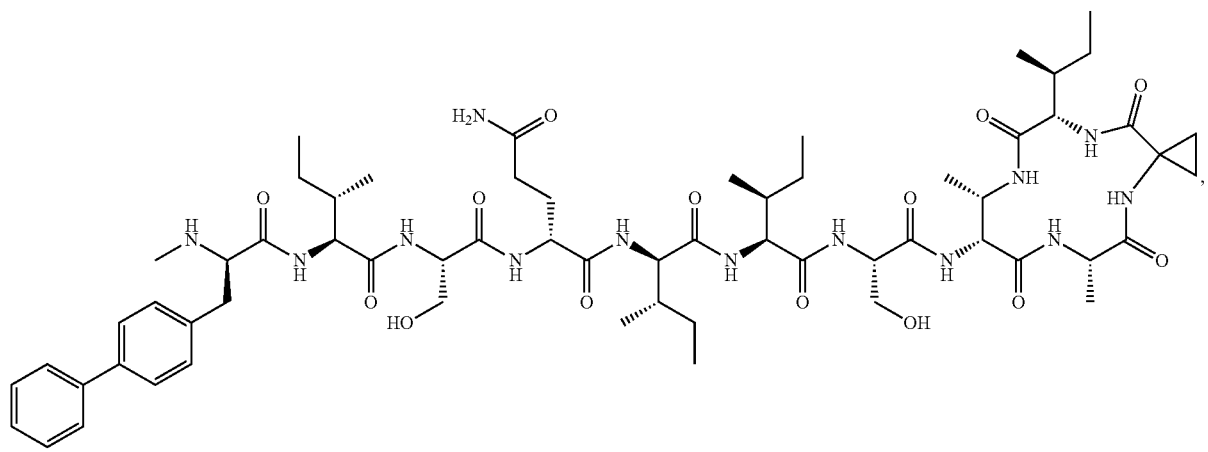
(98)
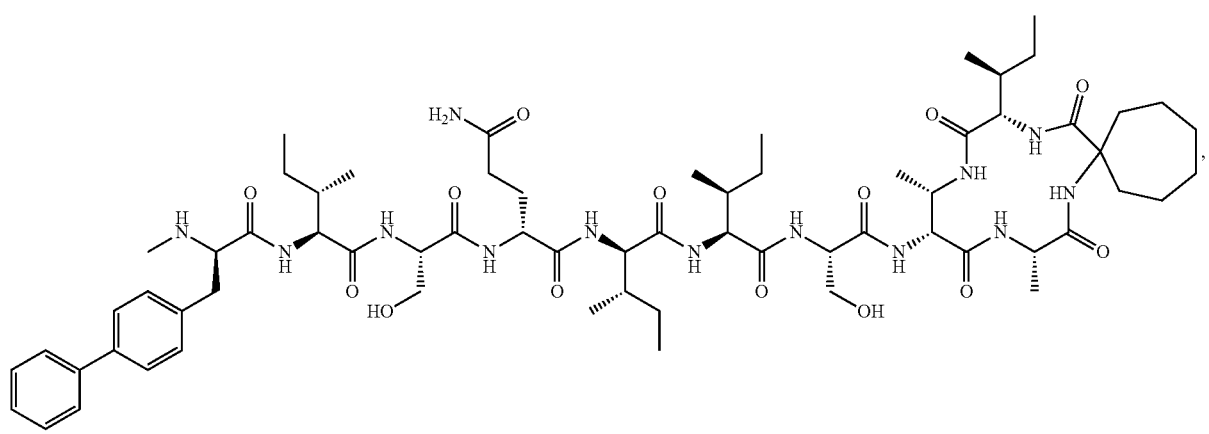

(99)

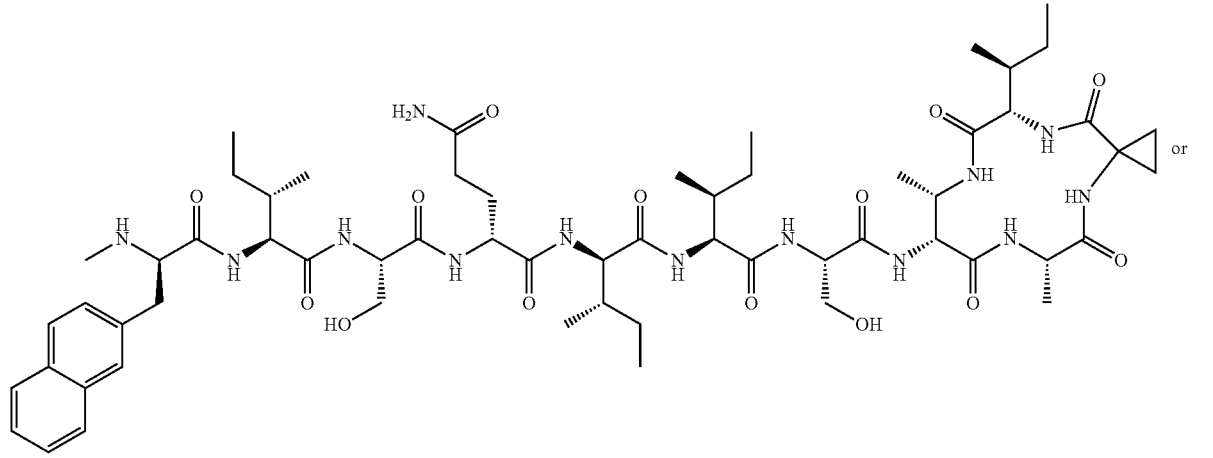

or (100)

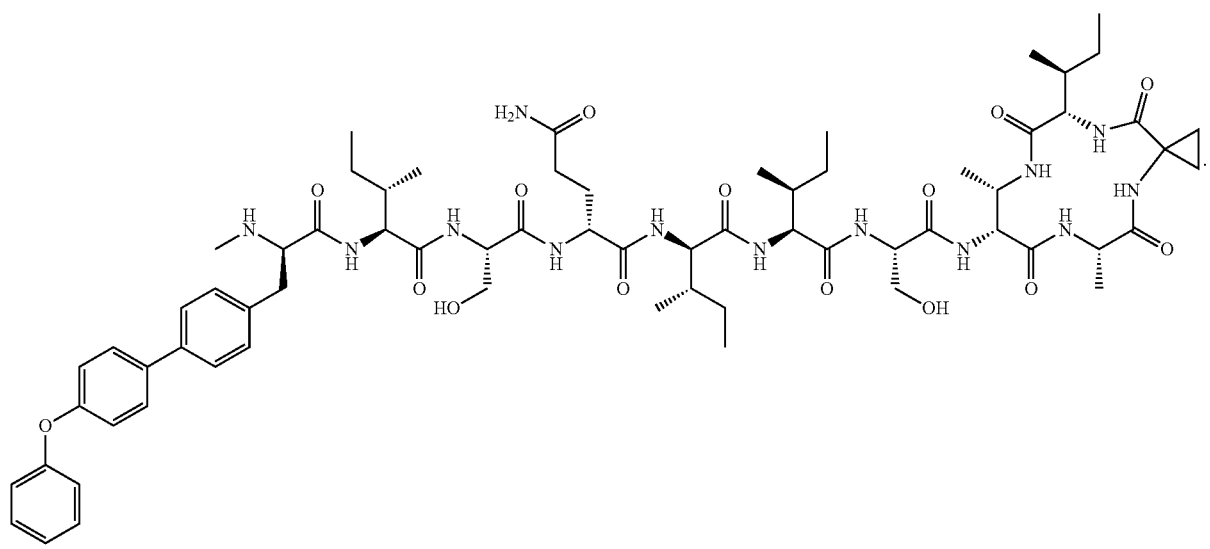

In another aspect, the invention relates to a pharmaceutical composition comprising the compound of the invention, optionally further comprising a pharmaceutically acceptable carrier, excipient, adjuvant, vehicle or a combination thereof.

In some embodiments, the composition of the present invention further comprises one or more other therapeutic agents, wherein the other therapeutic agents are selected from antibacterial agents, antifungal agents, antiviral agents, antiprotozoal agents, antihelminthic agents or a combination thereof.

In another aspect, provided herein is use of the compound or the pharmaceutical composition disclosed herein in the manufacture of a medicament for preventing, managing, treating or lessening a bacterial infectious disease in a patient.

In another aspect, provided herein is a method of preventing, managing, treating or lessening a bacterial infectious disease comprising administering to the patient a therapeutically effective amount of the compound or the the pharmaceutical composition disclosed herein.

In another aspect, provided herein is the compound or the pharmaceutical composition disclosed herein for use in preventing, managing, treating or lessening a bacterial infectiou disease in a subject.

In some embodiments, wherein the bacterial infection is a Gram-positive bacterial infection or a *Mycobacterium tuberculosis* infection.

In some embodiments, wherein the bacteria is *Streptococcus, Staphylococcus, Enterococcus, Corynebacterium, Listeria, Bacillus, Erysipelothrix, Actinomycetes, Helicobacter pylori, Legionella pneumophila, Mycobacterium tuberculosis, Mycobacterium avium, Mycobacterium avium intracellulare, Staphylococcus aureus, Staphylococcus epidermidis, Neisseria gonorrhoeae, Neisseria meningitidis, Streptococcus pyogenes, Streptococcus faecalis, Streptococcus bovis, Streptococcus pneumoniae, Haemophilus, Pseudomonas aeruginosa, Bacillus anthracis* or *Bacillus subtilis*.

Unless otherwise stated, all stereoisomers, geometric isomers, tautomers, N-oxides, hydrates, solvates, metabolites, salts and pharmaceutically acceptable prodrugs of the compounds disclosed herein are within the scope of the invention.

Specifically, the salt is a pharmaceutically acceptable salt. The phrase "pharmaceutically acceptable" refers to that the substance or composition must be compatible chemically and/or toxicologically, with the other ingredients comprising a formulation, and/or the mammal being treated therewith.

The compounds disclosed herein also include salts of the compounds which are not necessarily pharmaceutically acceptable salts, and which may be useful as intermediates for preparing and/or purifying compounds of Formula (I), Formula (Ia), Formula (II), Formula (IIa) or Formula (III); and/or for separating enantiomers of compounds of Formula (I), Formula (Ia), Formula (II), Formula (IIa) or Formula (III).

Pharmaceutical Compositions, Formulations, Administration and Uses of the Compounds of the Present Invention The present invention relates to a pharmaceutical composition comprising a compound having Formula (I), Formula (Ia), Formula (II), Formula (IIa) or Formula (III), a compound listed in the present invention, or a compound of an embodiment, or a stereoisomer thereof, a pharmaceutically acceptable salt. The composition further comprises at least one pharmaceutically acceptable carrier, adjuvant, vehicle or a combination thereof, and, optionally one or more other therapeutic agents. The amount of the compound in the composition of the present invention can effectively prevent, manage, treat or lessen a bacterial infectious disease in a subject.

It will also be appreciated that certain of the compounds disclosed herein can exist in free form for treatment, or where appropriate, as a pharmaceutically acceptable derivative thereof. Some non-limiting examples of the pharmaceutically acceptable derivative include pharmaceutically acceptable prodrugs, salts, esters, salts of such esters, or any other adducts or derivatives which upon administration to a patient in need is capable of providing, directly or indirectly, a compound as otherwise described herein, or a metabolite or residue thereof.

As described above, the pharmaceutical compositions disclosed herein further comprise a pharmaceutically acceptable carrier, an adjuvant, or a vehicle, which, as used herein, includes any and all solvents, diluents, or other liquid vehicle, dispersion or suspension aids, surface active agents, isotonic agents, thickening or emulsifying agents, preservatives, solid binders, lubricants and the like, as suited to the particular dosage form desired. As described in the following: In Remington: Troy et al., Remington: The Science and Practice of Pharmacy, 21st ed., 2005, Lippincott Williams & Wilkins, Philadelphia, and Swarbrick et al., Encyclopedia of Pharmaceutical Technology, eds. 1988-1999, Marcel Dekker, New York, both of which are herein incorporated by reference in their entireties, discloses various carriers used in formulating pharmaceutically acceptable compositions and known techniques for the preparation thereof. Except insofar as any conventional carrier medium incompatible with the compounds disclosed herein, such as by producing any undesirable biological effect or otherwise interacting in a deleterious manner with any other components of the pharmaceutically acceptable composition, its use is contemplated to be within the scope of this invention.

Some non-limiting examples of materials which can serve as pharmaceutically acceptable carriers include ion exchangers; aluminium; aluminum stearate; lecithin; serum proteins such as human serum albumin; buffer substances such as phosphates; glycine; sorbic acid; potassium sorbate; partial glyceride mixtures of saturated vegetable fatty acids; water; salts or electrolytes such as protamine sulfate, disodium hydrogen phosphate, potassium hydrogen phosphate, sodium chloride and zinc salts; colloidal silica; magnesium trisilicate; polyvinyl pyrrolidone; polyacrylates; waxes; polyethylene-polyoxypropylene-block polymers; wool fat; sugars such as lactose, glucose and sucrose; starches such as corn starch and potato starch; cellulose and its derivatives such as sodium carboxymethyl cellulose, ethyl cellulose and cellulose acetate; powdered tragacanth; malt; gelatin; talc; excipients such as cocoa butter and suppository waxes; oils such as peanut oil, cottonseed oil, safflower oil, sesame oil, olive oil, corn oil and soybean oil; glycols such as propylene glycol and polyethylene glycol; esters such as ethyl oleate and ethyl laurate; agar; buffering agents such as magnesium hydroxide and aluminum hydroxide; alginic acid; pyrogen-free water; isotonic saline; Ringer's solution; ethyl alcohol; and phosphate buffer solutions, as well as other non-toxic compatible lubricants such as sodium lauryl sulfate and magnesium stearate, as well as coloring agents, releasing agents, coating agents, sweetening, flavoring and perfuming agents, preservatives and antioxidants.

Preferably, the dosage form of the pharmaceutical composition is one or more pharmaceutically acceptable dosage forms of powder, injection preparation, capsule, tablet, sustained release agent or oral preparation. The drugs of the above various dosage forms can be prepared according to conventional methods in the pharmaceutical field. According to the formulation form, the content of the pharmaceutical composition of the present invention in the formulation may be 1 to 99% by mass, preferably 5 to 90%; the excipients used in the preparation may use conventional excipients in the art, provided that they do not react with the pharmaceutical composition of the present invention or affect the therapeutic effect of the pharmaceutical of the present invention; the preparation method of the formulation can be prepared by a conventional preparation method in the art.

For example, for oral administration in the form of tablets or capsules, the active pharmaceutical ingredient may be combined with an oral, non-toxic, pharmaceutically acceptable inert carrier, such as lactose, starch, sucrose, glucose, methyl cellulose, magnesium stearate, dicalcium phosphate, calcium sulfate, mannitol, sorbitol and the like. For oral administration in liquid form, the oral pharmaceutical components may be combined with any oral, non-toxic, pharmaceutically acceptable inert carrier such as ethanol, glycerol, water and the like. Also, where appropriate or necessary, suitable binders, lubricants, decomposition agents, and colorants may be added to the mixture. Suitable binders include starch, gelatin, natural sugars such as glucose or β-lactose, corn sweeteners, natural and synthetic gums such as acacia, tragacanth, or sodium alginate, carboxymethylcellulose prime, polyethylene glycol, wax and the like. Lubricants for use in these dosage forms include sodium oleate, sodium stearate, magnesium stearate, sodium benzoate, sodium acetate, sodium chloride and the like. Disintegrants include, but are not limited to, starch, methylcellulose, agar, bentonite, xanthan gum and the like.

The compounds of the present invention may be administered in the form of oral dosage forms such as tablets, capsules each of which includes a sustained-release or time-release formula, pills, powders, granules, elixirs, tinctures, suspensions, syrups and emulsifiers. They may also be administered intravenously (bolus or infusion), intraperitoneally, subcutaneously or intramuscularly. All dosage forms used are well known to those of ordinary skill in the pharmaceutical arts. They can be administered alone, but will generally be administered together with a single pharmaceutical carrier based on the chosen mode of administration and standard pharmaceutical practice.

The compounds of the present invention may be administered intranasally, for topical use with a suitable intranasal vehicle, or transdermally by the use of a transdermal patch. When administered in the form of a transdermal delivery system, the dosage administered throughout the dosage is continuous rather than intermittent.

The compounds of the invention may also be administered in the form of liposomal delivery systems, such as small, monolayer, large, single-layered vesicles and multilamellar vesicles. Liposomes can be formed by different phospholipids, such as cholesterol, stearylamine, or phosphatidylcholine.

The compounds of the present invention are also conjugated to soluble polymers that serve as targeted drug carriers. Such polymers may encompass polyvinylpyrrolidone, pyran copolymer, polyhydroxypropylmethacrylamide-phenol, polyhydroxyethylaspartamide phenol, or polyethylene oxide-polylysine substituted with palmitoyl residues. Moreover, the compounds of the invention can be coupled with a class of biodegradable polymers for the purpose of controlled drug release. For example, polylactic acid, polyglycolic acid, copolymers of polylactic acid and polyglycolic acid, polyepsilon caprolactone, polyhydroxybutyric acid, polyorthoesters, polyacetals, polydihydropyrans, polycyanoacrylates, and hydrogel cross-linked or amphiphilic blocking copolymer.

The compounds of the present invention may be administered as the only pharmaceutically acceptable agent or in combination with one or more additional therapeutic (pharmaceutically acceptable) agents, wherein the combination of drugs causes acceptable adverse reactions, which is of particular interest for the treatment of bacterial infection-related diseases. wherein the bacterial infections include Gram-positive bacterial infections and *Mycobacterium tuberculosis* infections. The "other therapeutic agents" used in the present invention are selected from antibacterial agents, antifungal agents, antiviral agents, antiprotozoal agents, antihelminthic agents or a combination thereof.

Wherein the antibacterial agents of the present invention include, but are not limited to:
1) Penicillins, such as Penicillin, Amoxicillin, Mezlocillin, Piperacillin, Ticarcillin, etc.;
2) Cephalosporins, such as Cefradine, Cefalexin, Cefaclor, Cefuroxime Axetil, Cefixime, Cefoperazone, Ceftriaxone, Cefpirome, etc.;
3) Carbapenems, such as Meropenem, Ertapenem, etc.;
4) Monocyclic β-lactams, such as Aztreonam;
5) Aminoglycosides, such as Amikacin, Gentamycin, Kanamycin, Streptomycin, etc.;
6) Macrolides, such as Azithromycin, Clarithromycin, Erythromycin, etc.;
7) Tetracyclines, such as Tetracycline, Demeclocycline, etc.;
8) Quinolones, Ciprofloxacin, Enoxacin, Levofloxacin, Moxifloxacin, Norfloxacin, Ofloxacin, etc.;
9) Sulfas, Sulfasoxazole, Sulfamethizole, Sulfasalazine, Trimethoprim, etc.;
10) Glycopeptides, such as Vancomycin, Teicoplanin, etc.;
11) Peptides, such as Bacitracin, polymyxin B, Colistin, etc.;
12) others, such as Loracarbef, Chloromycetin, Ethambutol, Fosfomycin, Isoniazid, Rifampin, Spectinomycin, etc.

The dosage of the pharmaceutical composition in the present invention can be appropriately changed according to the administration object, the administration route or the preparation form of the drug, but the premise is to ensure that the pharmaceutical composition can reach an effective blood drug concentration in the mammal.

The dosage regimen of the compounds of this invention will vary with known factors such as the pharmacokinetic profile of the particular agent and its mode and route of administration; the race, age, sex, health status, medical condition and weight of the recipient; The nature and extent of symptoms; the type of concurrent treatment; the frequency of treatment; the route of administration; the renal and hepatic function of the patient; and the effect desired. A physician or veterinarian can make a decision and prescribe an effective amount of medication to prevent, counteract or prevent the development of a thromboembolic disorder.

An "effective amount" or "effective dose" of the compound or pharmaceutically acceptable composition is an amount that is effective in treating or lessening the severity of one or more of the aforementioned disorders. The compounds and pharmaceutically acceptable compositions are effective administered in a fairly wide dose range. In accordance with the general guidelines, the daily oral dose of each active ingredient employed will range from about 0.001 to 1000 mg/kg of body weight, preferably from about 0.01 to 100 mg/kg of body weight, in order to achieve the indicated effect. Also, most preferably, between about 1.0 to 20 mg/kg body weight/day. The exact amount required will vary from subject to subject, depending on the species, age, and general condition of the subject, the severity of the infection, the particular agent, its mode of administration, etc., and needs to be determined by the attending physician according to the specific circumstances. The compounds of the present invention may be administered once daily, or they may be administered in two, three or four times daily. A compound or composition can also be administered with one or more other therapeutic agents as discussed above.

Each unit dose of dosage form (pharmaceutical composition) suitable for administration may contain from about 1 mg to about 100 mg of active ingredient. In these pharmaceutical compositions, the weight of the active ingredient will generally be about 0.5-95% of the total weight of the composition.

The compound and the pharmaceutical composition provided by the present invention can be used in the manufacture of a medicament for preventing, treating or alleviating bacterial infectious diseases in patients, wherein the bacterial infection is a Gram-positive bacterial infection or a *Mycobacterium tuberculosis* infection. Wherein the bacteria are *Streptococcus, Staphylococcus, Enterococcus, Corynebacterium, Listeria, Bacillus, Erysipelothrix,* Actinomycetes, *Helicobacter pylori, Legionella pneumophila, Mycobacterium tuberculosis, Mycobacterium avium, Mycobacterium avium intracellulare, Staphylococcus aureus, Staphylococcus epidermidis, Neisseria gonorrhoeae, Neisseria meningitidis, Streptococcus pyogenes, Streptococcus faecalis, Streptococcus bovis, Streptococcus pneumoniae, Haemophilus, Pseudomonas aeruginosa, Bacillus anthracis* or *Bacillus subtilis*.

The present invention provides a method of treating, preventing or delaying infection caused by bacteria, wherein the method comprises administering to a patient in need of treatment a therapeutically effective amount of the above compound or a pharmaceutical composition thereof.

Wherein the bacterial is Gram-positive bacterial or *Mycobacterium tuberculosis*. Moreover, the compound provided by the present invention or the pharmaceutical composition thereof can be co-administered with other therapies or therapeutic agents. The mode of administration can be simultaneous, sequential or at certain time intervals.

General Synthetic Procedures

To describe the invention, the following examples are listed. However, it should be understood that the present invention is not limited to these embodiments, but merely provides a method for practicing the present invention.

In the present invention, if the chemical name of the compound doesn't match the corresponding structure, the compound is characterized by the corresponding structure.

Generally, the compounds disclosed herein may be prepared by methods described herein, wherein the substituents are as defined in the present invention, except where further noted. The following non-limiting schemes and examples are presented to further exemplify the invention.

Persons skilled in the art will recognize that the chemical reactions described may be readily adapted to prepare a number of other compounds disclosed herein, and alternative methods for preparing the compounds disclosed herein are deemed to be within the scope disclosed herein. For example, the synthesis of non-exemplified compounds according to the invention may be successfully performed by modifications apparent to those skilled in the art, e.g., by appropriately protecting interfering groups, by utilizing other suitable reagents known in the art other than those described, and/or by making routine modifications of reaction conditions. Alternatively, other reactions disclosed herein or known in the art will be recognized as having applicability for preparing other compounds disclosed herein.

In the examples described below, unless otherwise indicated all temperatures are set forth in degrees Celsius. Reagents were purchased from commercial suppliers such as Aldrich Chemical Company, Arco Chemical Company and Alfa Chemical Company, and were used without further purification unless otherwise indicated. Common solvents were purchased from commercial suppliers such as Shantou XiLong Chemical Factory, Guangdong Guanghua Reagent Chemical Factory Co. Ltd., Guangzhou Reagent Chemical Factory, Tianjin YuYu Fine Chemical Ltd., Tianjin Fuchen Chemical Reagent Factory, Wuhan Xinhuayuan Technology Development Co., Ltd., Qingdao Tenglong Reagent Chemical Ltd., and Qingdao Ocean Chemical Factory.

Anhydrous THF, dioxane, toluene, and ether were obtained by refluxing the solvent with sodium. Anhydrous $CH_2Cl_2$ and $CHCl_3$ were obtained by refluxing the solvent with $CaH_2$. EtOAc, PE, hexane, DMAC and DMF were treated with anhydrous $Na_2SO_4$ prior to use.

The reactions set forth below were done generally under a positive pressure of nitrogen or argon or with a drying tube (unless otherwise stated) in anhydrous solvents, and the reaction flasks were typically fitted with rubber septa for the introduction of substrates and reagents via syringe. Glassware was oven dried and/or heat dried.

Column chromatography was conducted using a silica gel column. Silica gel (300-400 mesh) was purchased from Qingdao Ocean Chemical Factory.

$^1$H NMR spectra were recorded using Bruker 400 MHz or 600 MHz nuclear magnetic resonance spectrometer. $^1$H NMR spectra were obtained by using $CDCl_3$, $DMSO-d_6$, $CD_3OD$ or acetone-$d_6$ solutions (reported in ppm), with TMS (0 ppm) or chloroform (7.26 ppm) as the reference standard. When peak multiplicities are reported, the following abbreviations are used: s (singlet), d (doublet), t (triplet), q (quartet), m (multiplet), br (broadened), brs (broadened singlet), dd (doublet of doublets), dt (doublet of triplets). Coupling constants J, when given, were reported in Hertz (Hz).

The measurement conditions for low-resolution mass spectrometry (MS) data are: Agilent 6120 quadrupole HPLC-MS (column model: Zorbax SB-C18, 2.1×30 mm, 3.5 microns, 6 min, flow rate 0.6 mL/min. Mobile phase: 5%-95% ($CH_3CN$ with 0.1% formic acid) in ($H_2O$ with 0.1% formic acid) using electrospray ionization (ESI) at 210 nm/254 nm with UV detection.

The test conditions for high-resolution mass spectrometry (MS) data were: Agilent 6530 Q-TOF HPLC-MS; without column, flow rate is 0.6 mL/min, mobile phase: phase A ($H_2O$ with 0.1% formic acid): phase B ($CH_3CN$)=30%: 70%; run time was 1 min; UV detection at 210 nm/254 nm, electrospray ionization mode (ESI).

Purification of compound by preparative chromatography was implemented on Agilent 1260 Series high performance liquid chromatography (Pre-HPLC) or Calesep Pump 250 Series high performance liquid chromatography (Pre-HPLC) with UV detection at 210/254 nm (NOVASEP, 50/80 mm. DAC).

The following abbreviations are used throughout the specification:

| | | | | | |
|---|---|---|---|---|---|
| $CDCl_3$: | chloroform-d; | TFE: | 2,2,2-trifluoroethanol; | TFA: | trifluoroacetic acid; |
| $CHCl_3$: | chloroform; | mg: | milligram; | mmol: | millimoles; |
| mL, ml: | milliliter | Alloc: | N-allyloxycarbonyl; | $CD_3OD$: | methanol-d; |
| min: | minute; | mmol/g: | millimole per gram; | h: | hour; |
| g: | gram; | $H_2O$: | water; | µL: | microliter; |
| mole, mol: | mole; | tBu: | tert-butyl; | Fmoc: | fluorenylmethoxycarbonyl; |
| Boc: | tert-butoxycarbonyl; | $CH_3CN$: | acetonitrile; | DMF: | N, N-di methyl formamide |
| AcOH: | acetic acid | DCM: | dichloromethane | DMSO: | dimethylsulfoxide |
| TIPS: | triisopropylsilicon | | | | |

HOAT: N-hydroxy-7-azabenzotriazole;
2-Cl-Trt resin: 2-chloro-trityl resin;
DIPEA: N,N-diisopropylethylamine;
HATU: O-(7-azabenzotriazole-1-oxy)-N,N'',N''-tetramethyluronium hexafluorophosphate;
Fmoc-D-Gln(Trt)-OH: N-fluorenylmethoxycarbonyl-N'-trityl-D-glutamine;
Fmoc-Ser(tbu)-OH: N-(9-fluorenylmethoxycarbonyl)-O-tert-butyl-L-serine;
Fmoc-Ile-OH: N-[(9H-fluoren-9-ylmethoxy) carbonyl]-L-isoleucine;
Boc-N-Me-D-Phe-OH: N-tert-butoxycarbonyl-N-methyl-D-phenylalanine;
Fmoc-D-allo-Ile-OH: N-fluorenylmethoxycarbonyl-D-alloisoleucine;
Fmoc-Ala-OH: N-fluorenylmethoxycarbonyl-L-alanine;
Boc-Ser(OtBu)-OH: N-tert-butoxycarbonyl-O-tert-butyl-L-serine.

The following synthetic schemes describe the steps for preparing the compounds disclosed herein. Wherein each A, R, $R^1$, $R^2$, $R^3$, $R^7$, $R^8$ and $R^9$ has the definition described in the present invention.

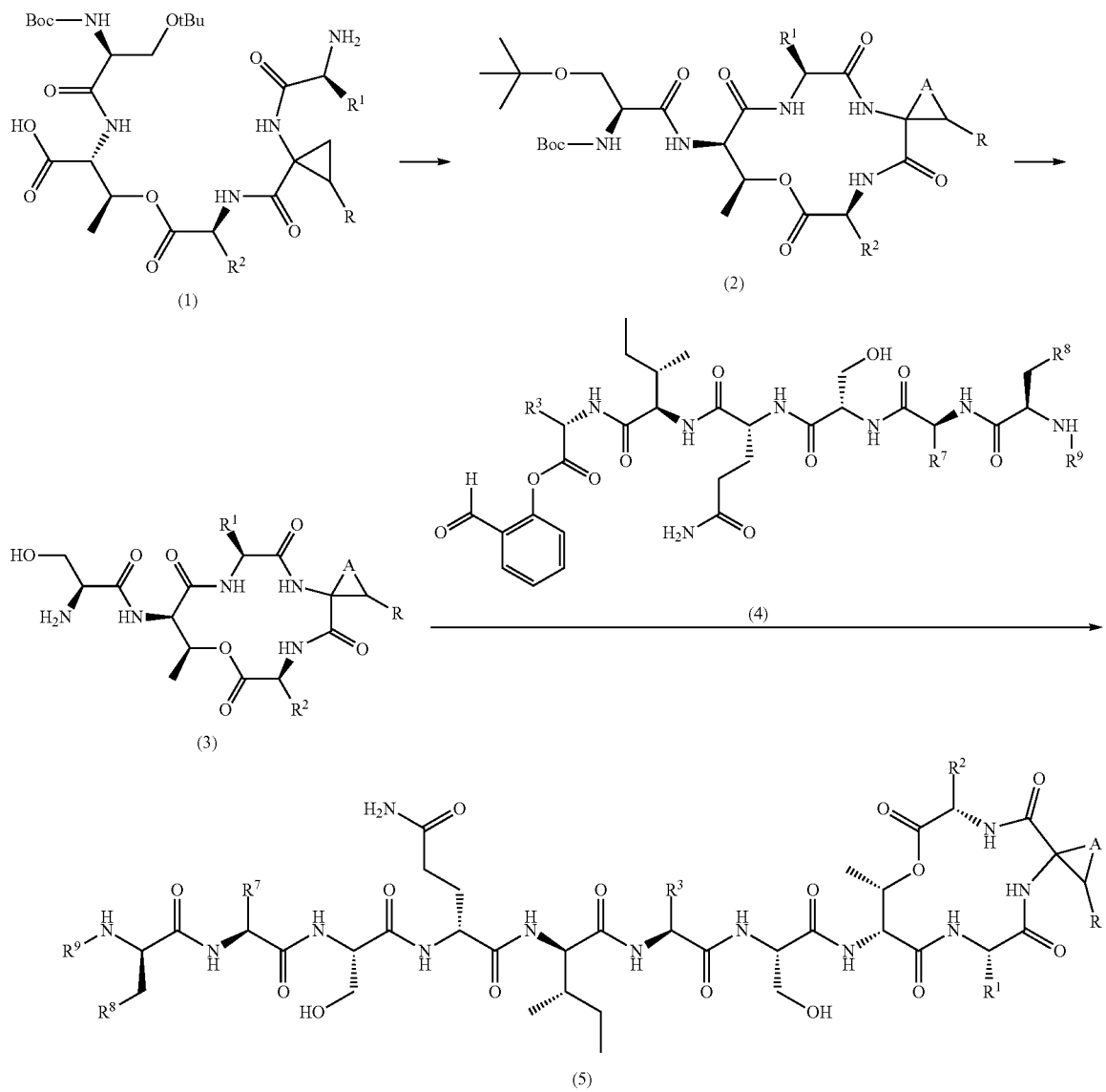

The compound having formula (5) can be synthesized by the method disclosed in synthesis scheme 1. First, compound (1) can be subjected to a ring closure reaction to give compound (2); then, compound (2) can be removed the hydroxy protecting group tBu and the amino protecting group Boc to give compound 3). Compound (3) and compound (4) can be subjected to a condensation reaction to give compound (5). The compound having formula (5) can form a salt with a suitable acid (for example, trifluoroacetic acid). Wherein, the intermediate (polypeptide) having formula (1) and the intermediate having formula (4) are both synthesized by solid phase peptide synthesis. Synthesis scheme 2 takes the synthesis of the intermediate having formula (1) as an example to briefly introduce the synthesis process of solid phase peptide synthesis.

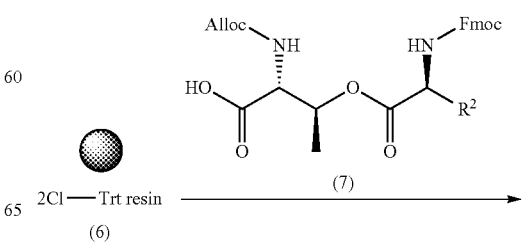

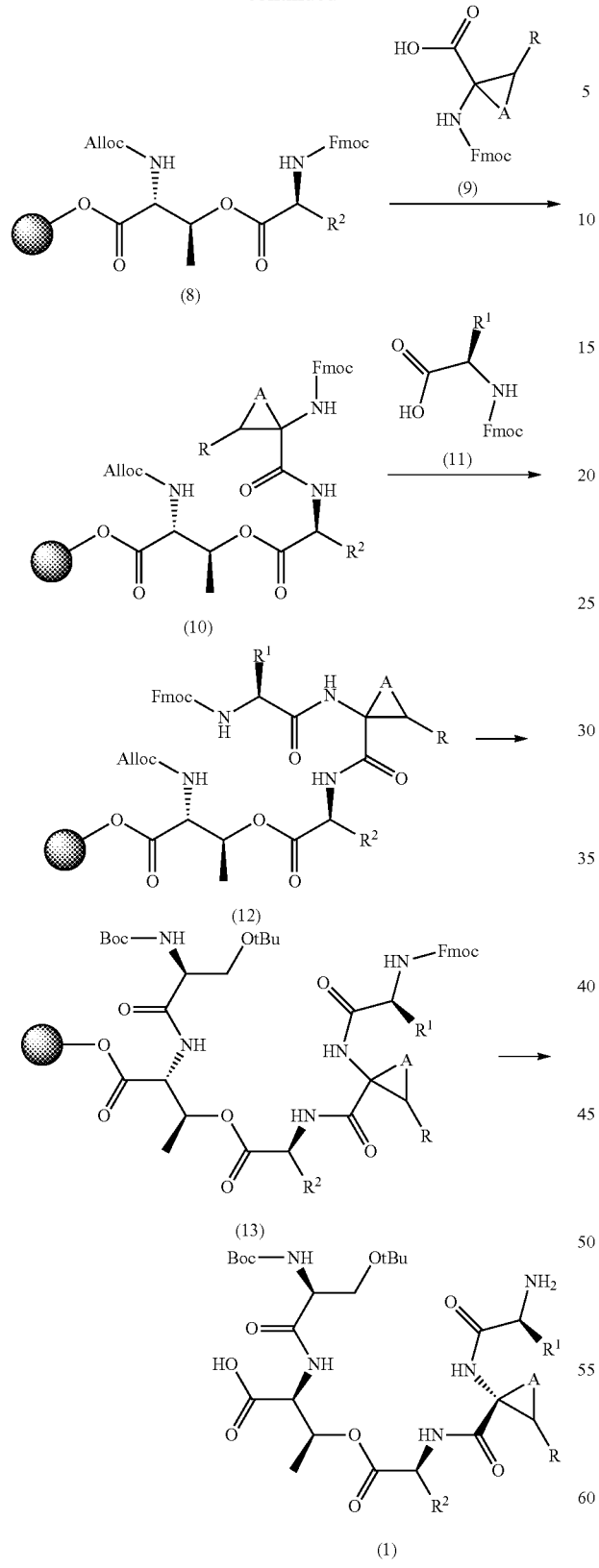

ane, and then react with compound (7) to give a resin compound (8). Then, the resin compound (8) can be removed the protective group Fmoc in the presence of piperidine, and then the product can be subjected to a condensation reaction with compound (9) to give a resin compound (10). Next, the resin compound (10) can be removed the protective group Fmoc in the presence of piperidine, and then the product can be subjected to a condensation reaction with compound (11) to give a resin compound (12). Next, the resin compound (12) can be removed the protective group Alloc in the presence of a palladium catalyst, and then the product can be subjected to a condensation reaction with Boc-Ser(OtBu)-OH to give a resin compound (13); finally, the resin compound (13) can be removed the protective group Fmoc in the presence of piperidine, and then the resin product can be cleaved in the presence of trifluoroethanol to give the intermediate having formula (1).

EXAMPLES

Synthesis of Intermediates

Intermediate (1-9): Synthesis of (1R,2S)-1-((((9H-fluoren-9-yl)methoxy)carbonyl)amino)-2-(2,2-difluoroethyl)cyclopropanecarboxylic acid

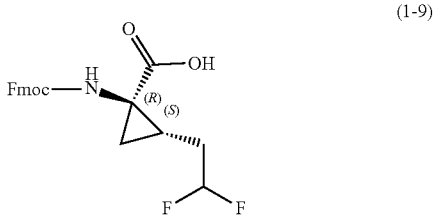

Synthetic Route 1:

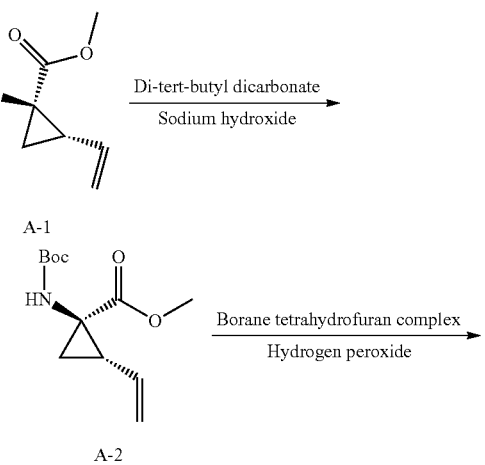

The intermediate having formula (1) can be synthesized by the method disclosed in synthesis scheme 2. First, 2-chloro-trityl resin (6) can be activated with dichlorometh- -continued

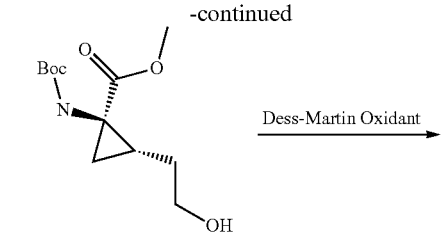

A-3

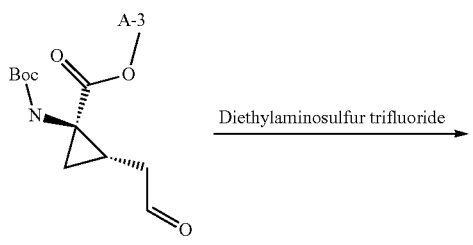

A-4

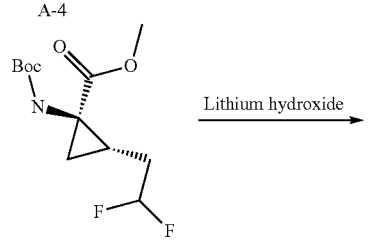

A-5

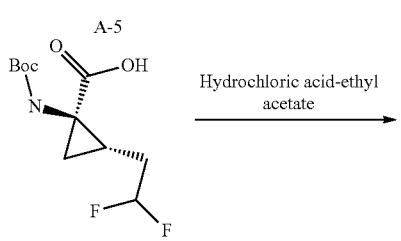

A-6

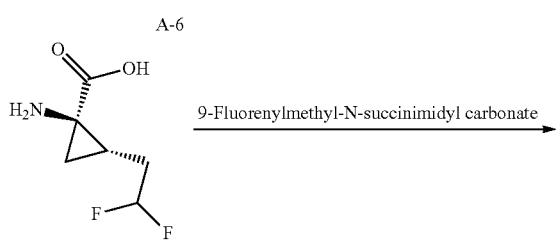

A-7

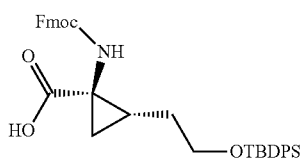

(1-9)

Intermediate (1-9) can be prepared by the method of synthetic route 1. First, compound A-1 can be protected by Boc under basic conditions to obtain compound A-2; then, compound A-2 can be subjected to hydroboration oxidation to obtain compound A-3; compound A-3 can be subjected to hydroxy oxidation under the condition of Dess-Martin oxidant to obtain compound A-4; compound A-4 can react under the condition of diethylaminosulfur trifluoride to obtain compound A-5; compound A-5 can undergo a hydrolysis reaction to obtain compound A-6; compound A-6 can be removed the Boc protecting group under acidic conditions to obtain compound A-7; finally, compound A-7 can be protected by Fmoc to obtain intermediate (1-9).

Intermediate 2: Synthesis of (1S,2R)-1-((((9H-fluoren-9-yl)methoxy)carbonyl)amino)-2-(2,2-difluoroethyl)cyclopropanecarboxylic acid

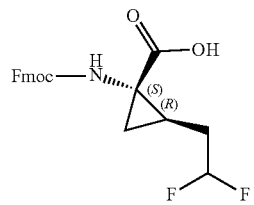

The synthesis method of intermediate 2 can be obtained by referring to the synthesis scheme of intermediate (1-9).

Intermediate 3: Synthesis of (1R,2S)-1-((((9H-fluoren-9-yl)methoxy)carbonyl)amino)-2-(2-((tert-butyldiphenylsilyl)oxy)ethyl)cyclopropanecarboxylic acid

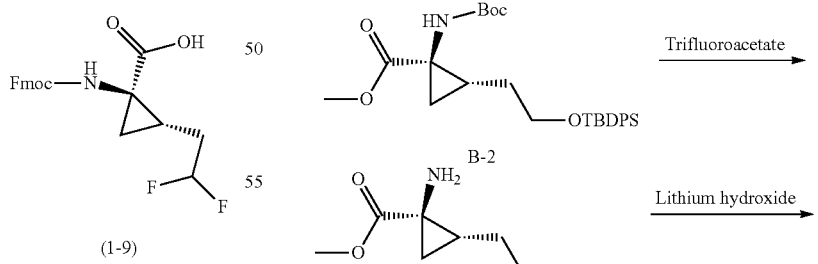

Synthetic Route 2:

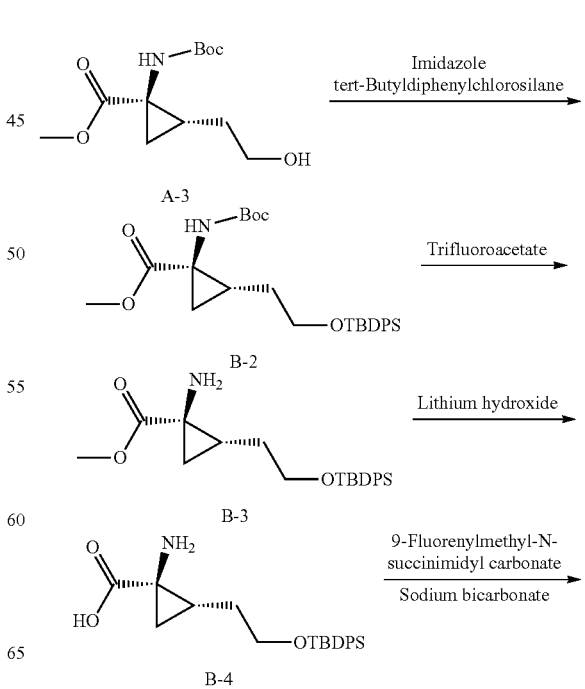

-continued

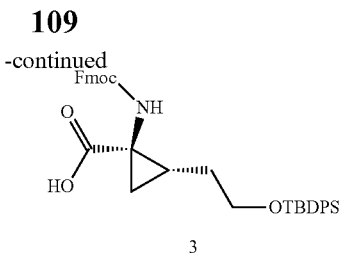

3

Intermediate 3 can be prepared by the method of synthetic route 2. First, compound A-3 can be protected by hydroxy to obtain compound B-2; then, compound B-2 can be removed the Boc protecting group under the condition of trifluoroacetic acid to obtain compound B-3; next, compound B-3 can undergo a hydrolysis reaction to obtain compound B-4; finally, compound B-4 can be protected by amino to obtain intermediate 3.

Intermediate 4: Synthesis of (1R,2R)-1-((((9H-fluoren-9-yl)methoxy)carbonyl)amino)-2-(2-((tert-butoxycarbonyl)amino)ethyl)cyclopropanecarboxylic acid

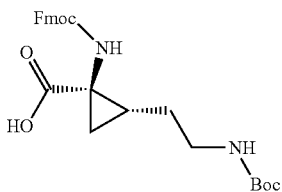

Synthetic Route 3:

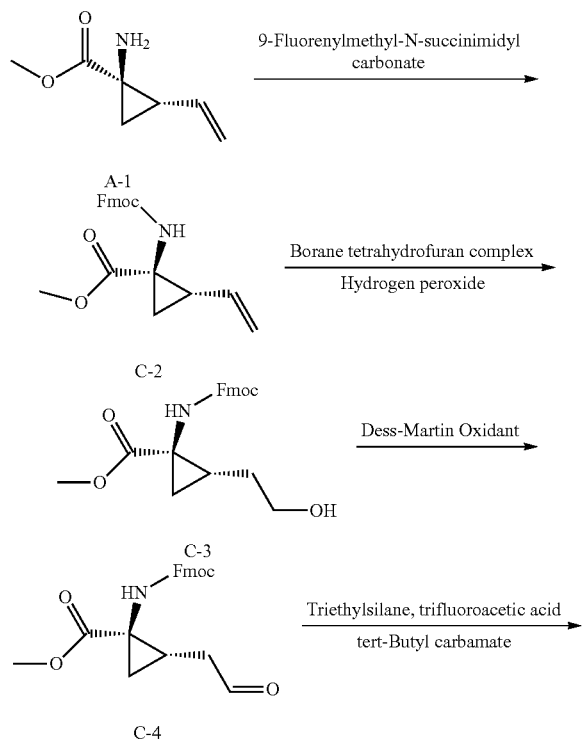

-continued

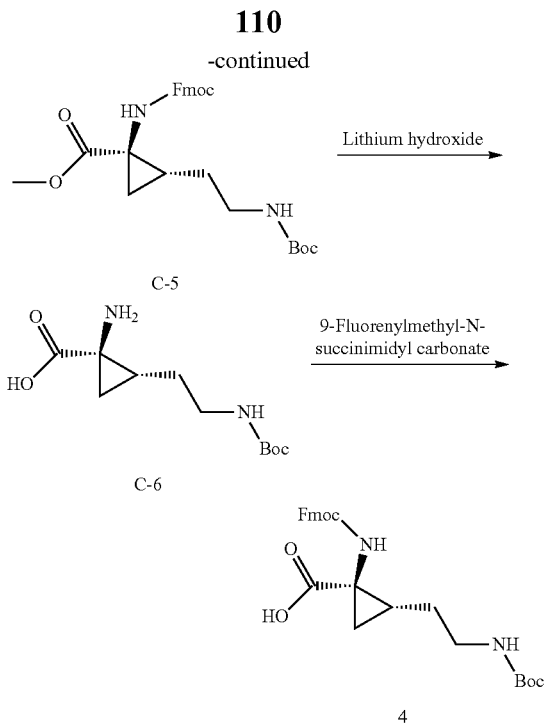

4

Intermediate 4 can be prepared by the method of synthetic route 3. First, compound A-1 can be protected by Fmoc to obtain compound C-2; then, compound C-2 can undergo hydroboration oxidation to obtain compound C-3; compound C-3 can be oxidized under the condition of Dess-Martin oxidant to obtain compound C-4; an aldehyde group of compound C-4 can undergo reductive amination to obtain compound C-5; next, compound C-5 can undergo a hydrolysis reaction to obtain compound C-6; finally, compound C-6 can be protected by Fmoc amino group to obtain intermediate 4.

Intermediate 5: Synthesis of (1R,2R)-1-((((9H-fluoren-9-yl)methoxy)carbonyl)amino)-2-(2-morpholinoethyl)cyclopropanecarboxylic acid

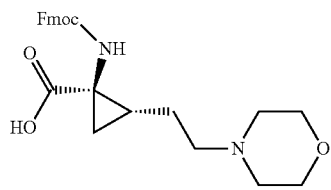

Synthetic Route 4:

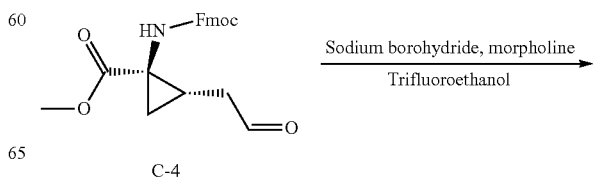

111
-continued

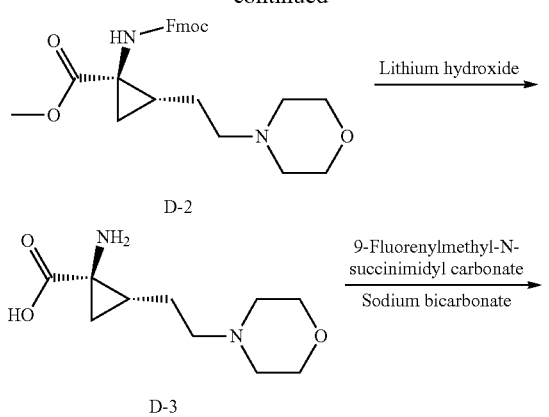

112
-continued

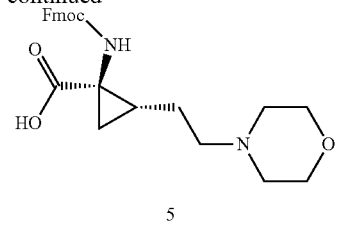

Intermediate 5 can be prepared by the method of synthetic route 4. First, compound C-4 and morpholine can be subjected to reductive amination to obtain compound D-2; then, compound D-2 can undergo a hydrolysis reaction to obtain compound D-3; finally, compound D-3 can be protected by Fmoc amino group to obtain intermediate 5.

Example 1 Compound (E1)

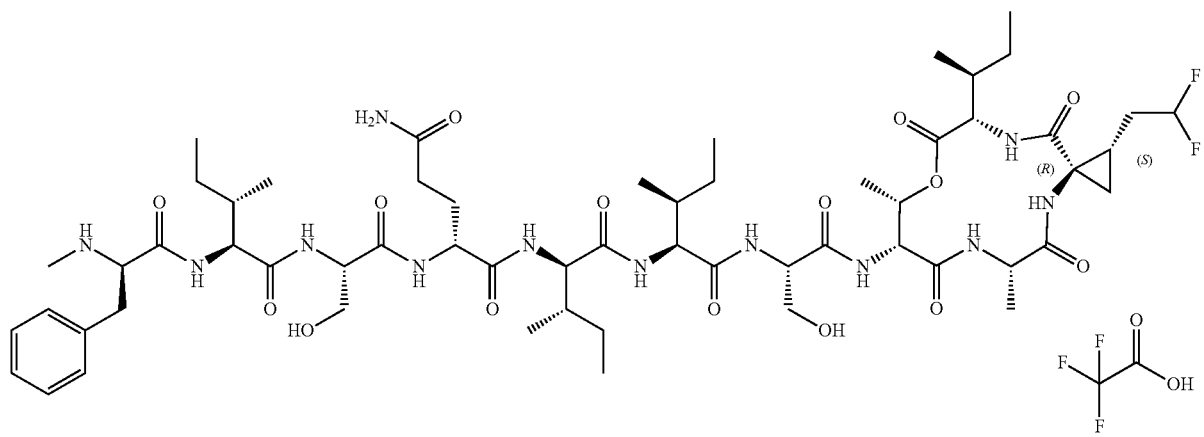

Synthetic Route:

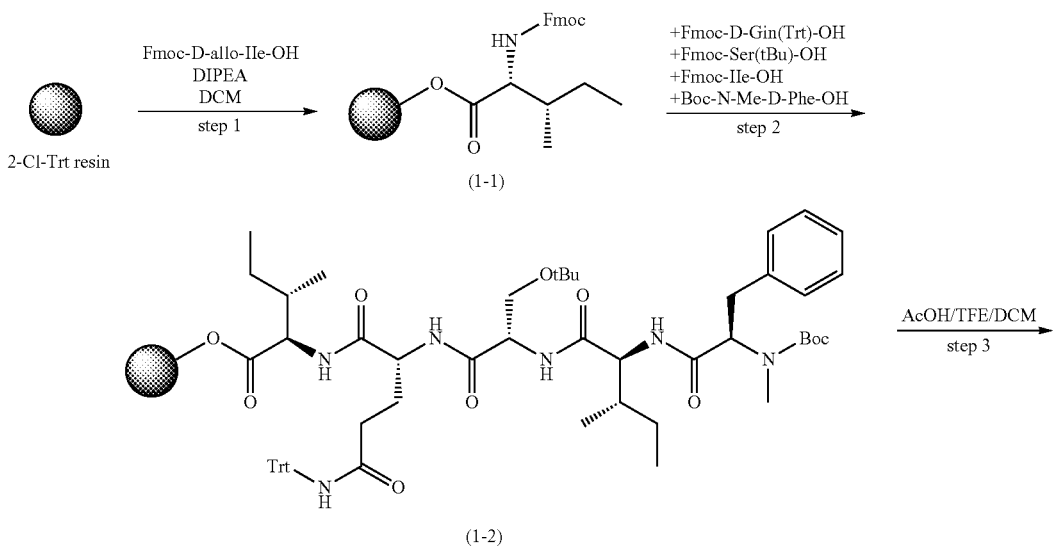

-continued
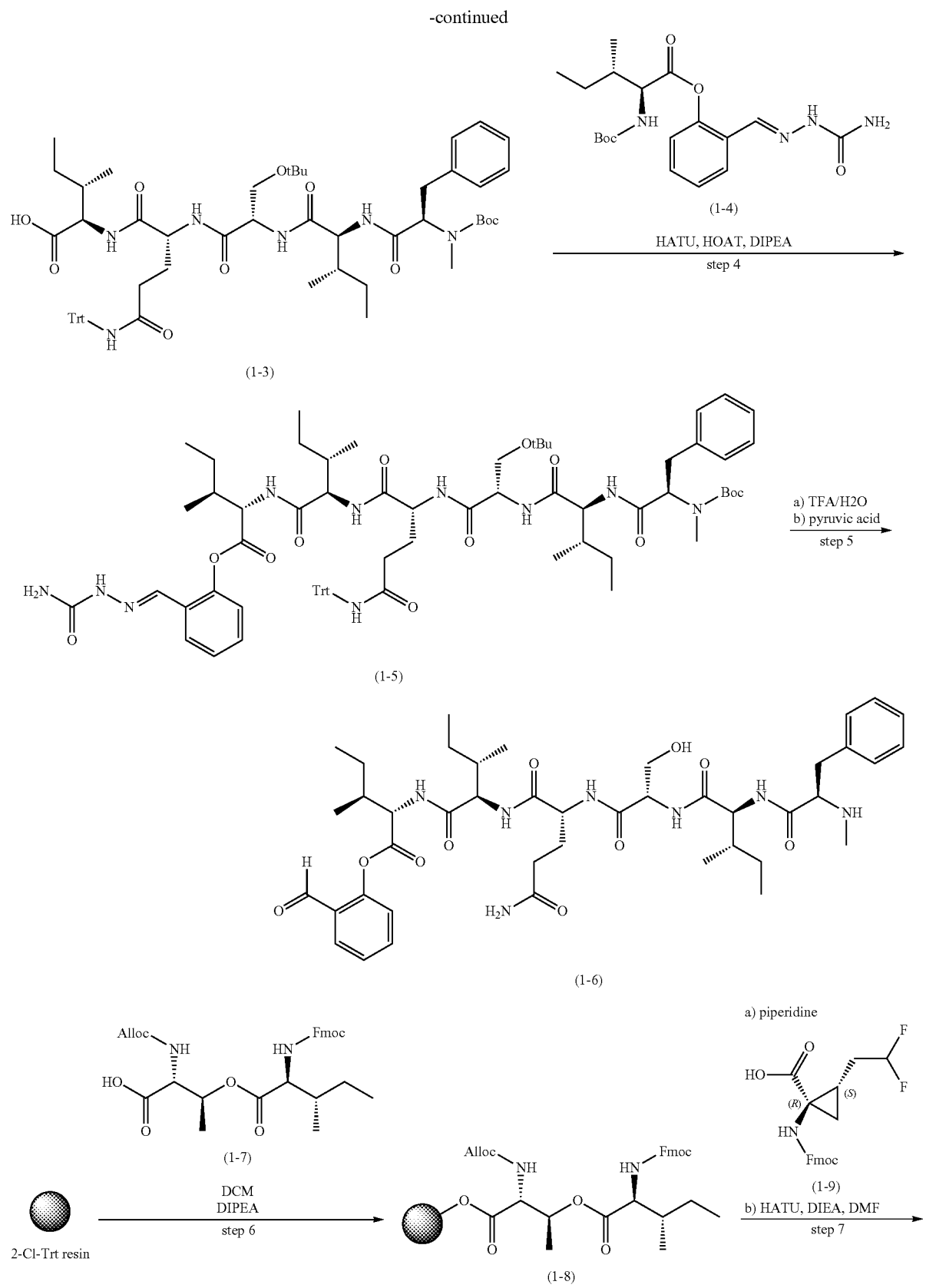

-continued
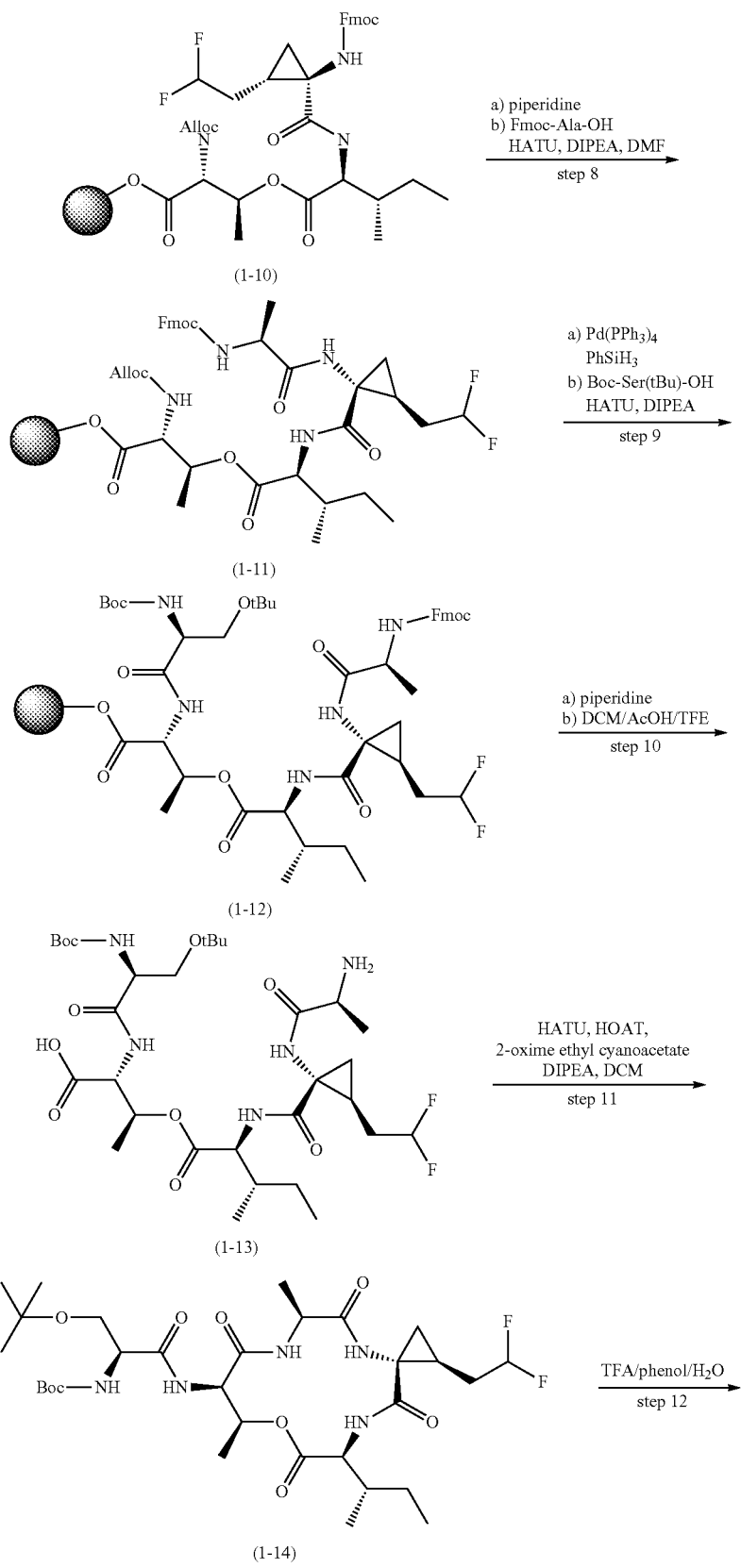

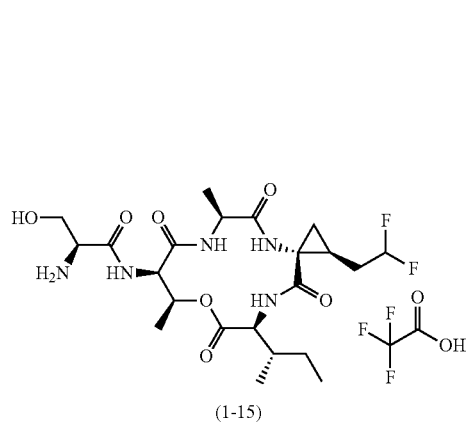

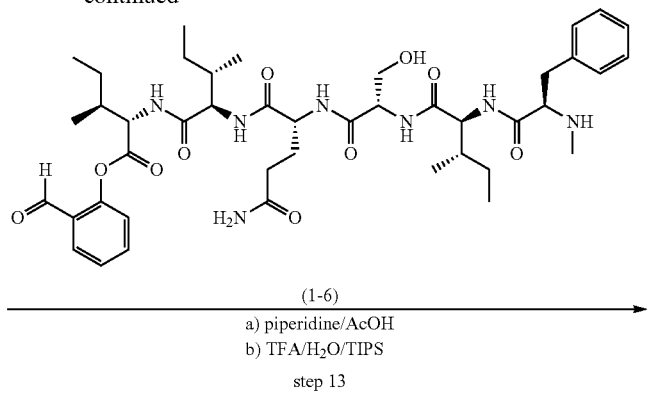

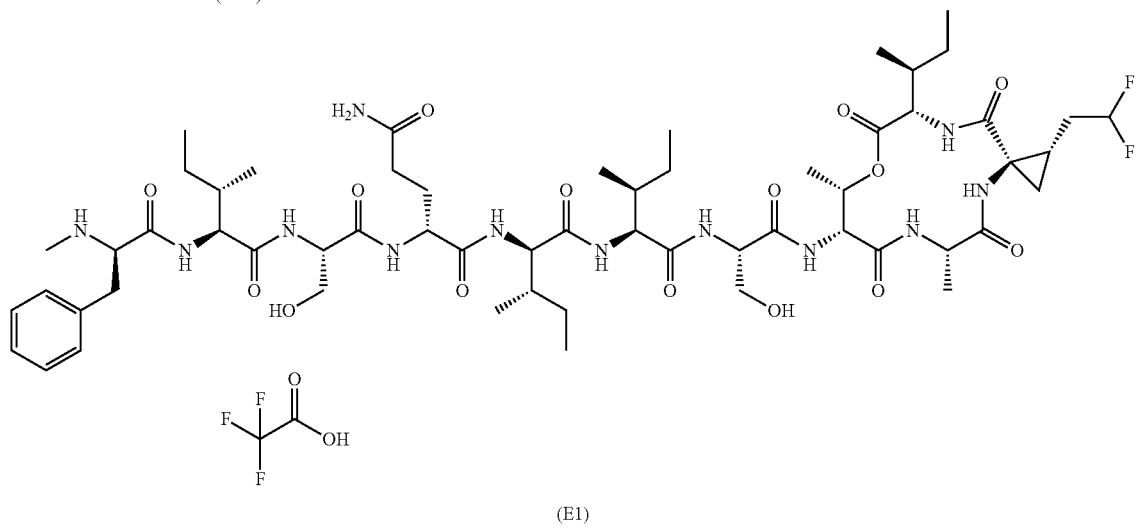

Step 1) Synthesis of Resin Compound (1-1)

2-Cl-Trt Resin (100 mg, 0.087 mmol, 0.873 mmoL/g) was added into a syringe (with a sieve), then dichloromethane (5 mL) was added. The mixture was shaken and swelled for 10 minutes, then washed with N, N-dimethylformamide (3×2 mL) and dichloromethane (3×2 mL) in turn. After washing, a solution of Fmoc-D-allo-Ile-OH (35.3 mg, 0.1 mmol) and DIPEA (34.8 µL, 0.2 mmol) in dichloromethane (2 mL) was added into the above resin. The mixture was shaken for 1.5 hours. After shaking, methanol (80 µL) was added and the resulting mixture was shaken for 30 minutes. After shaking, the resin was washed with dichloromethane (3×2 mL) and N, N-dimethylformamide (3×2 mL) respectively to obtain the title resin compound (1-1).

Step 2) Synthesis of Resin Compound (1-2)

A solution of 20% piperidine in N, N-dimethylformamide (2 mL) was added to the resin compound (1-1), and the mixture was shaken for 10 minutes. After shaking, the resin was washed with dichloromethane (3×2 mL) and N, N-dimethylformamide (3×2 mL) in turn. A mixed solution of Fmoc-D-Gln (Trt) —OH (0.21 g, 0.35 mmol), HATU (0.14 g, 0.35 mmol) and DIPEA (0.12 mL, 0.7 mmol) in N, N-dimethylformamide (5 mL) was added, and the mixture was shaken for 1 hour. After shaking, the resin was washed with dichloromethane (3×2 mL) and N, N-dimethylformamide (3×2 mL) in turn.

A solution of 20% piperidine in N, N-dimethylformamide (2 mL) was added to the above resin compound, and the mixture was shaken for 10 minutes. After shaking, the resin was washed with dichloromethane (3×2 mL) and N, N-dimethylformamide (3×2 mL) in turn. A mixed solution of Fmoc-Ser(tbu)-OH (0.135 g, 0.35 mmol), HATU (0.14 g, 0.35 mmol) and DIPEA (0.12 mL, 0.7 mmol) in N, N-dimethylformamide (2 mL) was then added, and the mixture was shaken for 1 hour. After shaking, the resin was washed with dichloromethane (3×2 mL) and N, N-dimethylformamide (3×2 mL) in turn.

A solution of 20% piperidine in N, N-dimethylformamide (2 mL) was added to the above resin compound, and the mixture was shaken for 10 minutes. After shaking, the resin was washed with dichloromethane (3×2 mL) and N, N-dimethylformamide (3×2 mL) in turn. A mixed solution of Fmoc-Ile-OH (0.125 g, 0.35 mmol), HATU (0.14 g, 0.35 mmol) and DIPEA (0.12 mL, 0.7 mmol) in N, N-dimethylformamide (5 mL) was added, and the mixture was shaken for 1 hour. After shaking, the resin was washed with dichloromethane (3×2 mL) and N, N-dimethylformamide (3×2 mL) in turn.

A solution of 20% piperidine in N, N-dimethylformamide (2 mL) was added to the above resin compound, and the mixture was shaken for 10 minutes. After shaking, the resin was washed with dichloromethane (3×2 mL) and N, N-dimethylformamide (3×2 mL) in turn. A mixed solution of Boc-N-Me-D-Phe-OH (0.100 g, 0.35 mmol), HATU (0.14 g, 0.35 mmol) and DIPEA (0.12 mL, 0.7 mmol) in N, N-dimethylformamide (5 mL) was added, and the mixture was shaken for 1 hour. After shaking, the resin was washed with dichloromethane (3×2 mL) and N, N-dimethylformamide (3×2 mL) in turn to obtain the title resin compound (1-2).

MS (ESI, pos.ion) m/z: 758.3 [M+H]$^+$.

Step 3) Synthesis of Compound (1-3)

To the resin compound (1-2) was added a mixed solution of methylene chloride/acetic acid/trifluoroethanol (v/v/v=8/1/1, 3 mL). Then the mixture was shaken for 1 hour, filtered, and the filtrate was collected. The solvent was removed, and the residue was purified by silica gel column chromatography (DCM/MeOH (v/v)=10/1) to give the title compound (1-3) [70 mg, total yield (steps 1 to 3): 80%] as a white solid.

Step 4) Synthesis of Compound (1-5)

To a round bottom flask was added (2S, 3S)-2-((E)-(2-carbamoylhydrazono) methyl) phenyl 2-((tert-butoxycarbonyl)amino)-3-methylpentanoate (1-4) (0.3 g, 0.8 mmol), then 4 mol/L hydrochloric acid-isopropanol solution (2 mL) was added thereto. The resulting mixture was stirred at 25° C. for 1 hour. After the reaction was complete, the solvent was removed, and the resulting crude hydrochloride was dissolved with a mixed solution of CHCl$_3$/TFE (v/v=3/1, 4 mL). To the resulting mixture were added compound (1-3) (0.31 g, 0.24 mmol), HATU (179 mg, 0.24 mmol), HOAT (62 mg, 0.24 mmol) and DIPEA (88 μL, 0.5 mmol). The mixture was stirred at room temperature overnight. The solvent was removed, and the obtained residue was purified by silica gel column chromatography (DCM/MeOH (v/v)=10/1) to give the title compound (1-5) [320 mg, yield: 53%] as a white solid.

Step 5) Synthesis of Compound (1-6)

To the compound (1-5) (320 mg, 0.44 mmol) was added a mixed solution of TFA/H$_2$O (v/v=95/5, 5 mL). The mixture was stirred at 25° C. for 1.5 hours, and then pyruvic acid (5 mL) was added thereto. The resulting mixture was continued stirring at 25° C. for 2 hours. After the reaction was complete, the solvent was removed, and the residue was purified by preparative chromatography (gradient elution, mobile phase: 5%-50% ratio of CH$_3$CN in H$_2$O, elution for 30 minutes) to obtain the title compound (1-6) (50 mg, yield 25%) as a white solid.

MS (ESI, poi.ion) m/z: 838.4 [M+H]$^+$.

Step 6) Synthesis of Resin Compound (1-8)

2-Cl-Trt Resin (200 mg, 0.175 mmol, 0.873 mmoL/g) was added into a syringe with a sieve, then dichloromethane (2 mL) was added. The mixture was shaken for 10 minutes, then washed with N, N-dimethylformamide (3×2 mL) and dichloromethane (3×2 mL) in turn. After washing, a solution of (2R,3S)-3-(((2S,3S)-2-((((9H-fluoren-9-yl)methoxy)carbonyl)amino)-3-methylpentanoyl)oxy)-2-(((allyloxy)carbonyl)amino)butanoic acid (1-7) (188 mg, 0.35 mmol) and DIPEA (0.18 μL, 1 mmol) in dichloromethane (5 mL) was added into the above resin. The mixture was shaken for 1.5 hours. After shaking, methanol (0.16 mL) was added and the resulting mixture was shaken for 30 minutes. After shaking, the resin was washed with dichloromethane (3×2 mL) and N, N-dimethylformamide (3×2 mL) in turn to obtain the title resin compound (1-8).

Step 7) Synthesis of Resin Compound (1-10)

To the resin bond (1-8) was added a solution of 20% piperidine in N, N-dimethylformamide (2 mL), and the mixture was shaken for 1 minutes. After shaking, the resin was washed with dichloromethane (3×3 mL) and N, N-dimethylformamide (3×3 mL) in turn. To the mixture was added a solution of (1R,2S)-1-((((9H-fluoren-9-yl)methoxy)carbonyl)amino)-2-(2,2-difluoroethyl)cyclopropanecarboxylic acid (1-9) (280 mg, 0.7 mmol), HATU (0.28 g, 0.7 mmol) and DIPEA (0.23 mL, 1.4 mmol) in N, N-dimethylformamide (3 mL). The resulting mixture was shaken for 1 hour. After shaking, the resin was washed with dichloromethane (3×3 mL) and N, N-dimethylformamide (3×3 mL) in turn to obtain the title resin compound (1-10).

Step 8) Synthesis of Resin Compound (1-11)

To the resin compound (1-10) was added a solution of 20% piperidine in N, N-dimethylformamide (2 mL), and the mixture was shaken for 1 minutes. After shaking, the resin was washed with dichloromethane (3×3 mL) and N, N-dimethylformamide (3×3 mL) in turn. A solution of Fmoc-Ala-OH (0.56 g, 1.7 mmol), HATU (0.68 g, 1.7 mmol) and DIPEA (0.44 mL, 2.6 mmol) in N, N-dimethylformamide (3 mL) was added, and the mixture was shaken for 1 hour. After shaking, the resin was washed with dichloromethane (3×3 mL) and N, N-dimethylformamide (3×3 mL) in turn to obtain the title resin compound (1-11).

Step 9) Synthesis of Resin Compound (1-12)

To the resin compound (1-11) were added dichloromethane (5 mL), phenylsilane (0.52 mL, 4.0 mmol) and tetrakis (triphenylphosphine) palladium (192 mg, 0.17 mmol) under argon protection. The mixture was shaken for 30 minutes. After shaking, the resin compound was washed with dichloromethane (3×3 mL) and N, N-dimethylformamide (3×3 mL) in turn. After washing, a mixed solution of Boc-Ser (OtBu) —OH (0.46 g, 1.68 mmol), HATU (0.66 g, 1.68 mmol) and DIPEA (0.4 mL, 2 mmol) in N, N-dimethylformamide (4 mL) was added. The resulting mixture was continued to shake for 1 hour. After shaking, the resin was washed with dichloromethane (3×3 mL) and N, N-dimethylformamide (3×3 mL) in turn to obtain the title resin compound (1-12).

Step 10) Synthesis of Compound (1-13)

To the resin compound (1-12) was added a solution of 20% piperidine in N, N-dimethylformamide (2 mL), and the mixture was shaken for 1 minutes. After shaking, the resin was washed with dichloromethane (3×3 mL) and N, N-dimethylformamide (3×3 mL) in turn. To the resulting mixture was added a mixed solution of methylene chloride/acetic acid/trifluoroethanol (v/v/v=8/1/1, 3 mL). Then the mixture was continued to shake for 1 hour. After shaking, the filtrate was collected and the solvent was removed to obtain the title compound (1-13) (66 mg, total yield (Step 6 to 10): 56%) as a white solid.

MS (ESI, poi.ion) m/z: 694.3 [M+H]$^+$.

Step 11) Synthesis of Compound (1-14)

To a round-bottom flask was added compound (1-13) (92 mg, 0.13 mmol), then dichloromethane (200 mL) was added. HOAT (36 mg, 0.26 mmol), 2-oxime ethyl cyanoacetate (38 mg, 0.26 mmol), HATU (159 mg, 0.4 mmol) and DIPEA (0.14 mL, 0.8 mmol) were added under ice bath. The resulting mixture was stirred at 25° C. for 24 hours. After the reaction was complete, the solvent was removed and the residue was purified by preparative chromatography (gradient elution, mobile phase: 15%-50% ratio of CH₃CN in H₂O, elution for 30 minutes) to obtain the title compound (1-14) (53 mg, yield 59%) as a white solid.

MS (ESI, poi.ion) m/z: 676.3 [M+H]⁺.

Step 12) Synthesis of Compound (1-15)

To a round bottom flask was added compound (1-14) (53 mg, 0.078 mmol). then a mixed solution of trifluoroacetic acid/phenol/water (v/v/v=95/2.5/2.5, 5 mL) was added. The resulting mixture was stirred at 25° C. for 2 hours, then the reaction was stopped, the solvent was removed, and the residue was purified by preparative chromatography (gradient elution, mobile phase: 15%-50% ratio of CH₃CN in H₂O, elution for 30 minutes) to obtain the title compound (1-15) (40 mg, 85% yield) as a white solid.

MS (ESI, poi.ion) m/z: 520.3 [M+H]⁺.

Step 13) Synthesis of Compound (E1)

To a round bottom flask were added compound (1-6) (75 mg, 0.089 mmol) and compound (1-15) (45 mg, 0.086 mmol). then a mixed solution of pyridine/acetic acid (molar ratio: 6/1, 5 mL) was added. The mixture was stirred at 25° C. for 10 hours. Then the solvent was removed, and a mixed solution of trifluoroacetic acid/water/triisopropylsilane (v/v/v=94/5/1, 10 mL) was added. The resulting mixture was continued stirring for 2 hours. The solvent was removed, and the residue was purified by preparative chromatography (gradient elution, mobile phase: 15%-50% ratio of CH₃CN in H₂O, elution for 30 minutes) to obtain the title compound (E1) (30 mg, yield 30%) as a white solid.

MS (ESI, poi.ion) m/z: 1235.7 [M+H]⁺;

¹H NMR (600 MHz, CD₃OD) δ(ppm): 8.38-8.22 (m, 2H), 7.50-7.23 (m, 5H), 7.19 (s, 1H), 6.16-5.79 (m, 2H), 5.49 (s, 1H), 4.87-4.79 (m, 3H), 4.48-4.45 (m, 3H), 4.34-4.31 (m, 3H), 4.14-4.13 (m, 3H), 3.95-3.79 (m, 3H), 3.83-3.77 (m, 1H), 3.31-3.04 (m, 3H), 2.70 (s, 3H), 2.41 (s, 1H), 2.31-2.22 (m, 3H), 2.14-1.84 (m, 5H), 1.61-1.51 (m, 5H), 1.42-1.41 (m, 3H), 1.33-1.32 (m, 3H), 1.27-1.05 (m, 5H), 0.98-0.91 (m, 15H), 0.75-0.74 (m, 7H).

Example 2 Compound (E2)

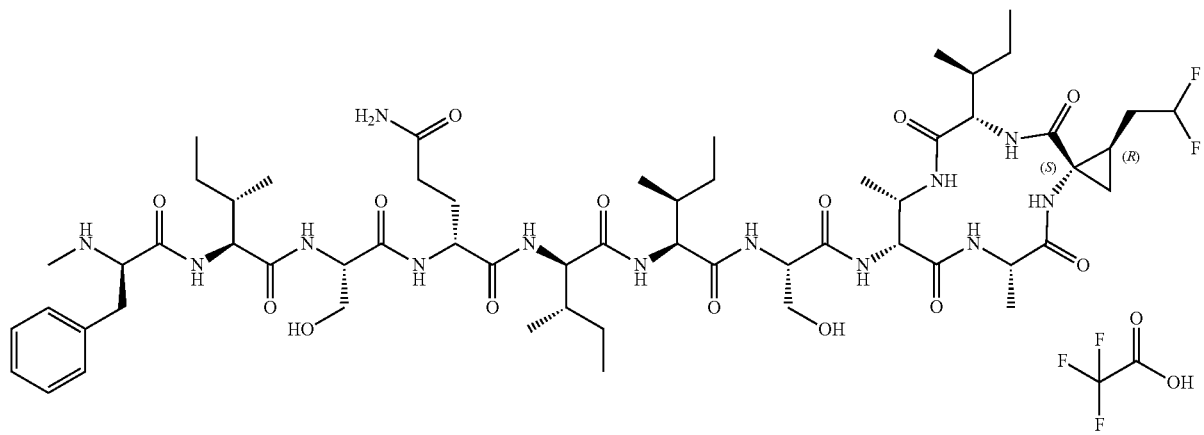

(E2)

The compound (1S,2R)-1-((((9H-fluoren-9-yl)methoxy) carbonyl) amino)-2-(2,2-difluoroethyl) cyclopropanecarboxylic acid was used instead of (1R,2S)-1-((((9H-fluoren-9-yl)methoxy)carbonyl)amino)-2-(2,2-difluoroethyl) cyclopropanecarboxylic acid (1-9) in step 7 of example 1. According to the method described in example 1, the title compound (E2) (16.9 mg, yield 21.4%) was prepared as a white solid.

MS (ESI, poi.ion) m/z: 1235.6 [M+H]⁺;

¹H NMR (600 MHz, CD₃OD) δ(ppm): 7.66-7.01 (m, 8H), 6.14-5.89 (m, 2H), 5.54 (s, 1H), 4.76 (s, 3H), 4.47-4.44 (m, 3H), 4.36-4.23 (m, 4H), 4.13-4.08 (m, 3H), 3.90-3.79 (m, 4H), 3.27-3.08 (m, 3H), 2.71 (s, 3H), 2.33-2.27 (m, 4H), 2.17-1.75 (m, 7H), 1.76-1.05 (m, 15H), 0.97-0.75 (m, 19H).

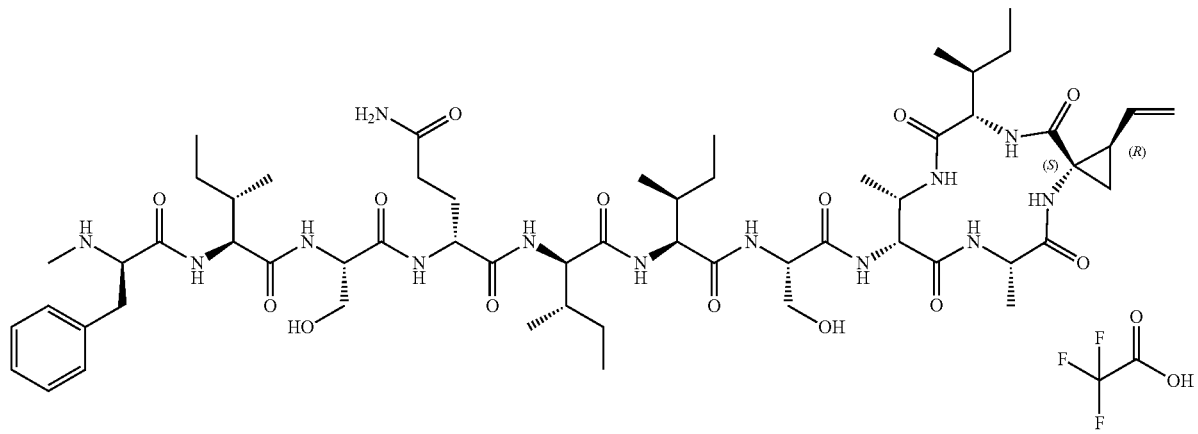

(E3)

(1S,2R)-1-(((((9H-fluoren-9-yl)methoxy)carbonyl) amino)-2-vinylcyclopropanecarboxylic acid was used instead of (1R, 2S)-1-((((9H-fluoren-9-yl)methoxy)carbonyl)amino)-2-(2,2-difluoroethyl) cyclopropanecarboxylic acid (1-9) in step 7 of example 1. According to the method described in example 1, the title compound (E3) (45 mg, yield 30.2%) was prepared as a white solid.

MS (ESI, poi.ion) m/z: 599.5 [½M+H]⁺;

$^1$H NMR (600 MHz, DMSO-d$_6$) δ (ppm): 9.02 (d, J=46.2 Hz, 2H), 8.49 (d, J=8.3 Hz, 1H), 8.44-8.34 (m, 2H), 8.09 (dd, J=25.6, 8.8 Hz, 2H), 8.01-7.87 (m, 3H), 7.82 (d, J=8.9 Hz, 1H), 7.42 (d, J=9.9 Hz, 1H), 7.32 (t, J=7.3 Hz, 2H), 7.29-7.21 (m, 4H), 6.79 (s, 1H), 5.41-5.34 (m, 1H), 5.34-5.15 (m, 3H), 5.03 (dd, J=9.2, 2.8 Hz, 1H), 4.95 (s, 1H), 4.58 (dd, J=9.8, 2.0 Hz, 1H), 4.43-4.31 (m, 3H), 4.28 (dd, J=11.6, 6.2 Hz, 1H), 4.22-4.10 (m, 3H), 4.05 (dt, J=9.9, 8.5 Hz, 2H), 3.74-3.62 (m, 2H), 3.57 (dd, J=18.8, 15.4 Hz, 2H), 3.11 (dd, J=13.3, 5.4 Hz, 1H), 2.97 (dd, J=13.2, 9.6 Hz, 1H), 2.46 (s, 3H), 2.09 (dd, J=15.2, 8.5 Hz, 2H), 2.00 (dd, J=16.2, 8.1 Hz, 1H), 1.85 (dt, J=14.5, 5.9 Hz, 1H), 1.81-1.73 (m, 2H), 1.71-1.60 (m, 3H), 1.54 (td, J=9.7, 3.6 Hz, 1H), 1.46-1.36 (m, 3H), 1.31-1.21 (m, 6H), 1.15 (dd, J=17.6, 6.2 Hz, 4H), 1.10-1.00 (m, 3H), 0.87-0.75 (m, 19H), 0.67-0.56 (m, 6H).

Example 4 Compound (E4)

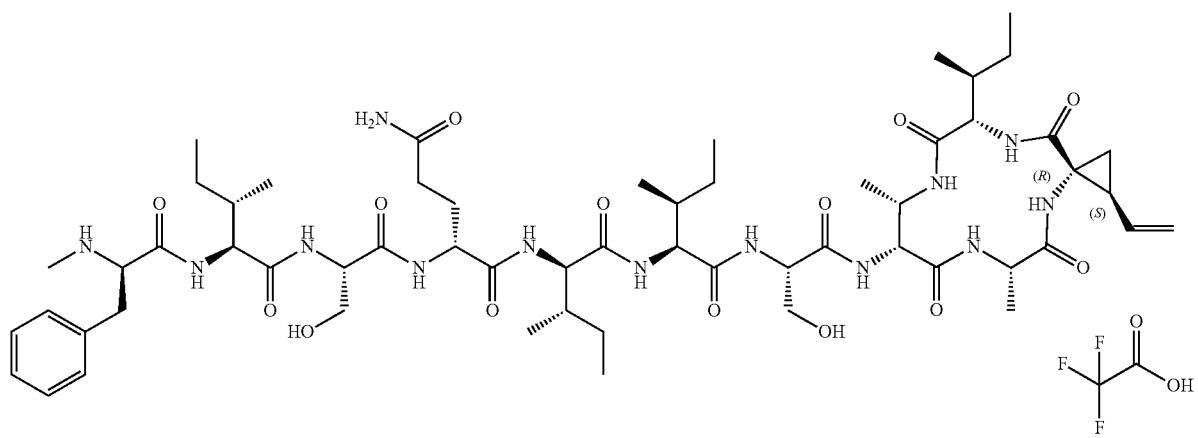

(E4)

The compound (1R,2S)-1-((((9H-fluoren-9-yl)methoxy)carbonyl)amino)-2-vinylcyclopropanecarboxylic acid was used instead of (1R,2S)-1-((((9H-fluoren-9-yl)methoxy)carbonyl)amino)-2-(2,2-difluoroethyl) cyclopropanecarboxylic acid (1-9) in step 7 of example 1. According to the method described in example 1, the title compound (E4) (9.4 mg, yield 24.0%) was prepared as a white solid.

MS (ESI, poi.ion) m/z: 599.9 [½M+H]⁺;
HRMS (ESI, pos. ion) m/z: 1197.6879 [M+H]+, (C₅₈H₉₂N₁₂O₁₅) [M+H]⁺ Theoretical value: 1197.6805;

Example 5 Compound (E5)

(E5)

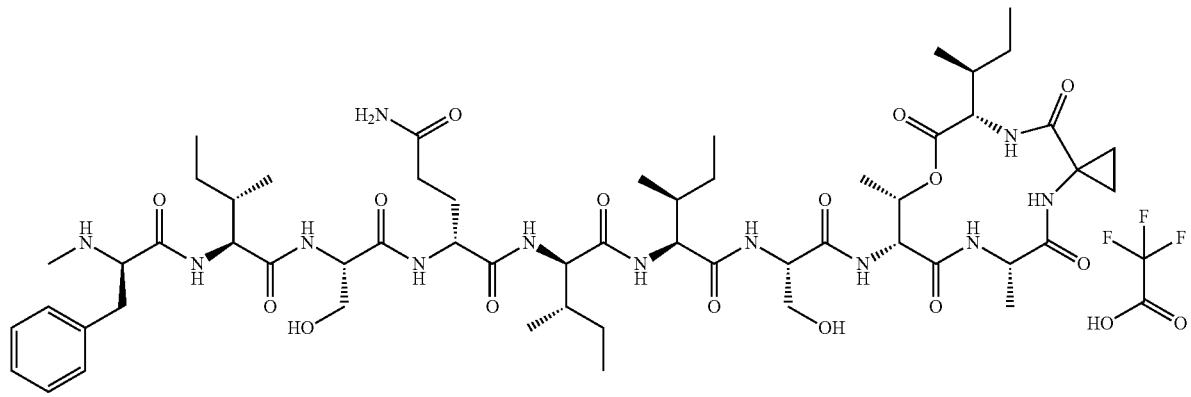

1-((((9H-Fluoren-9-yl)methoxy)carbonyl)amino)cyclopropanecarboxylic acid was used instead of (1R, 2S)-1-((((9H-fluoren-9-yl)methoxy)carbonyl)amino)-2-(2,2-difluoroethyl) cyclopropanecarboxylic acid (1-9) in step 7 of example 1. According to the method described in example 1, the title compound (E5) (12.0 mg, yield 33.3%) was prepared as a white solid.

MS (ESI, poi.ion) m/z: 1171.6 [M+H]⁺;
¹H NMR (400 MHz, CDCl₃): δ (ppm): 9.00 (d, J=39.6 Hz, 3H), 8.49 (d, J=5.2 Hz, 1H), 8.37 (d, J=3.6 Hz, 1H), 8.32 (s, 1H), 8.18 (d, J=6.4 Hz, 1H), 8.05 (d, J=5.2 Hz, 1H), 7.90-7.97 (m, 3H), 7.82 (d, J=5.6 Hz, 1H), 7.32 (t, J=4.8 Hz, 2H), 7.19-7.28 (m, 4H), 7.10 (d, J=5.6 Hz, 1H), 6.79 (s, 1H), 5.33-5.35 (m, 1H), 5.21 (s, 1H), 4.94 (s, 1H), 4.60 (dd, J=1.6, 6.8 Hz, 1H), 4.31-4.42 (m, 4H), 4.08-4.21 (m, 4H), 4.00 (t, J=6.4 Hz, 1H), 3.52-3.69 (m, 4H), 3.11 (dd, J=4.0, 9.2 Hz, 1H), 2.97 (dd, J=6.0, 8.0 Hz, 1H), 2.50 (dt, J=1.2, 91.2 Hz, 1H), 2.46 (s, 2H), 1.98-2.13 (m, 4H), 1.68-1.87 (m, 5H), 1.39-1.55 (m, 4H), 0.70-1.32 (m, 28H), 0.64 (t, J=5.2 Hz, 3H), 0.59 (d, J=4.4 Hz, 3H).

Example 6 Compound (E6)

(E6)

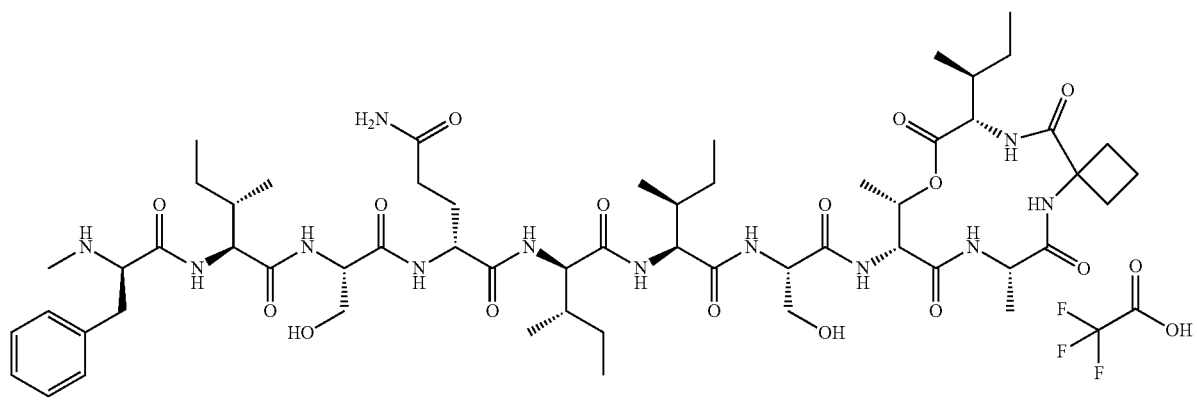

1-((((9H-Fluoren-9-yl)methoxy)carbonyl)amino)cyclobutanecarboxylic acid was used instead of (1R, 2S)-1-((((9H-fluoren-9-yl)methoxy)carbonyl)amino)-2-(2,2-difluoroethyl) cyclopropanecarboxylic acid (1-9) in step 7 of example 1. According to the method described in example 1, the title compound (E6) (38.0 mg, yield 33.5%) was prepared as a white solid.

MS (ESI, poi.ion) m/z: 1185.7[M+H]$^+$;

$^1$H NMR (600 MHz, DMSO-d$_6$) δ (ppm): 9.09 (s, 2H), 8.50 (m, J=8.3 Hz, 1H), 8.35 (m, J=5.1 Hz, 1H), 8.26 (s, 1H), 8.17 (m, J=7.1 Hz, 1H), 8.05 (m, J=7.9 Hz, 1H), 7.98-7.88 (m, 2H), 7.82 (m, J=13.2, 8.4 Hz, 2H), 7.37 (d, J=9.7 Hz, 1H), 7.31 (t, J=7.3 Hz, 2H), 7.27 (d, J=7.2 Hz, 1H), 7.23 (t, J=9.5 Hz, 3H), 6.78 (s, 1H), 5.29 (m, J=6.4, 2.6 Hz, 1H), 4.50 (m, J=8.1 Hz, 1H), 4.41-4.30 (m, 4H), 4.25-4.12 (m, 4H), 4.08 (t, J=9.8 Hz, 1H), 3.68 (m, J=10.3, 5.9 Hz, 1H), 3.65-3.56 (m, 2H), 3.53 (dd, J=10.7, 5.5 Hz, 2H), 3.12 (dd, J=13.3, 5.4 Hz, 1H), 2.97 (m, J=13.2, 9.7 Hz, 1H), 2.77 (m, J=11.9, 8.4 Hz, 1H), 2.47 (s, 3H), 2.20 (t, J=10.1 Hz, 1H), 2.08 (m, J=18.1, 7.9 Hz, 3H), 1.91-1.63 (m, 7H), 1.54 (m, J=6.2 Hz, 1H), 1.49-1.36 (m, 2H), 1.28 (m, J=27.6, 16.8 Hz, 5H), 1.20-0.97 (m, 7H), 0.93-0.68 (m, 19H), 0.67-0.53 (m, 6H).

Example 7 Compound (E7)

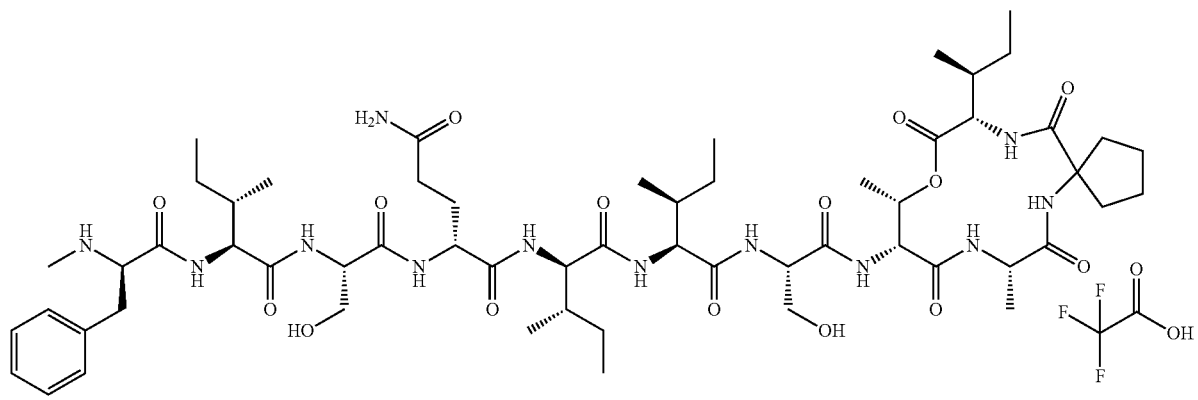

(E7)

1-((((9H-Fluoren-9-yl)methoxy)carbonyl)amino)cyclopentanoic acid was used instead of (1R, 2S)-1-((((9H-fluoren-9-yl)methoxy)carbonyl)amino)-2-(2,2-difluoroethyl) cyclopropanecarboxylic acid (1-9) in step 7 of example 1. According to the method described in example 1, the title compound (E7) (13.4 mg, yield 27.2%) was prepared as a white solid.

MS (ESI, poi.ion) m/z: 1200.4[M+H]$^+$;

$^1$H NMR (600 MHz, DMSO-d$_6$) δ (ppm): δ 8.55 (d, J=68.6 Hz, 1H), 8.19-7.89 (m, 3H), 7.80 (s, 1H), 7.37-7.05 (m, 5H), 6.86-6.50 (m, 1H), 5.28 (d, J=54.3 Hz, 1H), 4.98 (s, 1H), 4.54 (s, 1H), 4.32 (s, 2H), 4.24-4.05 (m, 2H), 3.78 (s, 1H), 3.59 (s, 3H), 2.91 (s, 1H), 2.62 (s, 1H), 2.39 (s, 2H), 2.17-1.95 (m, 3H), 1.81 (s, 4H), 1.71 (s, 1H), 1.58 (s, 3H), 1.42 (d, J=43.8 Hz, 3H), 1.27 (d, J=33.0 Hz, 10H), 1.14-1.05 (m, 4H), 0.91-0.74 (m, 13H), 0.65 (d, J=12.5 Hz, 3H).

Example 8 Compound (E8)

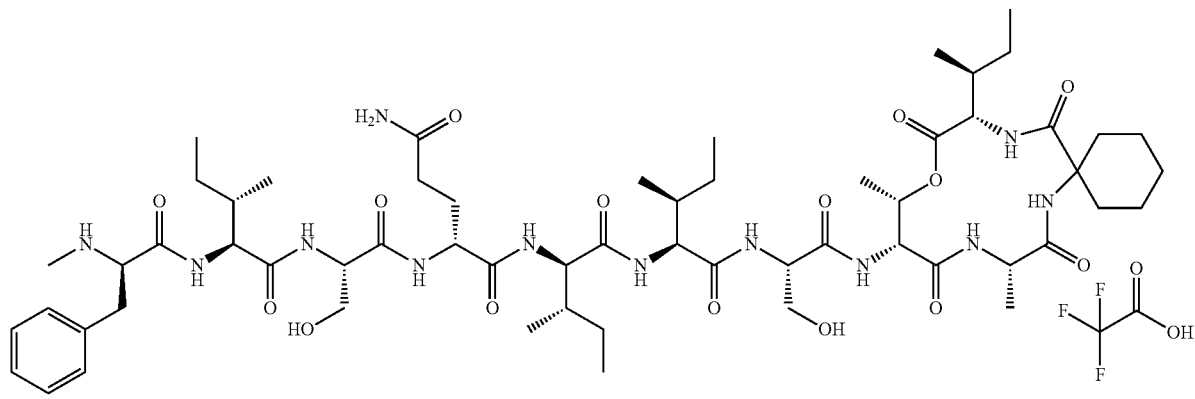

(E8)

1-((((9H-Fluoren-9-yl)methoxy)carbonyl)amino)cyclohexanoic acid was used instead of (1R, 2S)-1-((((9H-fluoren-9-yl)methoxy)carbonyl)amino)-2-(2,2-difluoroethyl) cyclopropanecarboxylic acid (1-9) in step 7 of example 1. According to the method described in example 1, the title compound (E8) (25.2 mg, yield 23.2%) was prepared as a white solid.

MS (ESI, poi.ion) m/z: 1214.7 [M+H]$^+$;

$^1$H NMR (400 MHz, CD$_3$OD): δ (ppm): 7.47-7.17 (m, 5H), 5.51 (s, 1H), 5.36 (s, 1H), 4.51-4.40 (m, 5H), 4.32 (m, J=7.1, 4.0 Hz, 2H), 4.18 (m, J=10.3 Hz, 1H), 4.05 (m, J=7.4 Hz, 2H), 3.88 (m, J=16.7, 9.9 Hz, 2H), 3.79 (m, J=5.7 Hz, 1H), 3.21 (s, 1H), 3.11 (m, J=22.3, 12.4 Hz, 1H), 2.78 (s, 2H), 2.68 (s, 3H), 2.33 (m, J=7.2 Hz, 2H), 2.02 (s, 3H), 1.92 (s, 4H), 1.60 (m, J=35.2 Hz, 8H), 1.45 (m, J=7.0 Hz, 5H), 1.40-1.05 (m, 18H), 0.87 (m, J=53.0, 9.7, 4.2 Hz, 27H).

Example 9 Compound (E9)

((((9H-fluoren-9-yl)methoxy)carbonyl)amino)-2-(2,2-difluoroethyl) cyclopropanecarboxylic acid (1-9) in step 7 of example 1. According to the method described in example 1, the title compound (E9) (12.0 mg, yield 33.3%) was prepared as a white solid.

MS (ESI, poi.ion) m/z: 1227.7 [M+H]$^+$;

$^1$H NMR (600 MHz, DMSO-d$_6$) δ (ppm): 9.12 (s, 1H), 9.00 (s, 1H), 8.50 (d, J=8.3 Hz, 1H), 8.28 (d, J=5.6 Hz, 1H), 8.02 (d, J=7.9 Hz, 1H), 7.97 (d, J=8.3 Hz, 1H), 7.94-7.87 (m, 3H), 7.82 (dd, J=19.2, 8.1 Hz, 3H), 7.72 (s, 1H), 7.56-7.45 (m, 3H), 7.39 (t, J=11.7 Hz, 2H), 7.21 (s, 1H), 6.77 (s, 1H), 5.23 (s, 2H), 4.95 (s, 1H), 4.45 (d, J=5.9 Hz, 2H), 4.35 (ddd, J=34.0, 18.0, 13.0 Hz, 5H), 4.22 (d, J=8.2 Hz, 1H), 4.08 (dt, J=19.4, 8.7 Hz, 2H), 3.68 (s, 1H), 3.62-3.56 (m, 2H), 3.52 (d, J=4.8 Hz, 1H), 3.14 (dd, J=13.1, 9.7 Hz, 1H), 2.40 (d, J=11.8 Hz, 1H), 2.17 (dd, J=14.2, 9.5 Hz, 1H), 2.10-2.04 (m, 3H), 1.92 (s, 1H), 1.82-1.72 (m, 4H), 1.71-1.63 (m, 1H), 1.44 (d, J=56.1 Hz, 12H), 1.32-1.21 (m, 6H), 1.18-1.13 (m,

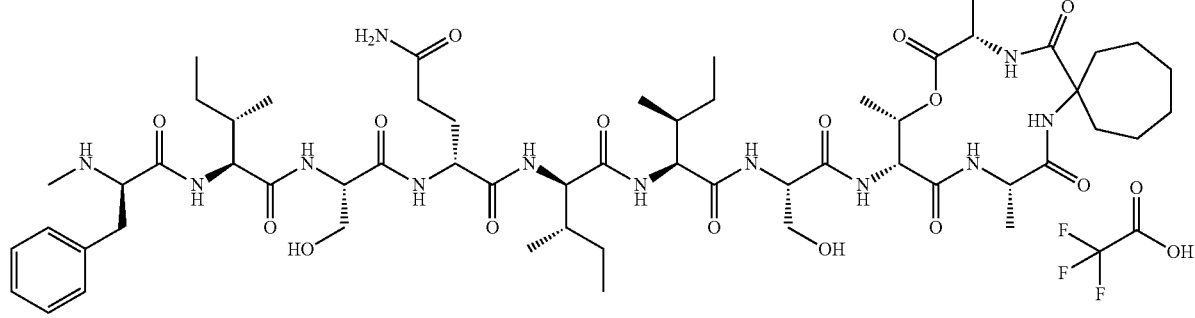

(E9)

1-((((9H-fluoren-9-yl)methoxy)carbonyl)amino)cycloheptanecarboxylic acid was used instead of (1R, 2S)-1-

4H), 1.12-1.01 (m, 3H), 0.80 (ddd, J=26.3, 16.7, 7.1 Hz, 19H), 0.42 (d, J=6.7 Hz, 3H), 0.34 (t, J=7.3 Hz, 3H).

Example 10 Compound (E10)

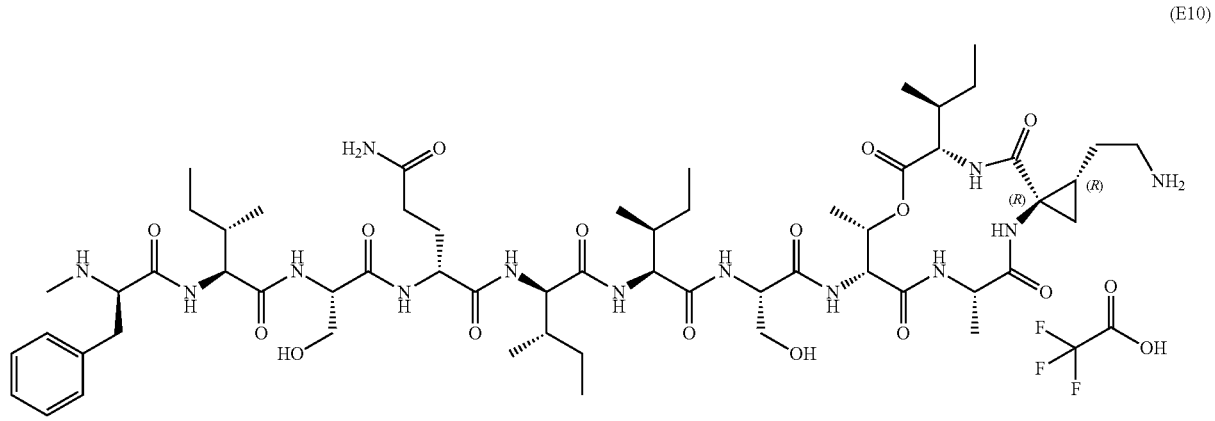

(1R,2R)-1-((((9H-Fluoren-9-yl)methoxy)carbonyl) amino)-2-(2-((tert-butoxycarbonyl)amino) ethyl)cyclopropanecarboxylic acid was used instead of (1R, 2S)-1-((((9H-fluoren-9-yl)methoxy)carbonyl)amino)-2-(2,2-difluoroethyl) cyclopropanecarboxylic acid (1-9) in step 7 of example 1. According to the method described in example 1, the title compound (E10) (25.0 mg, yield 40.25%) was prepared as a white solid.

MS (ESI, poi.ion) m/z: 1215.5 [M+H]$^+$;

$^1$H NMR (600 MHz, DMSO-d$_6$) δ (ppm): 9.00 (d, J=66.5 Hz, 2H), 8.52-8.42 (m, 2H), 8.36 (s, 1H), 8.11 (d, J=5.4 Hz, 1H), 8.05 (d, J=7.9 Hz, 1H), 7.99-7.89 (m, 2H), 7.77 (d, J=8.1 Hz, 3H), 7.59 (s, 1H), 7.32 (t, J=7.3 Hz, 1H), 7.29-7.25 (m, 1H), 7.25-7.16 (m, 2H), 6.79 (s, 1H), 5.39 (dd, J=6.4, 2.3 Hz, 1H), 5.26 (s, 1H), 4.96 (t, J=5.3 Hz, 1H), 4.64 (d, J=8.7 Hz, 1H), 4.39-4.30 (m, 2H), 4.28 (d, J=5.7 Hz, 1H), 4.21-4.12 (m, 2H), 4.09-3.98 (m, 2H), 3.74-3.64 (m, 2H), 3.58 (dd, J=10.8, 5.5 Hz, 1H), 3.56-3.50 (m, 1H), 3.16-3.01 (m, 3H), 3.00-2.94 (m, 1H), 2.62 (d, J=1.7 Hz, 1H), 2.46 (s, 3H), 2.39 (d, J=1.7 Hz, 1H), 2.15-2.03 (m, 2H), 2.00 (ddd, J=22.5, 13.8, 6.6 Hz, 2H), 1.90-1.82 (m, 1H), 1.81-1.64 (m, 3H), 1.59-1.35 (m, 4H), 1.27 (dd, J=22.2, 10.4 Hz, 5H), 1.18-1.01 (m, 5H), 0.95 (s, 1H), 0.90-0.68 (m, 10H), 0.67-0.58 (m, 3H).

Example 11 Compound (E11)

(1R,2R)-1-((((9H-Fluoren-9-yl)methoxy)carbonyl) amino)-2-(2-morpholinoethyl) cyclopropanecarboxylic acid was used instead of (1R,2S)-1-((((9H-fluoren-9-yl) methoxy)carbonyl)amino)-2-(2,2-difluoroethyl) cyclopropanecarboxylic acid (1-9) in step 7 of example 1. According to the method described in example 1, the title compound (E11) (30.0 mg, yield 42.0%) was prepared as a white solid.

MS (ESI, poi.ion) m/z: 1285.5 [M+H]$^+$;

$^1$H NMR (600 MHz, DMSO-d$_6$) δ (ppm): 9.72 (s, 1H), 9.04 (s, 2H), 8.50 (d, J=8.3 Hz, 1H), 8.24 (d, J=6.6 Hz, 2H), 8.18 (d, J=9.4 Hz, 1H), 8.00 (ddd, J=23.3, 17.9, 7.9 Hz, 3H), 7.79 (d, J=8.8 Hz, 1H), 7.32 (t, J=7.3 Hz, 2H), 7.27 (t, J=7.3 Hz, 1H), 7.22 (t, J=7.6 Hz, 2H), 7.04 (s, 1H), 6.78 (s, 1H), 5.26 (dd, J=6.4, 2.2 Hz, 2H), 4.97 (s, 1H), 4.58 (dd, J=9.6, 2.0 Hz, 1H), 4.45-4.37 (m, 2H), 4.37-4.27 (m, 2H), 4.27-4.21 (m, 1H), 4.20-4.11 (m, 2H), 4.00 (dd, J=22.4, 13.0 Hz, 2H), 3.61 (dddd, J=48.4, 31.2, 10.4, 5.6 Hz, 5H), 3.18 (s, 1H), 3.12 (dd, J=13.3, 5.4 Hz, 1H), 3.04 (s, 2H), 2.97 (dd, J=13.2, 9.6 Hz, 1H), 2.47 (s, 3H), 2.14-1.96 (m, 3H), 1.88 (dd, J=23.7, 11.1 Hz, 2H), 1.82-1.64 (m, 3H), 1.54 (d, J=6.2 Hz, 1H), 1.48-1.33 (m, 3H), 1.29 (t, J=8.9 Hz, 3H), 1.24 (s, 2H), 1.18 (d, J=6.4 Hz, 2H), 1.15-0.98 (m, 4H), 0.95 (s, 1H), 0.89-0.81 (m, 6H), 0.81-0.75 (m, 6H), 0.75-0.67 (m, 1H), 0.64 (t, J=7.3 Hz, 2H), 0.60 (d, J=6.8 Hz, 2H).

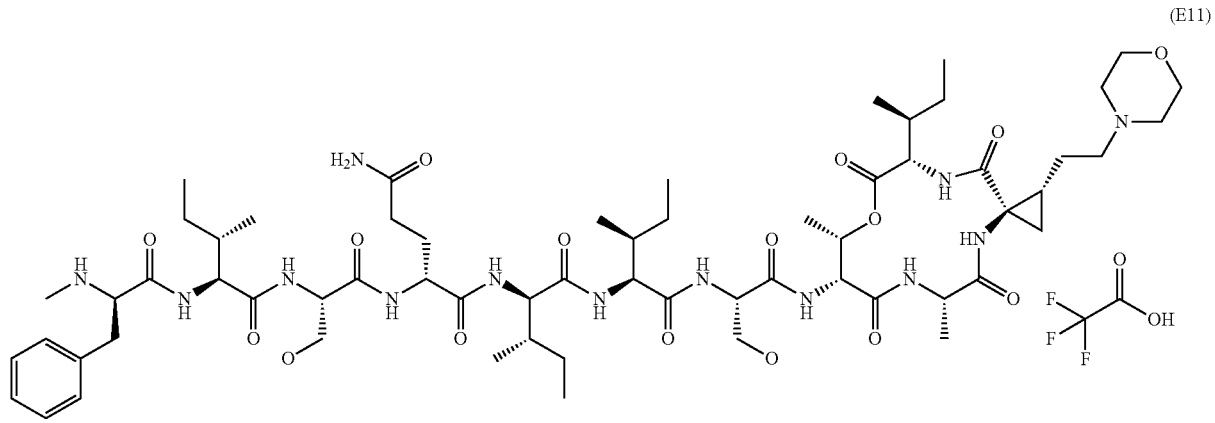

Example 12 Compound (E12)

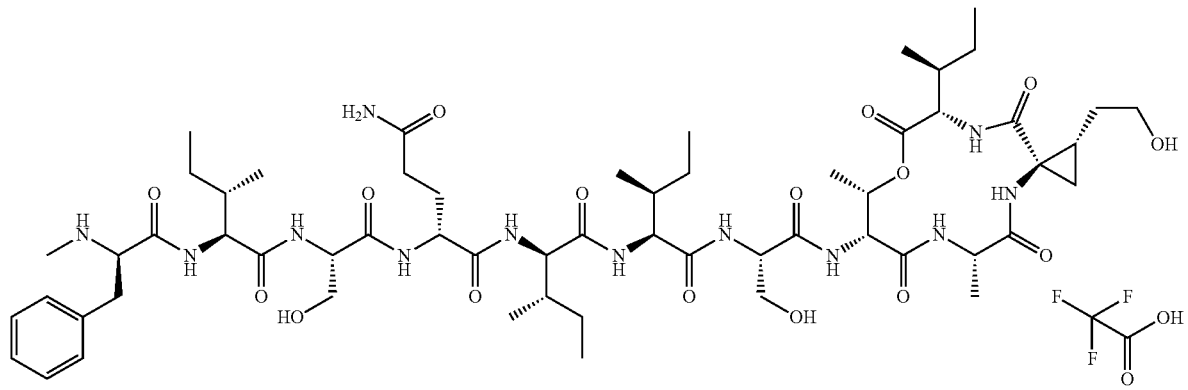

(1R,2S)-2-[2-[tert-Butyl(diphenyl)silyl]oxyethyl]-1-(9H-fluoren-9-ylmethoxycarbonylamino)cyclopropanecarboxylic acid was used instead of (1R,2S)-1-((((9H-fluoren-9-yl)methoxy)carbonyl)amino)-2-(2,2-difluoroethyl)cyclopropanecarboxylic acid (1-9) in step 7 of example 1. According to the method described in example 1, the title compound (E12) (16.0 mg, yield 38.9%) was prepared as a white solid.

MS (ESI, poi.ion) m/z: 1215.6 [M+H]$^+$;

$^1$H NMR (600 MHz, DMSO-d$_6$) δ (ppm): 9.05 (s, 1H), 8.92 (s, 1H), 8.48 (d, J=8.3 Hz, 1H), 8.37 (d, J=4.9 Hz, 1H), 8.33 (s, 1H), 8.11-8.01 (m, 2H), 7.99 (d, J=6.6 Hz, 1H), 7.93 (dd, J=12.5, 8.4 Hz, 2H), 7.81 (d, J=8.9 Hz, 1H), 7.28 (ddd, J=28.4, 17.9, 7.2 Hz, 5H), 7.12-7.00 (m, 2H), 6.79 (s, 1H), 5.34-5.30 (m, 1H), 5.23 (t, J=4.8 Hz, 1H), 4.94 (t, J=5.3 Hz, 1H), 4.62 (dd, J=9.7, 2.4 Hz, 1H), 4.47 (s, 1H), 4.39-4.31 (m, 3H), 4.21-4.08 (m, 4H), 3.99 (t, J=8.5 Hz, 1H), 3.71-3.62 (m, 2H), 3.11 (dd, J=13.3, 5.5 Hz, 1H), 2.97 (dd, J=13.3, 9.5 Hz, 1H), 2.62 (d, J=1.7 Hz, 1H), 2.46 (s, 3H), 2.39 (s, 1H), 2.13-2.04 (m, 2H), 2.04-1.92 (m, 3H), 1.89-1.64 (m, 6H), 1.57-1.37 (m, 5H), 1.33-1.20 (m, 9H), 1.20-1.14 (m, 3H), 1.14-1.10 (m, 1H), 1.10-1.00 (m, 3H), 0.93 (dd, J=7.8, 4.7 Hz, 1H), 0.89-0.67 (m, 15H), 0.67-0.55 (m, 5H).

Example 13 Compound (E13)

(R)-3-([1,1'-Biphenyl]-4-yl)-2-((2-(tert-butoxycarbonyl)-2-oxoethyl)amino)propionic acid was used instead of Boc-N-Me-D-Phe-OH in step 2 of example 1. According to the method described in example 1, the title compound (E13) (19 mg, yield 25.5%) was prepared as a white solid.

MS (ESI, poi.ion) m/z: 1297.1 [M+H]$^+$;

$^1$HNMR (600 MHz, DMSO-d$_6$) δ (ppm): 9.02 (d, J=46.2 Hz, 2H), 8.49 (d, J=8.3 Hz, 1H), 8.44-8.34 (m, 2H), 8.09 (dd, J=25.6, 8.8 Hz, 2H), 8.01-7.87 (m, 3H), 7.82 (d, J=8.9 Hz, 1H), 7.42 (d, J=9.9 Hz, 1H), 7.32 (t, J=7.3 Hz, 2H), 7.29-7.21 (m, 4H), 6.79 (s, 1H), 5.41-5.34 (m, 1H), 5.34-5.15 (m, 3H), 5.03 (dd, J=9.2, 2.8 Hz, 1H), 4.95 (s, 1H), 4.58 (dd, J=9.8, 2.0 Hz, 1H), 4.43-4.31 (m, 3H), 4.28 (dd, J=11.6, 6.2 Hz, 1H), 4.22-4.10 (m, 3H), 4.05 (dt, J=9.9, 8.5 Hz, 2H), 3.74-3.62 (m, 2H), 3.57 (dd, J=18.8, 15.4 Hz, 2H), 3.11 (dd, J=13.3, 5.4 Hz, 1H), 2.97 (dd, J=13.2, 9.6 Hz, 1H), 2.46 (s, 3H), 2.09 (dd, J=15.2, 8.5 Hz, 2H), 2.00 (dd, J=16.2, 8.1 Hz, 1H), 1.85 (dt, J=14.5, 5.9 Hz, 1H), 1.81-1.73 (m, 2H), 1.71-1.60 (m, 3H), 1.54 (td, J=9.7, 3.6 Hz, 1H), 1.46-1.36 (m, 3H), 1.31-1.21 (m, 6H), 1.15 (dd, J=17.6, 6.2 Hz, 4H), 1.10-1.00 (m, 3H), 0.87-0.75 (m, 19H), 0.67-0.56 (m, 6H).

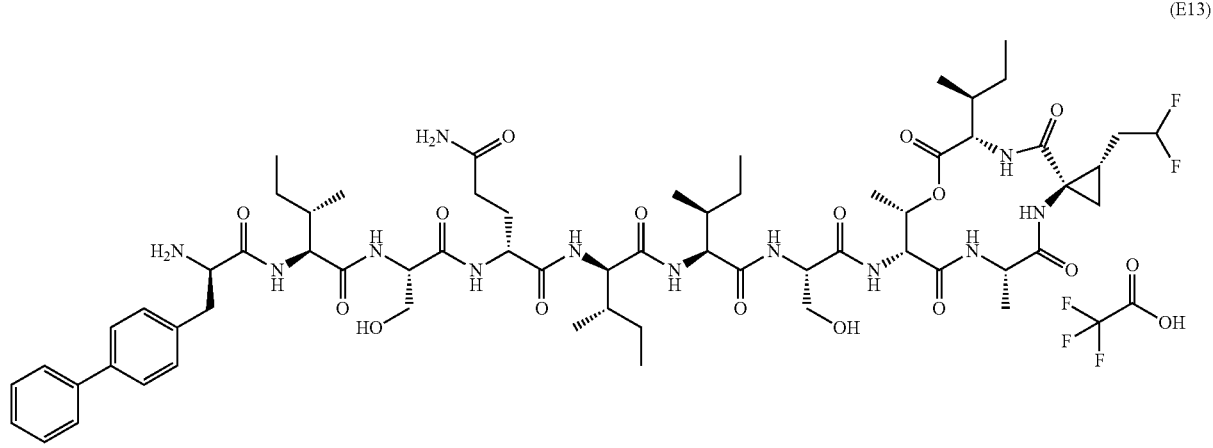

Example 14 Compound (E14)
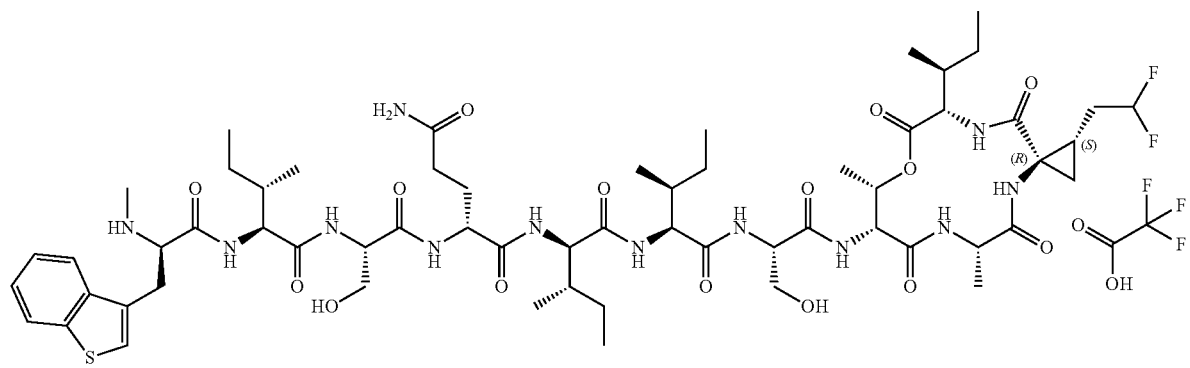
Step 1) Synthesis of Compound (14-1)
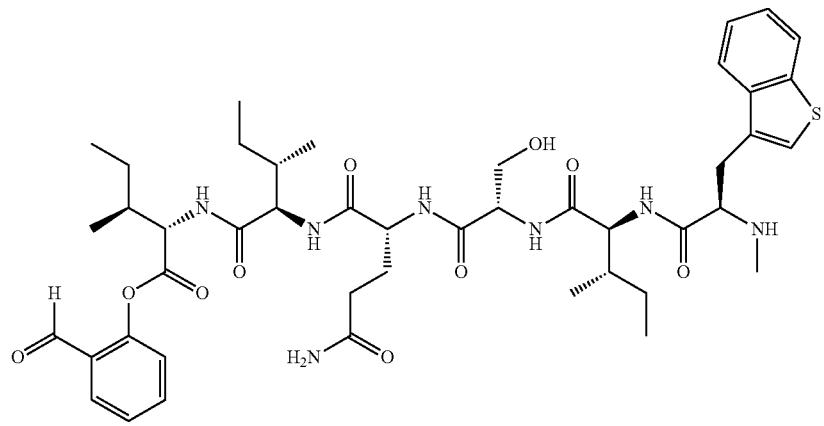
(R)-3-(Benzo[b]thiophen-3-yl)-2-((tert-butoxycarbonyl)(methyl)amino)propionic acid was used instead of Boc-N-Me-D-Phe-OH. According to the synthesis method of step 1 to step 5 in example 1, the title compound (14-1) (350 mg, yield 52.8%) was prepared as a white solid.
MS (ESI, poi.ion) m/z: 894.4 [M+H]$^+$.
Step 2) Synthesis of Compound (E14)
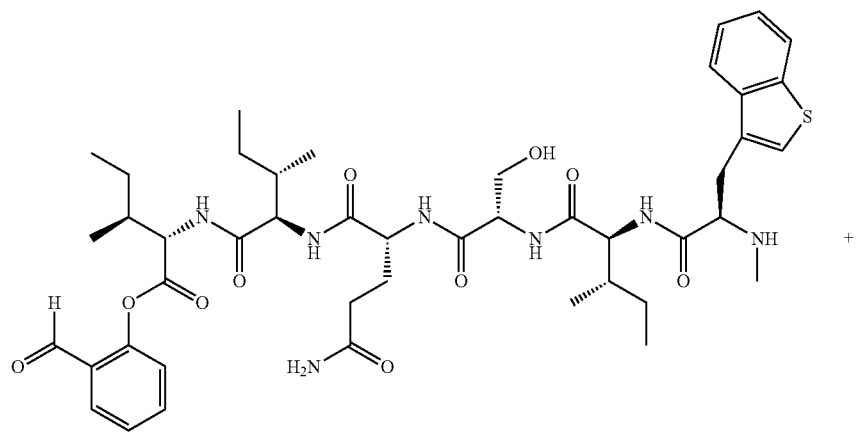

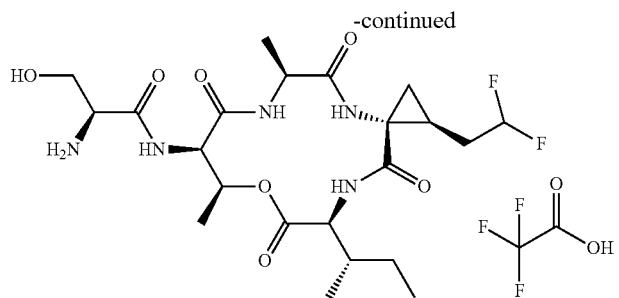

(1-15)

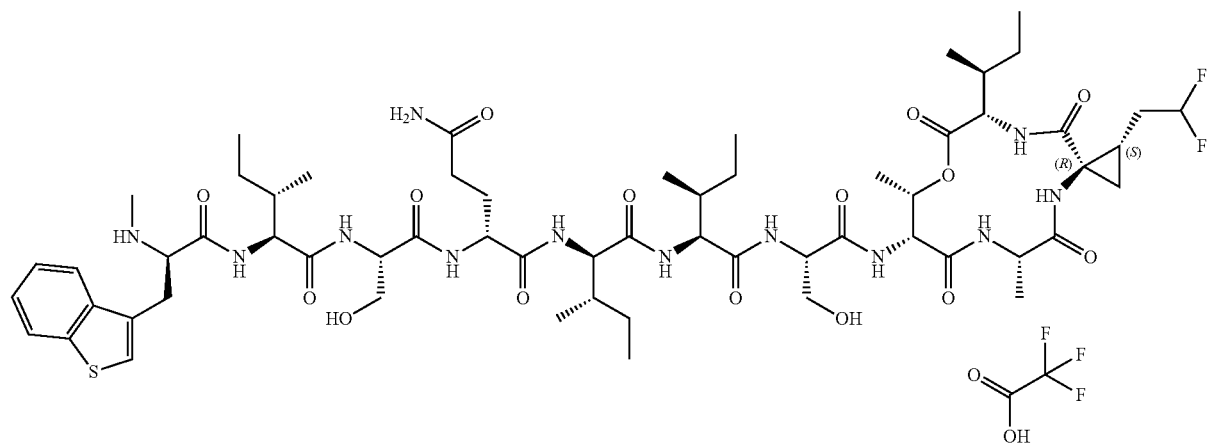

(E14)

To a round-bottom flask were added compound (14-1) (25 mg, 0.048 mmol), compound (1-15) (44 mg, 0.052 mmol) and a mixed solution of pyridine/acetic acid (molar ratio: 6/1, 5 mL). The mixture was stirred at 25° C. for 10 hours, then the solvent was removed. A mixed solution of trifluoroacetic acid/water/triisopropylsilane (v/v/v=94/5/1, 10 mL) was added, and the resulting mixture was continued to stir for 2 hours. The solvent was removed. The residue was purified by preparative chromatography (gradient elution, mobile phase: 15%-50% ratio of $CH_3CN$ in $H_2O$, elution for 30 minutes) to give the title compound (E14) (26 mg, yield 41.8%) as a white solid.

MS (ESI, poi.ion) m/z: 1291.1 [M+H]$^+$;

$^1$HNMR (600 MHz, DMSO-$d_6$) δ (ppm): 9.19 (s, 1H), 9.01 (s, 1H), 8.59 (d, J=8.3 Hz, 1H), 8.43 (d, J=4.1 Hz, 1H), 8.30 (s, 1H), 8.14 (d, J=8.5 Hz, 1H), 8.02 (dd, J=18.4, 7.8 Hz, 3H), 7.96-7.87 (m, 3H), 7.80 (d, J=8.8 Hz, 1H), 7.56 (s, 1H), 7.45 (t, J=7.5 Hz, 1H), 7.41 (t, J=7.5 Hz, 1H), 7.34 (d, J=8.3 Hz, 1H), 7.23 (s, 1H), 6.78 (s, 1H), 5.37-5.32 (m, 1H), 5.24 (s, 1H), 4.94 (s, 1H), 4.62 (d, J=11.1 Hz, 1H), 4.38 (dd, J=8.7, 5.4 Hz, 1H), 4.33 (dd, J=11.2, 5.7 Hz, 3H), 4.29 (s, 1H), 4.20 (t, J=8.1 Hz, 1H), 4.13 (t, J=7.6 Hz, 1H), 4.10-4.07 (m, 1H), 4.03 (t, J=8.8 Hz, 1H), 3.73-3.67 (m, 1H), 3.67-3.61 (m, 1H), 3.60-3.55 (m, 1H), 3.52 (dd, J=10.2, 5.3 Hz, 1H), 2.32 (ddd, J=22.7, 20.7, 11.3 Hz, 2H), 2.14-1.96 (m, 3H), 1.90-1.63 (m, 5H), 1.53-1.35 (m, 5H), 1.33-1.21 (m, 8H), 1.19-0.97 (m, 9H), 0.90-0.74 (m, 19H), 0.72-0.64 (m, 1H), 0.63-0.51 (m, 6H).

Example 15 Compound (E15)

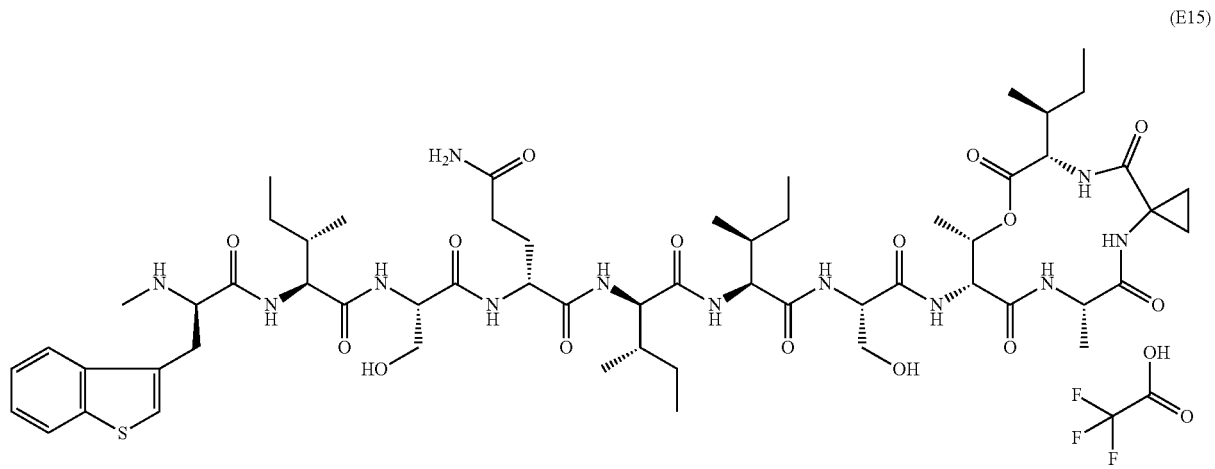

(R)-3-(Benzo[b]thiophen-3-yl)-2-((tert-butoxycarbonyl) (methyl)amino)propionic acid and 1-((((9H-fluoren-9-yl) methoxy)carbonyl)amino)cyclopropanecarboxylic acid were respectively used instead of Boc-N-Me-D-Phe-OH in step 2 of example 1 and (1R,2S)-1-((((9H-fluoren-9-yl) methoxy)carbonyl)amino)-2-(2,2-difluoroethyl)cyclopropanecarboxylic acid (1-9) in step 7 of example 1. According to the method described in example 1, the title compound (E15) (23.6 mg, yield 43.84%) was prepared as a white solid.

MS (ESI, poi.ion) m/z: 1227.1 [M+H]$^+$;

$^1$H NMR (600 MHz, DMSO-d$_6$) δ (ppm): 8.54 (s, 1H), 8.40 (d, J=4.6 Hz, 1H), 8.33 (s, 1H), 8.19 (d, J=9.5 Hz, 1H), 8.08-7.86 (m, 7H), 7.81 (d, J=8.8 Hz, 1H), 7.55 (s, 1H), 7.42 (dt, J=28.1, 7.3 Hz, 2H), 7.24 (s, 1H), 7.13 (d, J=9.2 Hz, 1H), 6.79 (s, 1H), 5.34 (dd, J=6.4, 2.5 Hz, 1H), 5.22 (t, J=4.7 Hz, 1H), 4.94 (t, J=5.4 Hz, 1H), 4.60 (dd, J=9.7, 2.3 Hz, 1H), 4.37 (dd, J=8.8, 5.5 Hz, 1H), 4.35-4.30 (m, 3H), 4.20 (t, J=8.1 Hz, 2H), 4.13 (dd, J=14.4, 7.2 Hz, 2H), 4.00 (t, J=9.3 Hz, 1H), 3.68 (dd, J=9.9, 5.1 Hz, 1H), 3.63 (dd, J=14.3, 8.4 Hz, 1H), 3.58 (dt, J=10.6, 5.5 Hz, 1H), 3.53 (dt, J=10.6, 5.3 Hz, 1H), 2.47 (s, 3H), 2.15-1.96 (m, 3H), 1.90-1.63 (m, 6H), 1.50 (dd, J=19.2, 15.9 Hz, 2H), 1.41 (dd, J=15.4, 9.7 Hz, 2H), 1.19-1.10 (m, 5H), 1.09-0.97 (m, 6H), 0.94-0.89 (m, 1H), 0.87-0.74 (m, 20H), 0.70 (d, J=7.9 Hz, 1H), 0.63-0.52 (m, 7H).

Example 16 Compound (E16)

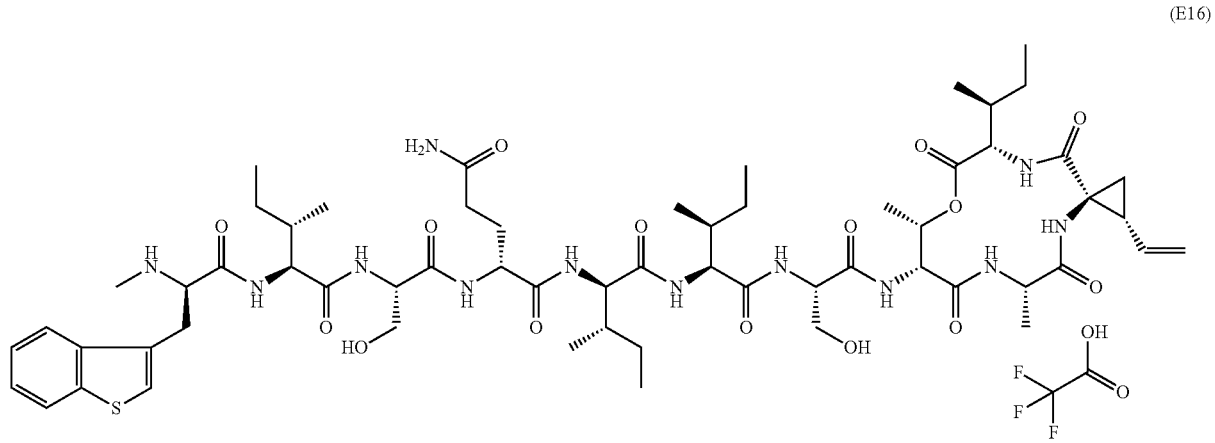

(R)-3-(Benzo[b]thiophen-3-yl)-2-((tert-butoxycarbonyl)(methyl)amino)propionic acid and (1S,2R)-1-((((9H-fluoren-9-yl)methoxy)carbonyl)amino)-2-vinylcyclopropanecarboxylic acid were respectively used instead of Boc-N-Me-D-Phe-OH in step 2 of example 1 and (1R,2S)-1-((((9H-fluoren-9-yl)methoxy)carbonyl)amino)-2-(2,2-difluoroethyl)cyclopropanecarboxylic acid (1-9) in step 7 of example 1. According to the method described in example 1, the title compound (E16) (20.0 mg, yield 38.4%) was prepared as a white solid.

MS (ESI, poi.ion) m/z: 1253.6 [M+H]$^+$;

$^1$H NMR (600 MHz, DMSO-d$_6$) δ (ppm): 9.11 (d, J=97.4 Hz, 2H), 8.59 (d, J=8.3 Hz, 1H), 8.44-8.34 (m, 2H), 8.11 (d, J=9.7 Hz, 1H), 8.05 (d, J=7.9 Hz, 1H), 8.00 (d, J=7.9 Hz, 1H), 7.97-7.87 (m, 4H), 7.82 (d, J=8.8 Hz, 1H), 7.55 (s, 1H), 7.43 (dt, J=15.2, 7.4 Hz, 3H), 7.22 (d, J=26.5 Hz, 1H), 6.79 (s, 1H), 5.40-5.35 (m, 1H), 5.28 (dt, J=25.4, 13.1 Hz, 3H), 5.03 (dd, J=9.4, 2.5 Hz, 1H), 4.95 (s, 1H), 4.57 (d, J=9.9 Hz, 1H), 4.39-4.32 (m, 3H), 4.28 (d, J=5.5 Hz, 2H), 4.15 (dt, J=15.3, 7.9 Hz, 2H), 4.05 (dd, J=13.8, 8.1 Hz, 2H), 3.72-3.63 (m, 2H), 3.58 (dd, J=10.4, 5.8 Hz, 1H), 3.53 (dd, J=10.4, 5.3 Hz, 1H), 3.32 (d, J=8.7 Hz, 3H), 2.11-1.97 (m, 3H), 1.85 (dd, J=14.4, 8.2 Hz, 1H), 1.77 (dd, J=13.2, 6.4 Hz, 2H), 1.66 (dd, J=12.7, 6.2 Hz, 3H), 1.48 (dd, J=14.5, 8.0 Hz, 1H), 1.45-1.37 (m, 3H), 1.34-1.21 (m, 7H), 1.14 (t, J=8.7 Hz, 4H), 1.10-0.98 (m, 3H), 0.88-0.74 (m, 18H), 0.68 (dd, J=14.6, 7.7 Hz, 1H), 0.62-0.50 (m, 6H).

Example 17 Compound (E17)

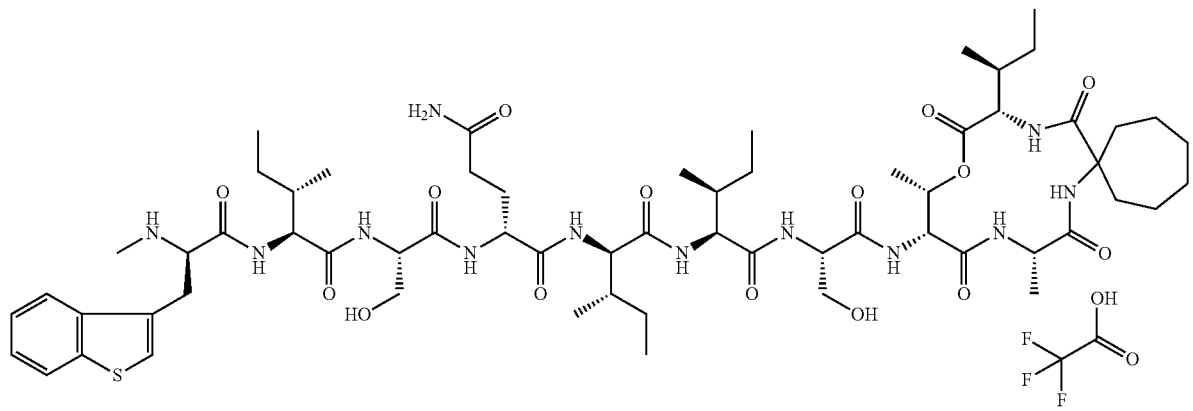

(E17)

(R)-3-(Benzo[b]thiophen-3-yl)-2-((tert-butoxycarbonyl)(methyl)amino)propionic acid and 1-((((9H-fluoren-9-yl)methoxy)carbonyl)amino)cycloheptanecarboxylic acid were respectively used instead of Boc-N-Me-D-Phe-OH in step 2 of example 1 and (1R,2S)-1-((((9H-fluoren-9-yl)methoxy)carbonyl)amino)-2-(2,2-difluoroethyl)cyclopropanecarboxylic acid (1-9) in step 7 of example 1. According to the method described in example 1, the title compound (E17) (13.8 mg, yield 27.5%) was prepared as a white solid.

MS (ESI, poi.ion) m/z: 1284.1 [M+H]$^+$;

$^1$H NMR (600 MHz, DMSO-d$_6$) δ (ppm): 9.19 (s, 1H), 9.02 (s, 1H), 8.59 (d, J=8.2 Hz, 1H), 8.23 (t, J=19.8 Hz, 2H), 8.01 (dt, J=20.7, 10.3 Hz, 3H), 7.90 (dd, J=23.0, 7.9 Hz, 2H), 7.81 (d, J=8.6 Hz, 2H), 7.56 (s, 1H), 7.45 (t, J=7.4 Hz, 1H), 7.40 (t, J=7.5 Hz, 1H), 7.36 (d, J=7.9 Hz, 1H), 7.21 (s, 1H), 6.77 (s, 1H), 5.27 (dd, J=63.1, 4.5 Hz, 2H), 4.94 (s, 1H), 4.49-4.42 (m, 2H), 4.40 (dd, J=8.7, 5.2 Hz, 1H), 4.37-4.31 (m, 3H), 4.28 (d, J=5.7 Hz, 1H), 4.23 (t, J=8.2 Hz, 1H), 4.13 (t, J=7.6 Hz, 1H), 4.06 (dd, J=20.4, 10.7 Hz, 1H), 3.71-3.65 (m, 1H), 3.58 (dd, J=17.6, 7.4 Hz, 2H), 3.52 (dd, J=10.0, 5.0 Hz, 1H), 2.40 (d, J=8.5 Hz, 1H), 2.17 (dd, J=14.5, 9.4 Hz, 1H), 2.08 (dd, J=14.5, 9.4 Hz, 1H), 2.08 (dd, J=16.4, 10.1 Hz, 2H), 2.03-1.96 (m, 1H), 1.83-1.73 (m, 4H), 1.70 (dd, J=14.3, 8.7 Hz, 1H), 1.54-1.37 (m, 12H), 1.32-1.21 (m, 7H), 1.16 (t, J=8.2 Hz, 3H), 1.08 (ddd, J=21.8, 14.5, 7.4 Hz, 3H), 1.02 (s, 1H), 0.89-0.73 (m, 20H), 0.68 (dt, J=15.2, 7.9 Hz, 1H), 0.62-0.51 (m, 6H).

Example 18 Compound (E18)
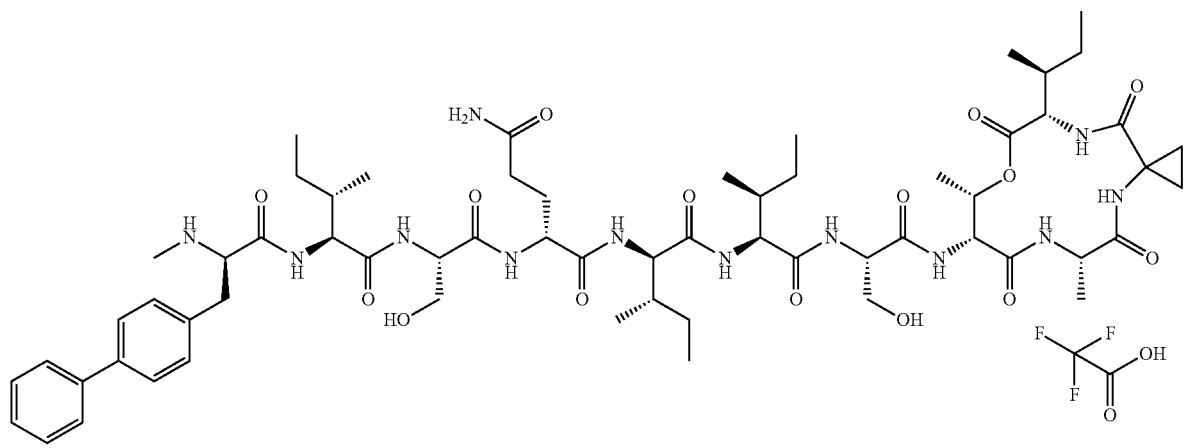
Step 1) Synthesis of Compound (18-1)
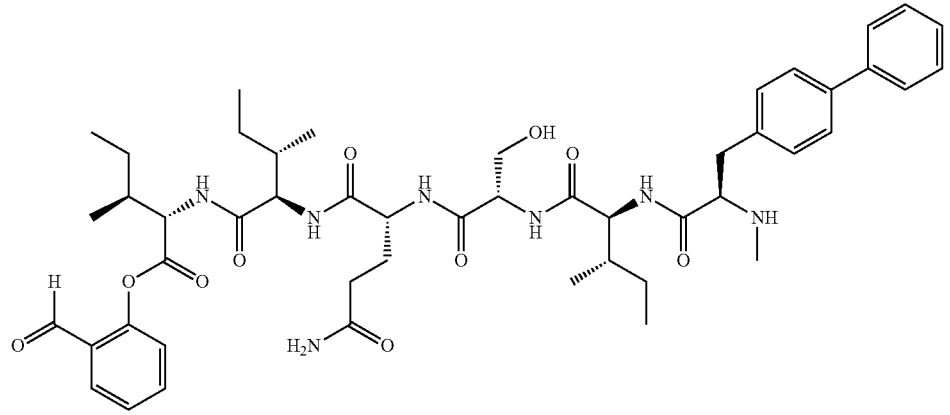
(R)-3-([1,1'-biphenyl]-4-yl)-2-((tert-butoxycarbonyl)(methyl)amino)propionic acid was used instead of Boc-N-Me-D-Phe-OH. According to the synthesis method of step 1 to step 5 in example 1, the title compound (18-1) (0.18 g, yield 35%) was prepared as a white solid.
MS (ESI, poi.ion) m/z: 914.4[M+H]$^+$.

Step 2) Synthesis of Compound (18-2)

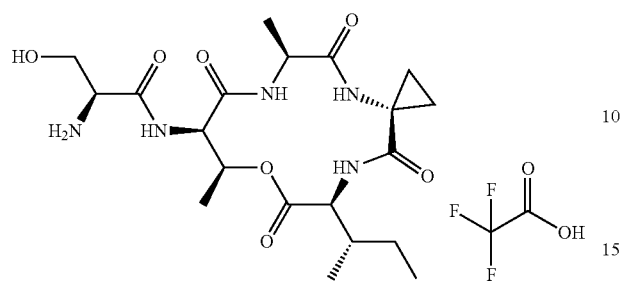

(18-2)

1-(((((9H-Fluoren-9-yl)methoxy)carbonyl)amino)cyclopropanecarboxylic acid was used instead of (1R,2S)-1-(((((9H-fluoren-9-yl)methoxy)carbonyl)amino)-2-(2,2-difluoroethyl) cyclopropanecarboxylic acid (1-9) in step 7 of example 1. According to the synthesis method of step 6 to step 12 in example 1, the title compound (18-2) (200 mg, yield 88%) was prepared as a white solid.

MS (ESI, poi.ion) m/z: 456.3 [M+H]$^+$.

Step 3) Synthesis of Compound (E18)

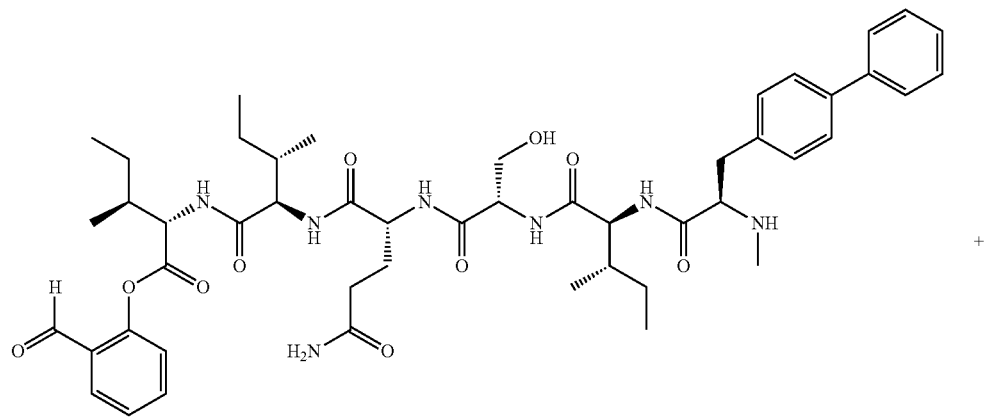

(18-1)

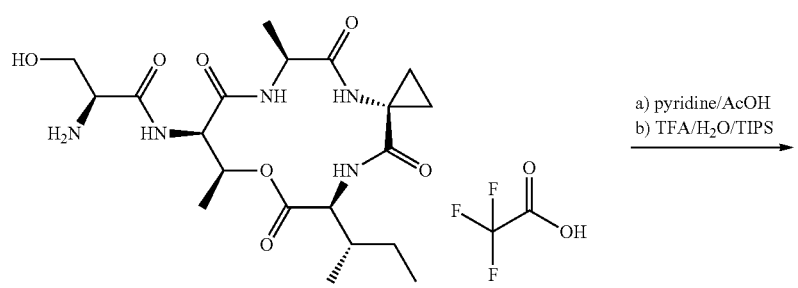

(18-2)

a) pyridine/AcOH
b) TFA/H$_2$O/TIPS

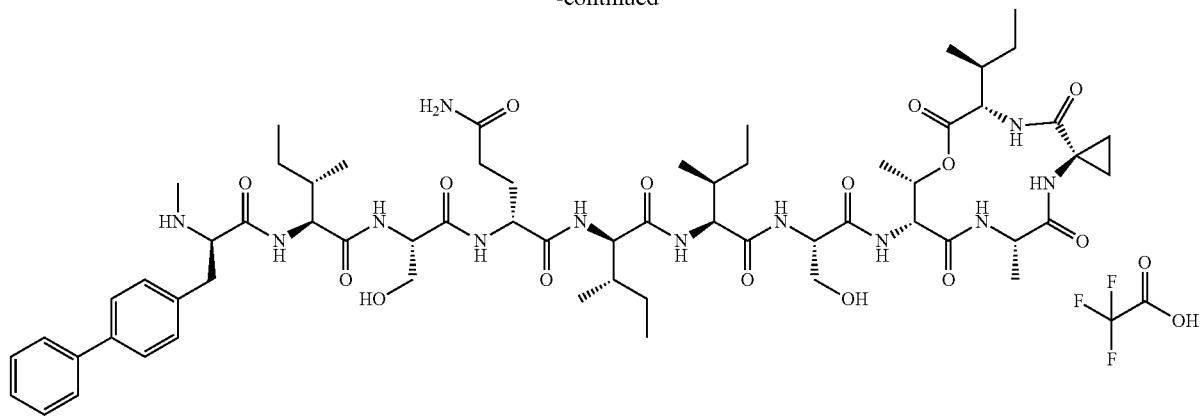

(E18)

To a round-bottom flask were added compound (18-1) (32 mg, 0.035 mmol), compound (18-2) (15 mg, 0.026 mmol) and a mixed solution of pyridine/acetic acid (molar ratio: 6/1, 5 mL). The mixture was stirred at 25° C. for 10 hours, then the solvent was removed. A mixed solution of trifluoroacetic acid/water/triisopropylsilane (v/v/v=94/5/1, 10 mL) was added, and the resulting mixture was continued to stir for 2 hours. The solvent was removed. The residue was purified by preparative chromatography (gradient elution, mobile phase: 15%-50% ratio of $CH_3CN$ in $H_2O$, elution for 30 minutes) to give the title compound (E18) (16 mg, yield 47%) as a white solid.

MS (ESI, poi.ion) m/z: 1247.7 [M+H]$^+$;

$^1$H NMR (600 MHz, DMSO-d$_6$) δ (ppm): 9.09 (s, 1H), 8.98 (s, 1H), 8.52 (d, J=8.3 Hz, 1H), 8.40 (t, J=13.3 Hz, 1H), 8.32 (s, 1H), 8.17 (t, J=14.4 Hz, 1H), 8.06 (d, J=8.0 Hz, 1H), 8.00-7.87 (m, 3H), 7.82 (d, J=8.9 Hz, 1H), 7.62 (dd, J=7.6, 4.5 Hz, 3H), 7.47 (t, J=7.7 Hz, 2H), 7.37 (t, J=7.4 Hz, 1H), 7.32 (d, J=8.1 Hz, 2H), 7.24 (s, 1H), 7.11 (d, J=9.3 Hz, 1H), 6.77 (d, J=20.9 Hz, 1H), 5.34 (dt, J=6.4, 5.1 Hz, 1H), 5.21 (s, 1H), 4.94 (s, 1H), 4.60 (dd, J=9.7, 2.2 Hz, 1H), 4.42-4.28 (m, 4H), 4.26-4.07 (m, 4H), 4.01 (dd, J=19.4, 10.2 Hz, 1H), 3.66 (dd, J=24.6, 4.2 Hz, 2H), 3.60-3.51 (m, 2H), 3.17 (dd, J=13.3, 5.5 Hz, 1H), 3.00 (dd, J=13.1, 9.7 Hz, 1H), 2.49 (s, 3H), 2.14-1.96 (m, 3H), 1.85 (dd, J=14.4, 8.6 Hz, 1H), 1.81-1.62 (m, 4H), 1.57-1.48 (m, 2H), 1.42 (ddd, J=11.9, 11.0, 5.8 Hz, 2H), 1.34-1.20 (m, 6H), 1.19-1.08 (m, 4H), 1.09-0.97 (m, 4H), 0.92 (dd, J=12.1, 4.7 Hz, 1H), 0.89-0.66 (m, 16H), 0.58 (t, J=7.5 Hz, 5H).

Example 19 Compound (E19)

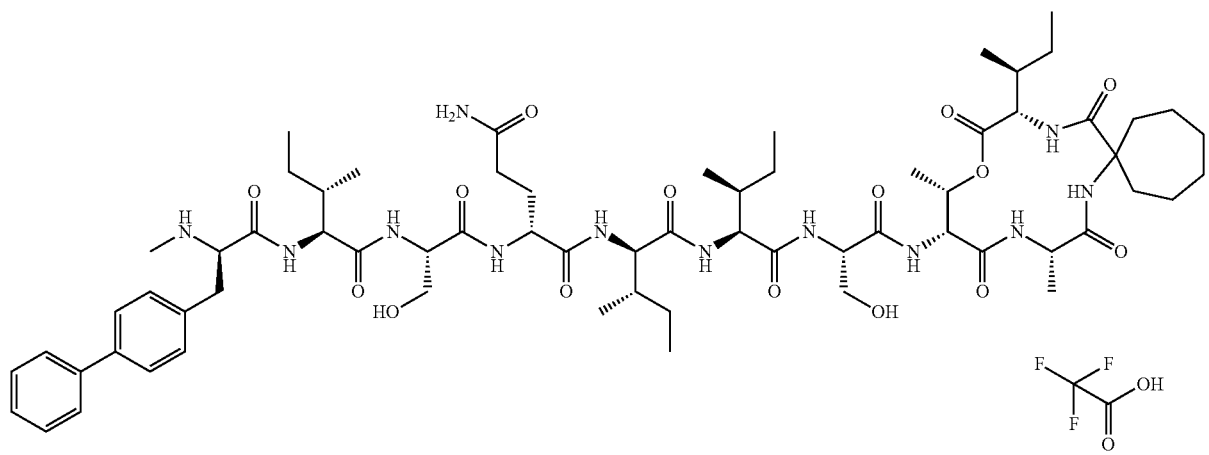

(E19)

N-Boc-N-methyl-3-(biphenyl-4-yl)-D-alanine and 1-((((9H-fluoren-9-yl)methoxy)carbonyl) amino)cycloheptanecarboxylic acid were respectively used instead of Boc-N-Me-D-Phe-OH in step 2 of example 1 and (1R,2S)-1-((((9H-fluoren-9-yl)methoxy)carbonyl)amino)-2-(2,2-difluoroethyl) cyclopropanecarboxylic acid (1-9) in step 7 of example 1. According to the method described in example 1, the title compound (E19) (14 mg, yield 43%) was prepared as a white solid.

MS (ESI, poi.ion) m/z: 1303.8 [M+H]$^+$;

$^1$H NMR (600 MHz, DMSO-d$_6$) δ (ppm): 9.09 (s, 1H), 8.95 (s, 1H), 8.52 (d, J=8.4 Hz, 1H), 8.27 (d, J=5.8 Hz, 1H), 8.18 (s, 1H), 8.06 (d, J=8.0 Hz, 1H), 7.98 (d, J=8.4 Hz, 1H), 7.93 (d, J=8.0 Hz, 1H), 7.81 (t, J=8.3 Hz, 2H), 7.62 (dd, J=7.7, 4.2 Hz, 3H), 7.47 (t, J=7.7 Hz, 3H), 7.37 (t, J=7.4 Hz, 2H), 7.32 (d, J=8.1 Hz, 2H), 7.21 (s, 1H), 6.77 (s, 1H), 5.23 (d, J=3.9 Hz, 2H), 4.94 (s, 1H), 4.45 (d, J=6.1 Hz, 2H), 4.40 (dd, J=8.9, 5.3 Hz, 1H), 4.35 (dd, J=7.9, 5.5 Hz, 3H), 4.26-4.19 (m, 2H), 4.18-4.13 (m, 1H), 4.06 (t, J=9.7 Hz, 1H), 3.71-3.50 (m, 5H), 3.17 (dd, J=13.2, 5.5 Hz, 2H), 3.00 (dd, J=13.2, 9.6 Hz, 2H), 2.49 (s, 3H), 2.41 (dd, J=13.7, 5.9 Hz, 2H), 2.22-1.95 (m, 5H), 1.94-1.64 (m, 8H), 1.44 (ddd, J=30.2, 16.8, 11.4 Hz, 10H), 1.34-1.19 (m, 6H), 1.19-0.99 (m, 7H), 0.88-0.66 (m, 16H), 0.58 (t, J=7.5 Hz, 5H).

Example 20 Compound (E20)

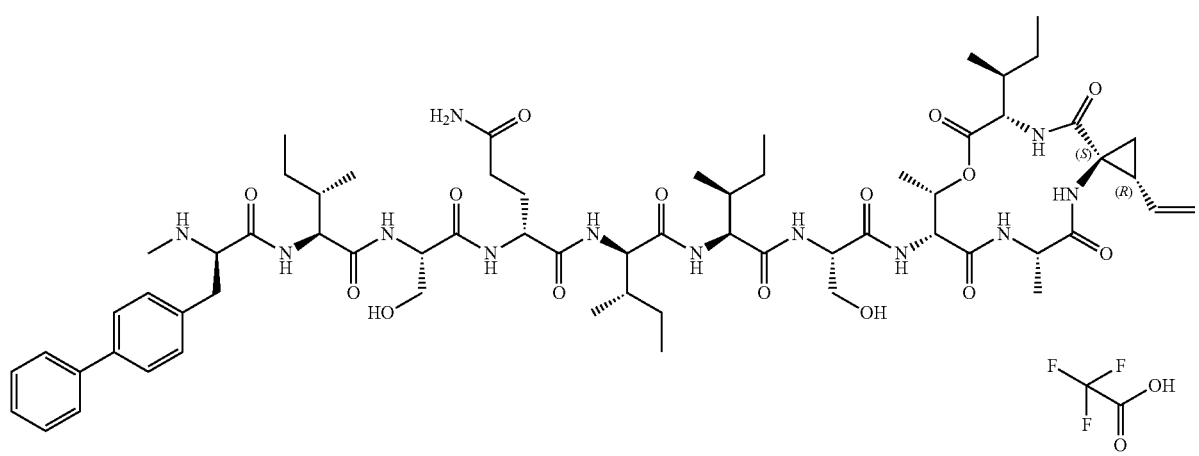

(E20)

N-Boc-N-methyl-3-(biphenyl-4-yl)-D-alanine and (1S, 2R)-1-((((9H-fluoren-9-yl) methoxy)carbonyl)amino)-2-vinylcyclopropanecarboxylic acid were respectively used instead of Boc-N-Me-D-Phe-OH in step 2 of example 1 and (1R,2S)-1-((((9H-fluoren-9-yl)methoxy) carbonyl)amino)-2-(2,2-difluoroethyl)cyclopropanecarboxylic acid (1-9) in step 7 of example 1. According to the method described in example 1, the title compound (E20) (28.2 mg, yield 53%) was prepared as a white solid.

MS (ESI, poi.ion) m/z: 1274.2 [M+H]$^+$;

$^1$H NMR (600 MHz, DMSO-d$_6$) δ (ppm): 9.05 (d, J=55.7 Hz, 2H), 8.53 (d, J=8.2 Hz, 1H), 8.43-8.35 (m, 2H), 8.09 (dd, J=23.3, 8.7 Hz, 2H), 7.93 (dd, J=19.2, 6.9 Hz, 3H), 7.82 (d, J=8.8 Hz, 1H), 7.67-7.58 (m, 4H), 7.47 (t, J=7.6 Hz, 2H), 7.43-7.34 (m, 2H), 7.32 (d, J=8.0 Hz, 2H), 7.25 (s, 1H), 6.79 (s, 1H), 5.37 (dd, J=6.3, 2.0 Hz, 1H), 5.28 (dd, J=17.3, 8.2 Hz, 2H), 5.21 (d, J=20.7 Hz, 1H), 5.06-5.00 (m, 1H), 4.95 (s, 1H), 4.57 (d, J=10.9 Hz, 1H), 4.36 (dd, J=11.6, 6.3 Hz, 3H), 4.30-4.26 (m, 1H), 4.25-4.13 (m, 3H), 4.05 (dd, J=12.5, 7.1 Hz, 2H), 3.71-3.62 (m, 2H), 3.61-3.56 (m, 1H), 3.56-3.51 (m, 1H), 3.17 (dd, J=13.1, 5.3 Hz, 1H), 3.04-2.97 (m, 1H), 2.08 (dd, J=15.2, 8.5 Hz, 2H), 2.03-1.95 (m, 2H), 1.90-1.81 (m, 1H), 1.77 (dd, J=12.3, 6.0 Hz, 2H), 1.71-1.61 (m, 3H), 1.53 (d, J=6.2 Hz, 1H), 1.42 (dd, J=8.7, 5.5 Hz, 3H), 1.29 (dt, J=27.0, 13.2 Hz, 8H), 1.13 (d, J=6.3 Hz, 4H), 1.10-1.00 (m, 3H), 0.85-0.75 (m, 18H), 0.71 (dd, J=13.8, 7.9 Hz, 1H), 0.58 (t, J=7.5 Hz, 6H).

Example 21 Compound (E21)
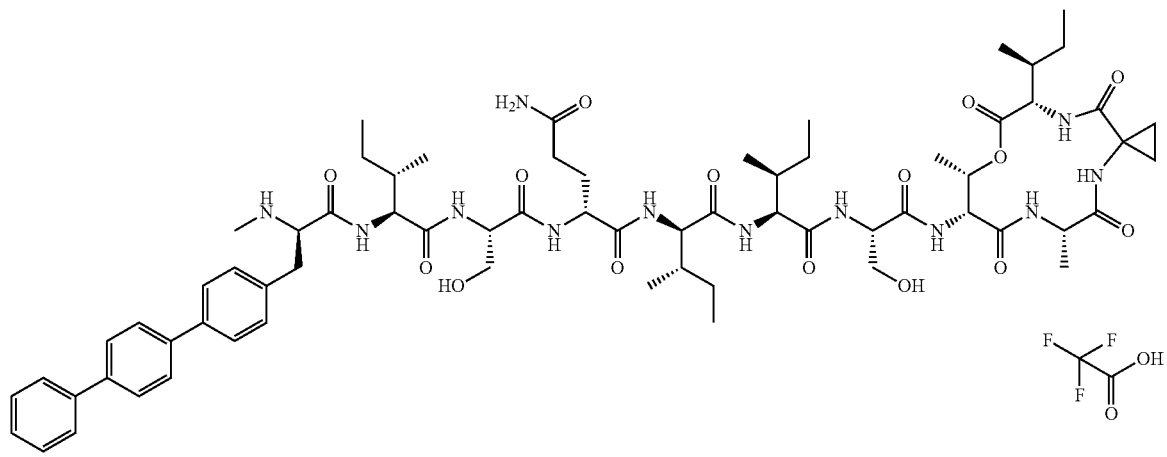
Step 1) Synthesis of Compound (21-1)
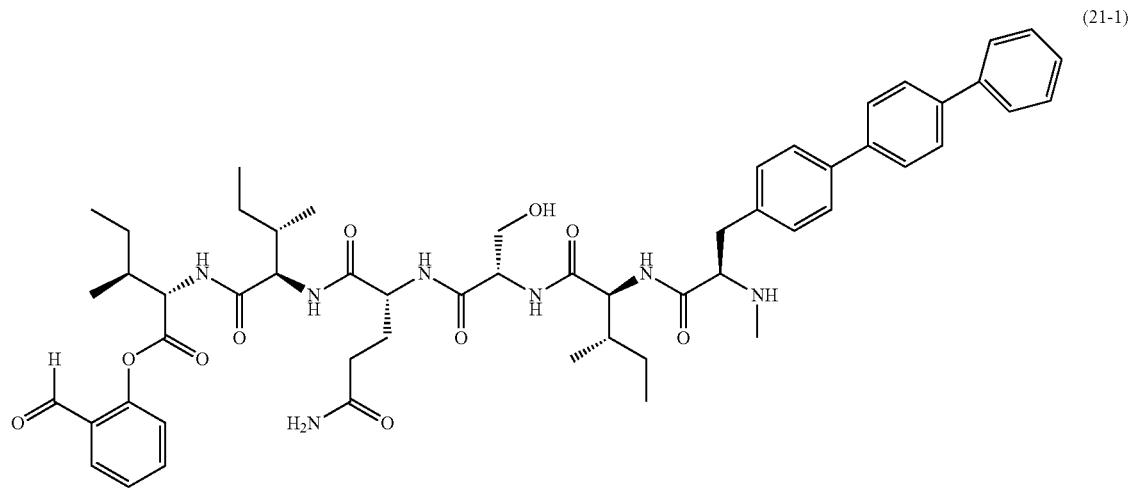 [SMILES: CC[C@H](C)[C@H](NC(=O)[C@@H](Cc1ccc(-c2ccc(-c3ccccc3)cc2)cc1)NC)C(=O)N[C@@H](CO)C(=O)N[C@H](CCC(N)=O)C(=O)N[C@@H](C(=O)N[C@H](C(=O)Oc1ccccc1C=O)[C@@H](C)CC)[C@@H](C)CC]
(R)-3-([1,1':4',1"-terphenyl]-4-yl)-2-((tert-butoxycarbonyl)(methyl)amino)propionic acid was used instead of Boc-N-Me-D-Phe-OH. According to the synthesis method of step 1 to step 5 in example 1, the title compound (21-1) (0.42 g, yield 73%) was prepared as a white solid.
MS (ESI, poi.ion) m/z: 990.5[M+H]+.

Step 2) Synthesis of Compound (E21)

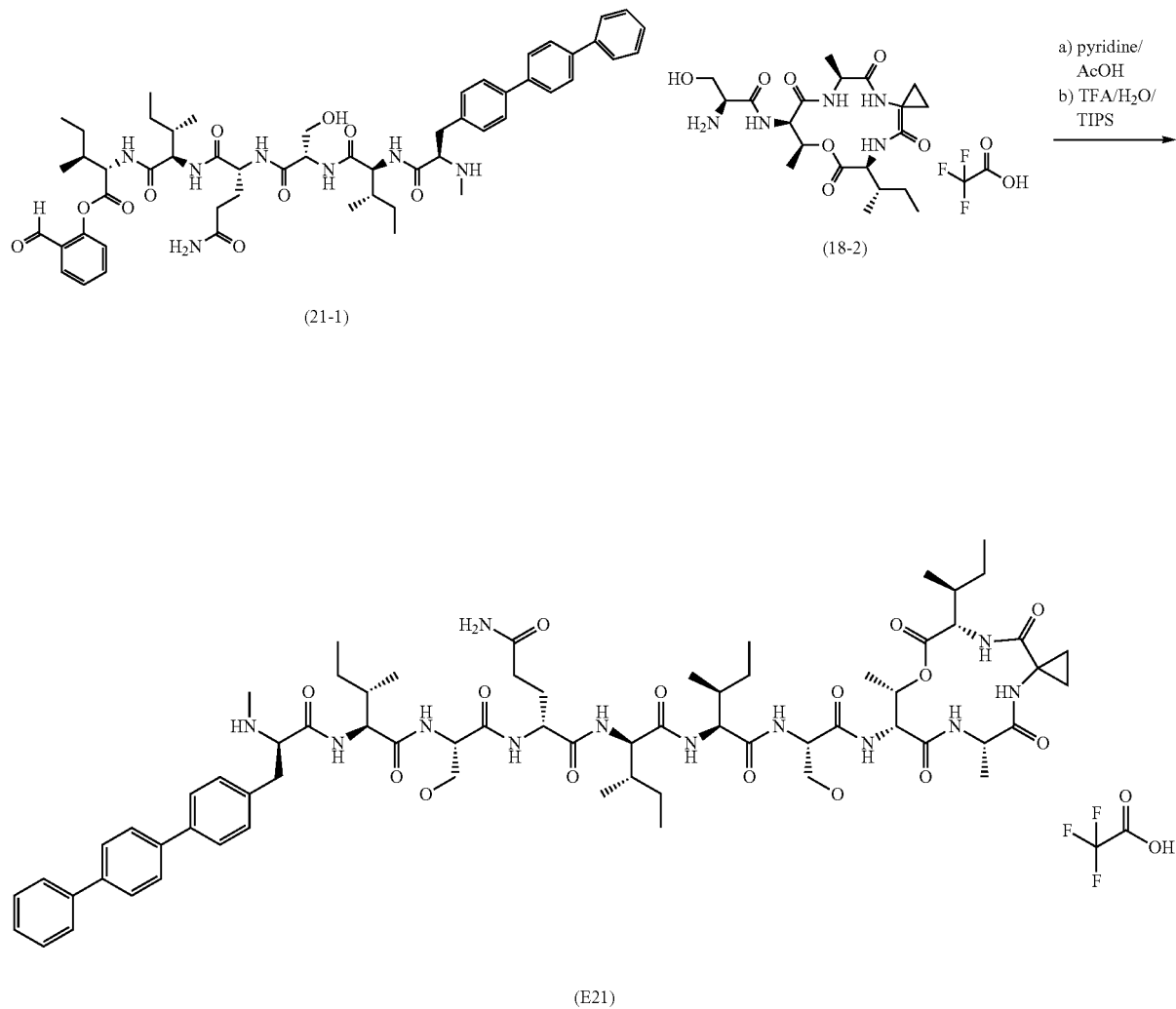

To a round-bottom flask were added compound (21-1) (52 mg, 0.052 mmol), compound (18-2) (20 mg, 0.043 mmol) and a mixed solution of pyridine/acetic acid (molar ratio: 6/1, 5 mL). The mixture was stirred at 25° C. for 10 hours, then the solvent was removed. A mixed solution of trifluoroacetic acid/water/triisopropylsilane (v/v/v=94/5/1, 10 mL) was added, and the resulting mixture was continued to stir for 2 hours. The solvent was removed. The residue was purified by preparative chromatography (gradient elution, mobile phase: 15%-50% ratio of $CH_3CN$ in $H_2O$, elution for 30 minutes) to give the title compound (E21) (41 mg, yield 70%) as a white solid.

MS (ESI, poi.ion) m/z: 1323.2 $[M+H]^+$;

$^1$H NMR (600 MHz, DMSO-$d_6$) δ (ppm): 8.55 (d, J=8.1 Hz, 1H), 8.42-8.32 (m, 2H), 8.24 (d, J=9.5 Hz, 1H), 8.04 (d, J=7.7 Hz, 1H), 8.00 (d, J=6.7 Hz, 1H), 7.96 (d, J=7.8 Hz, 1H), 7.92 (d, J=8.3 Hz, 1H), 7.81 (d, J=8.8 Hz, 1H), 7.77 (d, J=8.3 Hz, 2H), 7.75-7.71 (m, 4H), 7.68 (d, J=8.0 Hz, 2H), 7.49 (t, J=7.6 Hz, 2H), 7.39 (t, J=7.4 Hz, 1H), 7.33 (d, J=8.0 Hz, 2H), 7.24 (s, 1H), 6.78 (s, 1H), 5.37-5.23 (m, 2H), 4.99 (t, J=4.9 Hz, 1H), 4.60 (d, J=11.5 Hz, 1H), 4.40-4.30 (m, 5H), 4.26-4.18 (m, 2H), 4.13 (dt, J=14.2, 7.4 Hz, 2H), 3.99 (t, J=9.3 Hz, 1H), 3.72-3.68 (m, 1H), 3.64 (dd, J=9.6, 4.5 Hz, 1H), 3.60-3.57 (m, 1H), 3.56-3.50 (m, 1H), 3.21-3.16 (m, 1H), 3.05-2.97 (m, 1H), 2.49 (s, 3H), 2.08 (dd, J=16.9, 10.9 Hz, 2H), 1.90-1.82 (m, 1H), 1.80-1.74 (m, 2H), 1.73-1.69 (m, 1H), 1.53 (t, J=9.7 Hz, 2H), 1.43-1.36 (m, 2H), 1.28-1.22 (m, 5H), 1.15 (d, J=6.3 Hz, 4H), 1.06 (t, J=7.0 Hz, 6H), 0.99 (s, 2H), 0.81 (ddd, J=21.6, 14.7, 7.6 Hz, 20H), 0.58 (t, J=6.5 Hz, 6H).

Example 22 Compound (E22)

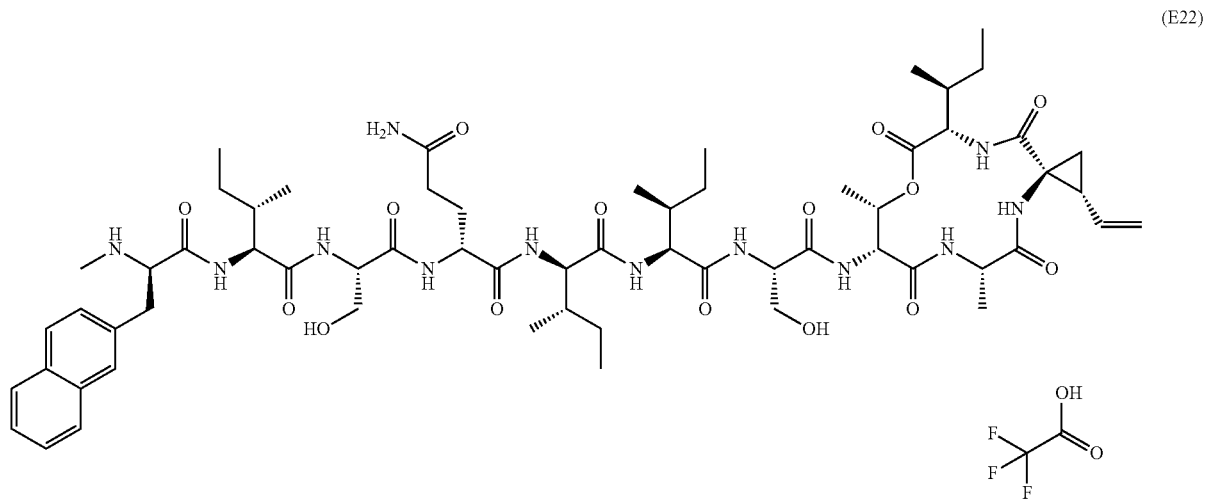 [SMILES: C=C[C@H]1C[C@]12NC(=O)[C@H](C)NC(=O)[C@H](NC(=O)[C@H](CO)NC(=O)[C@@H](NC(=O)[C@H](NC(=O)[C@@H](CCC(N)=O)NC(=O)[C@H](CO)NC(=O)[C@@H](NC(=O)[C@@H](Cc1ccc3ccccc3c1)NC)[C@@H](C)CC)[C@@H](C)CC)[C@@H](C)CC)[C@H](C)OC(=O)[C@H]([C@@H](C)CC)NC2=O ; O=C(O)C(F)(F)F]

(R)-2-((tert-Butoxycarbonyl)(methyl)amino)-3-(naphthalen-2-yl)propionic acid and (1S,2R)-1-((((9H-fluoren-9-yl)methoxy)carbonyl)amino)-2-vinylcyclopropanecarboxylic acid were respectively used instead of Boc-N-Me-D-Phe-OH in step 2 of example 1 and (1R,2S)-1-((((9H-fluoren-9-yl)methoxy)carbonyl)amino)-2-(2,2-difluoroethyl)cyclopropanecarboxylic acid (1-9) in step 7 of example 1. According to the method described in example 1, the title compound (E22) (19.3 mg, yield 37.2%) was prepared as a white solid.

MS (ESI, poi.ion) m/z: 1248.7 [M+H]$^+$;

$^1$H NMR (600 MHz, DMSO-d$_6$) δ (ppm): 9.12 (s, 1H), 8.99 (s, 1H), 8.50 (d, J=8.3 Hz, 1H), 8.43-8.35 (m, 2H), 8.11 (d, J=9.6 Hz, 1H), 8.04 (d, J=8.0 Hz, 1H), 7.96-7.88 (m, 5H), 7.82 (dd, J=16.0, 8.2 Hz, 2H), 7.72 (s, 1H), 7.54-7.47 (m, 2H), 7.45-7.38 (m, 2H), 7.24 (s, 1H), 6.79 (s, 1H), 5.40-5.36 (m, 1H), 5.30-5.24 (m, 2H), 5.21 (d, J=13.5 Hz, 1H), 5.03 (dd, J=9.4, 2.5 Hz, 1H), 4.94 (t, J=4.7 Hz, 1H), 4.57 (dd, J=9.8, 2.0 Hz, 1H), 4.38-4.31 (m, 3H), 4.30-4.25 (m, 2H), 4.18 (t, J=8.2 Hz, 1H), 4.11 (t, J=7.8 Hz, 1H), 4.05 (dd, J=16.7, 6.8 Hz, 2H), 3.66 (dd, J=13.4, 7.2 Hz, 2H), 3.59-3.49 (m, 3H), 3.31-3.26 (m, 2H), 3.14 (dd, J=13.2, 9.5 Hz, 1H), 2.49 (s, 2H), 2.10-2.05 (m, 2H), 2.00 (dt, J=16.8, 8.1 Hz, 2H), 1.84 (dd, J=14.7, 8.3 Hz, 1H), 1.76 (dd, J=11.9, 6.0 Hz, 2H), 1.71-1.61 (m, 3H), 1.45-1.35 (m, 5H), 1.28 (d, J=7.2 Hz, 7H), 1.13 (d, J=6.4 Hz, 4H), 1.09-1.03 (m, 2H), 0.85-0.75 (m, 22H), 0.43 (d, J=6.7 Hz, 3H), 0.34 (t, J=7.3 Hz, 3H).

Example 23 Compound (E23)

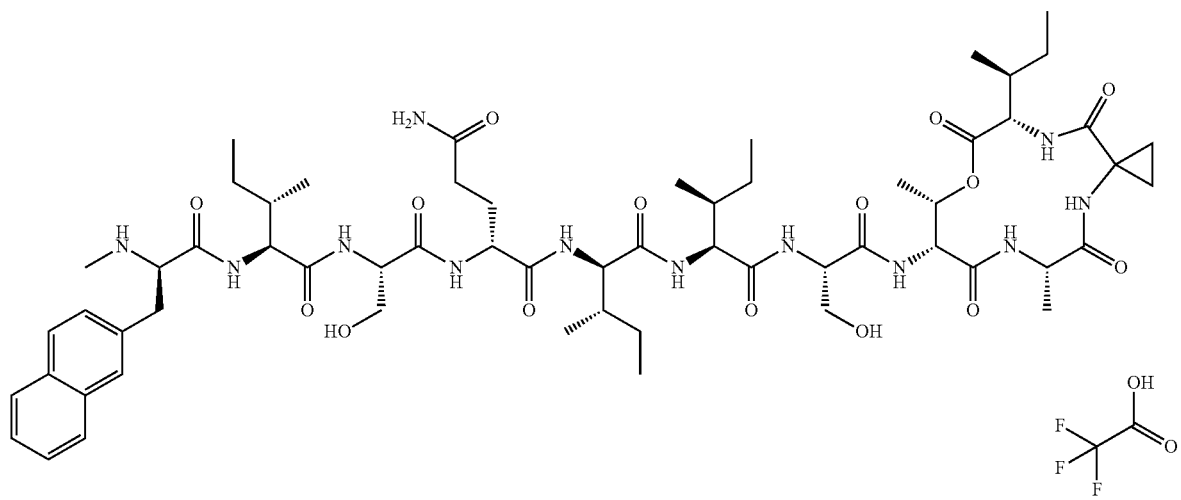

(R)-2-((tert-Butoxycarbonyl)(methyl)amino)-3-(naphthalen-2-yl)propionic acid and 1-((((9H-fluoren-9-yl)methoxy)carbonyl)amino)cyclopropanecarboxylic acid were respectively used instead of Boc-N-Me-D-Phe-OH in step 2 of example 1 and (1R,2S)-1-((((9H-fluoren-9-yl)methoxy)carbonyl)amino)-2-(2,2-difluoroethyl)cyclopropanecarboxylic acid (1-9) in step 7 of example 1. According to the method described in example 1, the title compound (E23) (9.4 mg, yield 24.0%) was prepared as a white solid.

MS (ESI, poi.ion) m/z: 1221.7[M+H]$^+$;

$^1$HNMR (600 MHz, DMSO-d) δ (ppm): 9.12 (s, 1H), 9.00 (s, 1H), 8.50 (d, J=8.3 Hz, 1H), 8.38 (d, J=4.9 Hz, 1H), 8.31 (s, 1H), 8.18 (d, J=9.6 Hz, 1H), 8.02 (d, J=8.0 Hz, 1H), 7.96 (d, J=6.7 Hz, 1H), 7.94-7.86 (m, 4H), 7.82 (dd, J=15.7, 8.2 Hz, 2H), 7.71 (s, 1H), 7.55-7.47 (m, 2H), 7.40 (d, J=7.8 Hz, 1H), 7.24 (s, 1H), 6.79 (s, 1H), 5.34 (dt, J=6.7, 5.1 Hz, 1H), 5.22 (s, 1H), 4.94 (s, 1H), 4.59 (dd, J=9.7, 2.1 Hz, 1H), 4.34 (ddd, J=15.9, 9.4, 5.0 Hz, 4H), 4.19 (t, J=8.2 Hz, 1H), 4.11 (dt, J=14.9, 7.4 Hz, 2H), 4.00 (t, J=9.3 Hz, 1H), 3.70-3.61 (m, 2H), 3.56 (s, 1H), 3.53 (s, 1H), 3.32-3.27 (m, 2H), 3.14 (dd, J=13.1, 9.6 Hz, 1H), 2.49 (s, 2H), 2.07 (q, J=9.5 Hz, 2H), 1.84 (dd, J=14.4, 8.7 Hz, 1H), 1.79-1.71 (m, 3H), 1.70-1.64 (m, 1H), 1.52 (dd, J=12.0, 4.5 Hz, 1H), 1.44-1.35 (m, 3H), 1.29-1.21 (m, 6H), 1.16 (d, J=6.4 Hz, 3H), 1.08-0.98 (m, 4H), 0.92 (dd, J=12.2, 4.3 Hz, 1H), 0.88-0.73 (m, 20H), 0.42 (d, J=6.7 Hz, 3H), 0.33 (t, J=7.3 Hz, 3H).

Example 24 Compound (E24)

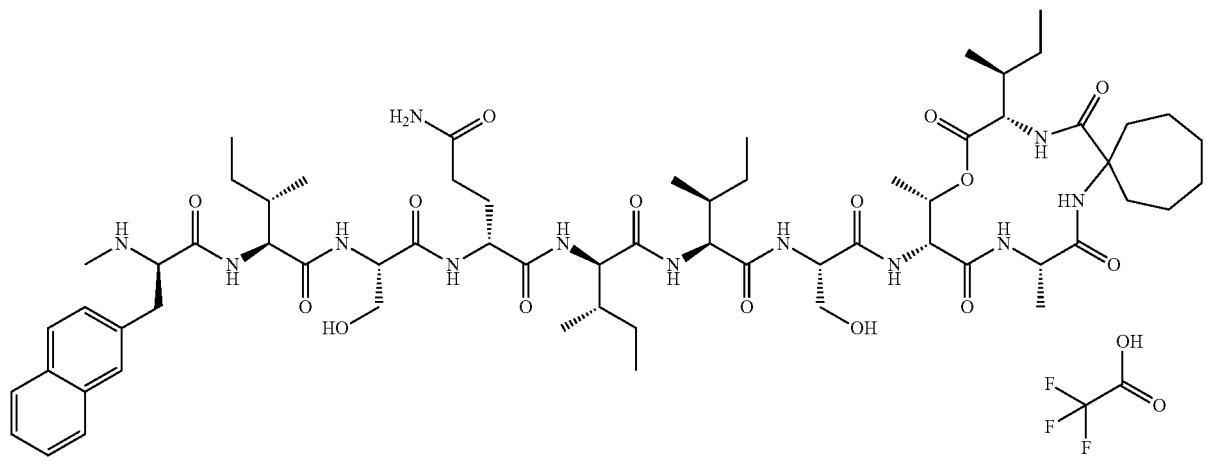

(R)-2-((tert-Butoxycarbonyl)(methyl)amino)-3-(naphthalen-2-yl)propionic acid and 1-((((9H-fluoren-9-yl)methoxy)carbonyl)amino)cycloheptanecarboxylic acid were respectively used instead of Boc-N-Me-D-Phe-OH in step 2 of example 1 and (1R,2S)-1-((((9H-fluoren-9-yl)methoxy)carbonyl)amino)-2-(2,2-difluoroethyl)cyclopropanecarboxylic acid (1-9) in step 7 of example 1. According to the method described in example 1, the title compound (E24) (14.5 mg, yield 29.0%) was prepared as a white solid.

MS (ESI, poi.ion) m/z: 1277.3 [M+H]$^+$;

$^1$HNMR (400 MHz, DMSO-d$_6$): δ (ppm): 9.12 (s, 1H), 9.00 (s, 1H), 8.50 (d, J=8.3 Hz, 1H), 8.28 (d, J=5.6 Hz, 1H), 8.02 (d, J=7.9 Hz, 1H), 7.97 (d, J=8.3 Hz, 1H), 7.94-7.87 (m, 3H), 7.82 (dd, J=19.2, 8.1 Hz, 3H), 7.72 (s, 1H), 7.56-7.45 (m, 3H), 7.39 (t, J=11.7 Hz, 2H), 7.21 (s, 1H), 6.77 (s, 1H), 5.23 (s, 2H), 4.95 (s, 1H), 4.45 (d, J=5.9 Hz, 2H), 4.35 (ddd, J=34.0, 18.0, 13.0 Hz, 5H), 4.22 (d, J=8.2 Hz, 1H), 4.08 (dt, J=19.4, 8.7 Hz, 2H), 3.68 (s, 1H), 3.62-3.56 (m, 2H), 3.52 (d, J=4.8 Hz, 1H), 3.14 (dd, J=13.1, 9.7 Hz, 1H), 2.40 (d, J=11.8 Hz, 1H), 2.17 (dd, J=14.2, 9.5 Hz, 1H), 2.10-2.04 (m, 3H), 1.92 (s, 1H), 1.82-1.72 (m, 4H), 1.71-1.63 (m, 1H), 1.44 (d, J=56.1 Hz, 12H), 1.32-1.21 (m, 6H), 1.18-1.13 (m, 4H), 1.12-1.01 (m, 3H), 0.80 (ddd, J=26.3, 16.7, 7.1 Hz, 19H), 0.42 (d, J=6.7 Hz, 3H), 0.34 (t, J=7.3 Hz, 3H).

Example 25 Compound (E25)

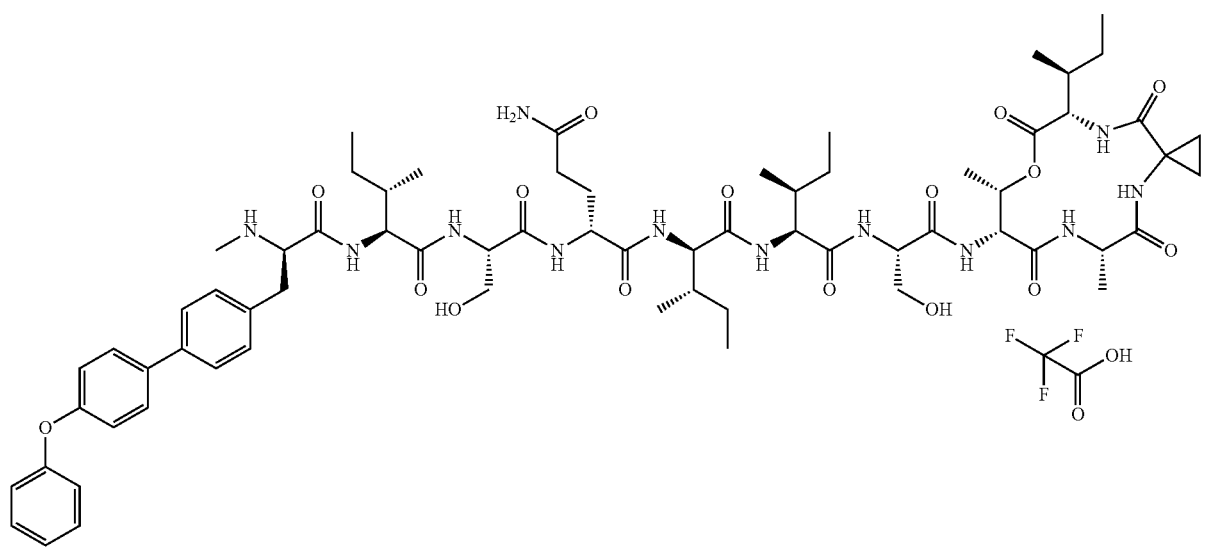

(R)-2-((tert-Butoxycarbonyl)(methyl)amino)-3-(4'-phenoxy-[1,1'-biphenyl]-4-yl) propionic acid and 1-((((9H-fluoren-9-yl)methoxy)carbonyl)amino)cyclopropanecarboxylic acid were respectively used instead of Boc-N-Me-D-Phe-OH in step 2 of example 1 and (1R,2S)-1-((((9H-fluoren-9-yl)methoxy)carbonyl)amino)-2-(2,2-difluoroethyl)cyclopropanecarboxylic acid (1-9) in step 7 of example 1. According to the method described in example 1, the title compound (E25) (22.3 mg, yield 38%) was prepared as a white solid.

MS (ESI, poi.ion) m/z: 1339.2 [M+H]⁺;
$^1$H NMR (600 MHz, DMSO-d$_6$) δ (ppm): 9.09 (s, 1H), 8.97 (s, 1H), 8.52 (d, J=8.3 Hz, 1H), 8.38 (d, J=4.9 Hz, 1H), 8.31 (s, 1H), 8.18 (d, J=9.7 Hz, 1H), 8.05 (d, J=7.9 Hz, 1H), 7.98-7.92 (m, 2H), 7.91 (d, J=8.3 Hz, 1H), 7.82 (d, J=8.9 Hz, 1H), 7.65 (d, J=8.7 Hz, 2H), 7.60 (d, J=8.2 Hz, 2H), 7.43 (dd, J=8.5, 7.5 Hz, 2H), 7.31 (d, J=8.2 Hz, 2H), 7.24 (s, 1H), 7.18 (t, J=7.4 Hz, 1H), 7.08 (dt, J=8.7, 6.8 Hz, 5H), 6.79 (s, 1H), 5.36-5.31 (m, 1H), 5.21 (s, 1H), 4.94 (s, 1H), 4.60 (dd, J=9.7, 2.3 Hz, 1H), 4.39-4.30 (m, 5H), 4.19 (dd, J=14.0, 5.7 Hz, 2H), 3.68 (s, 1H), 3.63 (s, 1H), 3.58 (d, J=4.7 Hz, 1H), 3.54 (d, J=5.1 Hz, 1H), 3.16 (dd, J=13.3, 5.4 Hz, 1H), 3.00 (dd, J=13.1, 9.6 Hz, 1H), 2.48 (s, 3H), 2.13-2.03 (m, 2H), 1.85 (dd, J=14.6, 8.8 Hz, 1H), 1.76 (dt, J=23.5, 11.8 Hz, 3H), 1.57-1.49 (m, 2H), 1.44-1.37 (m, 2H), 1.28-1.23 (m, 5H), 1.16 (d, J=6.4 Hz, 3H), 1.07 (q, J=6.7 Hz, 9H), 0.92 (dd, J=12.2, 4.8 Hz, 1H), 0.85-0.76 (m, 17H), 0.58 (t, J=7.0 Hz, 6H).

Example 26 Compound (E26)

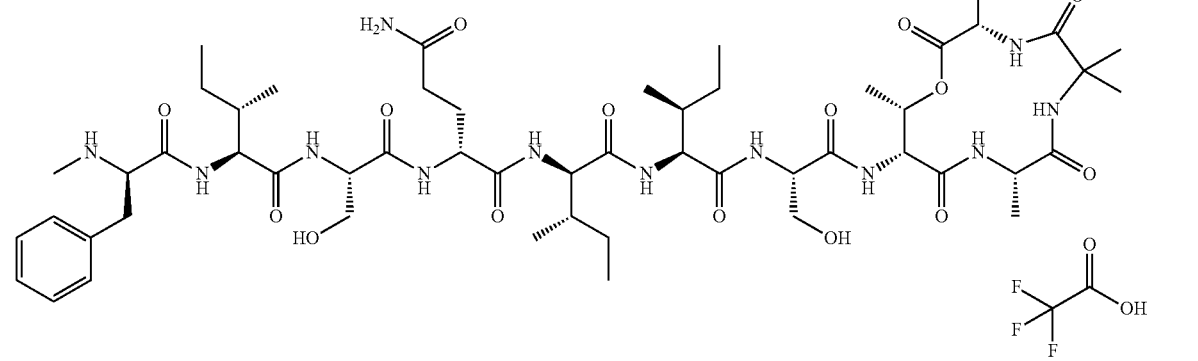

2-((((9H-Fluoren-9-yl)methoxy)carbonyl)amino)-2-methylpropionic acid was used instead of (1R,2S)-1-((((9H-fluoren-9-yl)methoxy)carbonyl)amino)-2-(2,2-difluoroethyl) cyclopropanecarboxylic acid (1-9) in step 7 of example 1. According to the method described in example 1, the title compound (E26) (24.0 mg, yield 56.4%) was prepared as a white solid.

MS (ESI, poi.ion) m/z: 1173.3 [M+H]⁺;

HRMS (ESI, pos. ion) m/z: 1173.6850[M+H]$^+$, (C$_{56}$H$_{92}$N$_{12}$O$_{15}$) [M+H]$^+$ Theoretical value: 1173.6883.

Activity Test

1. Antibacterial Activity Test

Test Method 1

For the determination of the minimum inhibitory concentration (MIC), according to the CLSI standard, a two-fold dilution method with a plate and a Denlay multi-point inoculator were used to conduct the drug sensitivity test. The test bacteria were enriched with MH broth or brain heart infusion. The drug solution was diluted two-fold with MH broth to prepare various required concentrations, and appropriate amounts were added to the plates respectively. After the MH agar medium was melted, it was quantitatively poured into the plates containing the drug solution and mixed uniformly. The final concentrations of the samples were: 128, 64, 32, 16, 8, 4, 2, 1, 0.5, 0.25, 0.125, 0.063, 0.031, 0.016, 0.008, 0.004 µg/mL, respectively. The test bacteria were inoculated (inoculation amount was 104 cfu/point) and then incubated at constant temperature of 35 □. The results were observed after 18 h. The minimum concentration of the drug contained in the sterile growth plate was the minimum inhibitory concentration (MIC). Selection of strain types: MRSA (SA86 and SA88), MSSA (ATCC29213), Enterococcus (ET6) and Streptococcus faecalis (SF). The experimental results were shown in Table A.

TABLE A

MIC (µg/mL) experimental results of the compounds of the invention
In vitro antibacterial activity MIC(µg/mL)

| Example No. | MRSA SA86 | MRSA SA88 | MSSA (ATCC29213) | Enterococcus (ET6) | Streptococcus faecalis(SF) |
|---|---|---|---|---|---|
| 1 | 4 | / | 2 | 4 | / |
| 2 | 4 | 2 | 4 | 4 | 8 |
| 3 | 4 | 4 | 4 | 2 | 4 |
| 4 | 8 | 4 | 4 | 8 | 8 |
| 5 | 4 | / | 4 | 8 | 8 |
| 6 | 8 | / | 8 | / | / |
| 8 | 8 | 4 | 8 | / | / |
| 9 | 4 | / | 4 | 4 | 8 |
| 10 | 4 | 4 | 2 | 2 | 2 |
| 13 | 8 | 8 | 8 | 8 | 8 |

"/" means not tested

The test results show that the compounds of the present invention have good antibacterial activity in vitro.

Test Method 2

For the determination of the minimum inhibitory concentration (MIC), according to the CLSI standard, the minimum inhibitory concentration of 3 ATCC standard strains (2 strains of Staphylococcus aureus and 1 strain of Enterococcus faecium) was tested by two independent repeated experiments. Compounds were diluted two-fold in a 96-well plate from the highest detection concentration of 64 µg/mL. The test plate was placed in a common incubator and incubated at 35±2° C. for 20-24 hours. The growth of bacteria in the wells was observed and recorded. Inoculation method: 5-10 bacterial single colonies from the solid medium plate resuspended in 500 µL of 1.02×CAMHB, and then OD$_{600}$ was adjusted to 0.1-0.15 with a spectrophotometer; then the bacteria were diluted 300-fold with 1.02×CAMHB to ~2×10$^5$ CFU/ml (stepwise dilution, first 10-fold and then 30-fold), and the prepared bacterial inoculum was inoculated in 96-well plate within 15 minutes, the number of inoculated bacteria could be obtained by plate count. Colony count: the inoculated bacteria was diluted with liquid medium from 10$^{-1}$ to 10$^{-3}$ (such as 100 µL of bacterial inoculum+900 µL of 1.02×CAMHB); 100 µl of the above bacterial dilution was evenly spread on a TSA or TSA II plate, with 2 replicates per dilution. After the medium was absorbed by TSA or TSA II for 10 minutes, the plate was inverted and cultured at 35±2° C. for 24 hours in an incubator. Record of minimum inhibitory concentration and statistics of colony count: the minimum inhibitory concentration of each compound was recorded referring to the CLSI standard; the number of colonies of bacterial inoculum of different dilutions on the TSA or TSA II plate was counted and the amount of bacterial inoculation was calculated. Selection of strain types: MRSA (ATCC43300), MSSA (ATCC29213) and VRE (ATCC700221). The experimental results were shown in Table B.

TABLE B

MIC (µg/mL) experimental results of the compounds of the invention
In vitro antibacterial activity MIC(µg/mL)

| Example No. | MRSA(ATCC 43300) | MSSA(ATCC29213) | VRE(ATCC700221) |
|---|---|---|---|
| 12 | 8 | 8 | / |
| 14 | 4 | 4 | 8 |
| 15 | 4 | 4 | 8 |
| 16 | 4 | 4 | 4 |
| 17 | 4 | 4 | 8 |
| 18 | 2 | 2 | 2 |
| 19 | 4 | 4 | 4 |
| 20 | 4 | 4 | 4 |
| 21 | 8 | 8 | 8 |
| 22 | 2 | 2 | 4 |
| 23 | 2 | 4 | 4 |
| 24 | 4 | 4 | 4 |
| 25 | 4 | 4 | 4 |
| 26 | 32 | 64 | >64 |

The test results in Table B show that the compounds of the present invention have good antibacterial activity in vitro.

Test Method 3

For the determination of the minimum inhibitory concentration (MIC), according to the CLSI standard, the minimum inhibitory concentration against Mycobacterium smegmatis mc2155 was tested by two independent repeated experiments. Compounds were diluted two-fold in a 96-well plate from the highest detection concentration of 64 µg/mL. The test plate was placed in a common incubator and incubated at 35±2° C. for 48 hours. The growth of bacteria in the wells was observed and recorded. Inoculation method: Mycobacterium smegmatis mc2155 was cultivated to the logarithmic growth phase, and then OD$_{600}$ was adjusted to 0.1-0.15 with a spectrophotometer; then the bacteria were diluted 200-fold with 7H9 liquid medium to ~5×10$^5$ CFU/ml (stepwise dilution, first 10-fold and then 30-fold). Colony count: the inoculated bacteria was diluted with liquid medium from 10$^{-1}$ to 10$^{-3}$; 100 µl of the above bacterial dilution was evenly spread on a 7H9 solid medium plate, with 2 replicates per dilution. After the medium was absorbed by the solid medium plate for 10 minutes, the plate was inverted and cultured at 35±2° C. for 48 hours in an incubator. Record of minimum inhibitory concentration and statistics of colony count: the minimum inhibitory concentration of each compound was recorded referring to the CLSI standard; the number of colonies of bacterial inoculum of different dilutions on the 7H9 plate was counted and the amount of bacterial inoculation was calculated. The experimental results were shown in Table C.

TABLE C

MIC (μg/mL) experimental results of the compounds of the invention
In vitro antibacterial activity MIC(μg/mL)

| Example No. | *Mycobacterium smegmatis* mc2155 |
|---|---|
| 1 | 8 |

The test results in Table C show that the compounds of the present invention have very good inhibitory activity against *Mycobacterium smegmatis*.

2. Pharmacokinetic Evaluation after Intravenous Injection of the Compound of the Present Invention in Rats The present invention evaluates the pharmacokinetic studies of the compounds of the present invention and control compounds in SD rats, dogs, or monkeys. The compound of the present invention was administered as a physiological saline solution consisting of 5% DMSO, 5% Kolliphor HS 15 and 90% Saline. For intravenous (iv) administration, animals were given a dose of 1 mg/kg, blood (0.3 mL) was drawn at time points of 0.083, 0.25, 0.5, 1.0, 2.0, 5.0, 7.0 and 24 hours, and centrifuged at 3,000 or 4,000 rpm for 10 minutes. The plasma solution was collected and stored at −20° C. or −70° C. until the above-mentioned LC/MS/MS analysis proceeded.

The test results show that the compounds provided by the present invention exhibit excellent pharmacokinetic properties when administered intravenously.

Reference throughout this specification to "an embodiment", "some embodiments", "one embodiment", "another example", "an example", "a specific example", or "some examples" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example", "in a specific example", or "in some examples" in various places throughout this specification are not necessarily referring to the same embodiment or example of the present disclosure. Furthermore, the particular features, structures, materials, or characteristics may be combined in any suitable manner in one or more embodiments or examples. In addition, those skilled in the art can integrate and combine different embodiments, examples or the features of them as long as they are not contradictory to one another.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A compound having Formula (I) or a stereoisomer, a tautomer, an N-oxide, a solvate, a pharmaceutically acceptable salt or a prodrug thereof:

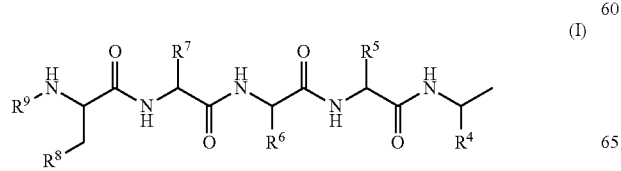

(I)

-continued

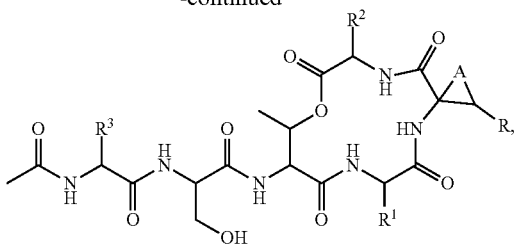

wherein:

$R^9$ is H, deuterium, $C_{1-6}$ alkyl or $C_{1-6}$ haloalkyl;

each of $R^1$, $R^2$, $R^3$, $R^4$, $R^5$, $R^6$ and $R^7$ is independently $C_{1-10}$ alkyl, hydroxy $C_{1-6}$ alkyl or $H_2NC(=O)-C_{1-6}$ alkyl, wherein $C_{1-10}$ alkyl is unsubstituted or substituted with 1, 2 or 3 substituents, and the substituent is independently selected from deuterium, F, Cl, Br, OH, $NH_2$, $C_{1-6}$ alkyl or $C_{2-6}$ alkenyl;

$R^8$ is $-R^{10}$, $-R^{11}-L_1-R^{12}$ or $-R^{13}-L_2-R^{14}-L_3-R^{15}$;

each of $L_1$, $L_2$ and $L_3$ is independently $-(CH_2)_q-$, $-O-$, or $-S-$;

q is 0, 1 or 2;

each of $R^{10}$, $R^{11}$, $R^{12}$, $R^{13}$, $R^{14}$ and $R^{15}$ is independently $C_{6-10}$ aryl or 5-10 membered heteroaryl, wherein each $C_{6-10}$ aryl and 5-10 membered heteroaryl is independently unsubstituted or substituted with 1 or 2 substituents independently selected from deuterium, F, Cl, Br, I, CN, OH, $C_{1-6}$ alkoxy, $C_{6-10}$ aryl or 5-6 membered heteroaryl;

A is $-(CR^aR^b)_p-$;

p is 1, 2, 3, 4, 5 or 6;

each $R^a$ and $R^b$ is independently H, deuterium, F, Cl, Br, I, OH, $NH_2$, $C_{1-6}$ alkyl, $C_{2-6}$ alkenyl, $C_{1-6}$ alkoxy, $C_{1-6}$ haloalkyl, hydroxy $C_{1-6}$ alkyl, amino $C_{1-6}$ alkyl, cyano $C_{1-6}$ alkyl, carboxy $C_{1-6}$ alkyl or 3-6 membered heterocyclyl-$C_{1-6}$ alkylene;

R is $R^{16}$ or $-P_4-L_4-R^{17}$;

$P_4$ is $C_{1-6}$ alkylene;

$L_4$ is $-O-$, $-S-$, $-NR^d-$ or $-NR^eC(=O)-$;

each $R^d$ and $R^e$ is independently H, deuterium or $C_{1-6}$ alkyl each of $R^{16}$ and $R^{17}$ is H, deuterium, F, Cl, Br, I, CN, OH, $NH_2$, $-SH$, $C_{1-8}$ alkyl, $C_{2-6}$ alkenyl, $C_{1-6}$ haloalkyl or $C_{6-10}$ aryl, wherein each $C_{1-8}$ alkyl and $C_{6-10}$ aryl is independently unsubstituted or substituted with 1, 2, 3 or 4 $R^x$; and each $R^x$ is independently deuterium, F, Cl, Br, I, OH, $NH_2$, $-C(=O)OH$, $-SH$, $C_{1-6}$ alkoxy or $C_{1-6}$ alkylamino.

2. The compound of claim 1 having Formula (II) or a stereoisomer, a tautomer, an N-oxide, a solvate, a pharmaceutically acceptable salt or a prodrug thereof:

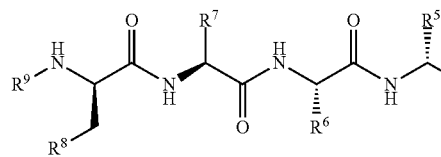
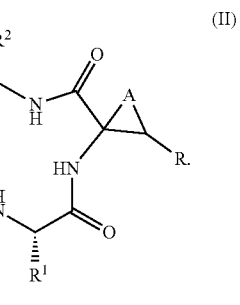

(II)

3. The compound of claim 1, wherein $R^9$ is H, deuterium, methyl, ethyl, n-propyl, isopropyl, n-butyl or tert-butyl.

4. The compound of claim 1, wherein:
each of $R^1$, $R^2$, $R^3$, $R^4$, $R^5$, $R^6$ and $R^7$ is independently $C_{1-8}$ alkyl, hydroxy $C_{1-4}$ alkyl or $H_2NC(=O)$—$C_{1-4}$ alkyl, wherein $C_{1-8}$ alkyl is unsubstituted or substituted with 1, 2 or 3 substituents, and the substituent is independently selected from deuterium, F, Cl, Br, OH, $NH_2$, $C_{1-4}$ alkyl or $C_{2-4}$ alkenyl; or
each of $R^1$, $R^2$, $R^3$, $R^4$, $R^5$, $R^6$, and $R^7$ is independently methyl, ethyl, n-propyl, isopropyl, n-butyl, isobutyl, sec-butyl, t-butyl, n-pentyl, n-hexyl, n-heptyl, n-octyl, hydroxymethyl, hydroxyethyl, $H_2NC(=O)$—$CH_2$—, $H_2NC(=O)$—$CH_2CH_2$— or $H_2NC(=O)$—$(CH_2)_3$—, wherein each methyl, ethyl, n-propyl, isopropyl, n-butyl, isobutyl, sec-butyl, t-butyl, n-pentyl, n-hexyl, n-heptyl and n-octyl is independently unsubstituted or substituted with 1, 2 or 3 substituents, and the substituent is independently selected from deuterium, F, Cl, Br, OH, $NH_2$, methyl, ethyl, n-propyl, isopropyl, vinyl or allyl.

5. The compound of claim 1, wherein:
each of $R^{10}$, $R^{11}$, $R^{12}$, $R^{13}$, $R^{14}$ and $R^{15}$ is independently $C_{6-10}$ aryl or 5-10 membered heteroaryl, wherein each $C_{6-10}$ aryl and 5-10 membered heteroaryl is independently unsubstituted or substituted with 1 or 2 substituents independently selected from deuterium, F, Cl, Br, I, CN, OH, $C_{1-4}$ alkoxy, $C_{6-10}$ aryl or 5-6 membered heteroaryl; or
each of $R^{10}$, $R^{11}$, $R^{12}$, $R^{13}$, $R^{14}$ and $R^{15}$ is independently phenyl, naphthyl, furyl, thienyl, imidazolyl, thiazolyl, pyrrolyl, pyrazolyl, pyrimidinyl, pyridyl, pyrazinyl, benzofuranyl, benzimidazolyl, benzothienyl, indolyl, purinyl, quinolinyl or isoquinolinyl, wherein each phenyl, naphthyl, furyl, thienyl, imidazolyl, thiazolyl, pyrrolyl, pyrazolyl, pyrimidinyl, pyridyl, pyrazinyl, benzofuranyl, benzimidazolyl, benzothienyl, indolyl, purinyl, quinolinyl and isoquinolinyl is independently unsubstituted or substituted with 1 or 2 substituents independently selected from deuterium, F, Cl, Br, I, CN, OH, methoxy, ethoxy, phenyl or 5-6 membered heteroaryl.

6. The compound of claim 1, wherein:
each of $R^{16}$ and $R^{17}$ is independently H, deuterium, F, Cl, Br, I, OH, $NH_2$, —SH, $C_{1-6}$ alkyl, $C_{1-4}$ haloalkyl, or $C_{6-10}$ aryl, wherein each $C_{1-6}$ alkyl and $C_{6-10}$ aryl is independently unsubstituted or substituted with 1, 2, 3 or 4 $R^x$; or each of $R^{16}$ and $R^{17}$ is independently H, deuterium, F, Cl, Br, I, CN, OH, $NH_2$, —SH, methyl, ethyl, n-propyl, isopropyl, n-butyl, isobutyl, t-butyl, n-pentyl, n-hexyl, —CH=$CH_2$, —CH=$CHCH_3$, —$CH_2CH$=$CH_2$, —$CH_2F$, —$CF_3$, —$CHF_2$, —$CH_2CF_3$, —$CH_2CHF_2$, —$CH_2CH_2F$, —$(CH_2)_2CF_3$, —$(CH_2)_2CHF_2$, —$(CH_2)_2CH_2F$ or phenyl, furanyl, thienyl, imidazolyl, thiazolyl, pyrrolyl, pyrazolyl, pyrimidinyl, pyridyl or pyrazinyl; wherein each methyl, ethyl, n-propyl, isopropyl, n-butyl, isobutyl, t-butyl, n-pentyl, n-hexyl and phenyl is independently unsubstituted or substituted with 1, 2, 3 or 4 $R^x$.

7. The compound of claim 1, wherein each $R^a$ and $R^b$ is independently H, deuterium, F, Cl, Br, I, OH, $NH_2$, $C_{1-4}$ alkyl, $C_{2-4}$ alkenyl, $C_{1-4}$ alkoxy, $C_{1-4}$ haloalkyl, hydroxy $C_{1-4}$ alkyl, amino $C_{1-4}$ alkyl, cyano $C_{1-4}$ alkyl, carboxyl $C_{1-4}$ alkyl, or 5-6 membered heterocyclyl-$C_{1-4}$ alkylene.

8. The compound of claim 1, wherein:
each $R^a$ and $R^b$ is independently H, deuterium, F, Cl, Br, I, OH, $NH_2$, methyl, ethyl, n-propyl, isopropyl, vinyl, methoxy, ethoxy, trifluoromethyl, —$CHF_2$, —$CH_2CHF_2$, —$CH_2CH_2F$, —$CH_2CF_3$, —$(CH_2)_2CHF_2$, —$(CH_2)_3CHF_2$, hydroxymethyl, —$CH_2CH_2OH$, aminomethyl, —$CH_2CH_2NH_2$, cyanomethyl, carboxymethyl, —$(CH_2)_2$-morpholine or —$(CH_2)_2$-pyrrole;
each $R^d$ and $R^e$ is independently H, deuterium, methyl, ethyl, n-propyl or isopropyl; and
$P_4$ is —$CH_2$—, —$CH_2CH_2$—, —$CH_2CH_2CH_2$—, —$CH(CH_3)CH_2$—, —$CH_2CH_2CH_2CH_2$— or —$CH_2(CH_2)_3CH_2$—.

9. The compound of claim 1, wherein:
each $R^x$ is independently deuterium, F, Cl, Br, I, OH, $NH_2$, —$C(=O)OH$, —SH, $C_{1-4}$ alkoxy or $C_{1-4}$ alkylamino; or
each $R^x$ is independently deuterium, F, Cl, Br, I, OH, $NH_2$, —$C(=O)OH$, —SH, methoxy, ethoxy, n-propyloxy, n-butyloxy, n-pentyloxy, n-hexyloxy or methylamino.

10. The compound of claim 1 having one of the following structures:

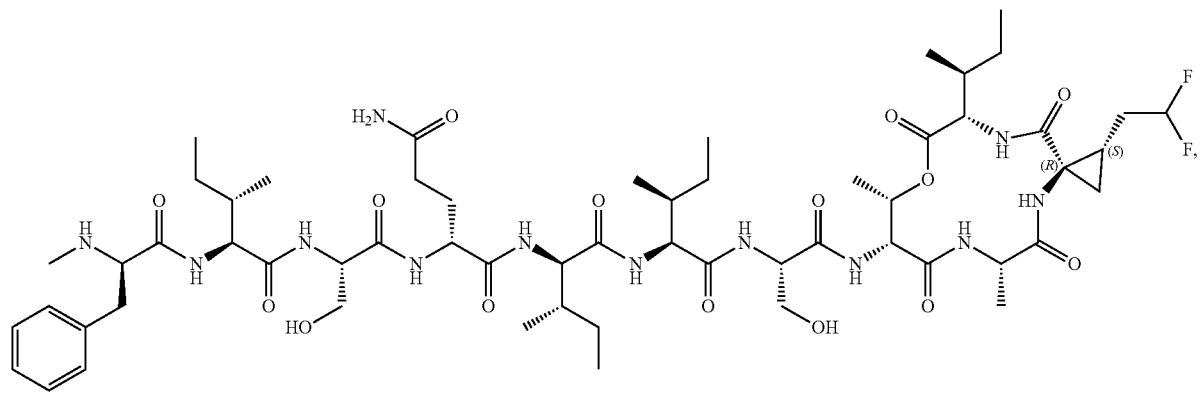
(1)
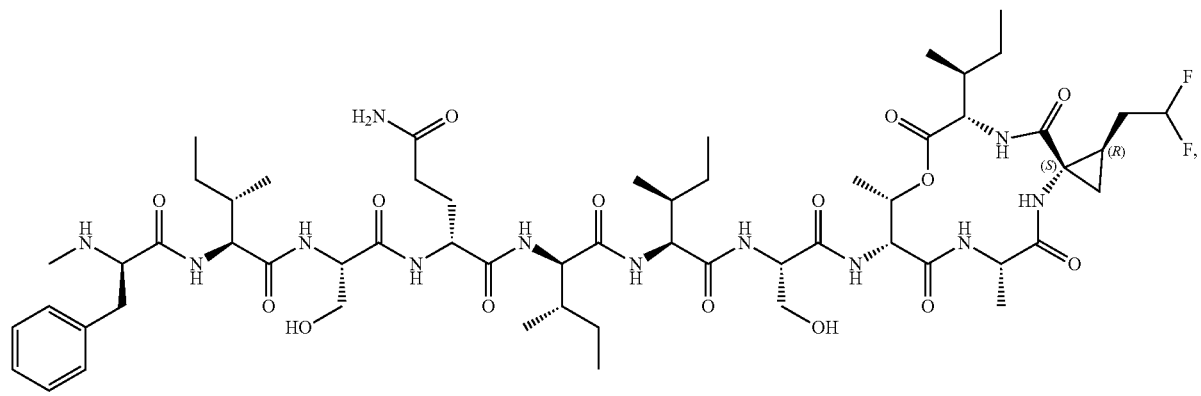
(2)
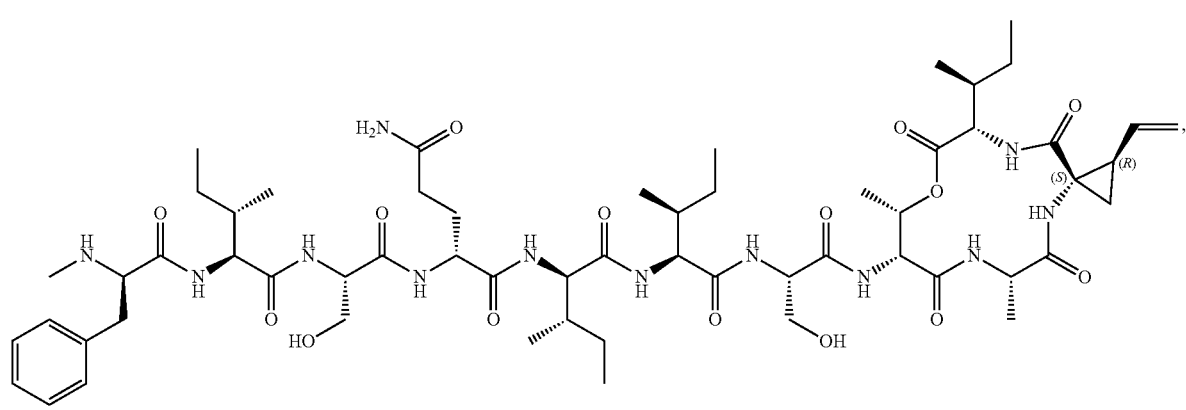
(3)

(4)
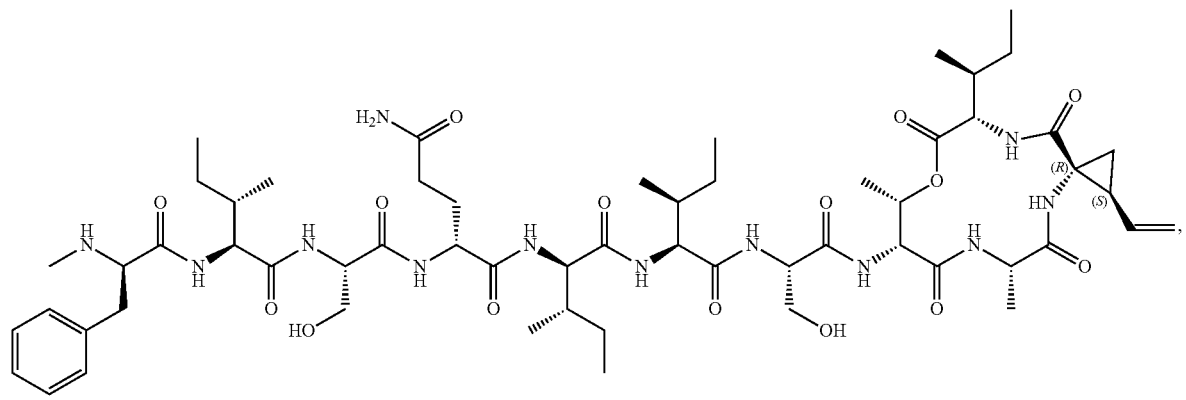
(5)
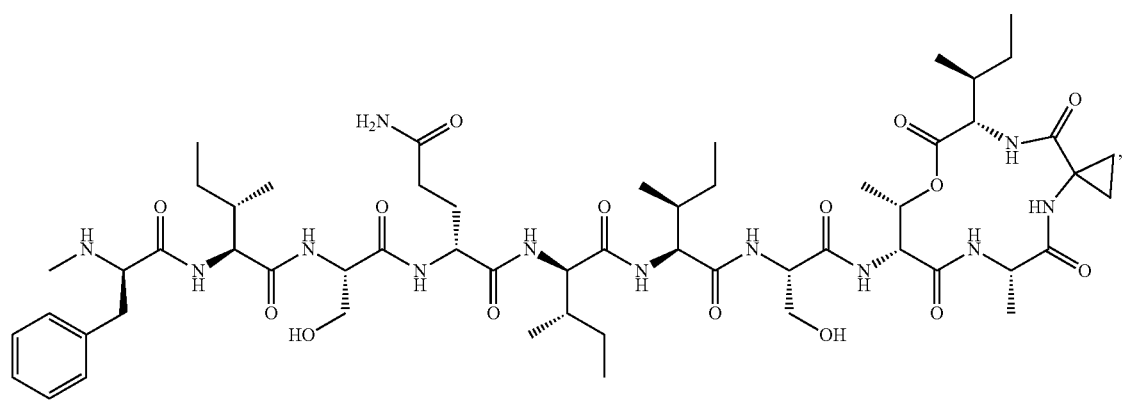
(6)
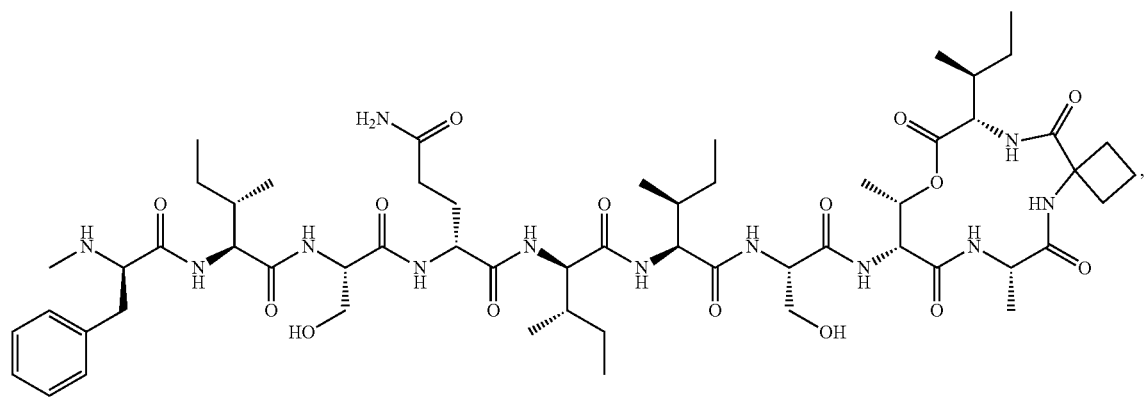
(7)
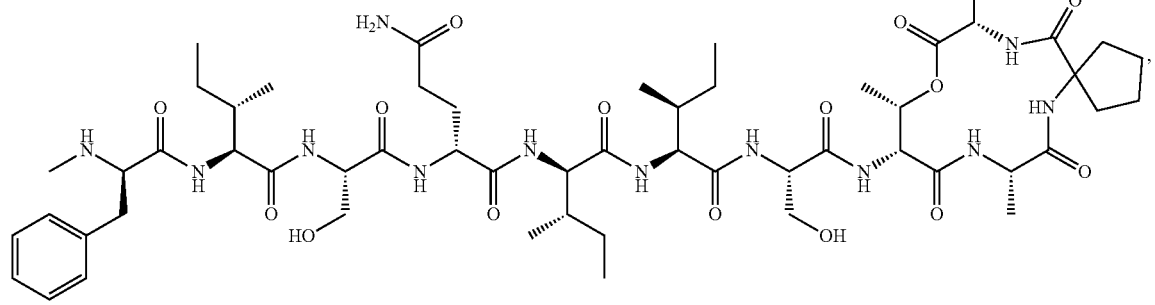

(8)
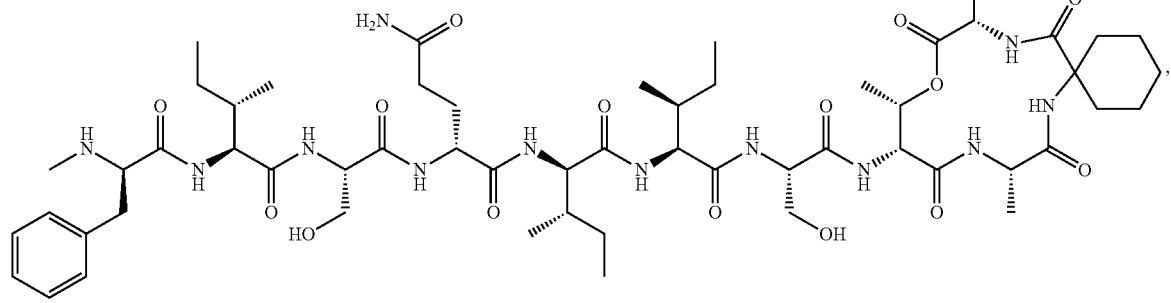
(9)
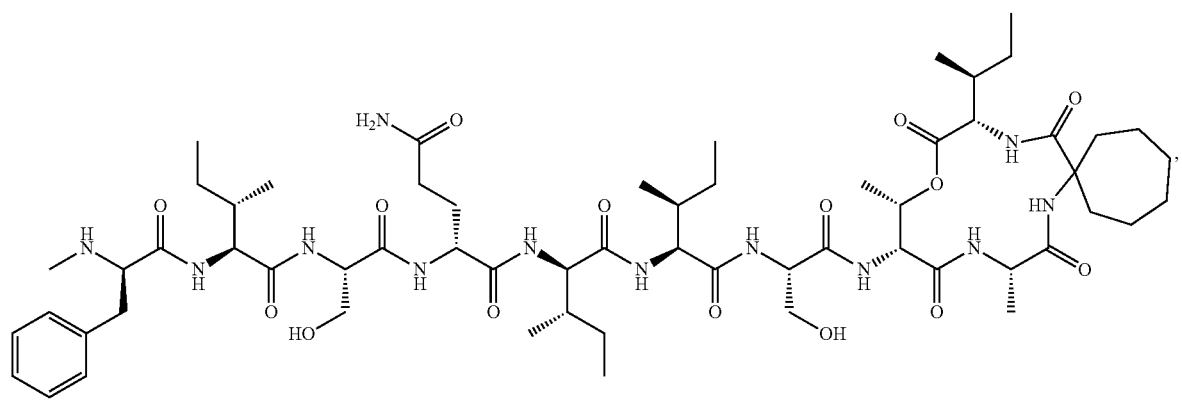
(10)
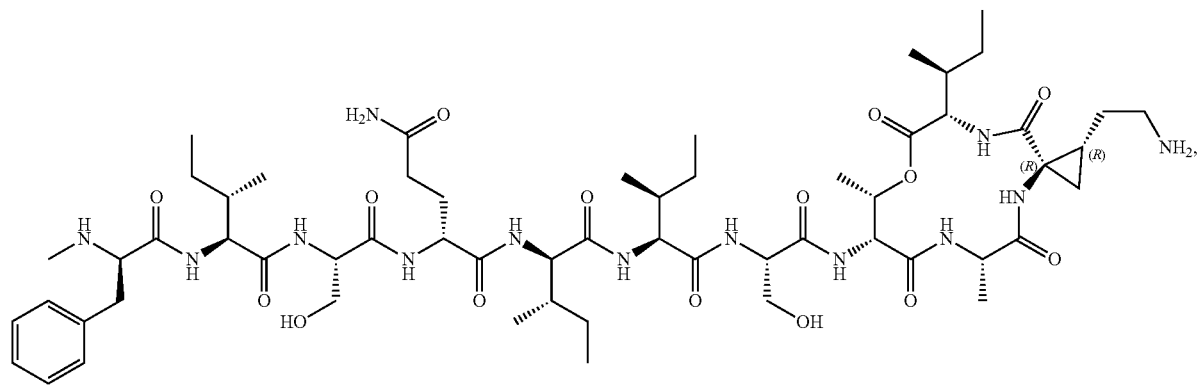
(11)
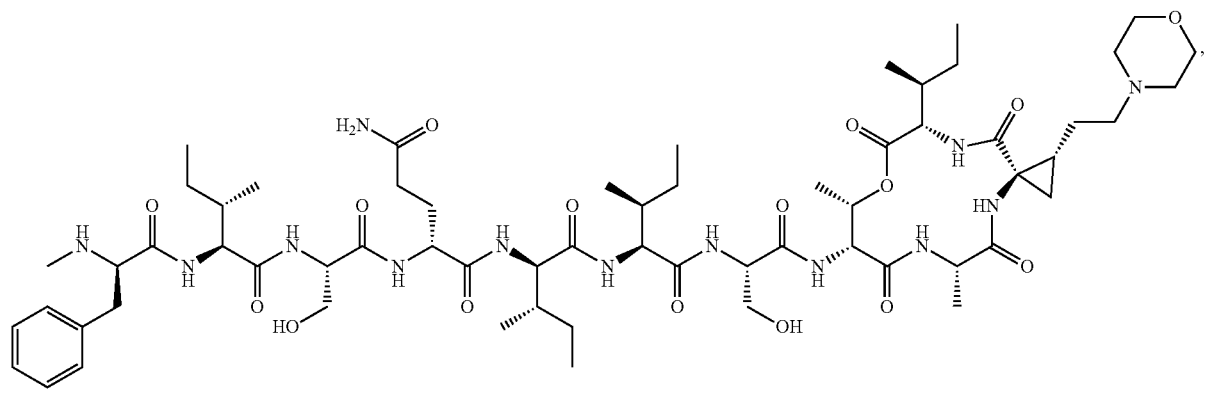

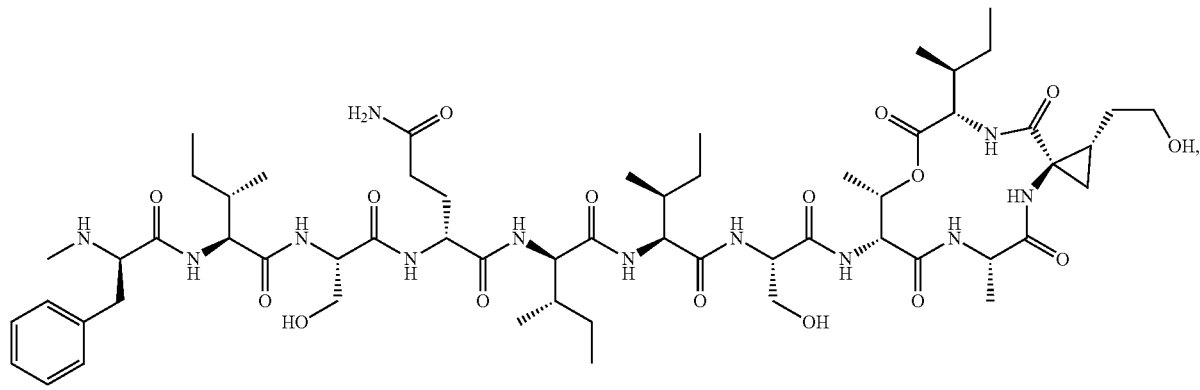
(12)
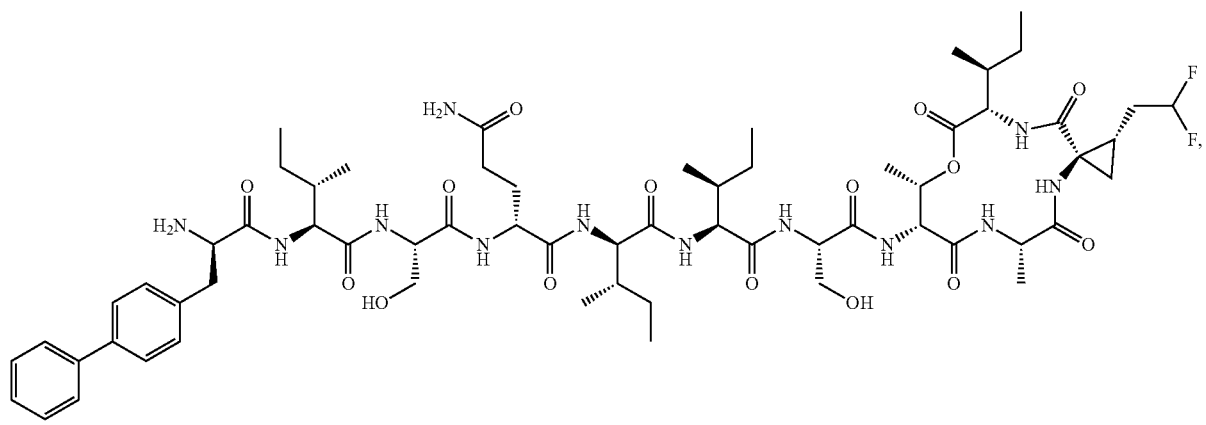
(13)
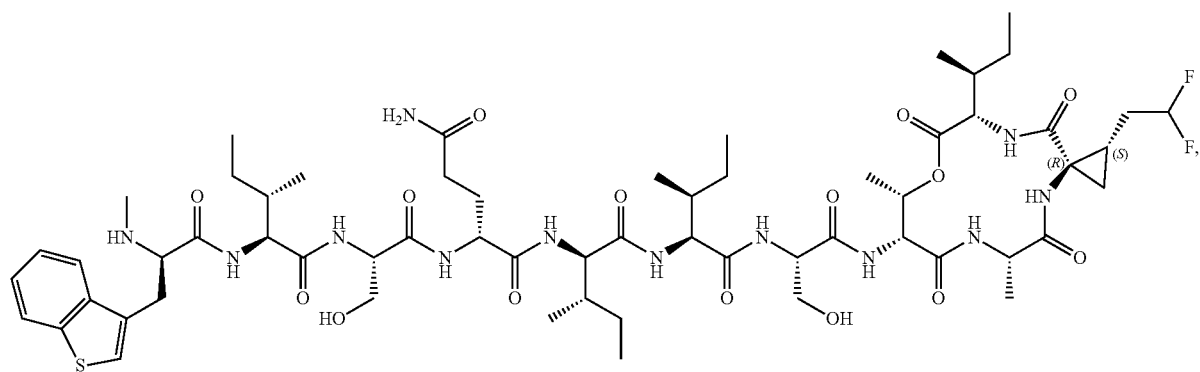
(14)

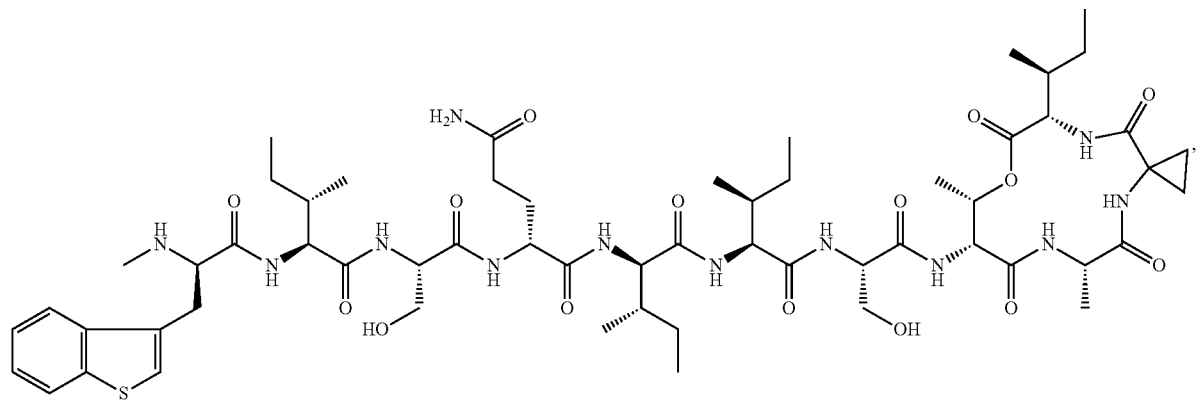
(15)
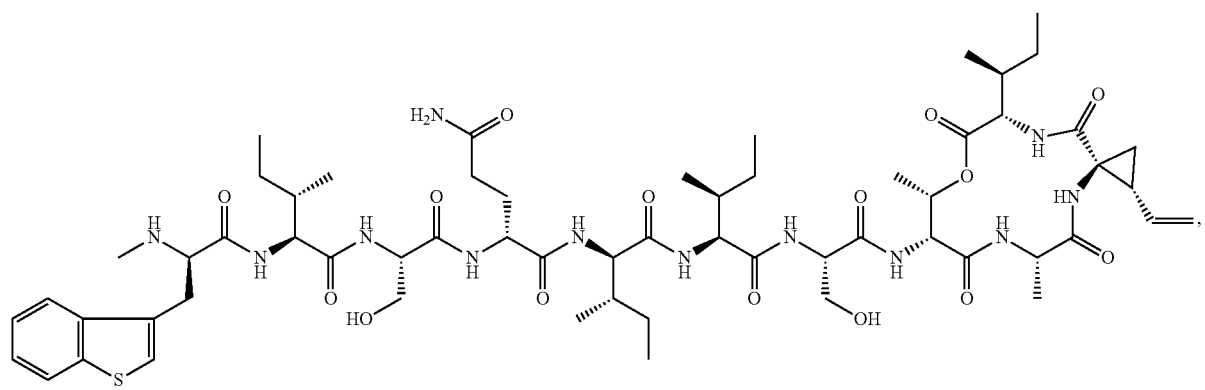
(16)
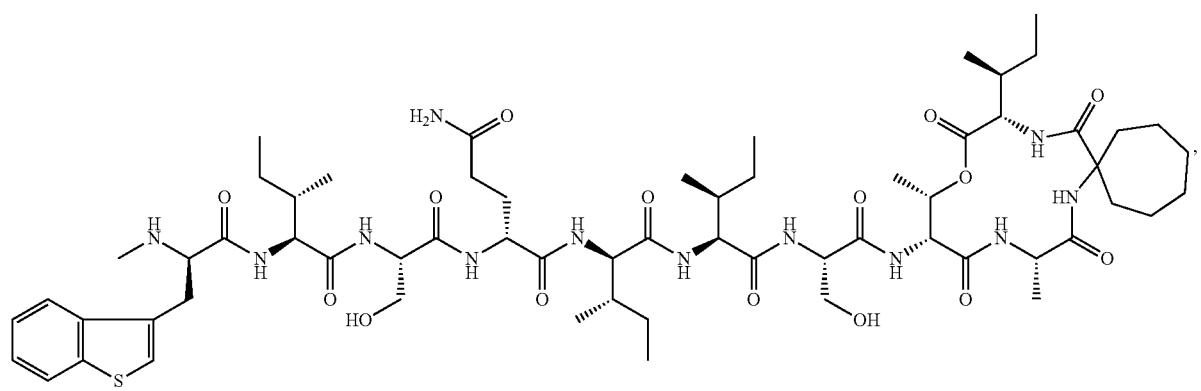
(17)

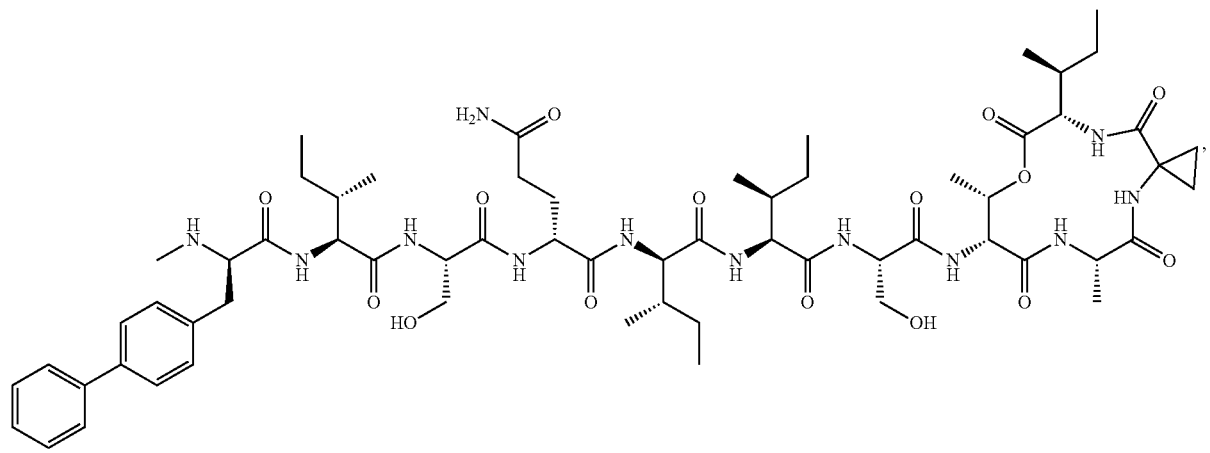
(18)
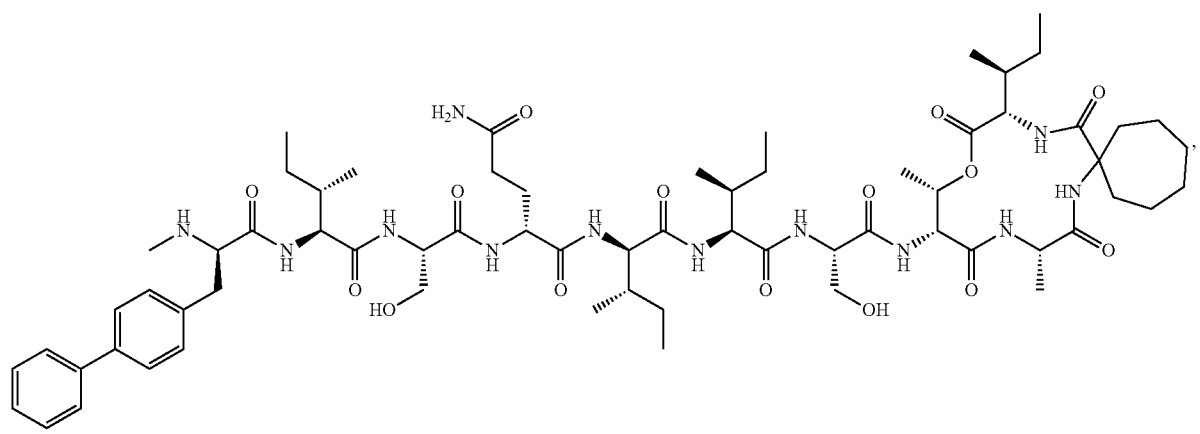
(19)
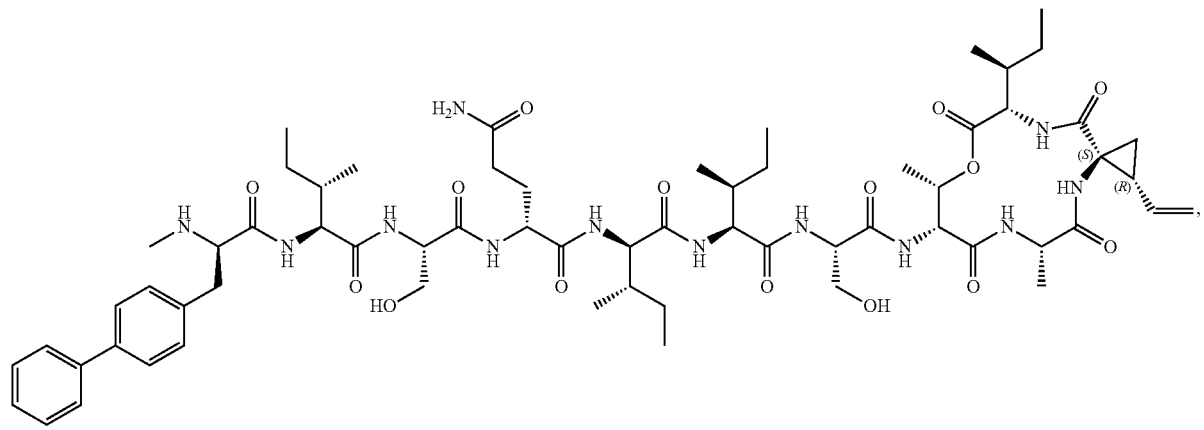
(20)

(21)
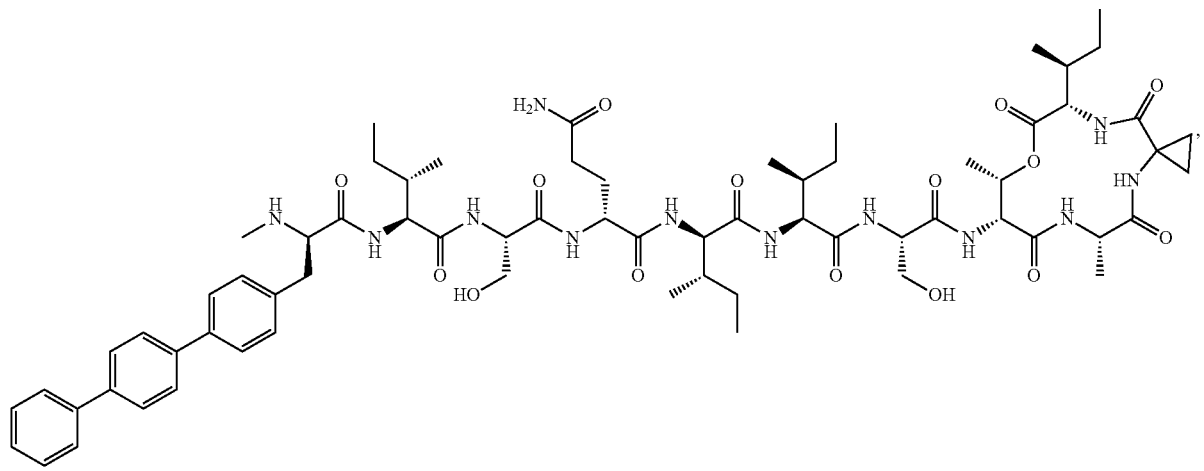
(22)
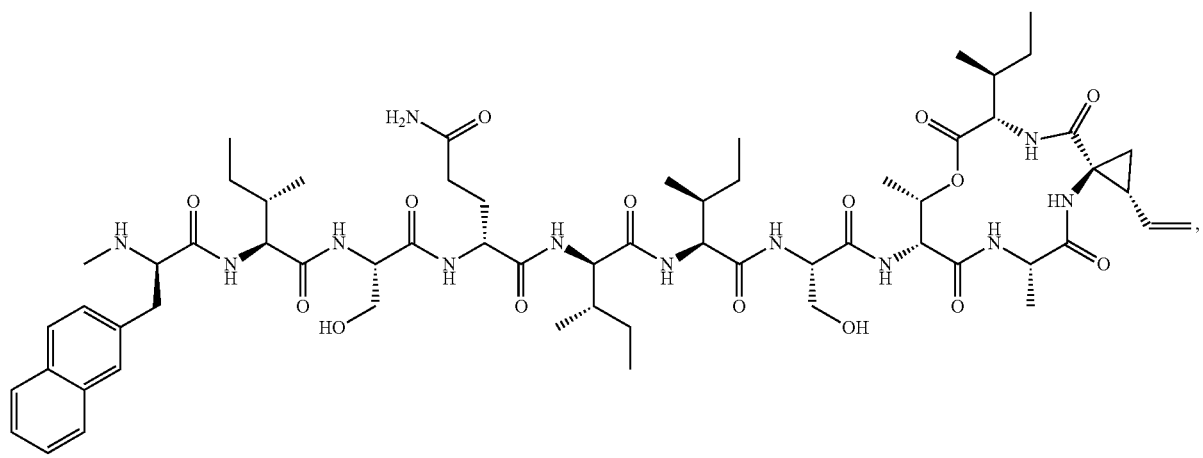
(23)
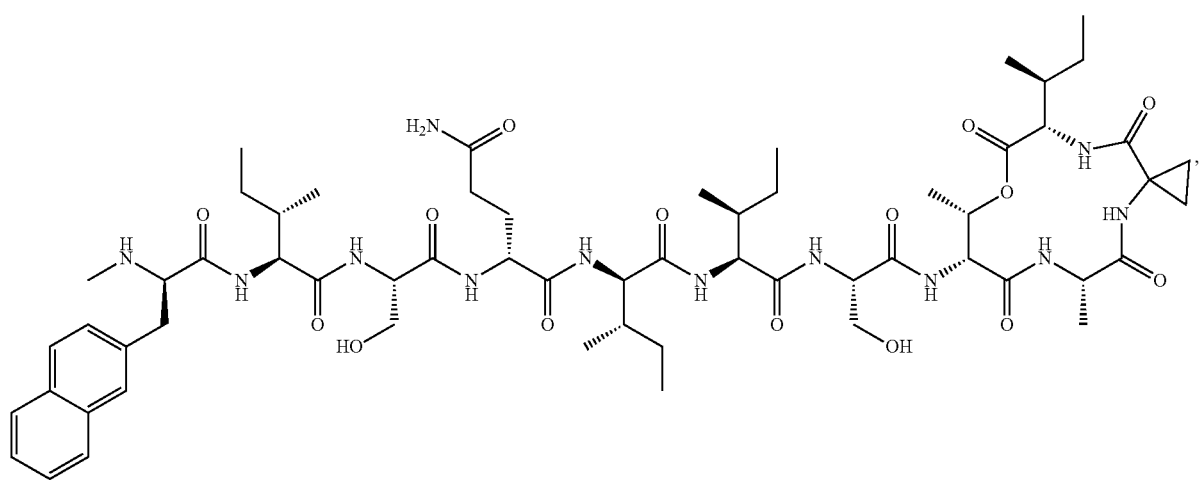

(24)
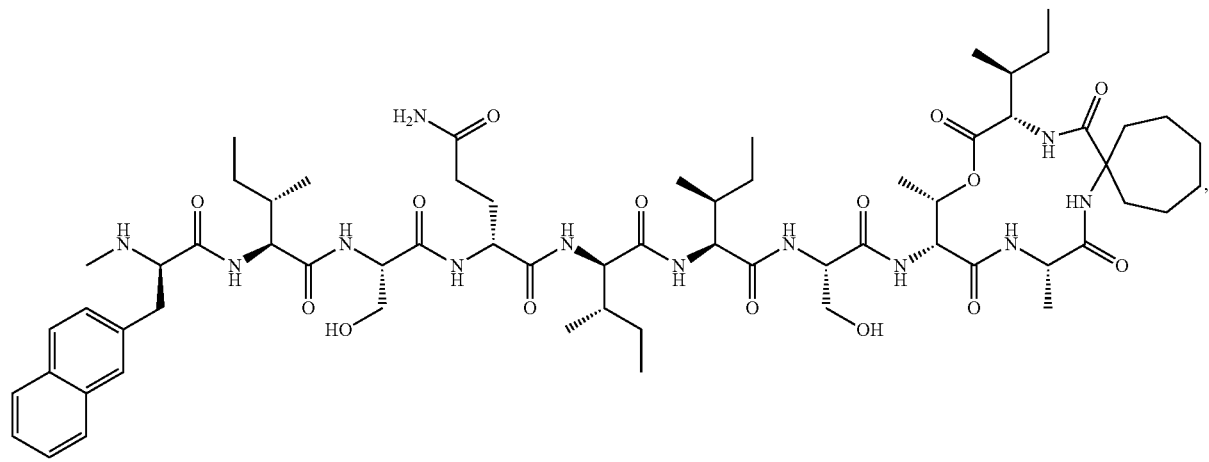
(25)
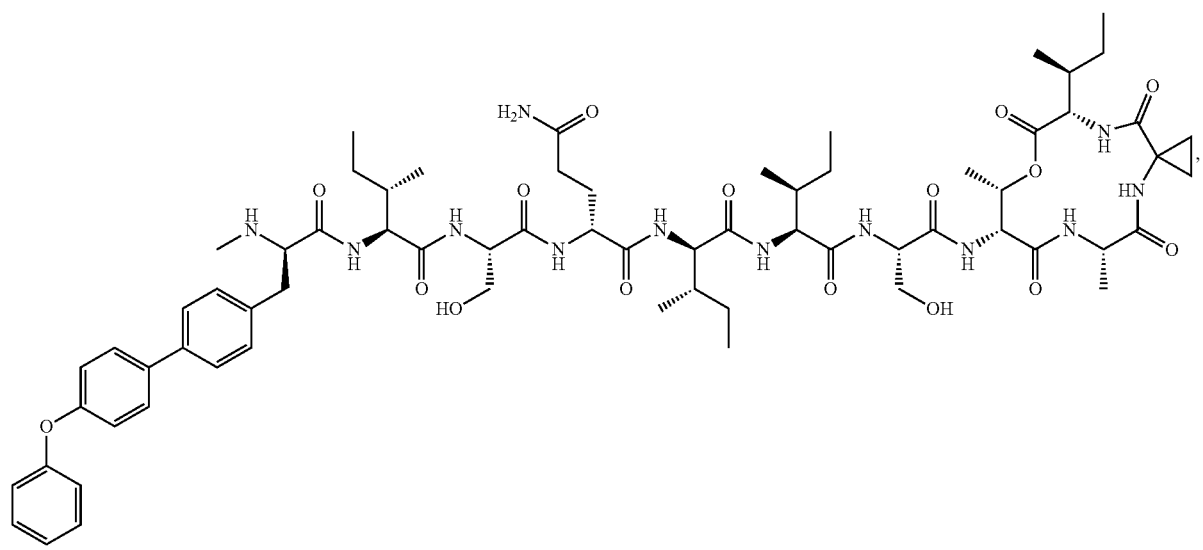
(26)
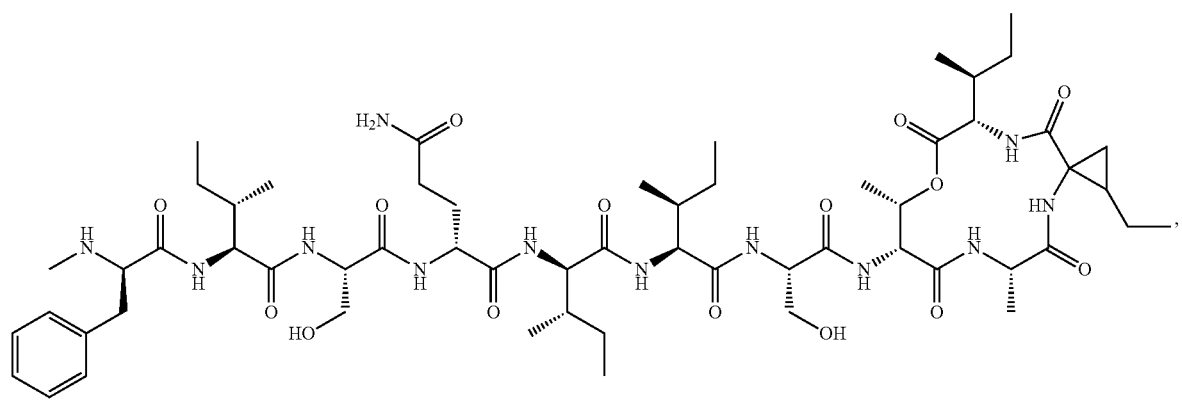

(27)
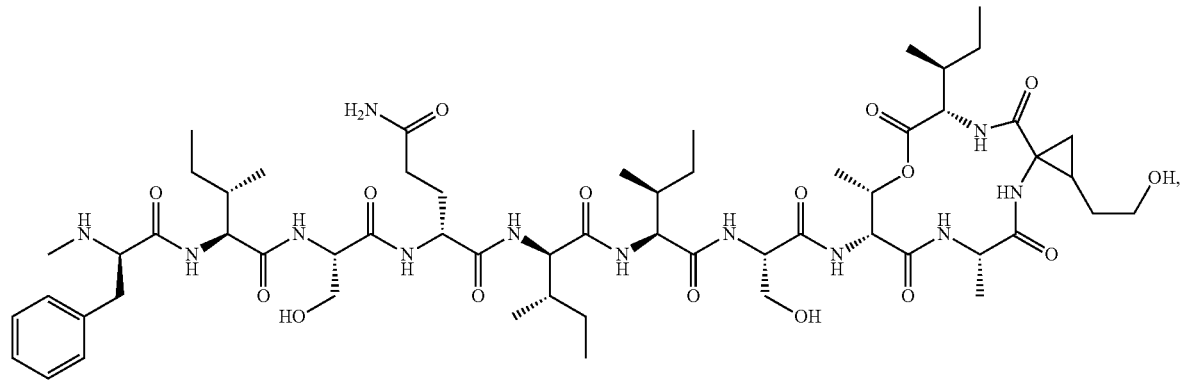
(28)
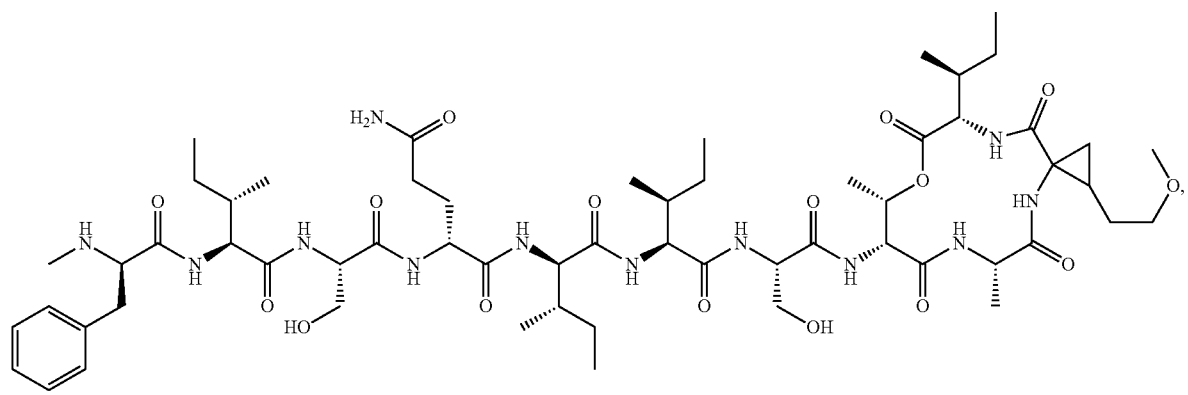
(29)
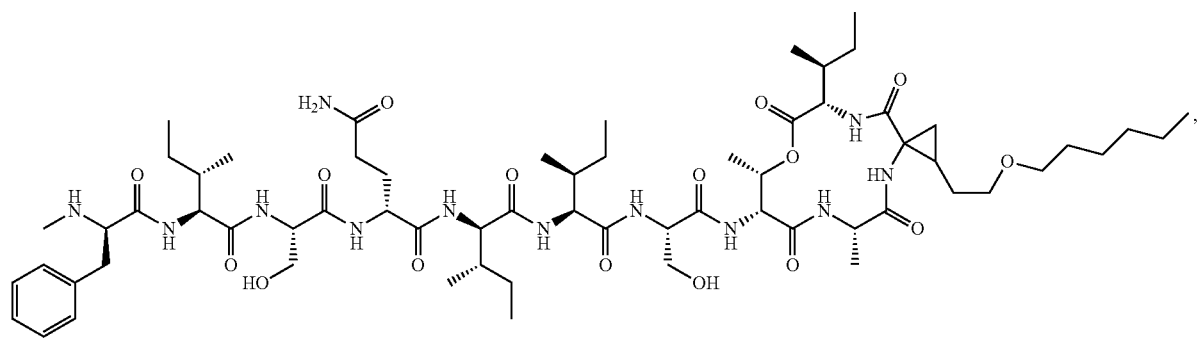
(30)
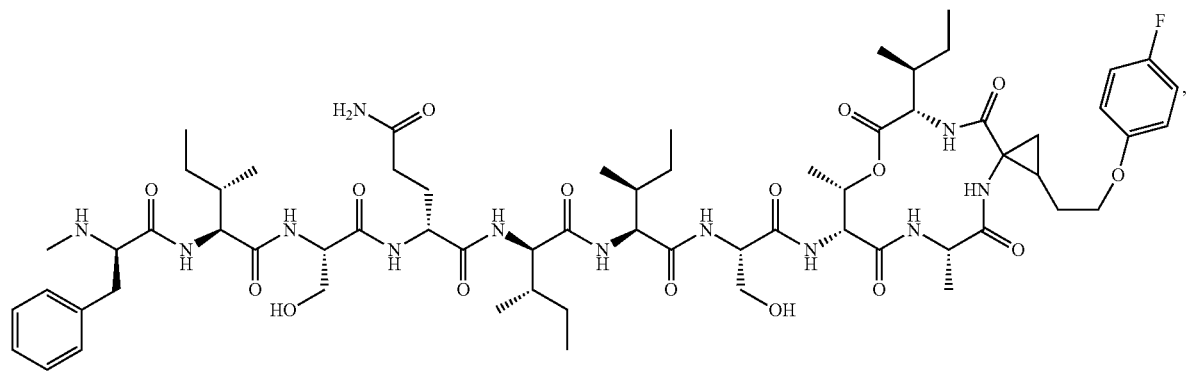

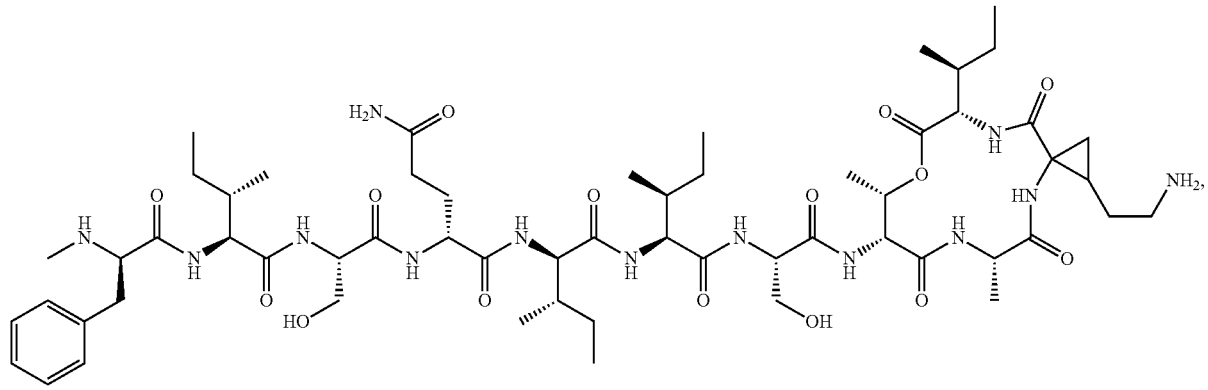
(32)
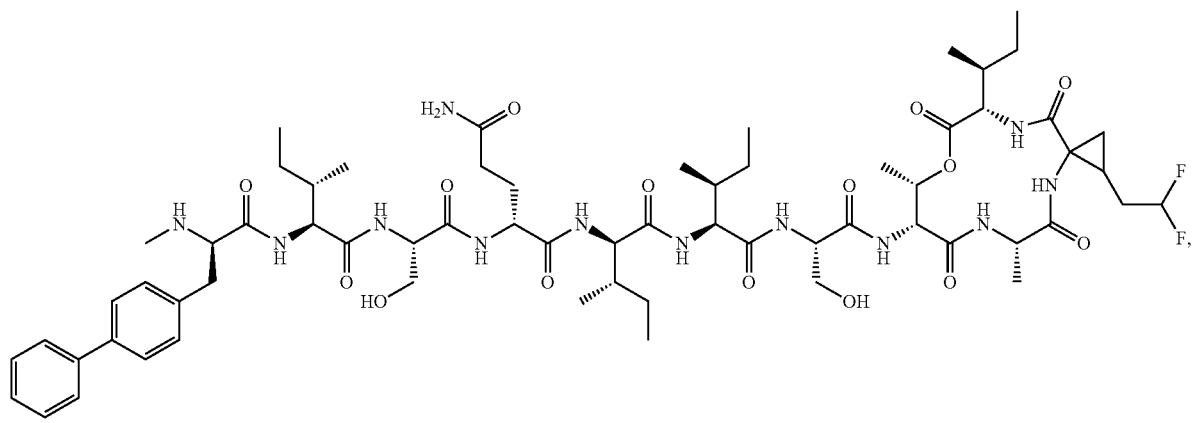
(33)
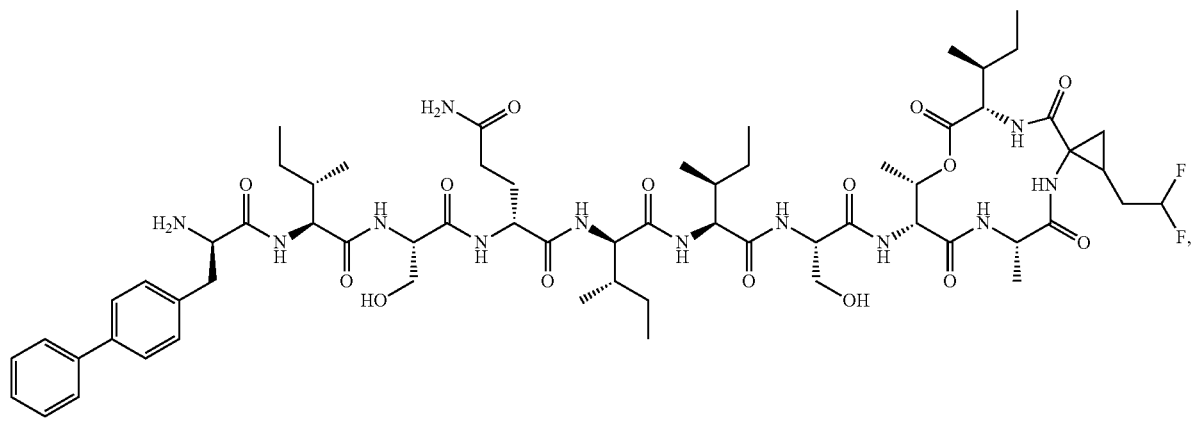
(34)

(35)
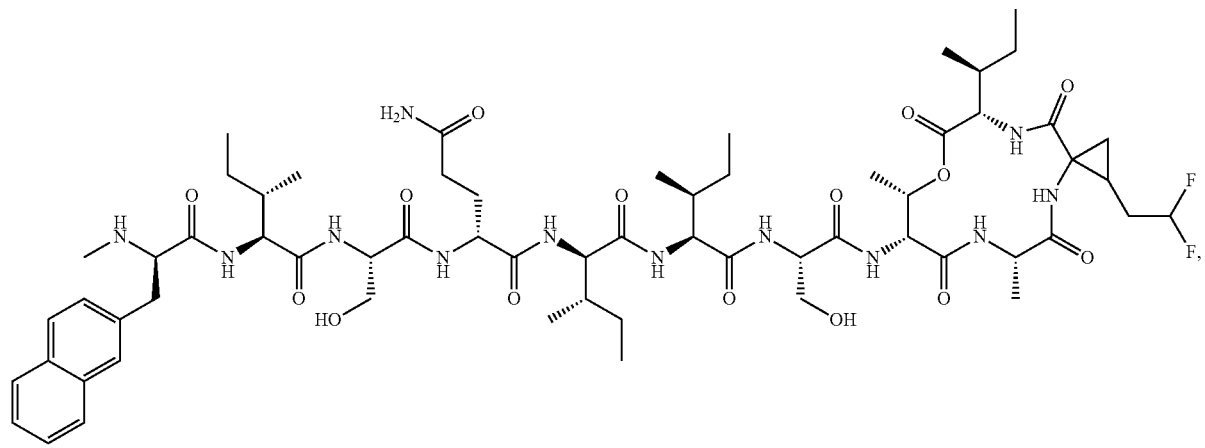
(36)
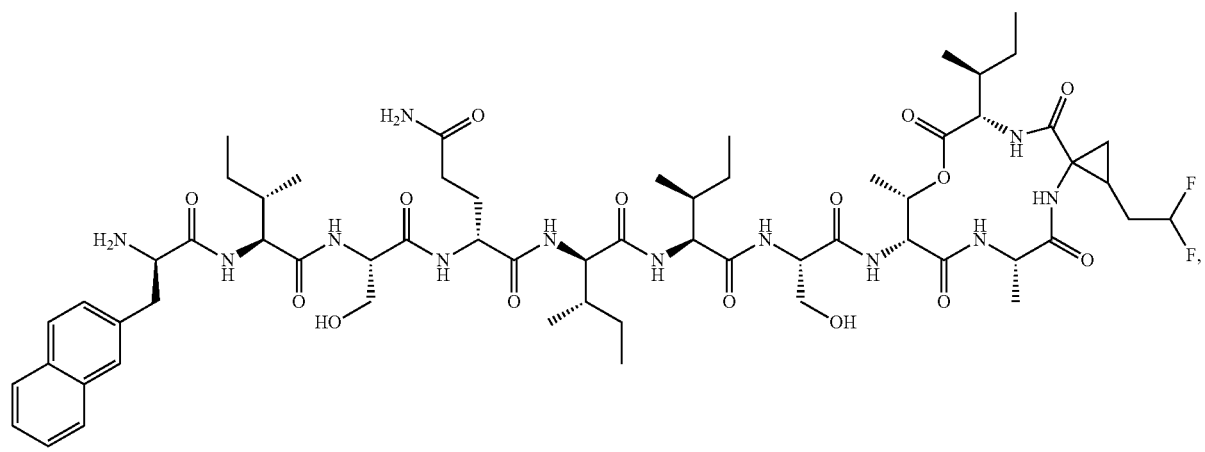
(37)
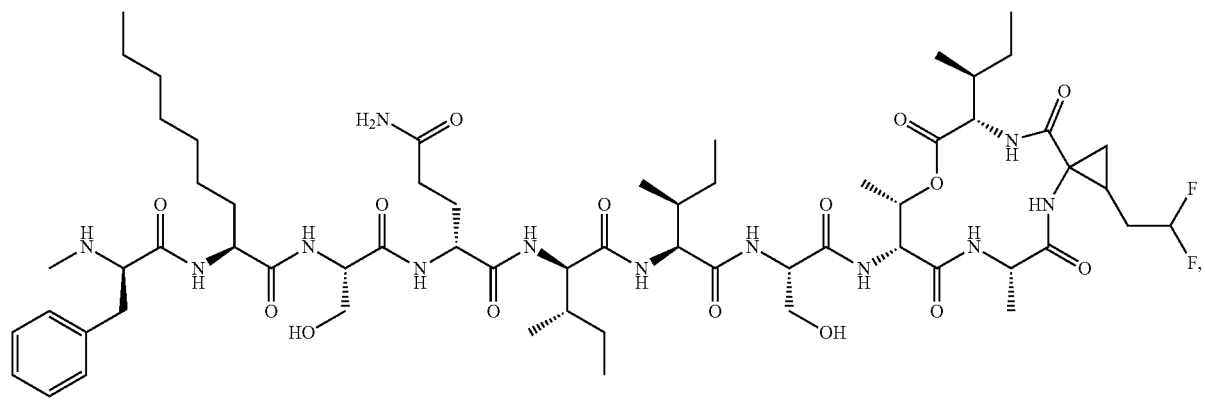

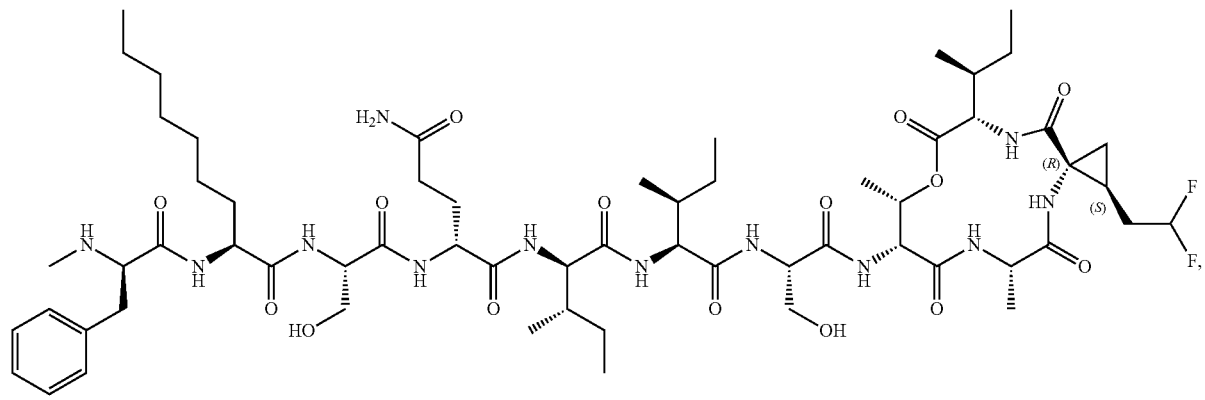
(38)
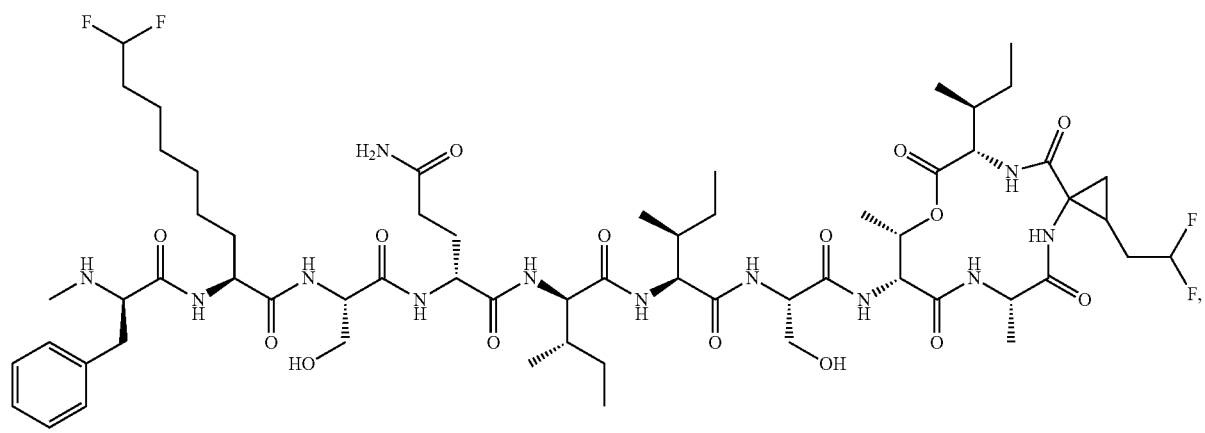
(39)
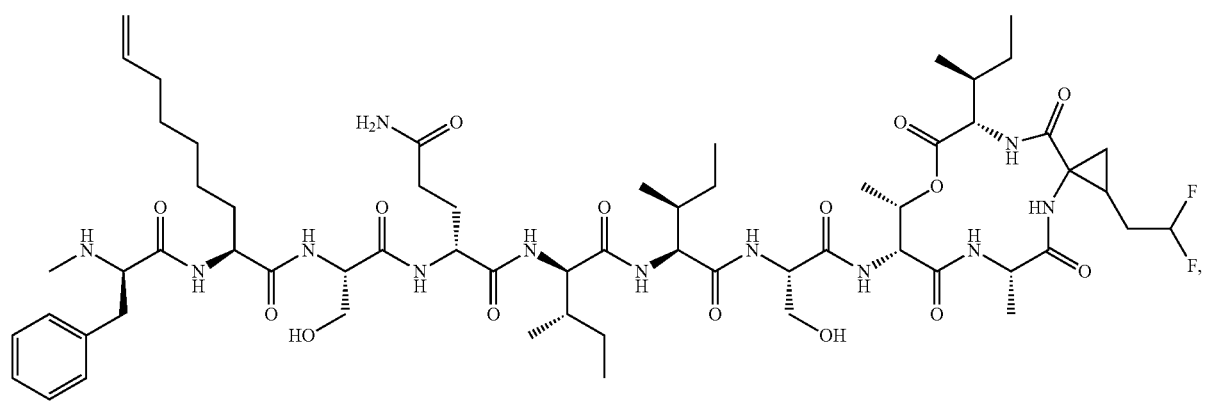
(40)

(41)
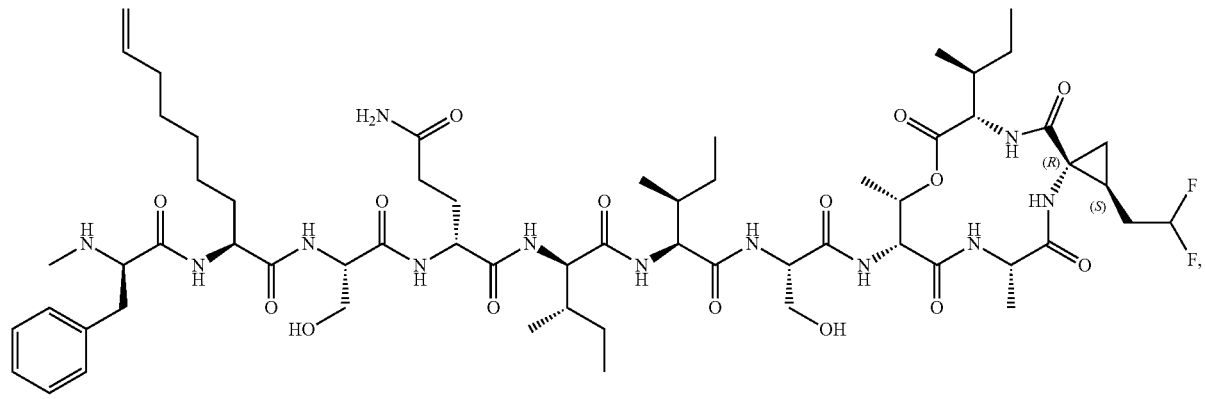
(42)
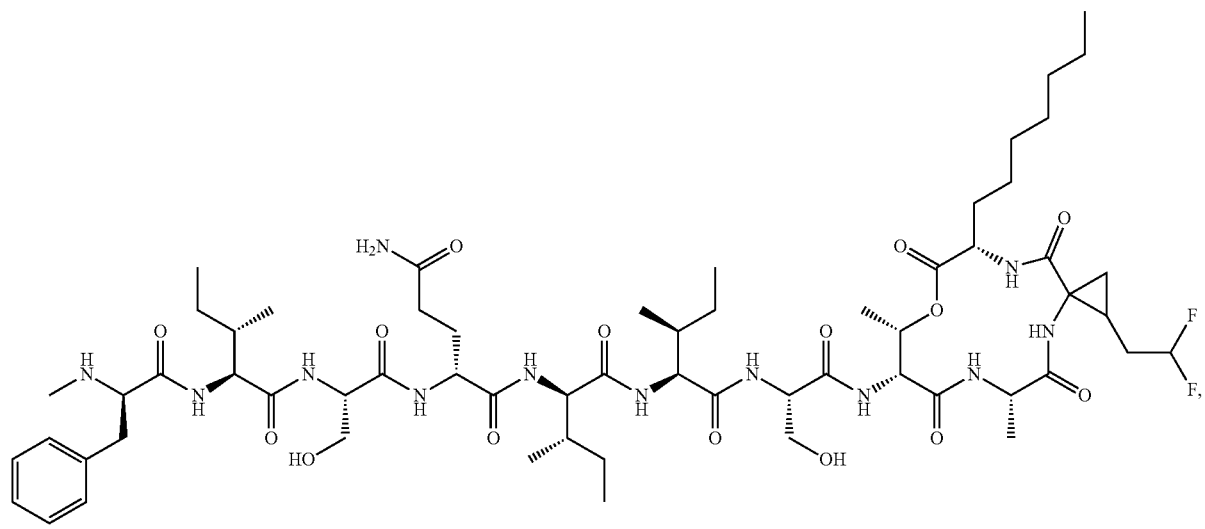
(43)
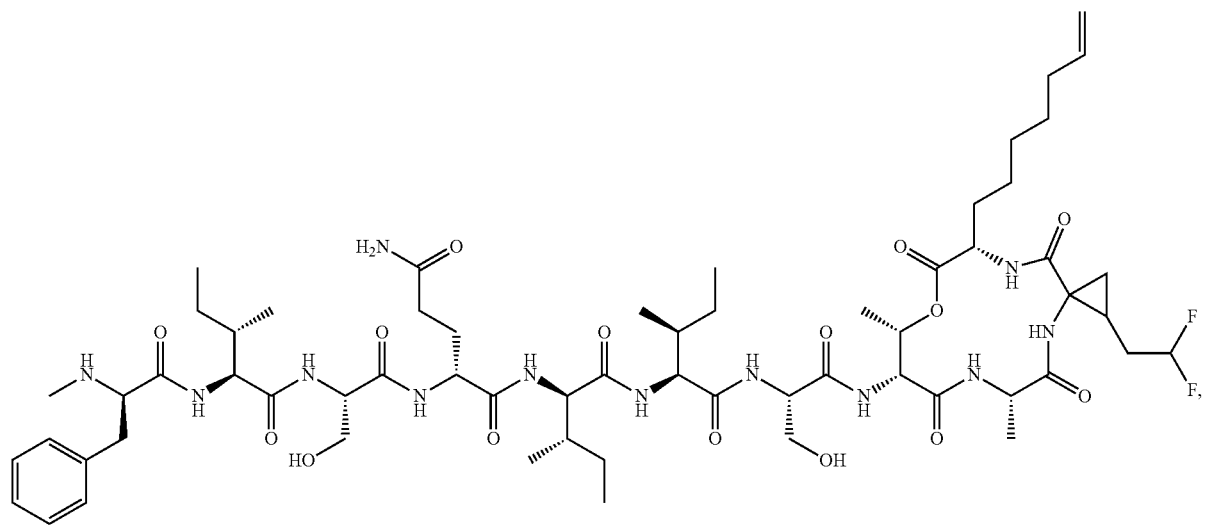

-continued
(44)
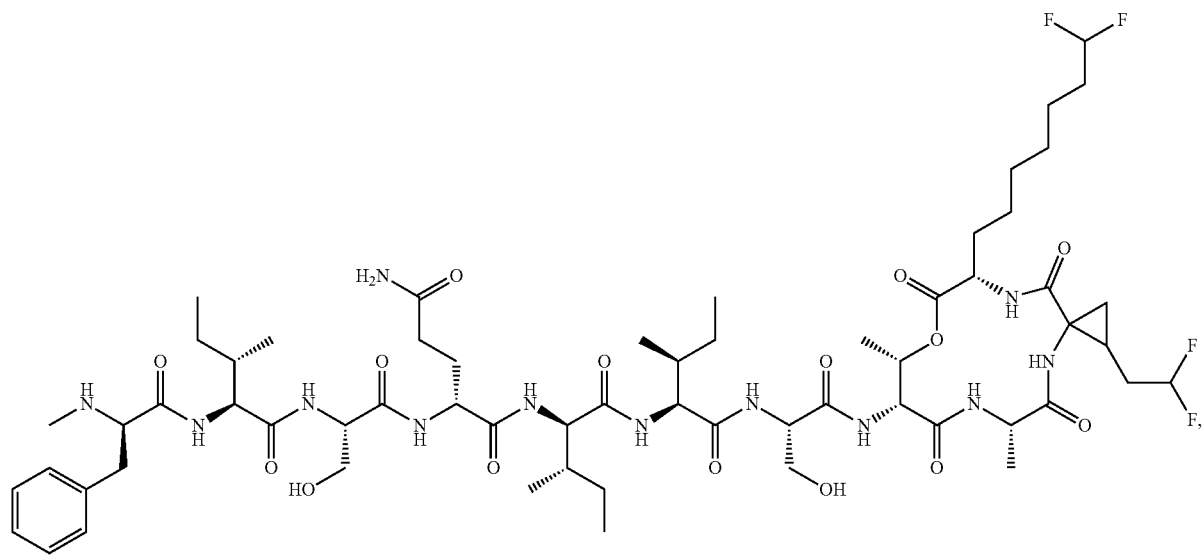
(45)
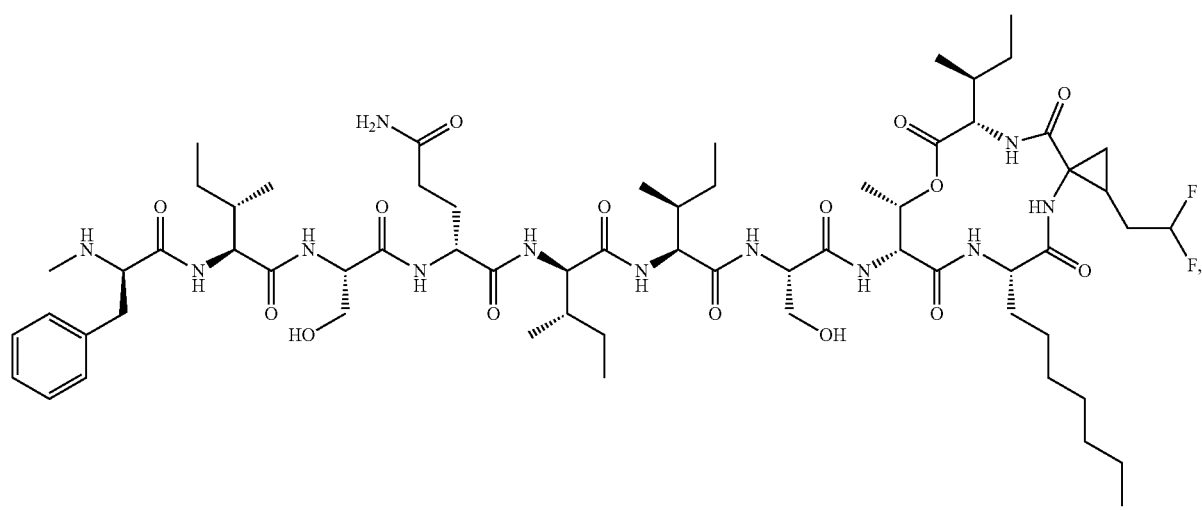
(46)
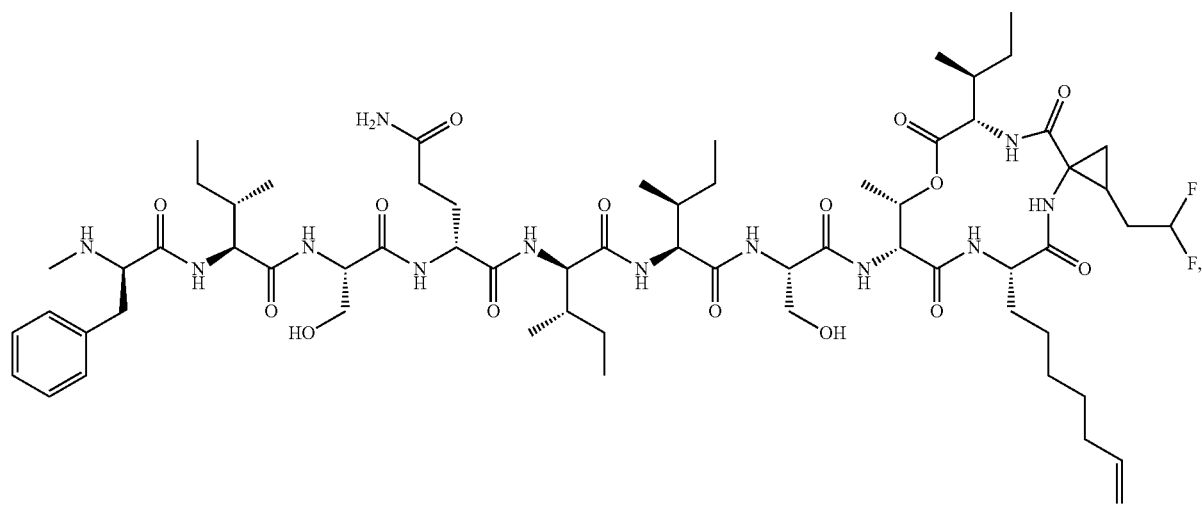

-continued
(47)
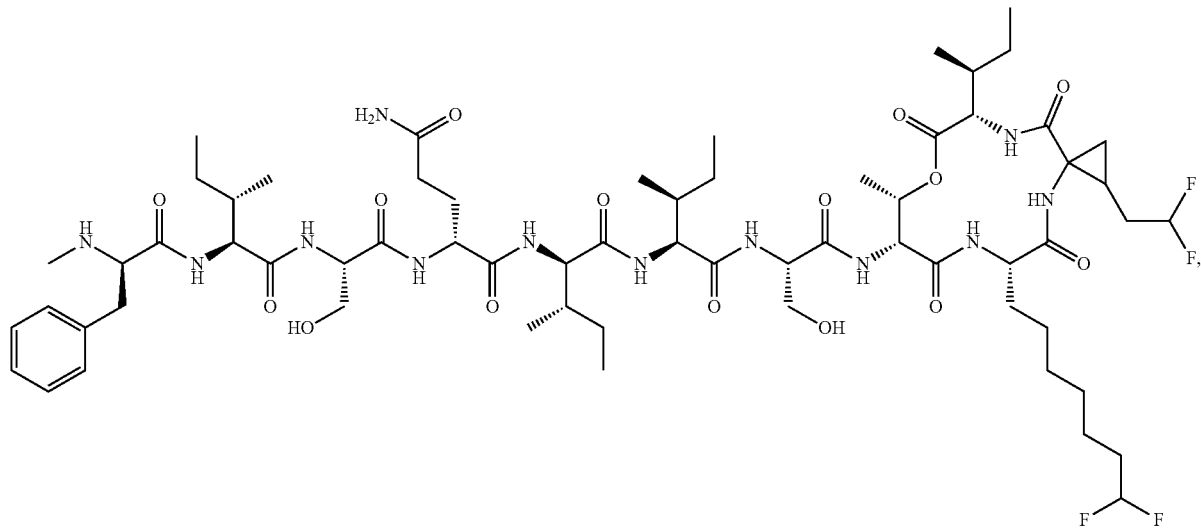
(56)
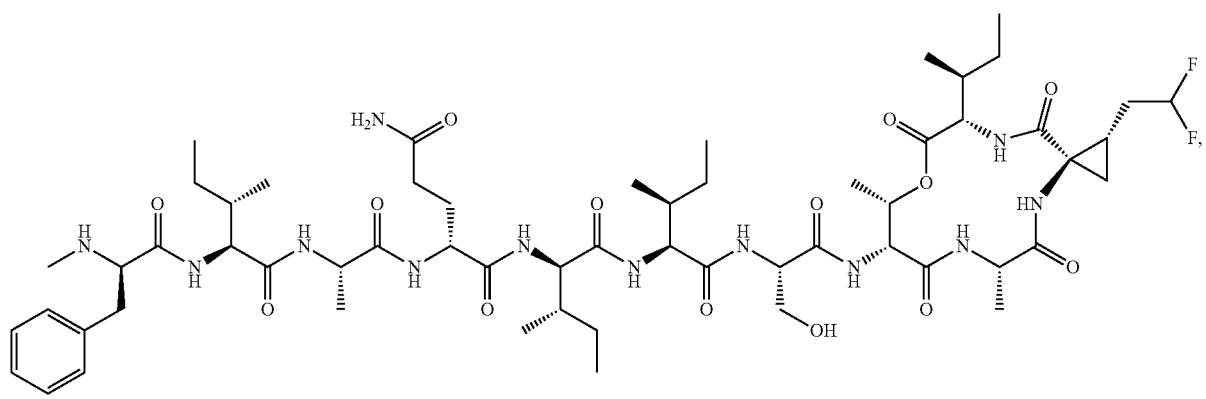
(57)
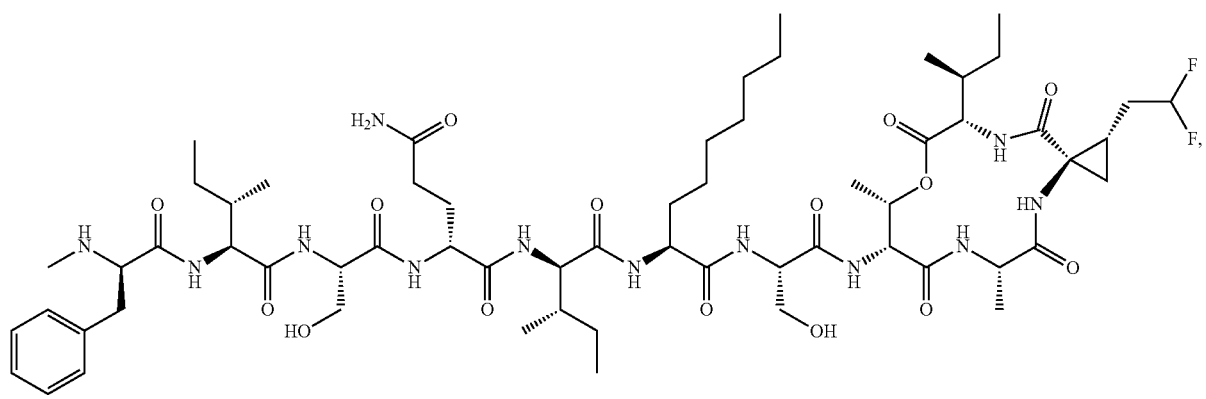

(58)
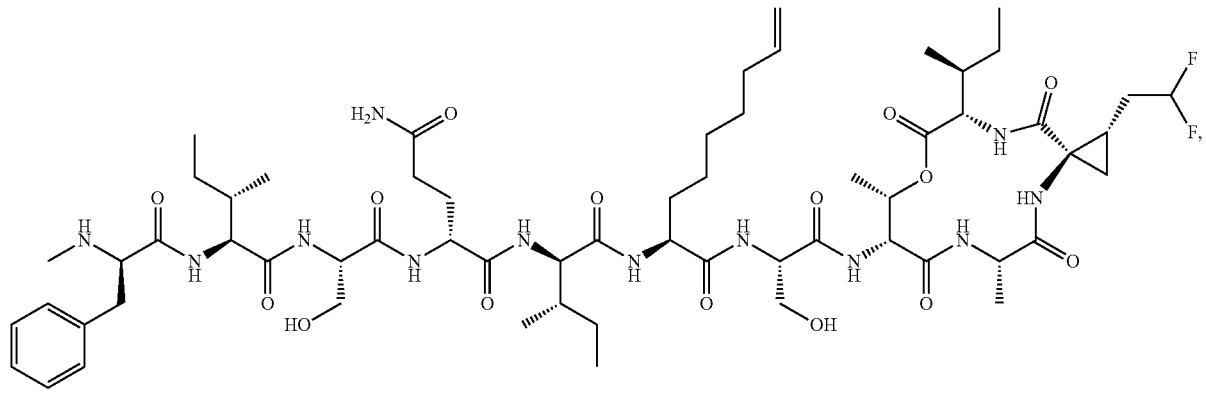
(59)
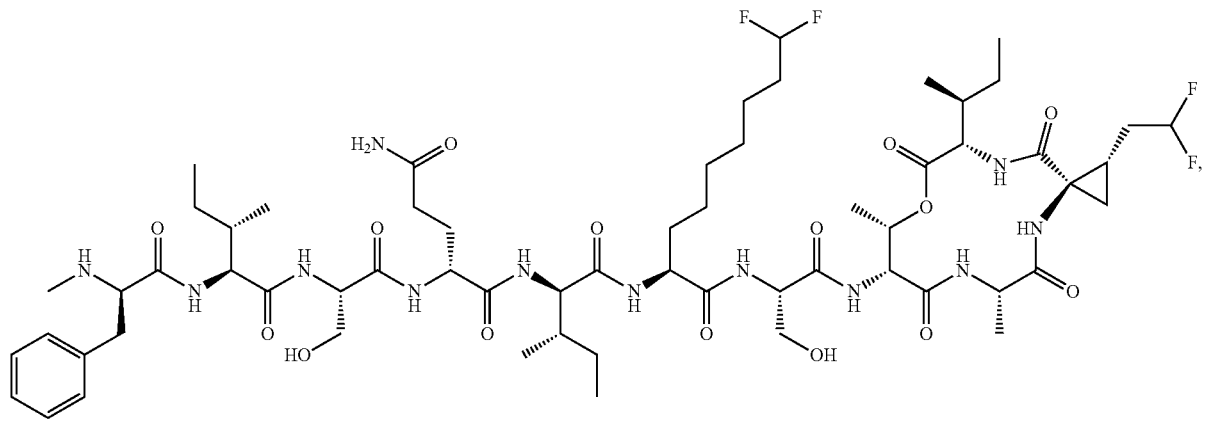
(60)
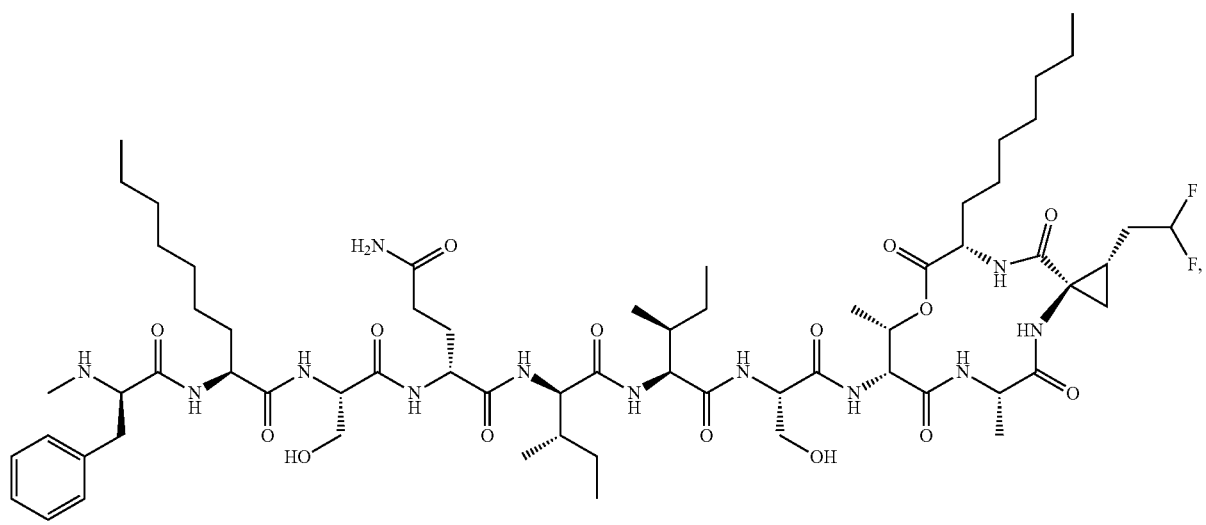

(61)
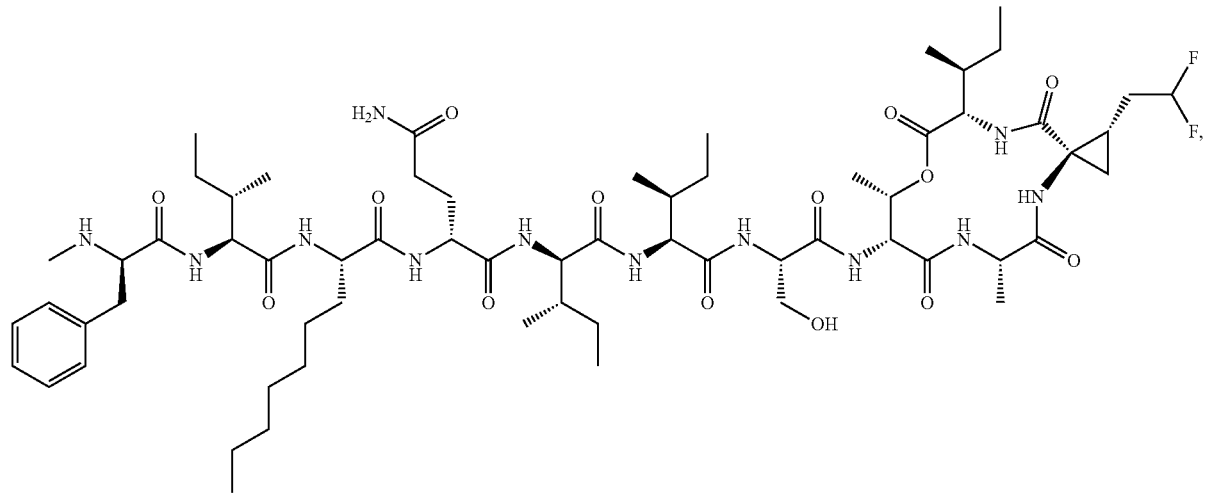
(62)
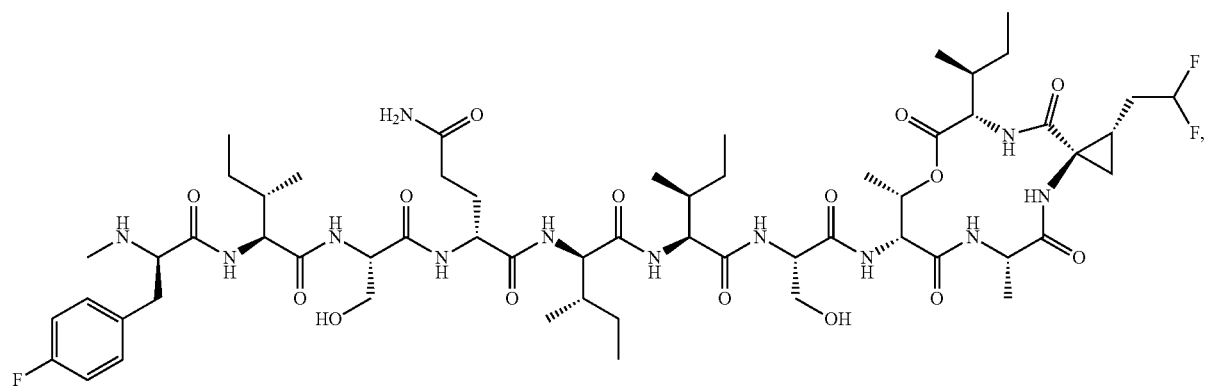
(63)
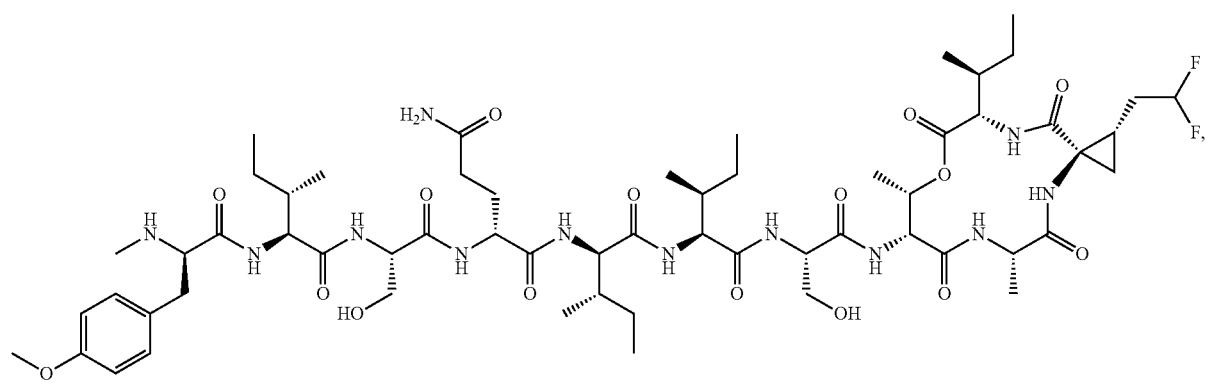

(64)
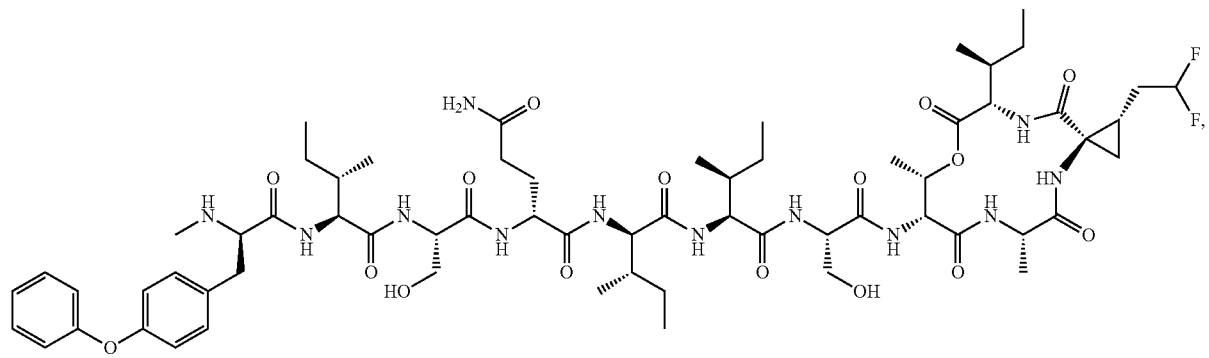
(65)
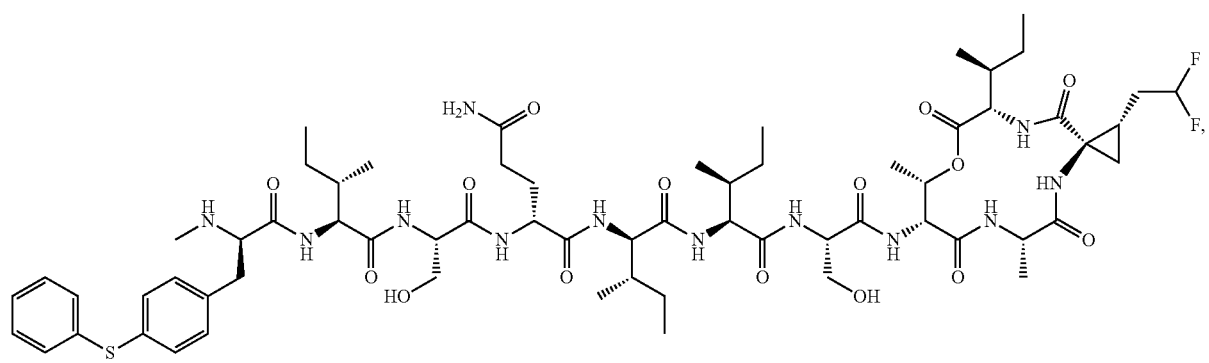
(66)
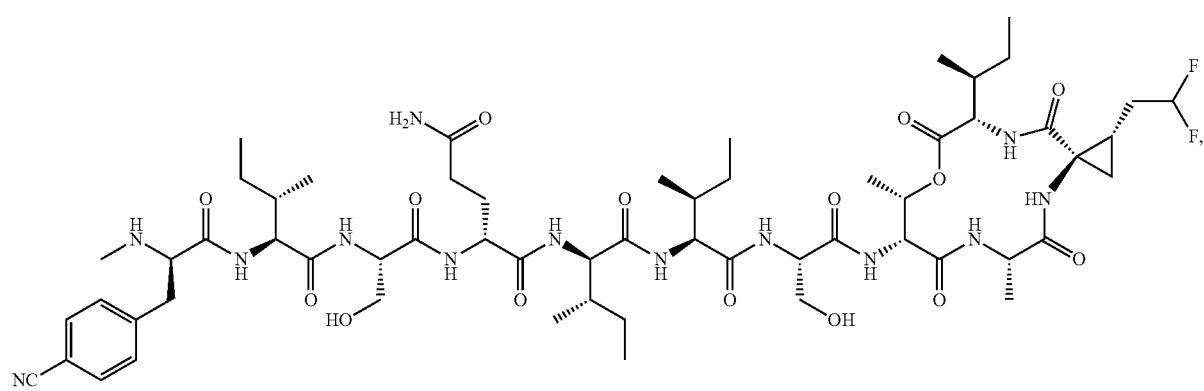
(67)
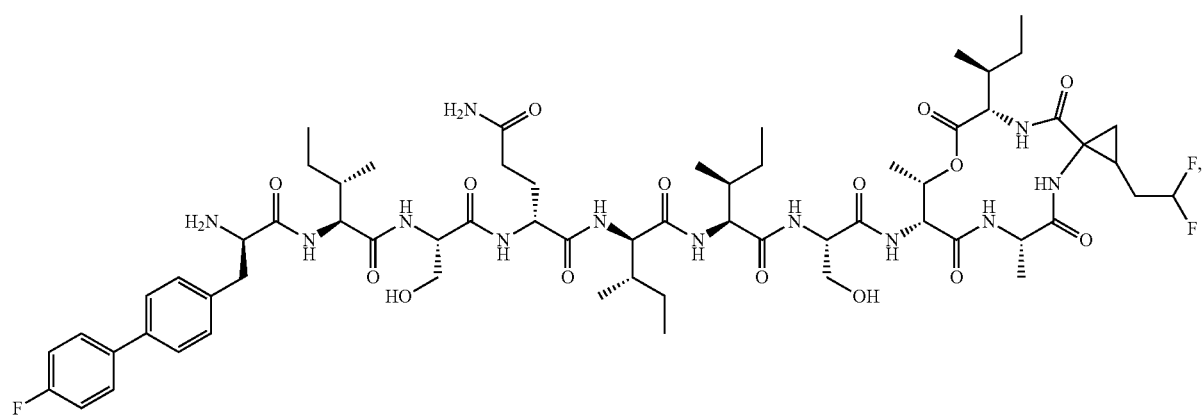

(68)
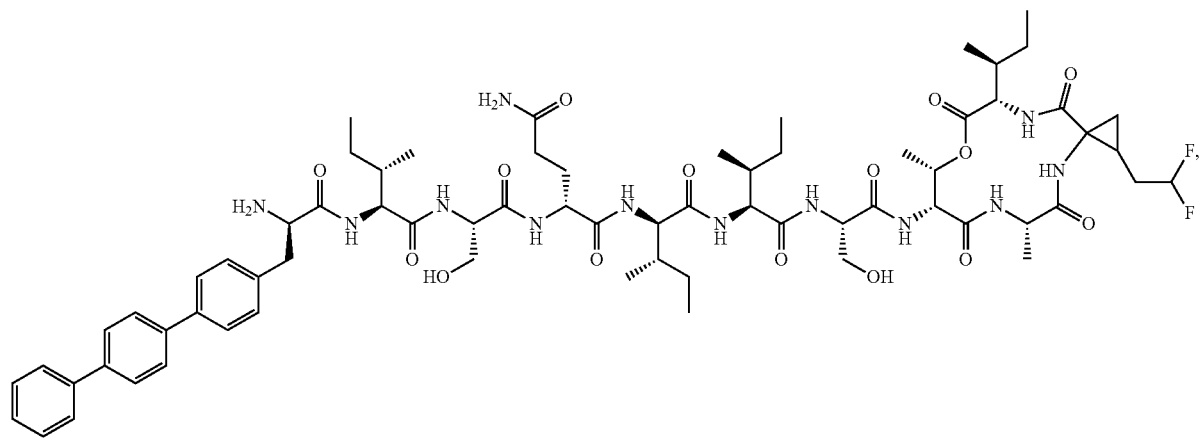
(69)
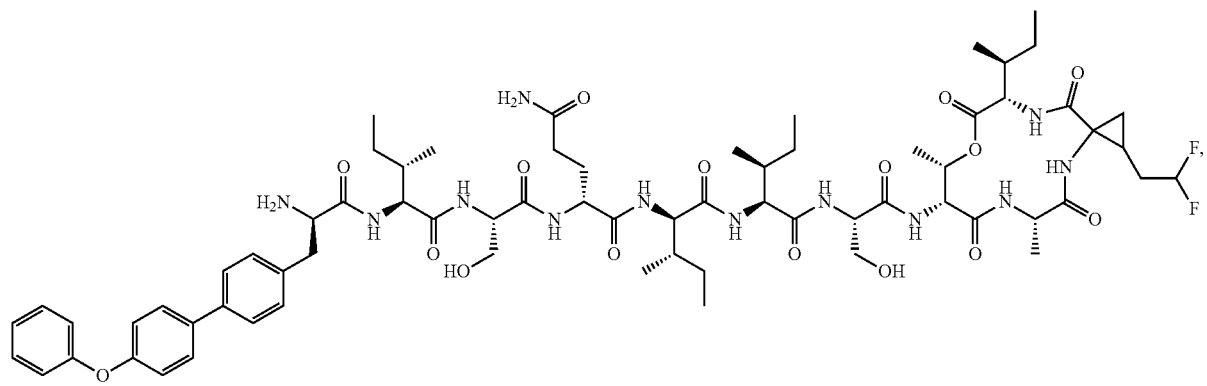
(70)
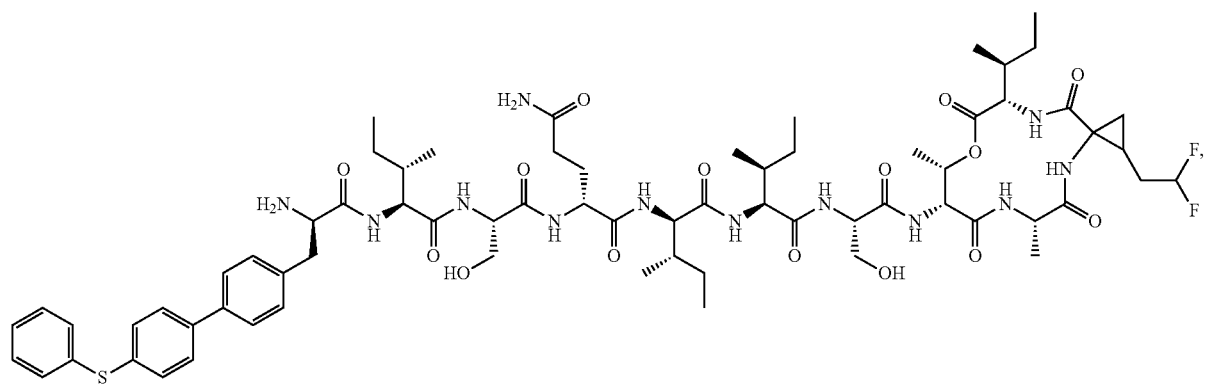

(71)
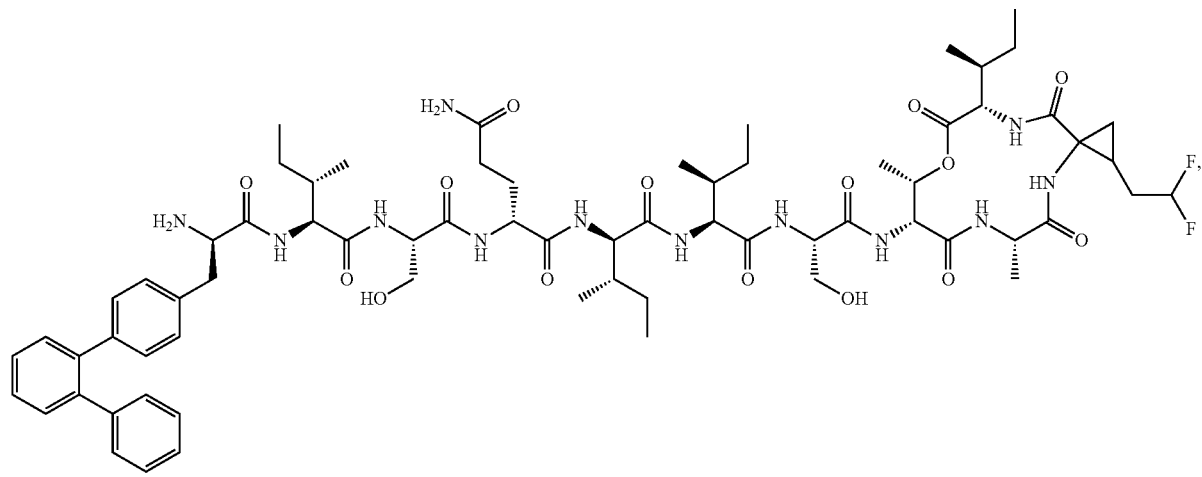
(72)
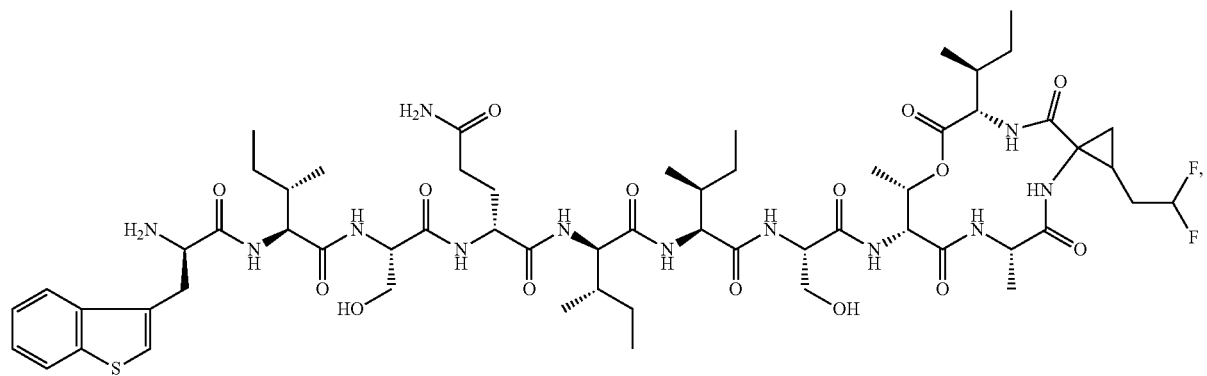
(73)
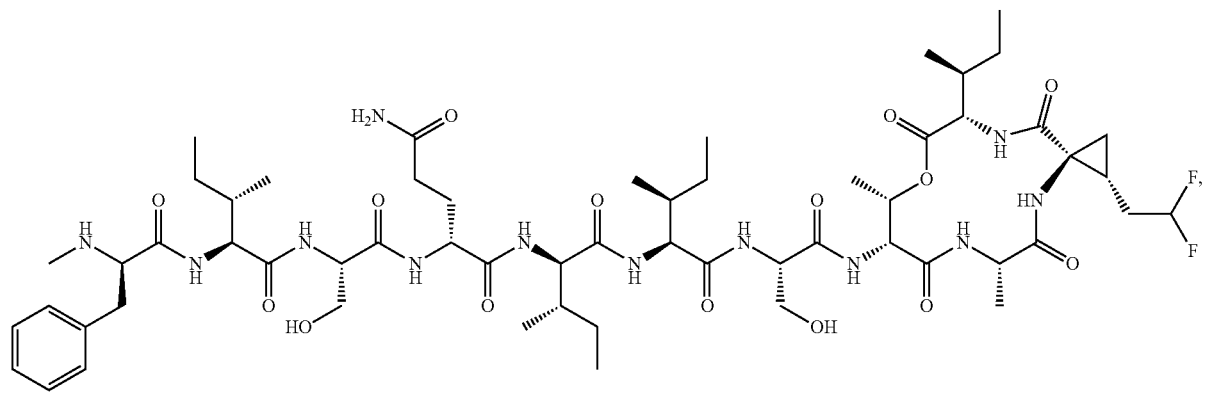

(76)
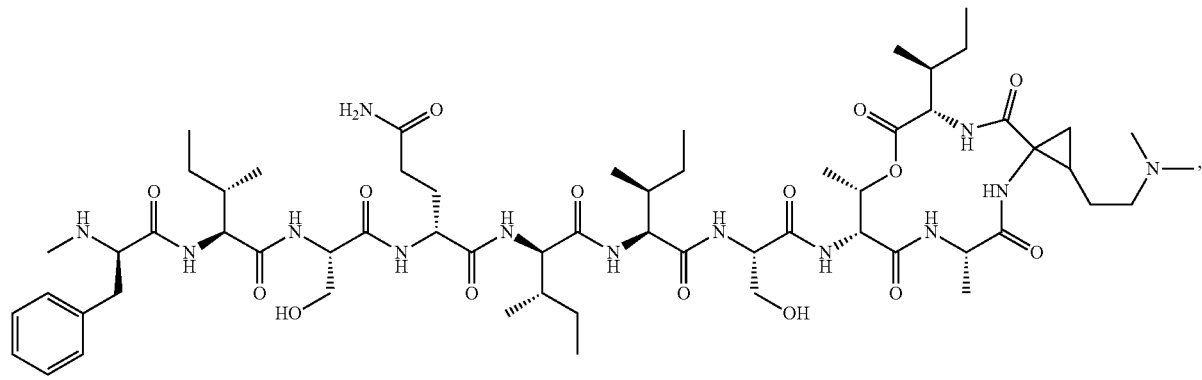
(77)
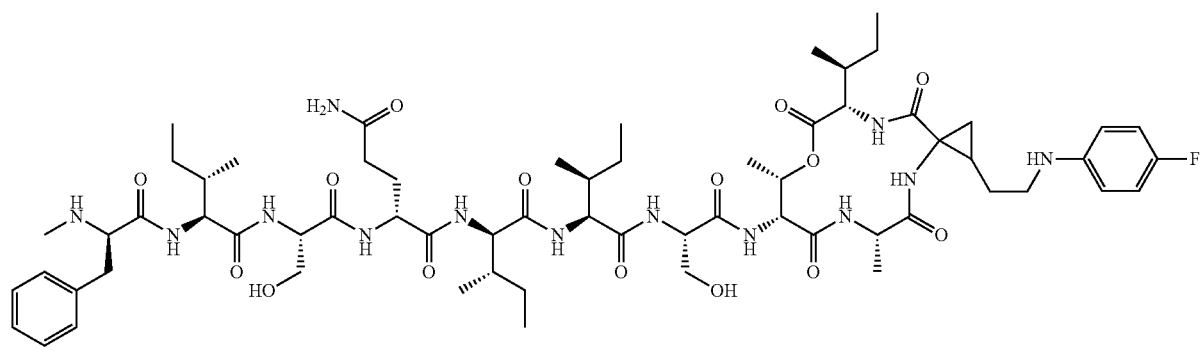
(78)
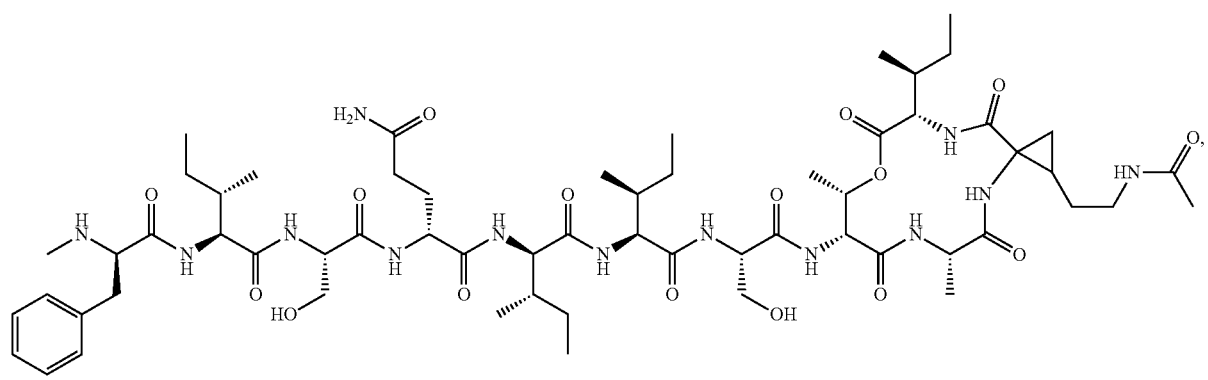
(79)
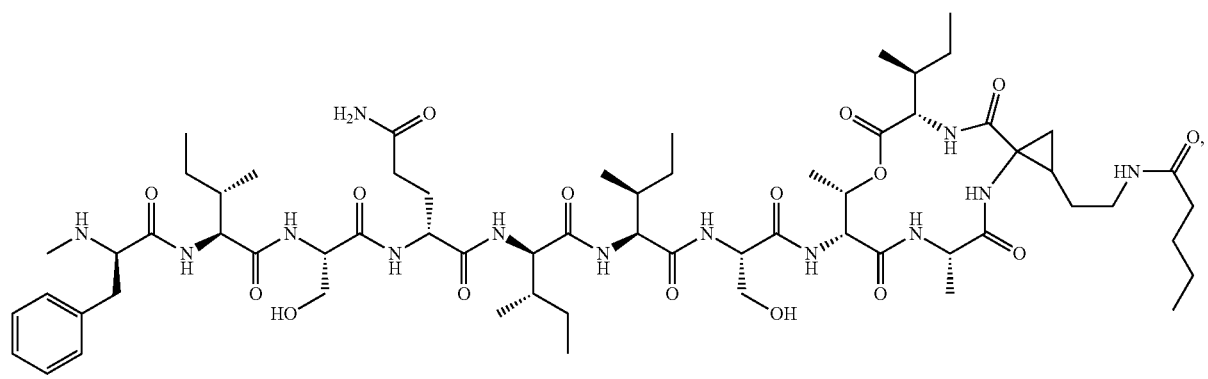

(81)
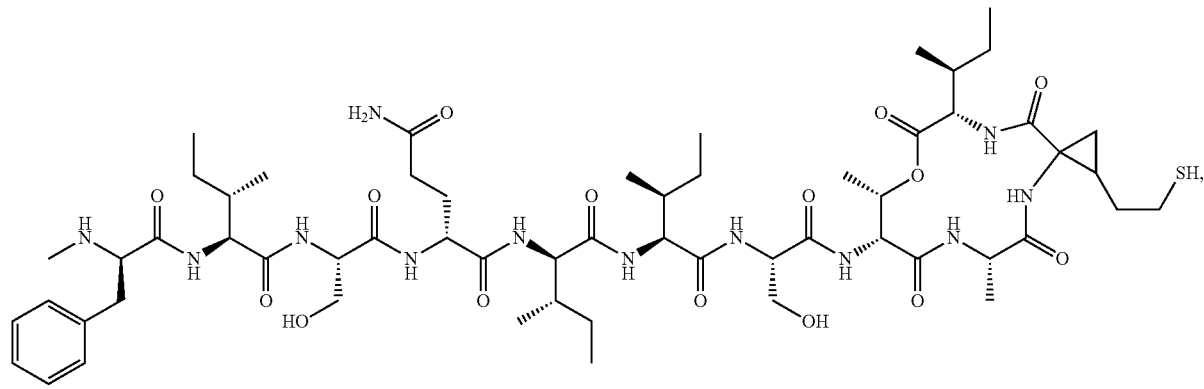
(82)
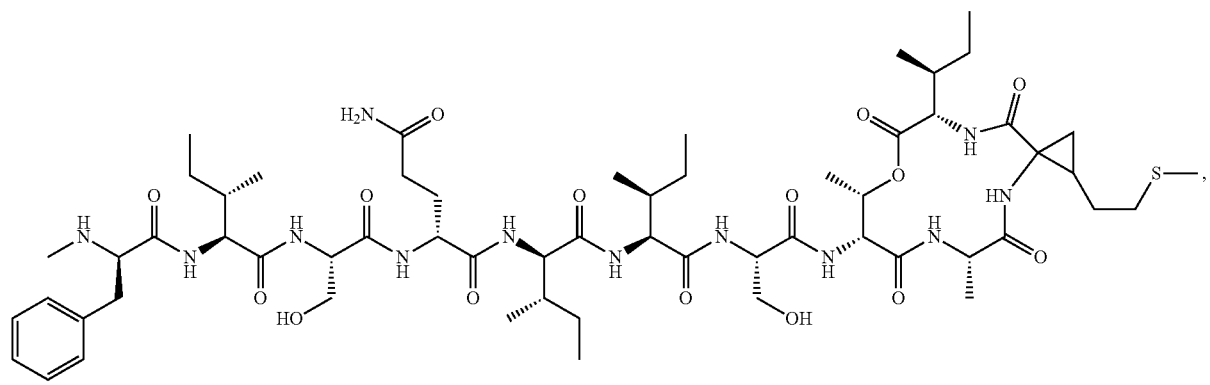
(83)
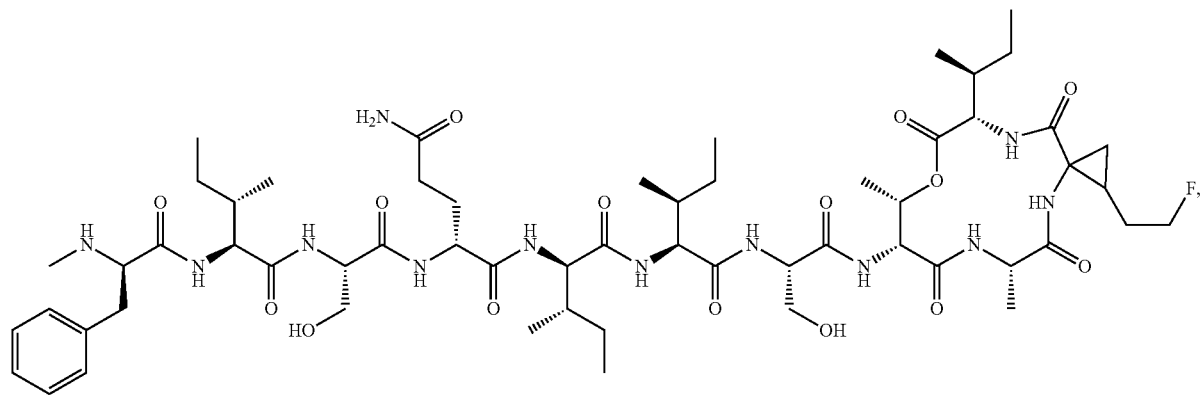

(84)
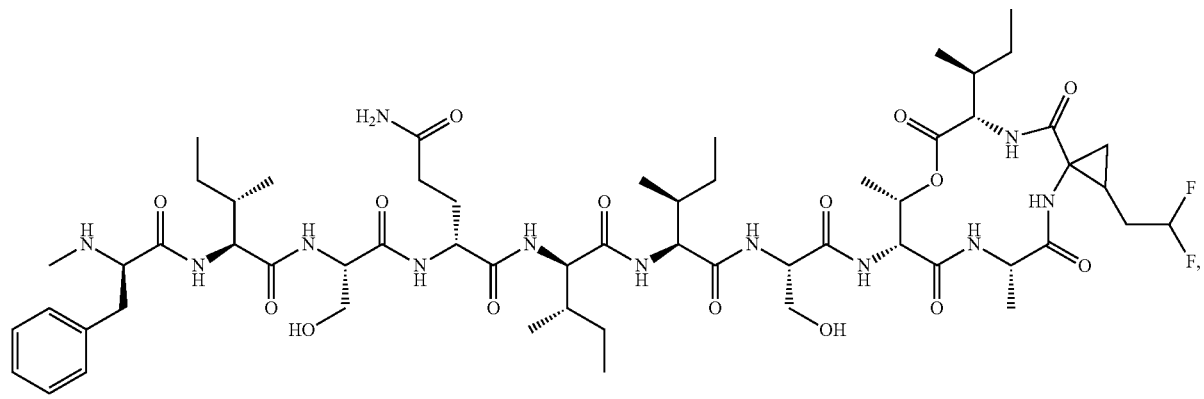
(85)
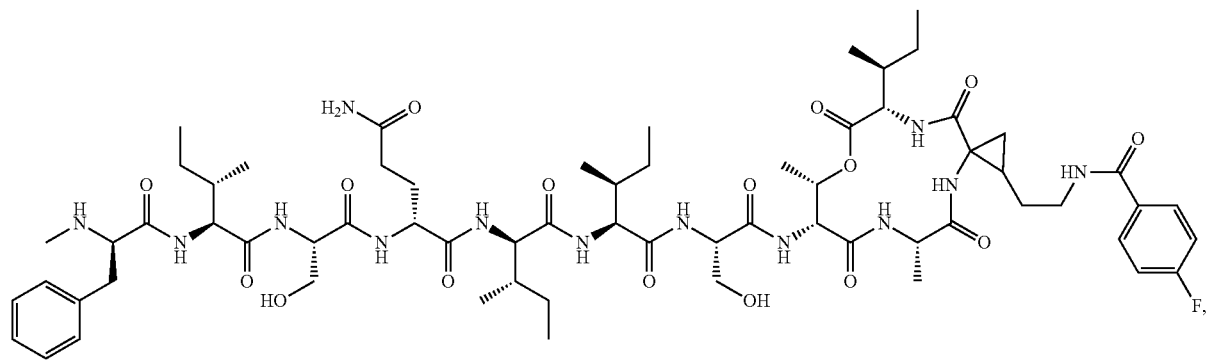
(86)
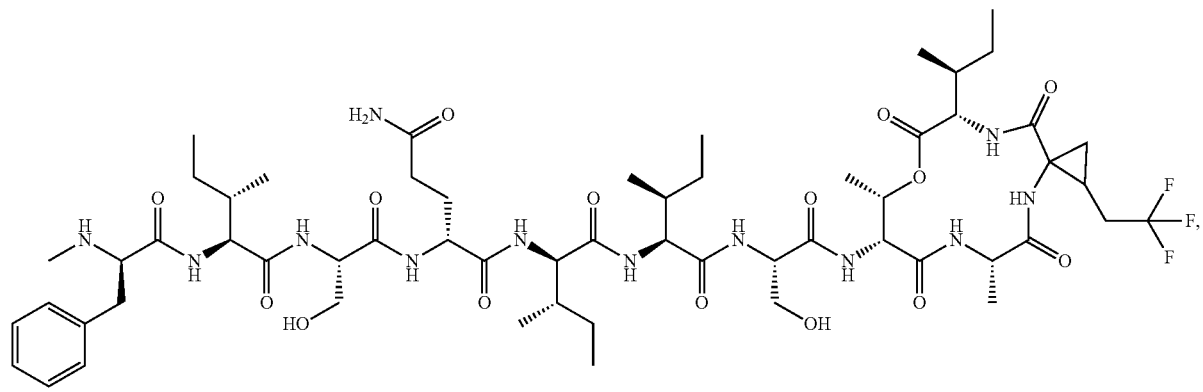
(87)
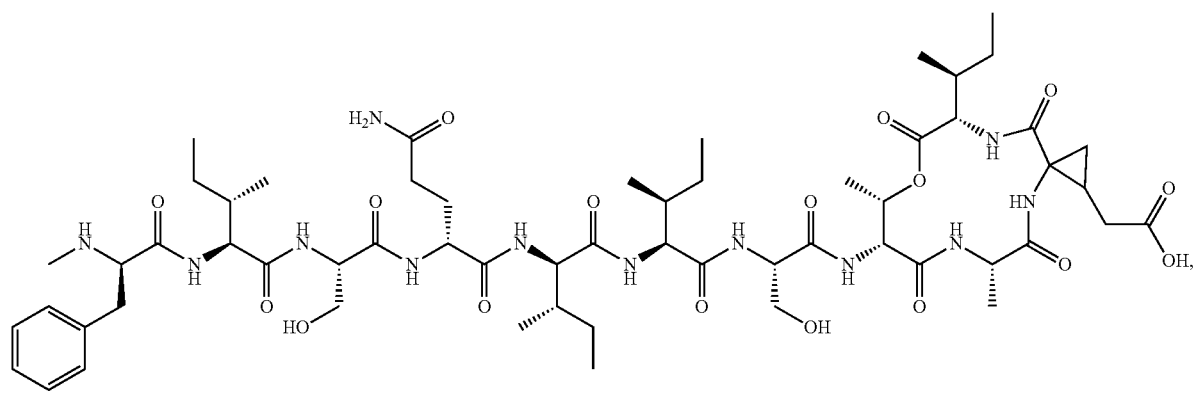

(88)
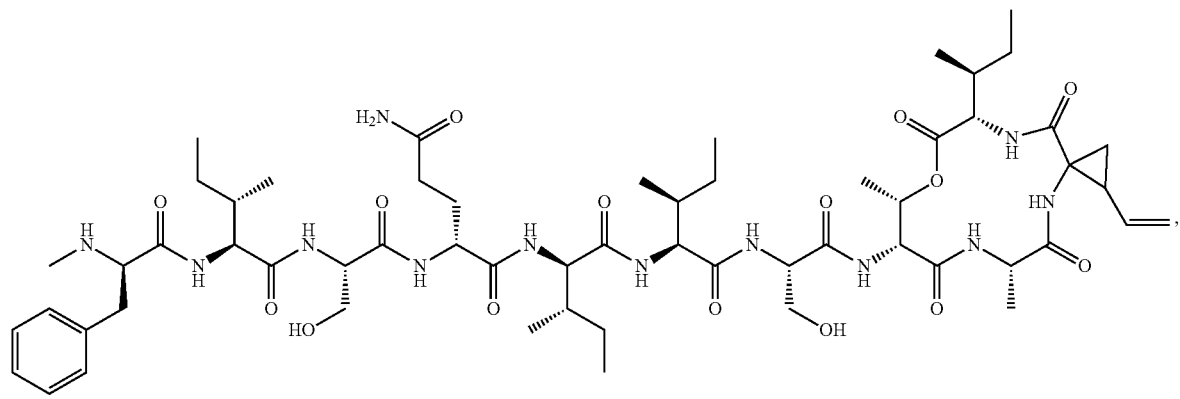
(89)
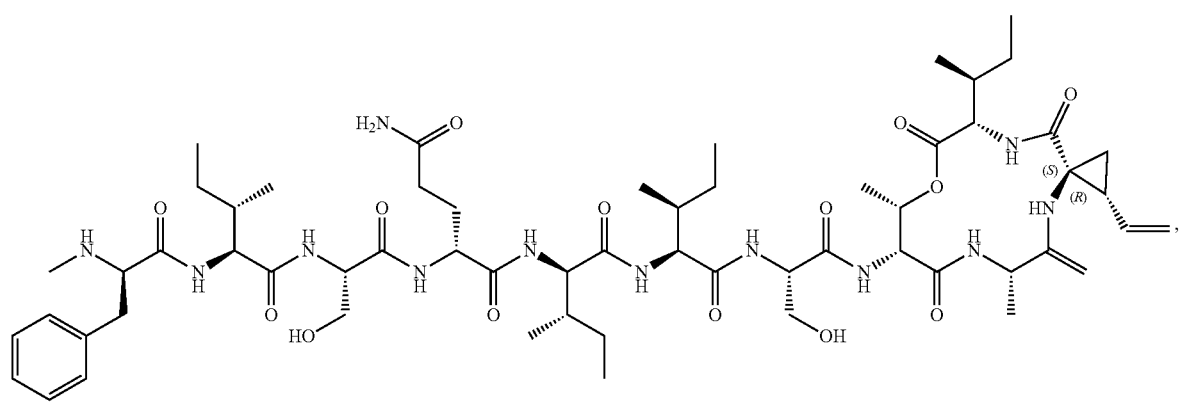
(90)
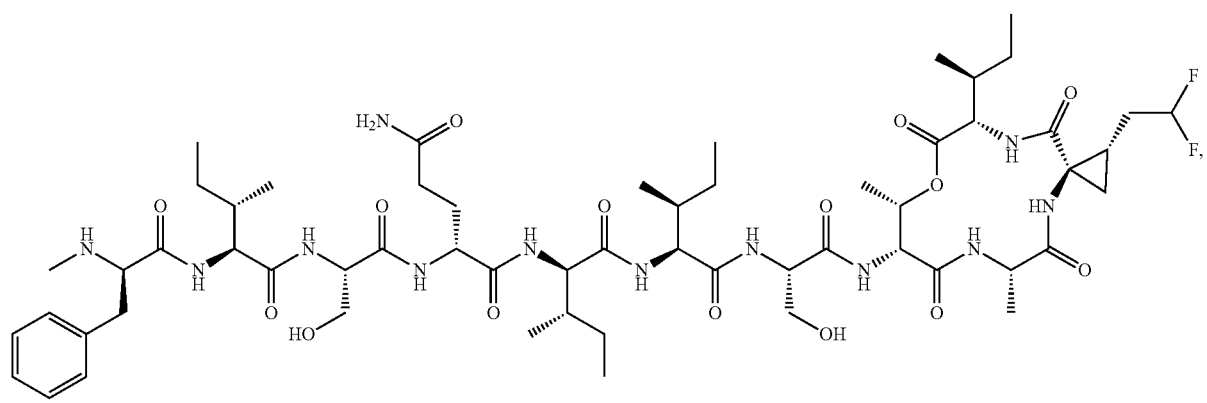

(91)
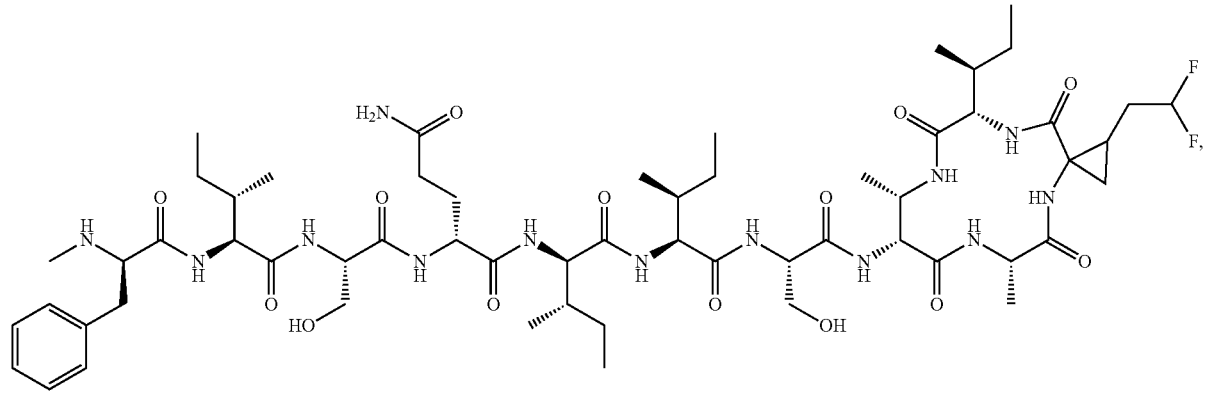
(92)
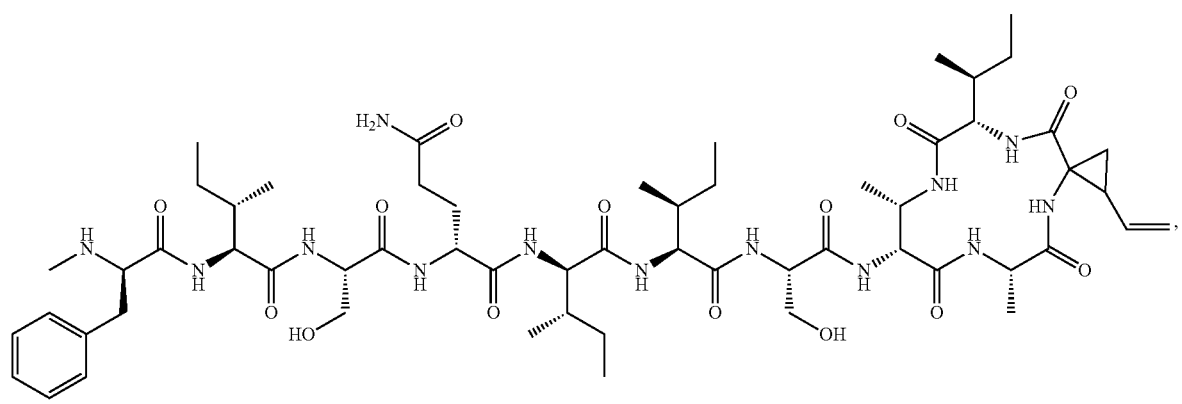
(93)
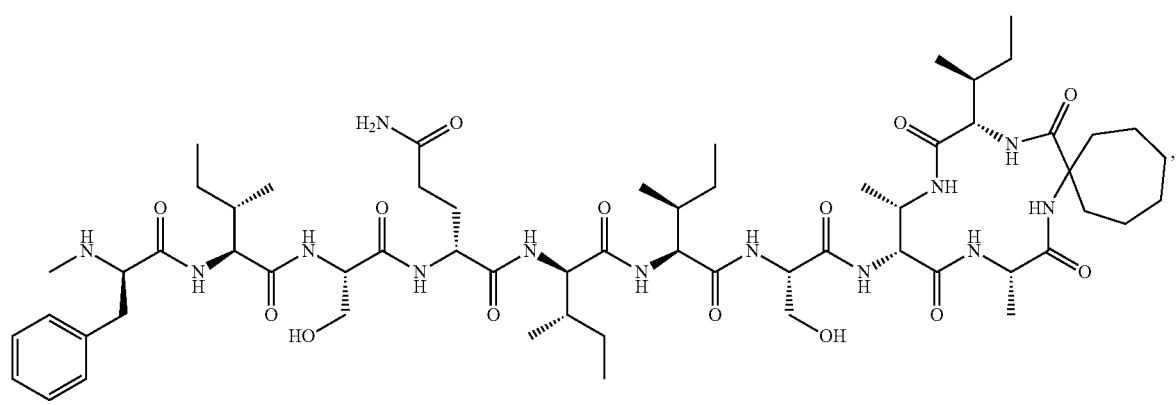
(94)
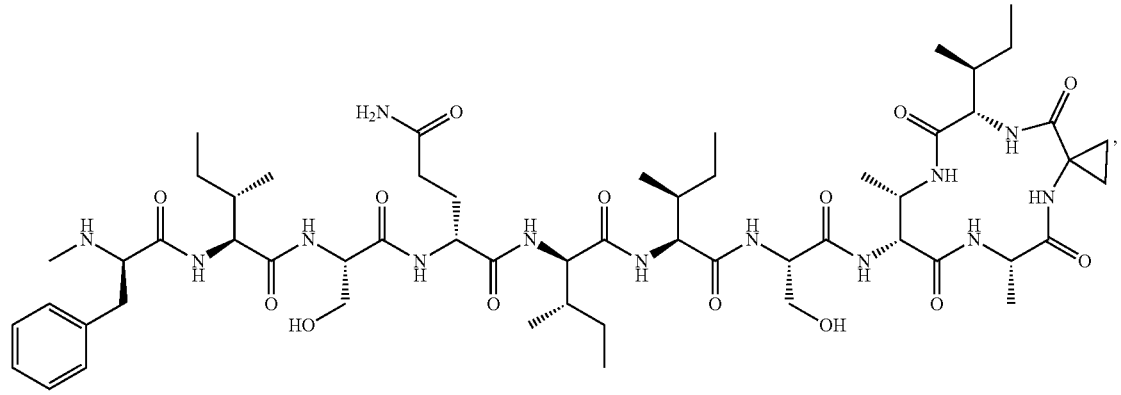

(95)
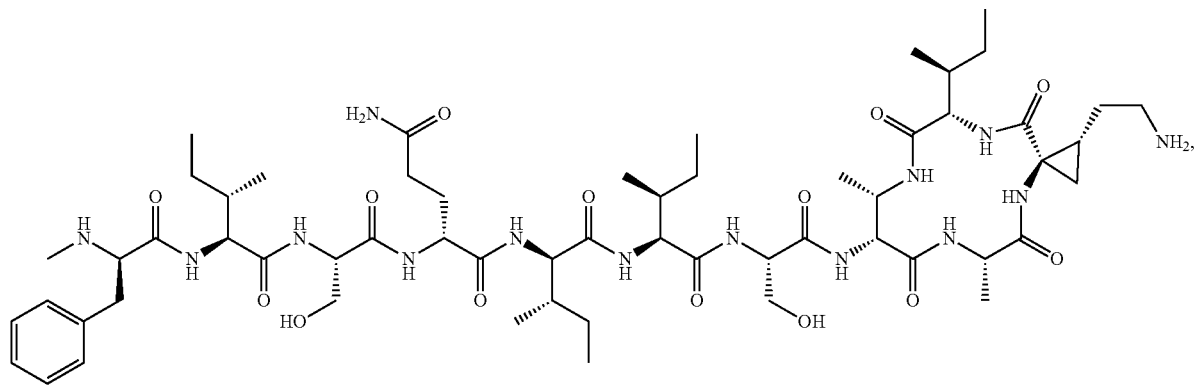
(96)
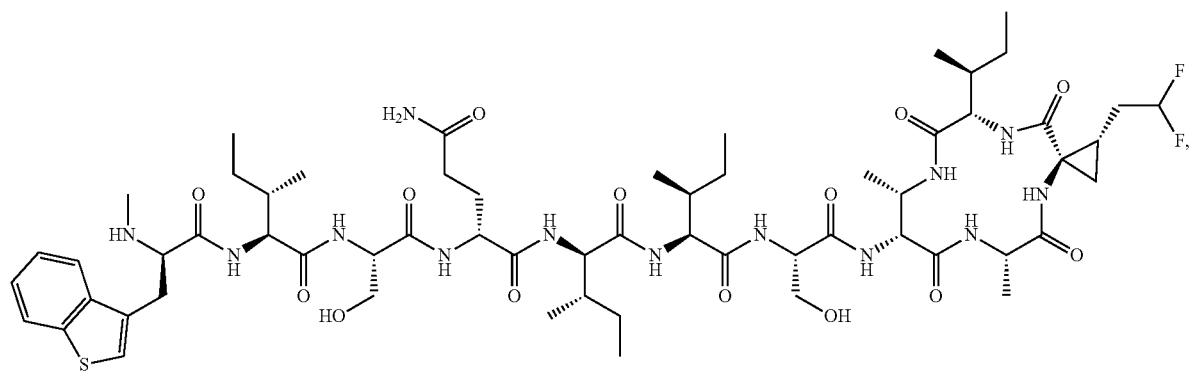
(97)
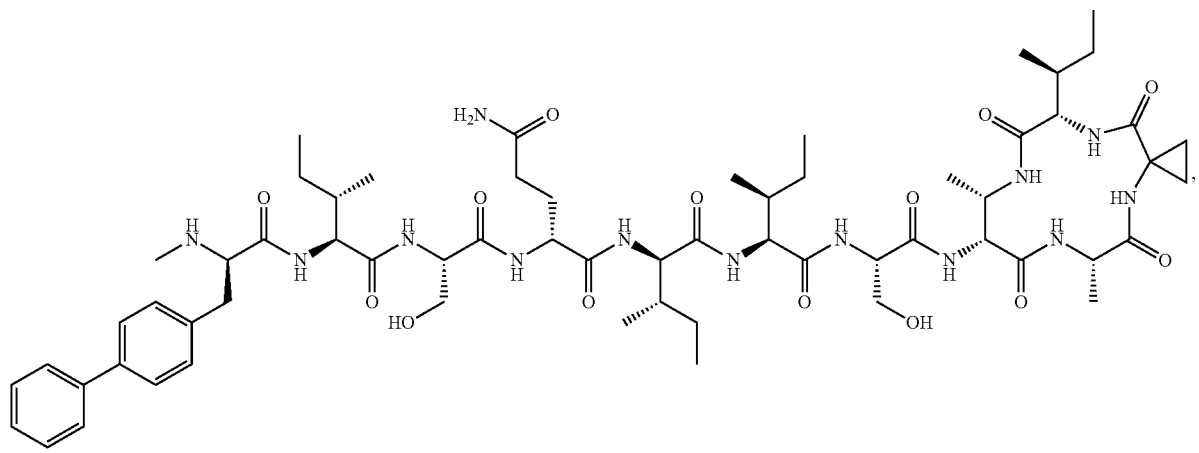

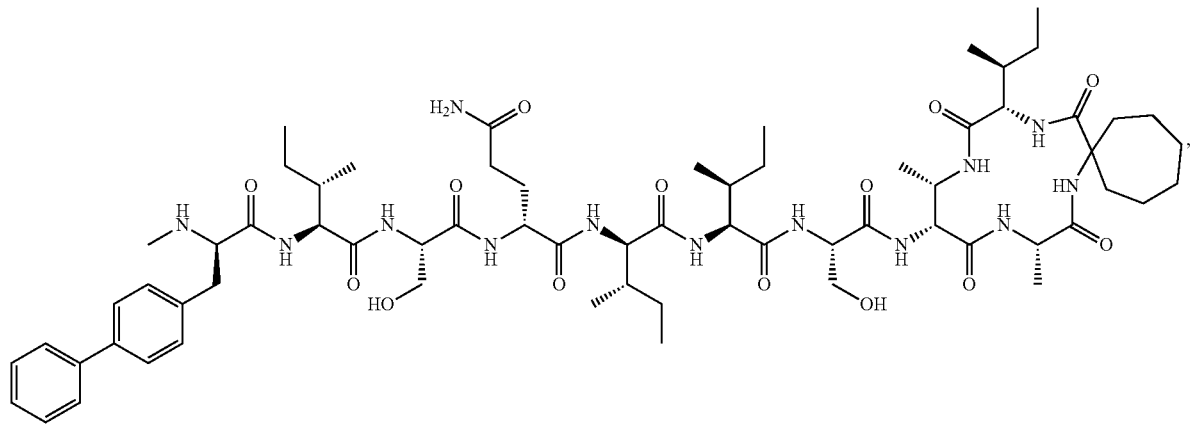

(98)

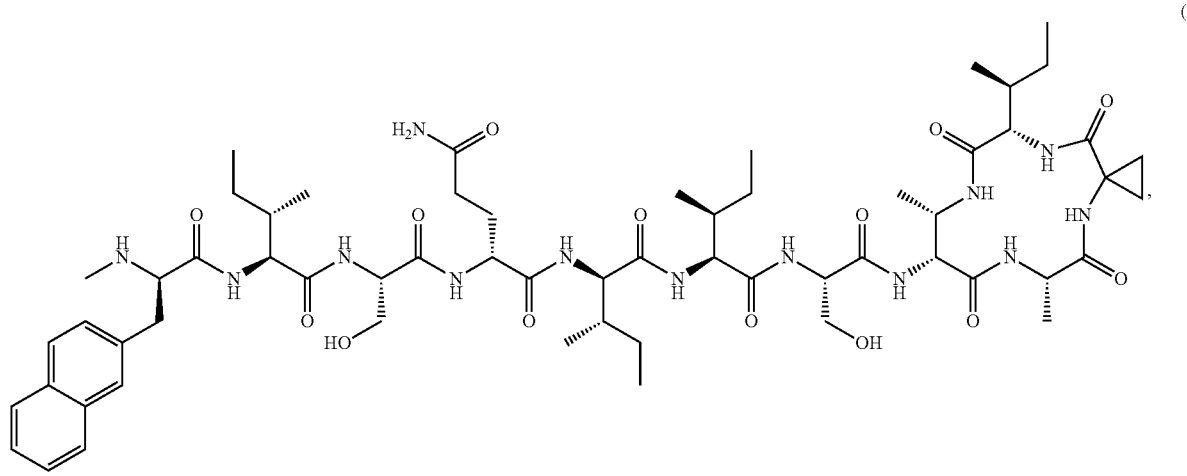

(99)

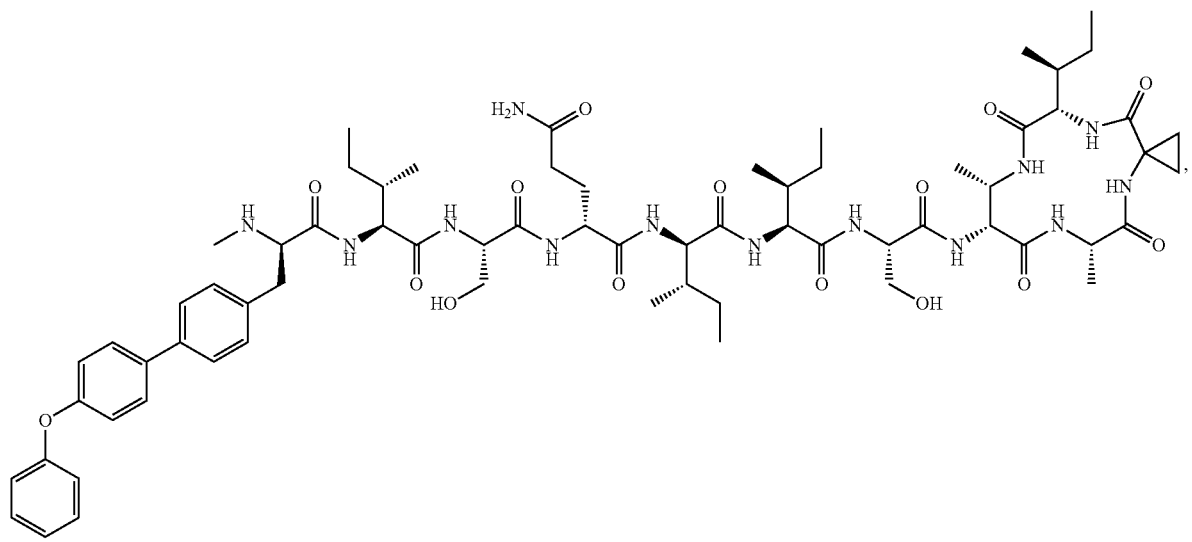

(100)

or a stereoisomer, a tautomer, an N-oxide, a solvate, a pharmaceutically acceptable salt or a prodrug thereof.

11. A pharmaceutical composition comprising:
the compound of claim 1, and
optionally, a pharmaceutically acceptable carrier, adjuvant, vehicle, or a combination thereof.

12. The pharmaceutical composition of claim 11, further comprising:
one or more other therapeutic agents,
wherein the other therapeutic agents are selected from the group consisting of antibacterial agents, antifungal agents, antiviral agents, antiprotozoal agents, antihelminthic agents and combinations thereof.

13. A method of managing, treating or lessening a bacterial infectious disease in a subject, the method comprising:
administering to the subject a therapeutically effective amount of the compound of claim 1.

14. The method of claim 13, wherein
the bacterial infection is a Gram-positive bacterial infection or a *Mycobacterium tuberculosis* infection; or
the bacteria is *Streptococcus, Staphylococcus, Enterococcus, Corynebacterium, Listeria, Bacillus, Erysipelothrix, Actinomycetes, Helicobacter pylori, Legionella pneumophila, Mycobacterium tuberculosis, Mycobacterium avium, Mycobacterium avium intracellulare, Staphylococcus aureus, Staphylococcus epidermidis, Neisseria gonorrhoeae, Neisseria meningitidis, Streptococcus pyogenes, Streptococcus faecalis, Streptococcus bovis, Streptococcus pneumoniae, Haemophilus, Pseudomonas aeruginosa, Bacillus anthracis* or *Bacillus subtilis*.

15. A method of managing, treating or lessening a bacterial infectious disease in a subject, the method comprising:
administering to the subject a therapeutically effective amount of the pharmaceutical composition of claim 11.

16. The method of claim 15, wherein:
the bacterial infection is a Gram-positive bacterial infection or a *Mycobacterium tuberculosis* infection; or
the bacteria is *Streptococcus, Staphylococcus, Enterococcus, Corynebacterium, Listeria, Bacillus, Erysipelothrix, Actinomycetes, Helicobacter pylori, Legionella pneumophila, Mycobacterium tuberculosis, Mycobacterium avium, Mycobacterium avium intracellulare, Staphylococcus aureus, Staphylococcus epidermidis, Neisseria gonorrhoeae, Neisseria meningitidis, Streptococcus pyogenes, Streptococcus faecalis, Streptococcus bovis, Streptococcus pneumoniae, Haemophilus, Pseudomonas aeruginosa, Bacillus anthracis* or *Bacillus subtilis*.

* * * * *